(12) United States Patent
Smith et al.

(10) Patent No.: US 11,755,825 B2
(45) Date of Patent: Sep. 12, 2023

(54) METHOD, SYSTEM, AND COMPUTING DEVICE FOR FACILITATING PRIVATE DRAFTING

(71) Applicant: WORKIVA INC., Ames, IA (US)

(72) Inventors: Travis Smith, Ames, IA (US); Michael Jerome Thiesen, Helena, MT (US); Hannah Joy Deering, Ames, IA (US); Mark David Erickson, Ankeny, IA (US); Ross W. Hendrickson, Prescott, AZ (US); Bryon Lee Marks, Huxley, IA (US); Tanner Davis Miller, Alpharetta, GA (US)

(73) Assignee: WORKIVA INC., Ames, IA (US)

( * ) Notice: Subject to any disclaimer, the term of this patent is extended or adjusted under 35 U.S.C. 154(b) by 0 days.

(21) Appl. No.: 17/018,054

(22) Filed: Sep. 11, 2020

(65) Prior Publication Data
US 2021/0081605 A1 Mar. 18, 2021

Related U.S. Application Data

(60) Provisional application No. 62/899,380, filed on Sep. 12, 2019.

(51) Int. Cl.
*G06F 40/177* (2020.01)
*G06F 16/93* (2019.01)
(Continued)

(52) U.S. Cl.
CPC ........ *G06F 40/177* (2020.01); *G06F 16/9027* (2019.01); *G06F 16/93* (2019.01);
(Continued)

(58) Field of Classification Search
CPC ...... G06F 40/177; G06F 16/93; G06F 40/197; G06F 16/9027; H04L 29/08; H04L 29/06; H04L 65/403; H04L 67/10
See application file for complete search history.

(56) References Cited

U.S. PATENT DOCUMENTS

| 4,807,182 A | 2/1989 | Queen |
| 5,603,021 A | 2/1997 | Spencer et al. |
| (Continued) | | |

FOREIGN PATENT DOCUMENTS

WO  2008/107665 A2  9/2008

OTHER PUBLICATIONS

Notice of Allowance issued in related application U.S. Appl. No. 17/175,910, filed May 17, 2021, 22 pages.
(Continued)

*Primary Examiner* — William L Bashore
*Assistant Examiner* — Gregory A DiStefano
(74) *Attorney, Agent, or Firm* — Faegre Drinker Biddle & Reath LLP

(57) ABSTRACT

A method for facilitating private drafting is described. A request to edit a section of a document in a draft mode is received from a first user of a plurality of users collaborating on the document. An edit for the section of the document in the draft mode is received from the first user. A result of the edit is displayed on a computing device of the first user but not on computing devices of other users of the plurality of users. A request to publish the edit is received from the first user. In response to the request to publish the edit, the result of the edit is displayed on computing devices of the other users of the plurality of users.

11 Claims, 70 Drawing Sheets

(51) Int. Cl.
*H04L 65/403* (2022.01)
*G06F 40/197* (2020.01)
*H04L 67/10* (2022.01)
*G06F 16/901* (2019.01)

(52) U.S. Cl.
CPC .......... *G06F 40/197* (2020.01); *H04L 65/403* (2013.01); *H04L 67/10* (2013.01)

(56) References Cited

U.S. PATENT DOCUMENTS

| | | | |
|---|---|---|---|
| 5,758,356 A | 5/1998 | Hara et al. | |
| 5,883,623 A | 3/1999 | Cseri | |
| 6,057,837 A | 5/2000 | Hatakeda et al. | |
| 6,138,130 A | 10/2000 | Adler et al. | |
| 6,230,173 B1 | 5/2001 | Ferrel et al. | |
| 6,252,605 B1 | 6/2001 | Beesley et al. | |
| 6,460,059 B1 | 10/2002 | Wisniewski | |
| 6,572,660 B1 | 6/2003 | Okamoto | |
| 6,631,385 B2 | 10/2003 | Lee et al. | |
| 6,741,998 B2 | 5/2004 | Ruth et al. | |
| 6,792,454 B2 | 9/2004 | Nakano et al. | |
| 6,848,077 B1 | 1/2005 | McBrearty et al. | |
| 6,909,965 B1 | 6/2005 | Beesley et al. | |
| 6,948,154 B1 | 9/2005 | Rothermel et al. | |
| 7,080,065 B1 | 7/2006 | Kothuri et al. | |
| 7,096,422 B2 | 8/2006 | Rothschiller et al. | |
| 7,124,362 B2 | 10/2006 | Tischer | |
| 7,181,467 B2 | 2/2007 | Kothuri | |
| 7,219,108 B2 | 5/2007 | Kothuri et al. | |
| 7,249,314 B2 | 7/2007 | Walker et al. | |
| 7,424,671 B2 | 9/2008 | Elza et al. | |
| 7,496,837 B1 | 2/2009 | Larcheveque et al. | |
| 7,496,841 B2 | 2/2009 | Hadfield et al. | |
| 7,587,471 B2 | 9/2009 | Yasuda et al. | |
| 7,631,255 B2 | 12/2009 | Weise et al. | |
| 7,734,714 B2 | 6/2010 | Rogers | |
| 7,761,403 B2 | 7/2010 | Witkowski et al. | |
| 7,792,847 B2 | 9/2010 | Dickerman et al. | |
| 7,809,712 B2 | 10/2010 | Witkowski et al. | |
| 7,827,208 B2 | 11/2010 | Bosworth et al. | |
| 7,984,371 B2 | 7/2011 | Zdenek | |
| 8,015,235 B1 | 9/2011 | Bauer et al. | |
| 8,108,464 B1* | 1/2012 | Rochelle ............ G06F 3/04842 709/205 | |
| 8,307,337 B2 | 11/2012 | Chamieh et al. | |
| 8,332,747 B2 | 12/2012 | Carro et al. | |
| 8,335,783 B2 | 12/2012 | Milby | |
| 8,412,813 B2 | 4/2013 | Carlson et al. | |
| 8,423,471 B1 | 4/2013 | Emigh et al. | |
| 8,527,865 B2 | 9/2013 | Li et al. | |
| 8,555,161 B2 | 10/2013 | Parker | |
| 8,595,620 B2 | 11/2013 | Larsen et al. | |
| 8,595,750 B2 | 11/2013 | Agarwal et al. | |
| 8,607,207 B2 | 12/2013 | Chamieh et al. | |
| 8,645,929 B2 | 2/2014 | Chamieh et al. | |
| 8,656,290 B1 | 2/2014 | Greenspan et al. | |
| 8,707,156 B2 | 4/2014 | Xue et al. | |
| 8,745,483 B2 | 6/2014 | Chavoustie et al. | |
| 8,825,594 B2 | 9/2014 | Skaria et al. | |
| 8,849,834 B2 | 9/2014 | Milby | |
| 8,856,234 B2 | 10/2014 | Kluin et al. | |
| 8,869,020 B2 | 10/2014 | Daga | |
| 8,954,457 B2 | 2/2015 | Fablet et al. | |
| 9,015,301 B2 | 4/2015 | Redlich et al. | |
| 9,152,686 B2 | 10/2015 | Whitehead et al. | |
| 9,292,366 B2 | 3/2016 | Carro et al. | |
| 9,292,482 B1 | 3/2016 | Thiesen et al. | |
| 9,292,507 B2 | 3/2016 | Calkowski et al. | |
| 9,552,343 B2 | 1/2017 | Thiesen et al. | |
| 9,613,055 B2 | 4/2017 | Tyercha et al. | |
| 9,720,931 B2 | 8/2017 | Tyercha et al. | |
| 10,133,708 B2 | 11/2018 | Carro et al. | |
| 10,147,054 B2 | 12/2018 | Dayon et al. | |
| 10,223,340 B2 | 3/2019 | Soni | |
| 10,325,014 B2 | 6/2019 | Nelson et al. | |
| 10,331,776 B2 | 6/2019 | Thiesen et al. | |
| 10,635,744 B2 | 4/2020 | Beth et al. | |
| 10,878,182 B2 | 12/2020 | Thiesen et al. | |
| 10,936,808 B2 | 3/2021 | Soni | |
| 10,956,446 B1* | 3/2021 | Hurst ................ G06F 16/275 | |
| 2002/0049697 A1 | 4/2002 | Nakano et al. | |
| 2002/0065848 A1 | 5/2002 | Walker et al. | |
| 2002/0103825 A1 | 8/2002 | Bauchot | |
| 2003/0028545 A1 | 2/2003 | Wang et al. | |
| 2003/0079157 A1 | 4/2003 | Lee et al. | |
| 2003/0112273 A1* | 6/2003 | Hadfield ............. G06Q 10/10 715/751 | |
| 2003/0121008 A1 | 6/2003 | Fischer | |
| 2003/0128243 A1 | 7/2003 | Okamoto et al. | |
| 2004/0024752 A1 | 2/2004 | Manber et al. | |
| 2004/0133567 A1 | 7/2004 | Witkowski et al. | |
| 2004/0172616 A1 | 9/2004 | Rothschiller et al. | |
| 2004/0181543 A1 | 9/2004 | Wu et al. | |
| 2004/0193615 A1 | 9/2004 | Kothuri | |
| 2005/0132070 A1 | 6/2005 | Redlich et al. | |
| 2005/0149851 A1 | 7/2005 | Mittal | |
| 2006/0044307 A1 | 3/2006 | Song | |
| 2006/0080594 A1 | 4/2006 | Chavoustie et al. | |
| 2006/0085386 A1 | 4/2006 | Thanu et al. | |
| 2006/0101324 A1 | 5/2006 | Goldberg et al. | |
| 2006/0143607 A1 | 6/2006 | Morris | |
| 2006/0224946 A1 | 10/2006 | Barrett et al. | |
| 2006/0271868 A1 | 11/2006 | Sullivan et al. | |
| 2007/0033519 A1 | 2/2007 | Zdenek | |
| 2007/0124281 A1 | 5/2007 | Cowan | |
| 2007/0136698 A1 | 6/2007 | Trujillo et al. | |
| 2007/0186157 A1 | 8/2007 | Walker et al. | |
| 2007/0219956 A1 | 9/2007 | Milton | |
| 2007/0220415 A1* | 9/2007 | Cheng .................. G06F 40/18 715/212 | |
| 2007/0245409 A1 | 10/2007 | Harris et al. | |
| 2008/0005164 A1 | 1/2008 | Yee et al. | |
| 2008/0114720 A1 | 5/2008 | Smith et al. | |
| 2008/0134138 A1 | 6/2008 | Chamieh et al. | |
| 2008/0148140 A1 | 6/2008 | Nakano | |
| 2008/0162532 A1 | 7/2008 | Daga | |
| 2008/0177825 A1 | 7/2008 | Dubinko et al. | |
| 2008/0300864 A1 | 12/2008 | Smith | |
| 2008/0306983 A1 | 12/2008 | Singh | |
| 2009/0044283 A1 | 2/2009 | Yoshihama | |
| 2009/0063949 A1 | 3/2009 | Duan | |
| 2009/0094242 A1* | 4/2009 | Lo ..................... G06F 16/1774 | |
| 2009/0100324 A1 | 4/2009 | Aureglia et al. | |
| 2009/0150426 A1 | 6/2009 | Cannon et al. | |
| 2009/0182837 A1 | 7/2009 | Rogers | |
| 2009/0199090 A1 | 8/2009 | Poston et al. | |
| 2009/0292730 A1 | 11/2009 | Li et al. | |
| 2009/0327213 A1 | 12/2009 | Choudhary | |
| 2010/0058176 A1 | 3/2010 | Carro et al. | |
| 2010/0077331 A1 | 3/2010 | Bargh et al. | |
| 2010/0257439 A1 | 10/2010 | Xue et al. | |
| 2011/0106795 A1* | 5/2011 | Maim ................ G06F 40/131 707/728 | |
| 2011/0202968 A1 | 8/2011 | Nurmi | |
| 2011/0271179 A1 | 11/2011 | Jasko et al. | |
| 2012/0030563 A1 | 2/2012 | Lemonik et al. | |
| 2012/0136874 A1 | 5/2012 | Milby | |
| 2012/0137308 A1 | 5/2012 | Agarwal et al. | |
| 2012/0151312 A1 | 6/2012 | Clee et al. | |
| 2012/0173612 A1 | 7/2012 | Vegesna-Venkata et al. | |
| 2012/0330984 A1 | 12/2012 | Fablet et al. | |
| 2012/0331379 A1 | 12/2012 | Carro et al. | |
| 2013/0232475 A1 | 9/2013 | Chamieh et al. | |
| 2014/0047327 A1 | 2/2014 | Larsen et al. | |
| 2014/0082470 A1* | 3/2014 | Trebas ................ G06F 40/197 715/217 | |
| 2014/0129645 A1* | 5/2014 | Mo .................... G06F 40/131 709/205 | |
| 2014/0172919 A1* | 6/2014 | Johnston ............. G06F 16/9027 707/797 | |
| 2014/0181016 A1 | 6/2014 | Whitehead et al. | |
| 2014/0188544 A1 | 7/2014 | Senescu | |
| 2014/0245257 A1 | 8/2014 | Kusmer et al. | |

(56) References Cited

U.S. PATENT DOCUMENTS

| | | |
|---|---|---|
| 2014/0282101 A1 | 9/2014 | Beechuk et al. |
| 2015/0052100 A1 | 2/2015 | Calkowski et al. |
| 2015/0058449 A1 | 2/2015 | Garg et al. |
| 2015/0100304 A1 | 4/2015 | Tealdi et al. |
| 2015/0100594 A1 | 4/2015 | Hess et al. |
| 2015/0199270 A1 | 7/2015 | Day-Richter et al. |
| 2015/0324373 A1 | 11/2015 | Tyercha et al. |
| 2015/0324399 A1 | 11/2015 | Tyercha et al. |
| 2016/0162128 A1 | 6/2016 | Hansen et al. |
| 2016/0239488 A1 | 8/2016 | Aguilon et al. |
| 2016/0344667 A1 | 11/2016 | Lane et al. |
| 2016/0378737 A1 | 12/2016 | Keslin et al. |
| 2017/0132188 A1 | 5/2017 | Thiesen et al. |
| 2017/0220546 A1* | 8/2017 | Codrington ........... G06F 3/0484 |
| 2017/0308511 A1 | 10/2017 | Beth et al. |
| 2018/0165260 A1 | 6/2018 | Soni |
| 2019/0102370 A1 | 4/2019 | Nelson et al. |
| 2020/0250383 A1 | 8/2020 | Cheng |
| 2021/0064817 A1 | 3/2021 | Deering et al. |

OTHER PUBLICATIONS

Extendoffice, "How to insert multiple hyperlinks in a cell in Excel?", ExtendOffice.com, <https://web.archive.org/web/20150409040726/https://www.extendoffice.com/documents/excel/916-excel-insert-mulitple-hyperlinks.html>, 2015, 3 pages.

Bewig, "How do you know your spreadsheet is right? Principles, Techniques and Practice of Spreadsheet Style," <http://www.eusprig.org/hdykysir.pdf>, Jul. 28, 2005, 14 pages.

Burnett et al., "Testing Homogeneous Spreadsheet Grids with the "What You See Is What You Test" Methodology," IEEE Transactions on Software Engineering, Jun. 2002, vol. 28, No. 6, pp. 576-594.

Grishchenko, "Deep Hypertext with Embedded Revision Control Implemented in regular Expressions," Proceedings of the 6th International Symposium on Wikis and Open Collaboration, ACM, 2010, 10 pages.

Grishchenko et al., "Referencing within evolving hypertext," Second international Workshop on Dynamic and Adaptive Hypertext, 2011, 12 pages.

Guttman, "R-Trees: A Dynamic Index Structure for Spatial Searching," ACM, 1984, pp. 47-57.

Ignat et al., "Tree-based model algorithm for maintaining consistency in real-time collaborative editing systems," The Fourth International Workshop on Collaborative Editing Systems, CSCW 2002, New Orleans, USA, Nov. 2002, 8 pages.

Kamel et al., "Hilbert R-tree: An Improved R-tree Using Fractals," PVLDB '94 Proceedings of the 20th International Conference on Very Large Data Bases, Sep. 12-15, 1994, Morgan Kaufman Publishers Inc., San Francisco, CA, USA, 1994, pp. 500-509.

Kankuzi, "A Dynamic Graph-based Visualization for Spreadsheets," University of Bostwana, Faculty of Science, Department of Computer Science, <http://www.researchgate.net/profile/Yirsaw_Ayalew2/publication/234808991_A_dynamic_graph-based_visualization_for_spreadsheets/links/00b7d51a9b5169d566000000.pdf>, Jun. 2008, 121 pages.

Kankuzi et al., "An End-User Oriented Graph-Based Visualization for Spreadsheets," Proceedings of the 4th International Workshop on End-user Software Engineering, WEUSE '08, May 12, 2008, Leipzig, Germany, ACM, 2008, pp. 86-90.

Microsoft, "Create an external reference (link) to a cell range in another workbook," Excel for Microsoft 365, Excel 2019, Excel 2016, Excel 2013, Excel 2010 Support Office, 2020, retrieved from internet at <https://support.office.com/en-us/article/create-an-external-reference-link-to-a-cell-range-in-another-workbook-c98d1803-dd75-4668-ac6a-d7cca2a9b95f> on May 5, 2020, 8 pages.

Microsoft, "Create or change a cell reference," Excel for Microsoft 365, Excel for the web, Excel 2019, Excel 2016 Support Office, 2020, retrieved from internet at <https://support.office.com/en-us/article/create-or-change-a-cell-reference-c7b8b95d-c594-4488-947e-c835903cebaa> on May 5, 2020, 8 pages.

Rothermel et al., "A Methodology for Testing Spreadsheets," ACM Transactions on Software Engineering and Methodology, Jan. 2001, vol. 10, No. 1, pp. 110-147.

Sewall et al., "PALM: Parallel Architecture-Friendly Latch-Free Modifications to B+ Trees on Many-Core Processors," Proc. VLDB Endowment, 2011, pp. 795-806.

Stanescu et al., "Using R-trees in content-based region query with spatial bounds," Seventh International Symposium on Symbolic and Numeric Algorithms for Scientific Computing (SYNASC'05), Timisoara, Romania, 2005, 7 pages.

Tang et al., "Novel DR-tree index based on the diagonal line of MBR," 2012 8th International Wireless Communications and Mobile Computing Conference (IWCMC), Limassol, Cyprus, 2012, pp. 574-579.

Yang et al., "Performance of R-Tree with Slim-Down and Reinsertion Algorithm," 2010 International Conference on Signal Acquisition and Processing, Bangalore, India, 2010, pp. 291-294.

\* cited by examiner

| | A | B | C | D |
|---|---|---|---|---|
| 1 | | | | |
| 2 | Worksheet 1 | Income Statement | Current Period | |
| 3 | | Interest income | 45,000 | |
| 4 | | Non-interest income | 12,000 | |
| 5 | | Write down of real estate | (6,000) | |
| 6 | | Net income | 51,000 | |
| 7 | | | | |
| 8 | | | | |
| 9 | Worksheet 2 | Balance Sheet | Current Period | Prior Period |
| 10 | | Cash | 52,000 | 36,000 |
| 11 | | Real estate | 15,000 | 21,000 |
| 12 | | Total Assets | 67,000 | 57,000 |
| 13 | | | | |
| 14 | | | | |
| 15 | Worksheet 3 | Statement of Cash Flow | Current Period | |
| 16 | | Change in cash from operating activities | 16,000 | |
| 17 | | Net change in cash flows | 16,000 | |
| 18 | | Cash at beginning of period | 36,000 | |
| 19 | | Cash at end of period | 52,000 | |

|   | A | B | C | D |
|---|---|---|---|---|
| 1 |   |   |   |   |
| 2 |   | Worksheet 1 | Income Statement | Current Period |
| 3 |   |   | Interest income | 45,000 |
| 4 |   |   | Non-interest income | 12,000 |
| 5 |   |   | Write down of real estate | (6,000) |
| 6 |   |   | Net income | =sum(C3:C5) |
| 7 |   |   |   |   |
| 8 |   |   |   |   |
| 9 |   | Worksheet 2 | Balance Sheet | Current Period | Prior Period |
| 10 |   |   | Cash | link to source at C19 | 36,000 |
| 11 |   |   | Real estate | =D11+C5 | 21,000 |
| 12 |   |   | Total Assets | =sum(C3:C5) | =sum(D10:D11) |
| 13 |   |   |   |   |
| 14 |   |   |   |   |
| 15 |   | Worksheet 3 | Statement of Cash Flow | Current Period |
| 16 |   |   | Change in cash from operating activities | 16,000 |
| 17 |   |   | Net change in cash flows | =sum(C16) |
| 18 |   |   | Cash at beginning of period | link to source at D10 |
| 19 |   |   | Cash at end of period | =C18+C17 |

METHOD, SYSTEM, AND COMPUTING DEVICE FOR FACILITATING PRIVATE DRAFTING

CROSS-REFERENCE TO RELATED APPLICATIONS

This application claims the priority benefit of U.S. Provisional Patent Application No. 62/899,380, filed on Sep. 12, 2019. This application is also related to U.S. patent application Ser. No. 16/994,944, filed on Aug. 17, 2020. Each of the above documents is incorporated herein by reference in its entirety.

TECHNICAL FIELD

The present disclosure relates generally to cloud-based document collaboration and, more particularly, to methods for facilitating private drafting in a document collaboration system.

BACKGROUND

Cloud-based document collaboration platforms tend to be fully open and collaborative. That is, all users who are invited to edit a document (e.g., text document, graphics-based document, spreadsheet, or a hybrid of one or more of the foregoing) are able to see one another's edits in real time or nearly real time. However, there are many situations in which one or more users would prefer not to share their draft work product with other collaborators.

SUMMARY

In an embodiment, a method for facilitating private drafting includes: storing, in a database, a mainline causal tree structure corresponding to a document, wherein the mainline causal tree structure comprises a sequence of nodes and each node comprises an editing instruction and an identifier unique to the editing instruction; receiving, from a first user of a plurality of users collaborating on the document, a request to edit a section of the document in a draft mode; in response to the edit request, creating a draft branch of the mainline causal tree structure to manage editing instructions in the draft mode, wherein the draft branch comprises a sequence of nodes, a portion of which correspond to the nodes of the mainline causal tree structure, and each node of the draft branch comprises an editing instruction and an identifier unique to the editing instruction; receiving, from the first user, an edit for the section of the document in the draft mode; displaying a result of the edit on a computing device of the first user but not on computing devices of other users of the plurality of users; storing, in an additional node of the draft branch, an editing instruction that represents the edit by the first user; receiving, from the first user, a request to publish the edit; and in response to the request to publish the edit, merging the draft branch of the causal tree structure with the mainline causal tree structure, and displaying the result of the edit on computing devices of the other users of the plurality of users.

According to an embodiment, a method for facilitating private drafting includes: displaying, on a computing device of a first user, a document including a table comprising a plurality of cells, wherein at least one of the cells is governed by a formula and wherein the first user is one of a plurality of users collaborating on the document; maintaining an interval-based dependency graph comprising a plurality of nodes, such that each node of the graph represents a range of locations on the table on which at least one formula depends; receiving, from the first user, a request to edit the table in a draft mode; in response to the edit request, creating a copy of at least a portion of the dependency graph to manage editing instructions in the draft mode; receiving, from the first user, an edit for the table in the draft mode; displaying a result of the edit on the computing device of the first user but not on computing devices of other users of the plurality of users; storing, in an additional node of the copy of the portion of the dependency graph, an editing instruction that represents the edit by the first user; receiving, from the first user, a request to publish the edit; and in response to the request to publish the edit, merging the copy of the portion of the dependency graph with the dependency graph, and displaying the result of the edit on the computing devices of the other users of the plurality of users.

DRAWINGS

While the appended claims set forth the features of the present techniques with particularity, these techniques may be best understood from the following detailed description taken in conjunction with the accompanying drawings of which:

Figure 52C:
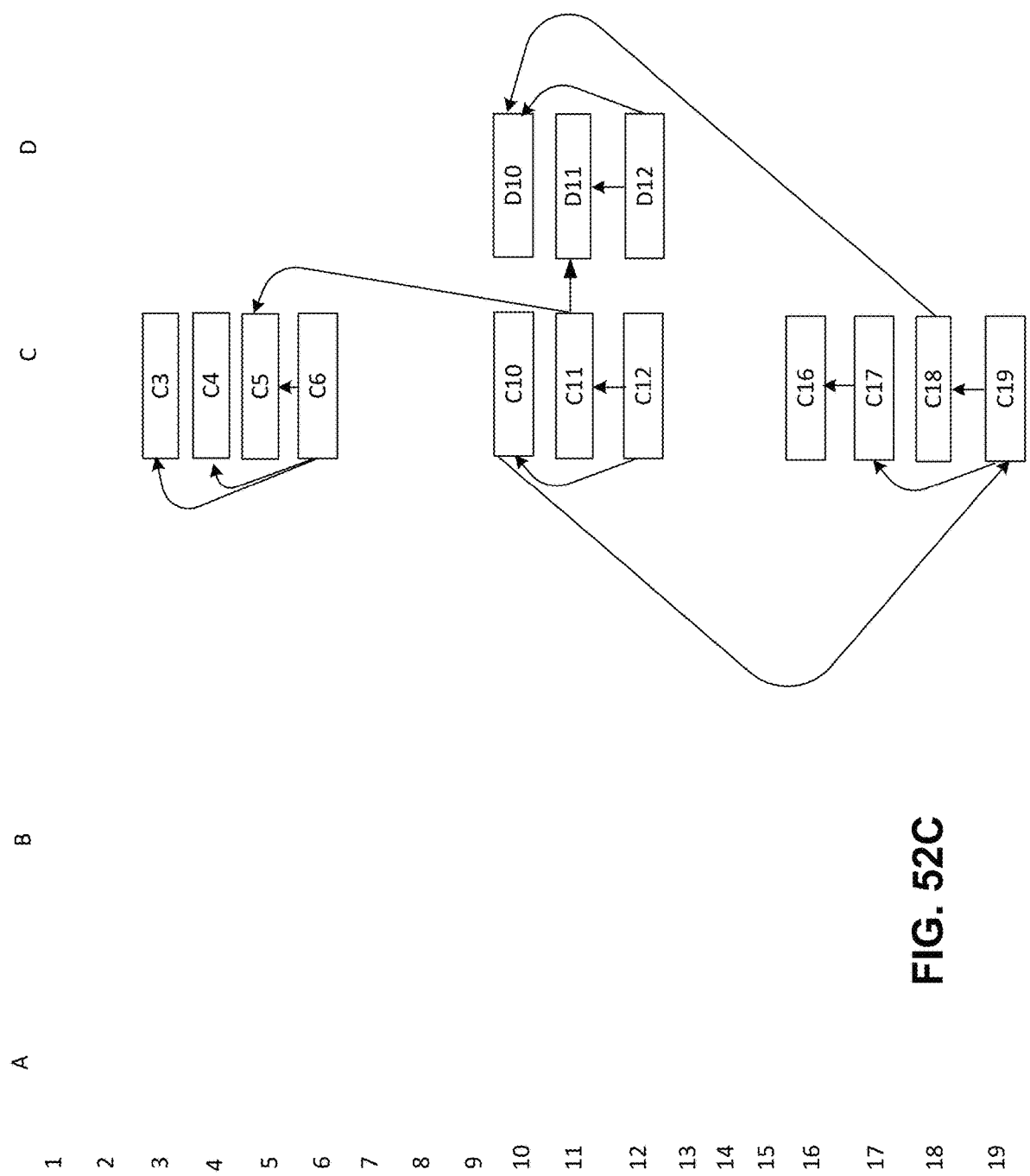

FIG. 52A, FIG. 52B, and FIG. 52C show another spreadsheet on a user interface to help illustrate another embodiment.

Figure 53A:
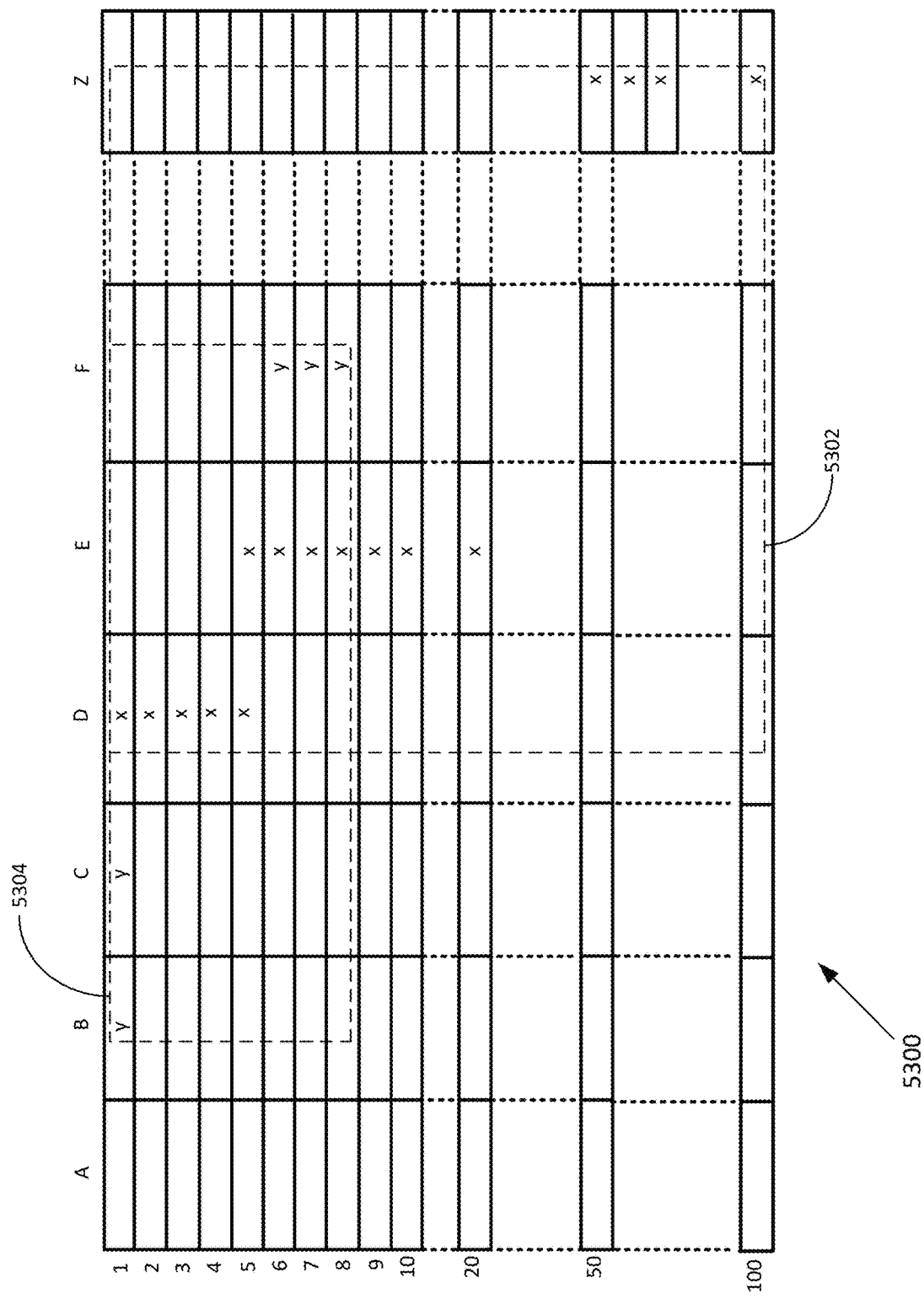
Figure 53B:
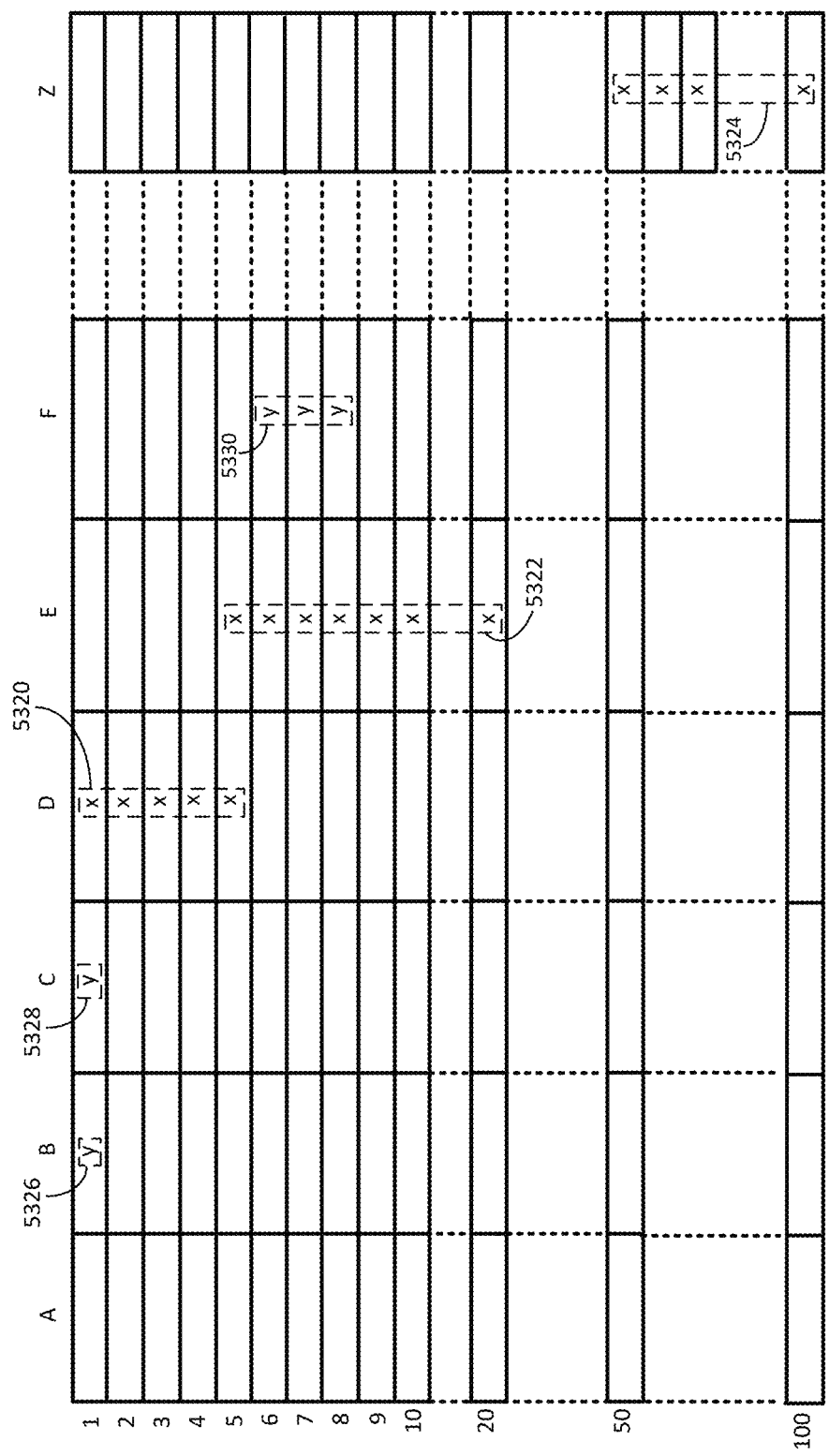

FIG. 53A and FIG. 53B depict example spreadsheets to help illustrate minimum bounding rectangles according to an embodiment.

Figure 54A:
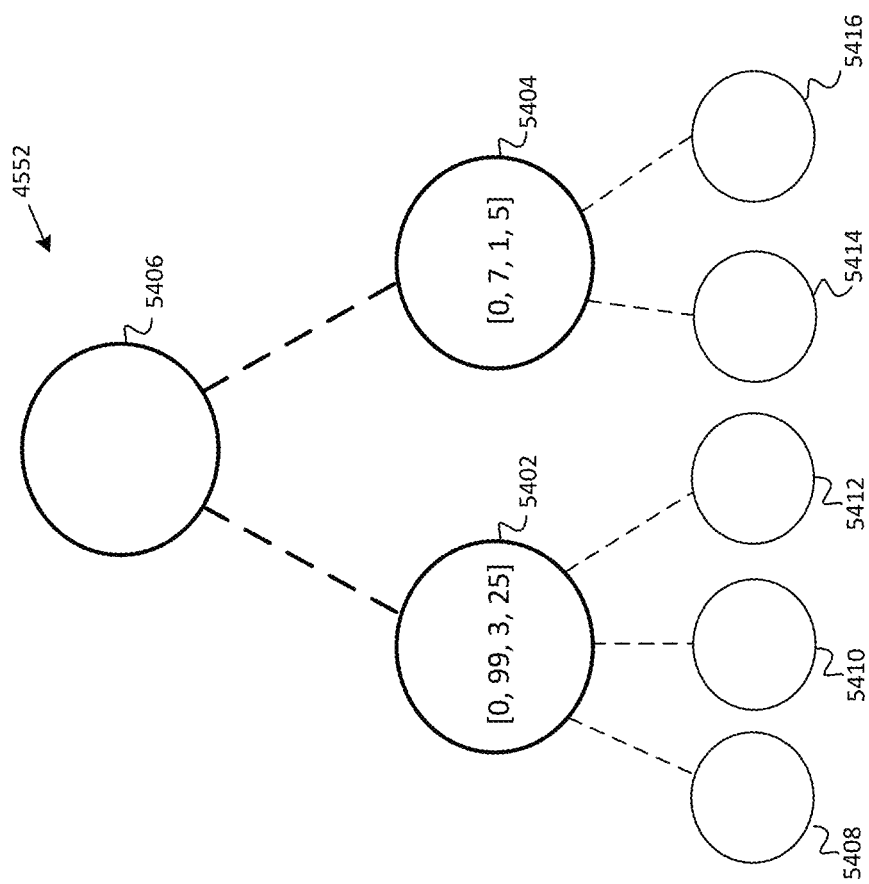
Figure 54B:
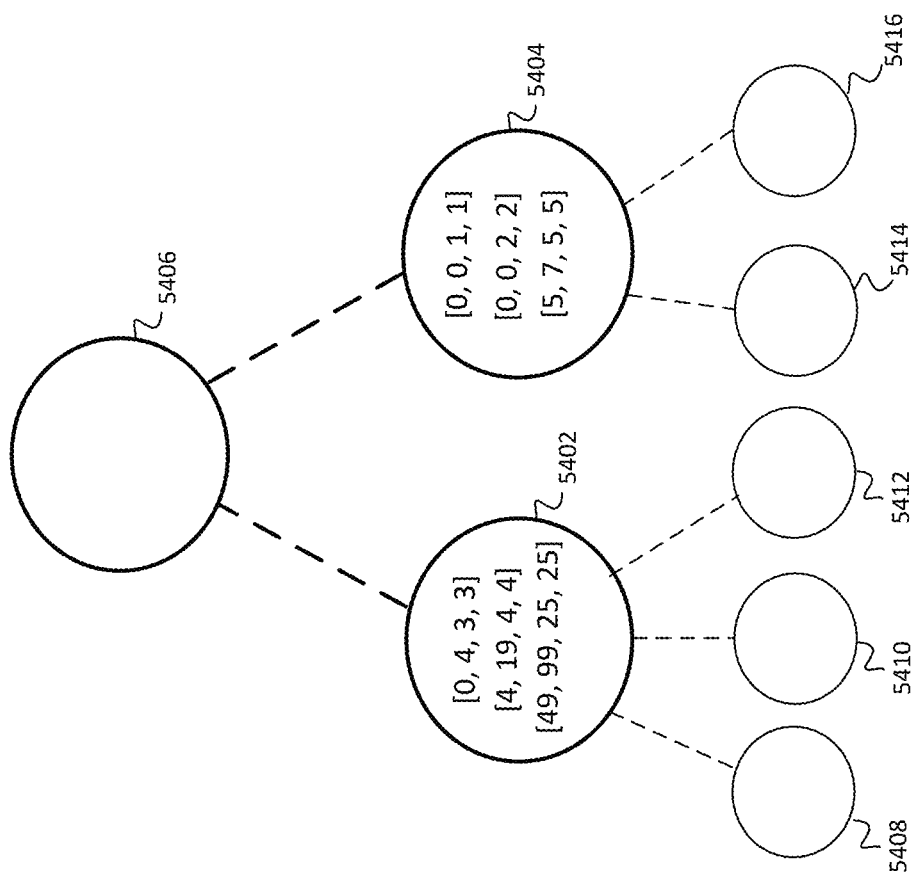

FIG. 54A and FIG. 54B depict example RTrees to help illustrate the technical improvements resulting from the use of columnar-based minimum bounding rectangles according to an embodiment.

Figure 54C:
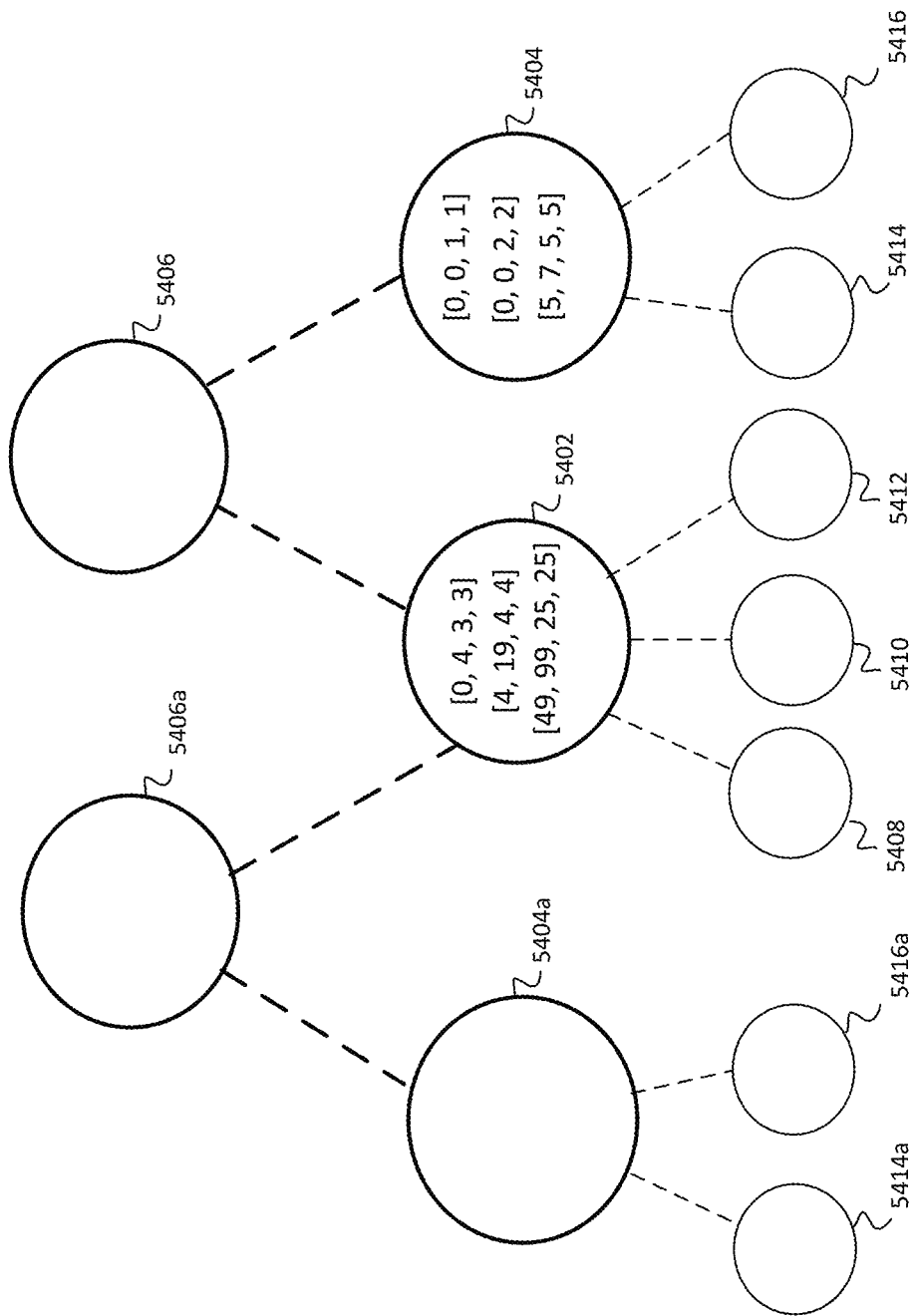

FIG. 54C illustrates the use of immutability in the context of the RTree of FIG. 54B according to an embodiment.

FIG. 55A, FIG. 55B, FIG. 55C, and FIG. 55D illustrate the use of virtual coordinates according to an embodiment.

FIG. 56A, FIG. 56B, FIG. 56C, and FIG. 56D depict changes to an example spreadsheet to accompany the example of FIGS. 55A-55D.

DESCRIPTION

Various embodiments set forth in the present disclosure are directed to a method, system, and computing device that facilitates private drafting in a document collaboration system. According to an embodiment, a document is made up of a series of sections. The default mode for the document is that it is fully collaborative (which may sometimes be referred to herein as "collaborative mode"). That is, each collaborator can see the edits of all other collaborators in real time or nearly real time. However, any collaborator with sufficient permission can take control of a section of the document and make the section "private" to themselves only (the "private user") or private to themselves and any additional users (the "private group") that the user taking control designates. Making a section of the document private is sometimes referred to herein as editing the section of the document in "draft mode" or creating a "draft" of that section of the document, in accordance with one or more embodiments. Once a section of the document becomes private, users other than the private user (also sometimes referred to as the "draft user") or those not within the private group (also sometimes referred to as the "draft group") will not be able to see additional edits being made to the section, but will only see the state of the section as it was just prior to being taken into draft mode. The private user or a user within the private group (assuming they have sufficient permission) can choose to make the edits public, which unlocks the draft section and allows the rest of the collaborators to view the changes that were made and to make their own edits to the section if desired.

In an embodiment, edits to the document are managed through the use of a causal tree or causal graph, and when a section of the document is taken private (is taken into draft mode), the document collaboration system creates a branch (sometimes referred to herein as a "draft branch") of the causal tree or causal graph to keep track of the edits to the section of the document and, when the section is subsequently made public, merges the draft branch into the original (or "mainline") causal tree or causal graph.

In an embodiment, the system includes a computing device that configures the computer memory according to a causal tree or causal graph (which is a type of logic tree or logic graph) representing a structure of a document. The computer memory may be internal to or external to the computing device. Causal tree structures are useful representations of how content and metadata associated with the content are organized. For example, a document may be represented by a single causal tree structure or a bounded set of causal tree structures. The causal tree structure is useful in efficiently tracking and storing changes made in the document. A typical causal tree structure includes nodes of the editing instructions in the document, and each editing instruction has a unique identifier or ID. The editing instructions include, for example, text characters, insertion of text characters, deletion of text characters, formatting instructions, copy and paste, cut and paste, etc. In other words, a causal tree structure is a representation of all the instructions (regardless of type) that compose a document. The causal tree structure starts with a root node and a collection of observation instances, from which all other instruction nodes branch. Except for the root node and observations, each editing instruction in the document is caused by whichever editing instruction that came before it. Every editing instruction is aware of the ID of its parent instruction, i.e., the instruction that "caused" it. In an embodiment, each instruction (other than the root node and observations) in the document may be represented as a 3-tuple: ID or nodeID (ID of the instruction), CauseID (ID of the parent instruction), and Value (value of the instruction). Observations have a 3-tuple: ID (ID of the instruction), Start ID (ID of the first character in a range), and Stop ID (ID of character immediately after the last character in a range unless the same as the Start ID which indicates only a single character is to be observed). Additional instructions may be added to an observation to provide additional information or to modify the range being observed. Examples of observations are discussed in U.S. patent application Ser. No. 16/871,512. Casual trees and causal graphs are described in greater detail later in this disclosure.

According to an embodiment, edits to the document are managed through the use of an Rtree (also referred to herein as "R-Tree"), and when a section of the document is taken private (is taken into draft mode), the document collaboration system creates a copy of the relevant segment or segments of the Rtree, uses the segment or segments to keep track of the edits to the section of the document and, when the section is subsequently made public, merges the segment or segments into the original Rtree.

In an embodiment, the system includes a computing device that configures the computer memory according to an RTree (which is a type of logic tree) representing a structure of a spreadsheet or other document. The computer memory may be internal to or external to the computing device. In an embodiment, the RTree has a plurality of nodes, at least some of which contain one or more minimum bounding rectangles. Each minimum bounding rectangle ("MBR") encompasses cells of the spreadsheet from a different one of a plurality of columns of the spreadsheet, but does not encompass cells of any of the other columns of the plurality of columns. A node of the RTree may hold multiple MBRs or a single MBR. Rtrees are described in greater detail later in this disclosure.

A document collaboration system may include a server and various client devices or may simply involve a single device or peer-to-peer devices. The document collaboration system may be implemented in a cloud computing environment. In a client-server architecture, a document collaboration editing application may be installed on the server, the client devices, or both. The document collaboration editing application may also be an application that is accessible through a web browser.

Figure 1A:
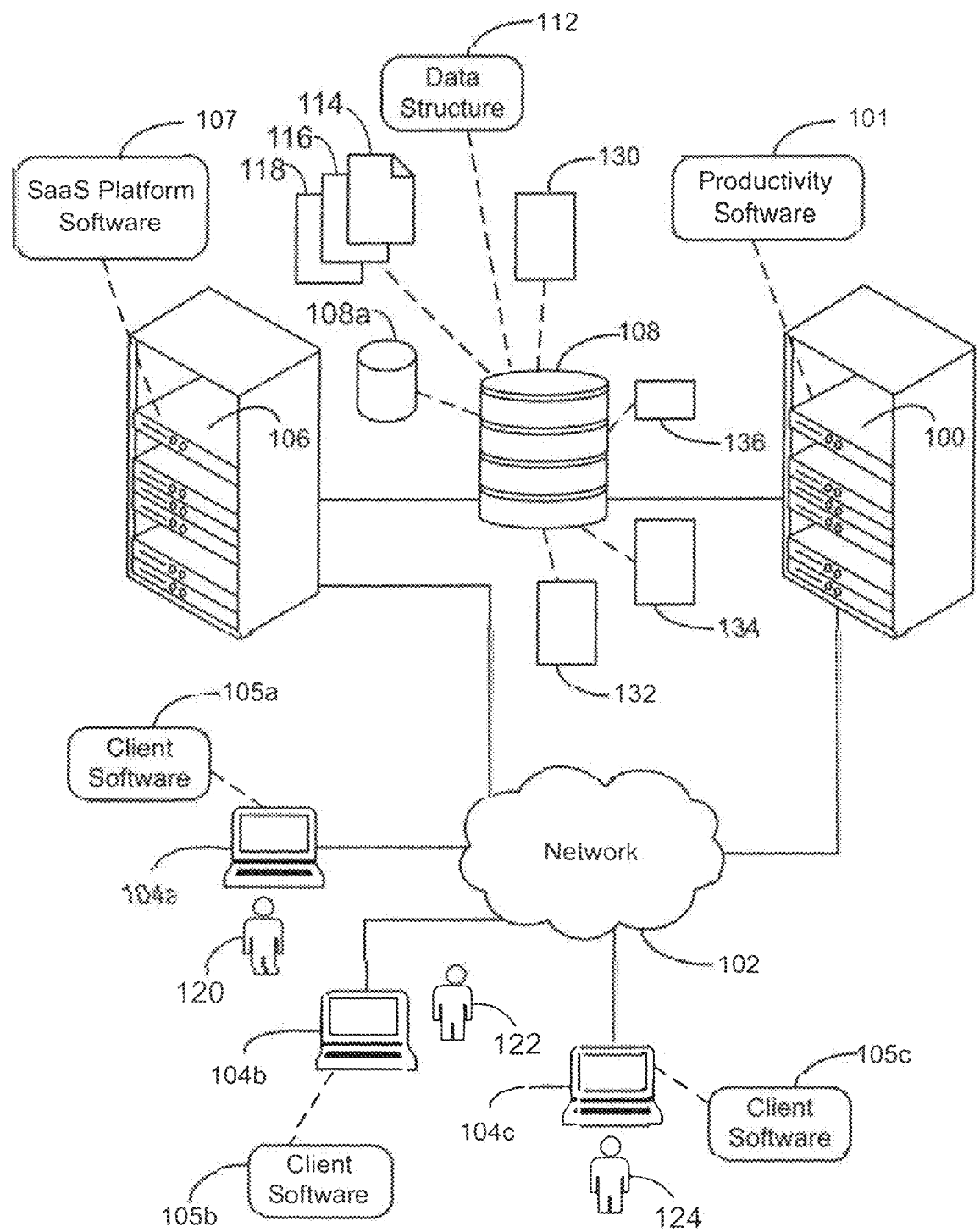
FIG. 1A is an example of a networking environment in which various embodiments of the disclosure may be employed.

Various embodiments of the disclosure are implemented in a computer networking environment. Turning to FIG. 1A, an example of such an environment is shown. A first computing device 100 is communicatively linked to a network 102. Possible implementations of the network 102 include a local-area network, a wide-area network, a private network, a public network (e.g., the Internet), or any combination of these. The network 102 may include both wired and wireless components. Also communicatively linked to the network 102 are a second computing device 104a (also referred to as a "first client device" or, when there is no specific mention of the first computing device 100, the "first computing device"), a third computing device 104b (also referred to as a "second client device" or, when there is no specific mention of the first computing device 100, the "second computing device"), a fourth computing device 104c (also referred to as a "third client device" or, when there is no specific mention of the first computing device 100, the "third computing device"), and a fifth computing device 106 (e.g., a server or a cluster of servers, also referred to herein as "SaaS server"). The fifth computing device 106 is communicatively linked to a media storage device 108 (e.g., a redundant array of independent disks). For the sake of example, it is assumed that a first user 120 operates the second computing device 104a, a second user 122 operates the third computing device 104b, and a third user 124 operates the fourth computing device 104c. Each of the computing devices 104a, 104b, and 104c executes client software (reference numerals 105a, 105b, and 105c, respectively). One possible implementation of the client software is a web browser. It should be noted that the networking environment may include any number of computing devices (e.g., hundreds of client devices) and the number depicted in FIG. 1A is meant only to be representative.

Residing within the media storage device 108 is a database 108a containing multiple documents, three of which are depicted in FIG. 1A: a first document 114, a second document 116, and a third document 118. The first computing device 100 and the fifth computing device 106 are depicted as rack-mounted servers, while the second, third, and fourth computing devices 104a, 104b, and 104c, respectively, are depicted as a notebook computers. However, the computing devices depicted in FIG. 1A are merely representative. Other possible implementations of a computing device include a desktop computer, a tablet computing, and a smartphone. Furthermore, although the first, second, and third documents 114, 116, and 118, respectively, are depicted as being stored in a single device, they may, in fact, be stored on multiple storage devices (e.g., sharded into multiple physical chunks) of a cloud storage service. Finally, there may be more than or fewer than the first, second, and third documents 114, 116, and 118, respectively, residing on the media storage device 1

For convenient reference, the first computing device 100 will also be referred to as a "productivity server 100" and the fifth computing device 106 will be also be referred to as a "database server 106." Although depicted in FIG. 1A as separate devices, in some embodiments, the functionality of the productivity server 100 and the database server 106 are on the same device. The productivity server 100 executes productivity software 101 to provide document collaboration services. The database server 106 executes Software-as-a-Service ("SaaS") platform software 107 to provide database services to the productivity software 101, such as maintaining the contents of the database 108a and providing a programming platform for various processes launched by the productivity software (e.g., to manipulate, store, and retrieve documents and other information from the database 108a). Under the control of the productivity software 101, the productivity server 100 interacts with the database server 106 (which operates under the control of the SaaS platform software 107) and the computing devices 104a, 104b, and 104c to allow the computing devices to access the first document 114, the second document 116, and the third document 118 so that the first user 120, the second user 122, and the third user 124 can collaborate in editing the documents (e.g., moving sections around in a particular document).

Figure 1B:
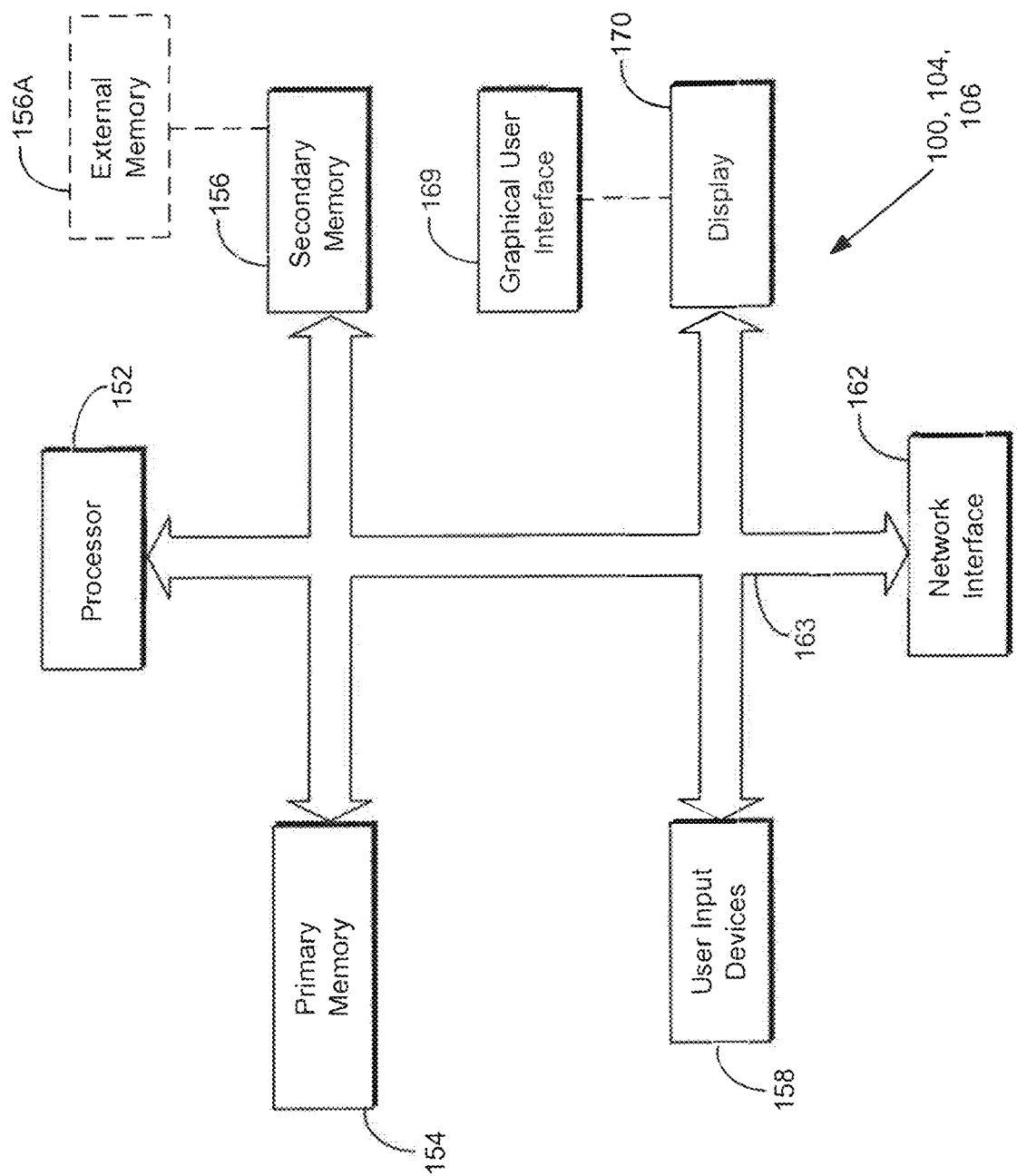
FIG. 1B is a block diagram of a computing device according to an embodiment.

According to an embodiment, one or more of the computing devices of FIG. 1A (including the media storage device 108) have the general architecture shown in FIG. 1B. The device depicted in FIG. 1B includes a processor 152 (e.g., a microprocessor, controller, or application-specific integrated circuit), a primary memory 154 (e.g., volatile memory, random-access memory), a secondary memory 156

(e.g., non-volatile memory), user input devices 158 (e.g., a keyboard, mouse, or touchscreen), a display 170 (e.g., an organic, light-emitting diode display), and a network interface 162 (which may be wired or wireless). The memories 154 and 156 store instructions and data. The processor 152 executes the instructions and uses the data to carry out various procedures including, in some embodiments, the methods described herein.

Each of the elements of FIG. 1B is communicatively linked to one or more other elements via one or more data pathways 163. Possible implementations of the data pathways 163 include wires, conductive pathways on a microchip, and wireless connections. In an embodiment, the processor 152 is one of multiple processors in the computing device, each of which is capable of executing a separate thread. In an embodiment, the processor 152 communicates with other processors external to the computing device in order to initiate the execution of different threads on those other processors.

The term "local memory" as used herein refers to one or both the memories 154 and 156 (i.e., memory accessible by the processor 152 within the computing device). In some embodiments, the secondary memory 156 is implemented as, or supplemented by an external memory 156A. The media storage device 108 is a possible implementation of the external memory 156A. The processor 152 executes the instructions and uses the data to carry out various procedures including, in some embodiments, the methods described herein, including displaying a graphical user interface 169. The graphical user interface 169 is, according to one embodiment, software that the processor 152 executes to display a report on the display device 170, and which permits a user to make inputs into the report via the user input devices 158.

The computing devices 104*a*, 104*b*, and 104*c* of FIG. 1A (e.g., the processor 152 of each of the computing devices) are able to communicate with other devices of FIG. 1A via the network interface 162 over the network 102. In an embodiment, this communication takes place via a user interface that the productivity server 100 provides to the computing devices 104*a*, 104*b*, and 104*c*. The specific nature of the user interface and what the user interface shows at any given time may vary depending what the user has chosen to view. Also, multiple users may interact with different instances of the user interface on different devices. In some embodiments, the productivity server 100 carries out calculations to determine how content is to be rendered on a computing device, generates rendering instructions based on those calculations, and transmits those rendering instructions to the computing device. Using the received instructions, the computing device renders the content on a display. In other embodiments, the productivity server 100 transmits instructions regarding an asset to a computing device. In carrying out the received instructions, the computing device performs the appropriate calculations locally to render the content of the asset on a display.

This disclosure may sometimes refer to one or more of the client software 105*a*, the client software 105*b*, the client software 105*c*, the productivity software 101, the server device 100, the first client device 104*a*, the second client device 104*b*, or the third client device 104*c* as taking one or more actions. It is to be understood that such actions may involve one or more of the client software 105*a*, the client software 105*b*, the client software 105*c*, and the productivity software 101 taking such actions as: (a) the client software transmitting hypertext transport protocol commands such as "Get" and "Post" in order to transmit to or receive information from the productivity software 101 (e.g., via a web server), and (b) the client software running a script (e.g., JavaScript) to send information to and retrieve information from the productivity software 101. The productivity software 101 may ultimately obtain information (e.g., web pages or data to feed into plugins used by the client software) from the database 108*a* or the SaaS platform software 107. It is to be understood, however, that when a computing device (or software executing thereon) carries out an action, it is the processor hardware 152 (the main processor and/or one or more secondary processors, such as a graphics processing unit, hardware codec, input-output controller, etc.) that carries out the action at the hardware level.

The disclosure will also refer to actions taking place via a user interface. There are various ways in which this takes place. In an embodiment, client software on a client computing device (such as one of the computing devices 104*a*, 104*b*, and 104*c* of FIG. 1A) presents a user interface, which it receives from the productivity software 101. A user interacts with the user interface, and the client computing device transmits the user's input to the productivity software 101, which responds to the user's input via the client software.

In an embodiment, documents maintained on the media storage device 108 may be organized into sections, with each section (e.g., the contents of the section) being maintained in its own separate data structure referred to as a "section entity." For example, the first document 114 in FIG. 1A has a first section represented by a first section entity 130, a second section represented by a second section entity 132, and a third section represented by a third section entity 134. The productivity software 101 uses an outline entity 136 (also stored on the media storage device 108) to determine how the sections of the document are organized. As will be described below, the outline entity 136 may be implemented as a causal tree or causal graph, in one or more embodiments.

In an embodiment, the productivity software 101 (e.g., via the SaaS platform software 107) manages various items of data stored on the media storage device 108. These data items are presented to the client software 105*a*, 105*b*, and 105*c* as being part of the one or more documents 114, 116, and 118 (e.g., text-based documents, spreadsheets, drawings, or presentations). In one example, the data items that are presented as being part of the one of the documents 114, 116, or 118 may be presented as being part of a section of that document (e.g., one of the sections represented by the first section entity 130, second section entity 132, or third section entity 134). However, the various data items are not necessarily organized into documents on the media storage device 108. Instead, the various data items may be separately accessible (e.g., referenced by their own individual globally unique IDs).

In some cases, a data item may be used and edited in one document by a user who acts as a data producer, while a linked version of the same data item is used in another document by a user (or users) who acts as a data consumer. In at least one embodiment, a linked version of a data item is a copy of the data item that remains consistent (e.g., has the same value) as its original counterpart as long as there is no unpublished edit to the data item. Once one or more edits are made to a data item, its value may no longer match that of its linked version unless and until that data item is published (i.e., the edits to the data item are published), at which point the productivity software 101 will propagate the edit (e.g., the updated value) to the linked version of the data item, so that the linked version of the data item once again has the same value as the original data item. This update to the linked version will therefore appear on the user interface of any user who is a consumer of the data item (e.g., has opened a document in which the linked version of the data item is being used), even if such user has not been granted any permissions to the document containing the data item.

According to an embodiment, the productivity software 101 manages permissions to the various data items and to documents that include such items. In one implementation, the permission levels granted to users for a given document include (a) owner, which gives a user permission to view the document, to edit the document, and to give others permissions to the document, (b) editor, which gives a user permission to view the document and to edit the document, and (c) viewer, which only gives a user permission to view the document.

In an embodiment, various documents in the system of FIG. 1A share data with one another via links and via a publish-subscribe system referred to herein as "streams."

As noted above, users may feel uncomfortable working in a real-time collaborative setting. Allowing a user to edit a portion of a document in draft mode gives the user the ability to work on their own private "copy" of that portion of the document. In accordance with one or more embodiments, a "draft" of a document or section of the document is not a literal copy, but is durable and persistent (at least until the draft is merged with the collaborative document).

Figure 34:
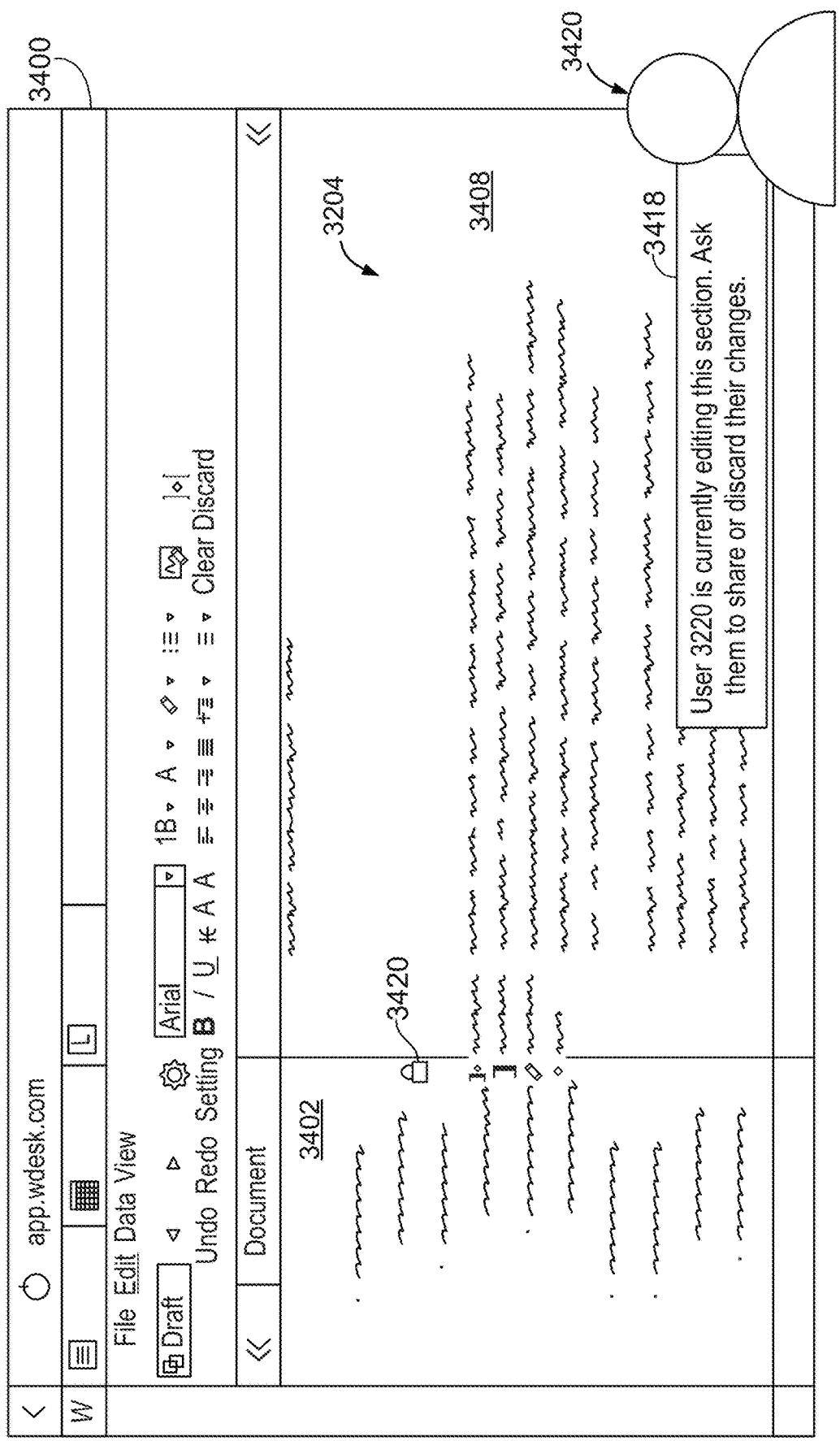
FIG. 34 illustrates an example of editing a section of a document that is in a draft mode, according to an embodiment.

In at least one embodiment, when a first user takes a section of a document into draft mode (e.g., when a user requests to edit a section of the document in draft mode), other users who are collaborating on the document with the first user are prevented from making edits to the section of the document. In an embodiment, when a section of a document is being edited in draft mode, an indicator is displayed to indicate to the draft user and the other users that the section is being edited in draft mode. In one example, the indicator may appear as a lock displayed next to the section of the document in an outline of the document. Such an example is shown in FIG. 34. In accordance with one embodiment, only one user may edit a particular section of a document in draft mode at one time. In one or more other embodiments, multiple users may edit a particular section of a document in draft mode at the same time.

Figure 17:
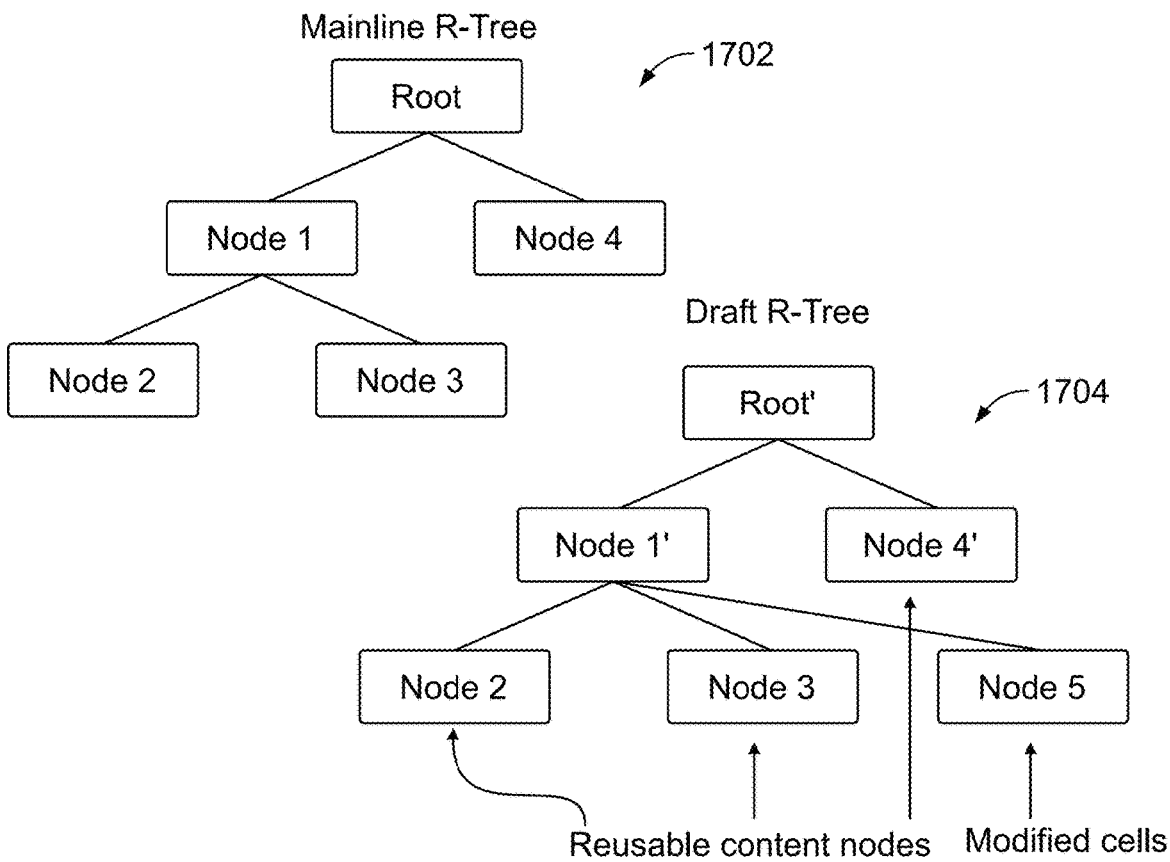
FIG. 17 is a diagram illustrating an example of loading a table in a draft mode, according to an embodiment.

"Branch" and "merge" refers to the underlying process of creating drafts and then taking the edits to the draft and applying them to the main timeline of the document. In an embodiment, when a user takes a section of a document into draft mode, a branch of the mainline causal tree structure is created to manage editing instructions in the draft mode. This branch that is created is sometimes referred to herein as a "draft branch" of the mainline causal tree structure. In this manner, edits made to the draft section of the document are maintained separately from edits made to other sections of the document that are not in the draft mode (sometimes referred to herein as a "collaborative section" or "collaborative sections" of the document). As with the mainline causal tree structure, the draft branch includes a sequence of nodes, and each node of the draft branch has the same or similar structure as the nodes that comprise the mainline causal tree structure, in an embodiment. For example, each node of the draft branch may include an editing instruction and a unique identifier, in an embodiment. In some embodiments, each node of the draft branch may be comprised of a 3-tuple similar to that of the nodes of the mainline causal tree structure. Because the draft branch builds off the mainline causal tree structure, a portion of the sequence of nodes comprising the draft branch corresponds to nodes of the mainline causal tree structure, in an embodiment. That is, when a draft branch of the causal tree structure is created, one or more nodes of the mainline causal tree structure are reused. An example of this is shown in FIG. 17.

In some embodiments, each node in the draft branch will have a document identifier that is different from the document identifier (e.g., docID) of the nodes comprising the mainline causal tree structure. For example, when a user makes edits to a section of a document in draft mode, those edits are held in the draft branch of the causal tree structure under a new document identifier (which is sometimes referred to herein as a "draftID"). In an embodiment, the draftID associated with edits made to the draft section is a temporary identifier that persists only until the draft edits are merged back with the mainline causal tree structure. Merging generally corresponds to a process of comparing a draft branch to the mainline causal tree structure and making any needed changes to the mainline causal tree structure to be consistent with the draft branch.

In an embodiment, a draft for a document or section of a document exists for a single user with permission to edit the document. In one or more other embodiments, a draft for a document or section of a document may exist for multiple users each with permission to edit the document. In accordance with an embodiment, when a user takes a section of a document into draft mode, the user is able to perform the same operations on that section of the document as the user would be able to perform if the section of the document were being edited in collaborative mode. In an embodiment, only users associated with a particular account and/or workspace are permitted to edit sections of a document in draft mode.

As used herein, a "draft session" refers to the set of drafts for a given set of users within a workspace. In an embodiment, a draft session may have a one to one relationship to a single user. In another embodiment, a draft session may have a multi-way relationship with multiple users. In one embodiment, a draft session maintains the causal tree structure or causal graph for the portion of the document that is being edited in draft mode. For example, the draft session maintains which new nodes are created and which existing nodes the new nodes branch from. According to various embodiments, draft sessions may not cross the boundaries of a workspace.

According to an embodiment, a section of a document that is in draft mode may still respond to collaborative edits that affect cross sheet formulas.

According to various embodiments, both collaborative and draft modes are available within the same document. In at least one embodiment, the control over whether a document or section can be used in either draft mode or collaborative mode may be determined by a user at either a document level or at a higher level. For example, in one embodiment, only the owner of a document may decide whether the document or a section of the document can be used in draft mode. In another embodiment, both the owner of the document and any editors of the documents may determine whether the document or a section of the document can be used in draft mode.

According to an embodiment, when a draft is merged, all modified and impacted sections of the draft are merged at one time. For example, when a draft is merged the branch edits are flattened into a single commit in the mainline document.

In one or more embodiments, a user is able to create new links between a draft portion of a document and a collaborative portion of the document, a user is able to create new destination links (also sometimes referred to herein as "usage" links or "consumers") in a draft portion of a document for a source link (also sometimes referred to herein as a "producer") that already exists in the mainline document, a user is able to create a link between two drafts, and a user is able to remove a link (producer or consumer) in a draft. Various processes and features involving linking and editing sections of a document in draft mode will be described in greater detail below (e.g., FIGS. 37A-41C).

In an embodiment, each draft will have its own revision counter since it uses a different docID. For example, the draft will behave as though it were effectively a duplicate of the original document or portion of the document.

In an embodiment, when a portion of a document containing a table is being edited in draft mode, a new TableID will be generated to make a copy of the underlying R-Tree data. The database will store the mapping from the mainline TableID to the draft TableID, and any requests to access or mutate the mainline table will be mapped to the draft table for the draft session only.

Figure 16:
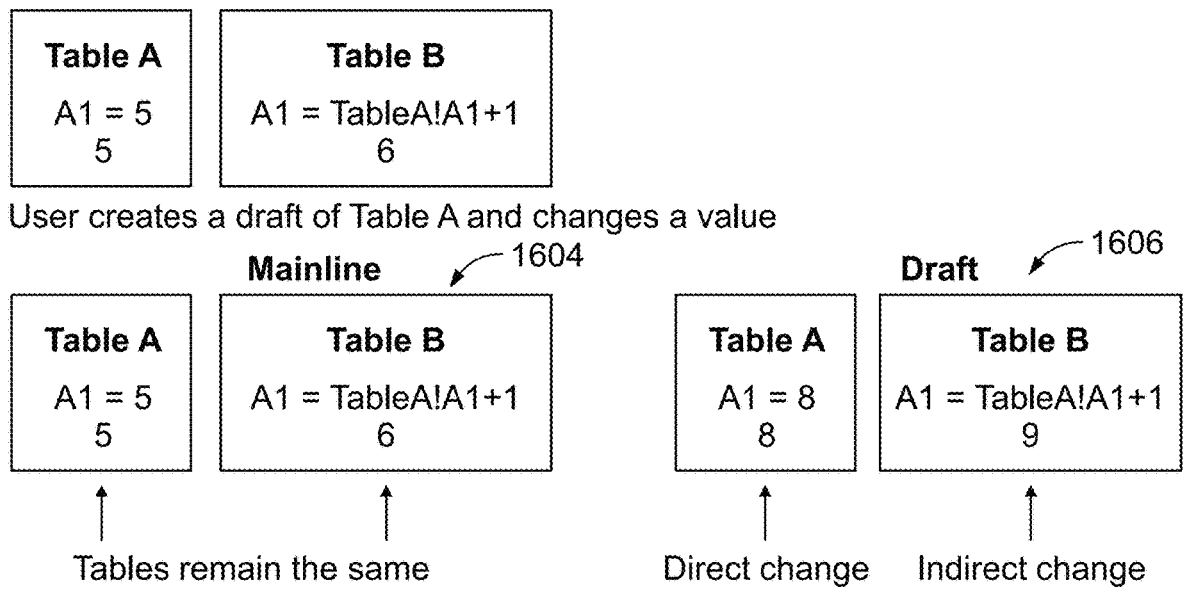
FIG. 16 is a diagram illustrating an example of editing a table in a draft mode, according to an embodiment.

FIG. 16 is a diagram illustrating an example of editing a table in draft mode. According to an embodiment, any table that has been directly modified (as part of the draft) or indirectly modified (e.g., via cross-sheet formulas) may be copied as part of the draft session 1606. The example shown includes mainline 1604 Table A and Table B. Table A includes a cell A1 that has a value of "5". Table B includes a formula ("TableA!A1") that references cell A1 of Table A. Even though the user only drafted Table A, there are still two different results in Table B, which causes the user to have a copy of Table B as well to capture the results of the draft calculations. In an embodiment, the system can reuse most of the existing R-Tree nodes and utilize copy-on-write to only duplicate tables as they are affected.

Loading a draft table according to an embodiment is depicted in FIG. 17. Since the draft table has been given its own unique ID, any requests for the mainline table 1702 get mapped to load the draft TableID 1704 instead. This lets other users continue loading the original table but draft users see the copy being drafted.

In an embodiment, draft fragments should have the same fragment IDs as the mainline document. It is more efficient to do a shallow copy retaining the same ID space rather than trying to merge edits from a completely new fragment back into the mainline. According to an embodiment, a draft fragment should also share the same siteID and characterID space as its mainline document. This ensures that edits from a draft can easily be applied to the mainline without conflict or transformation.

Figure 18:
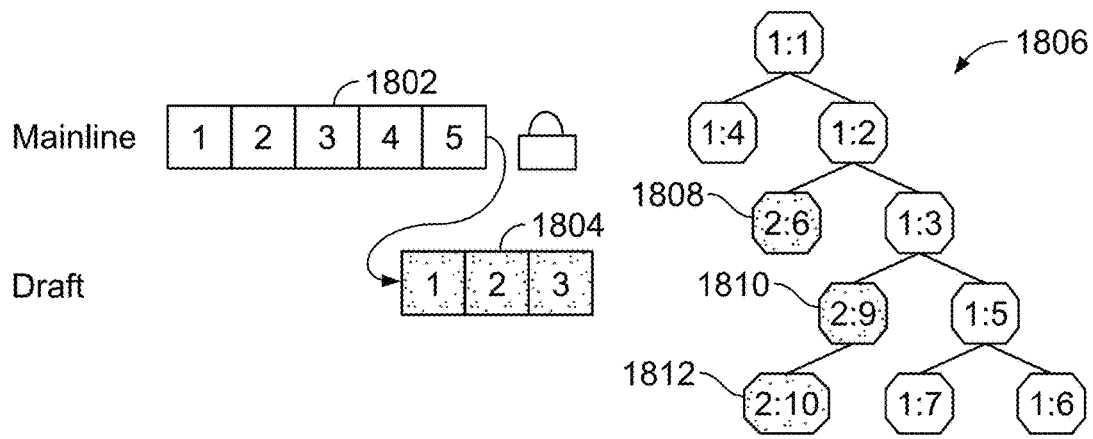
FIG. 18 is a diagram illustrating an example of editing a fragment of a document in a draft mode, according to an embodiment.
Figure 19:
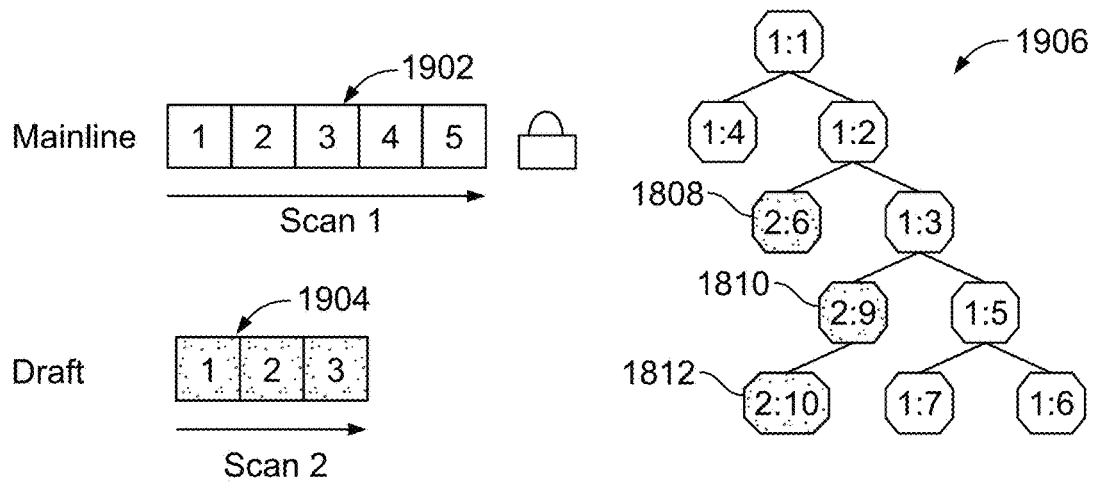
FIG. 19 is a diagram illustrating an example of loading a draft of a fragment of a document, according to an embodiment.

An example of loading a draft fragment is shown in FIG. 18 and FIG. 19. As shown in FIG. 18, a draft 1804 has been created for a portion of the mainline 1802 document. In the mainline causal tree structure 1806 and 1906 (in FIG. 19), which comprises a sequence of nodes, a draft branch has been created including nodes 1808, 1810, and 1812. In the causal tree structure 1806, each node (e.g., nodes 1808, 1810, and 1812) is represented with a causeID and a nodeID. For example, in node 1808, "2" represents the causeID (the ID of the parent node) and "6" represents the nodeID. In an embodiment, loading the draft portion of the document may involve two scans: one for the mainline 1902 and another for the draft 1904 commits. This ensures all edits to the mainline will be included when loading a draft.

Figure 20:
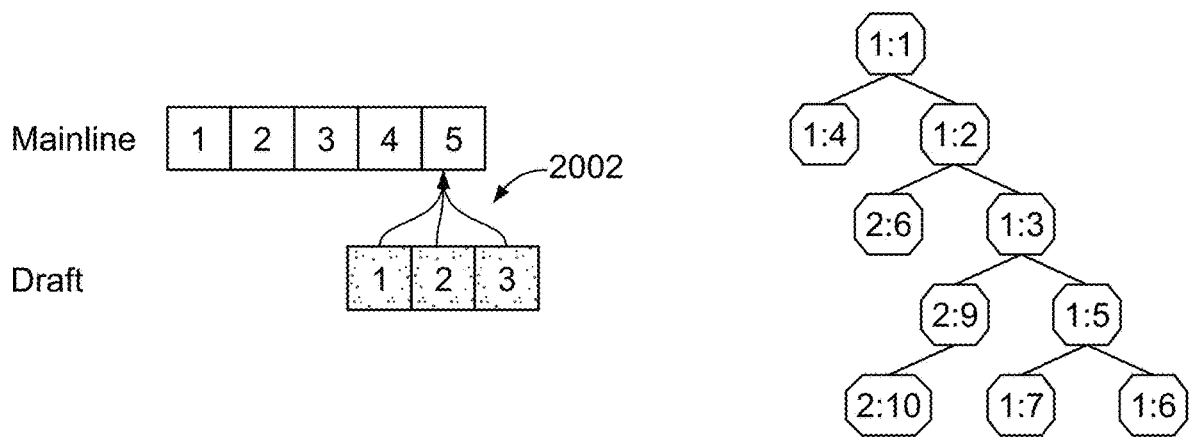
FIG. 20 is a diagram illustrating an example of merging edits from a draft into the mainline, according to an embodiment.

FIG. 20 is a diagram illustrating an example of merging, in accordance with an embodiment. As shown, the process of merging includes grouping all of the edits from the draft session into one large commit 2002 into the mainline.

Figure 21A:
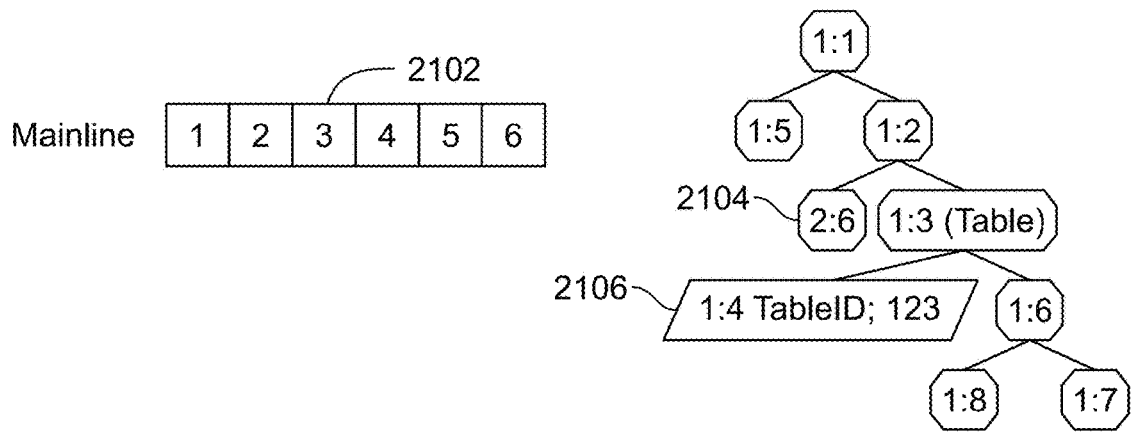
FIG. 21A is a diagram illustrating an example of a document with an embedded table, according to an embodiment.
Figure 21B:
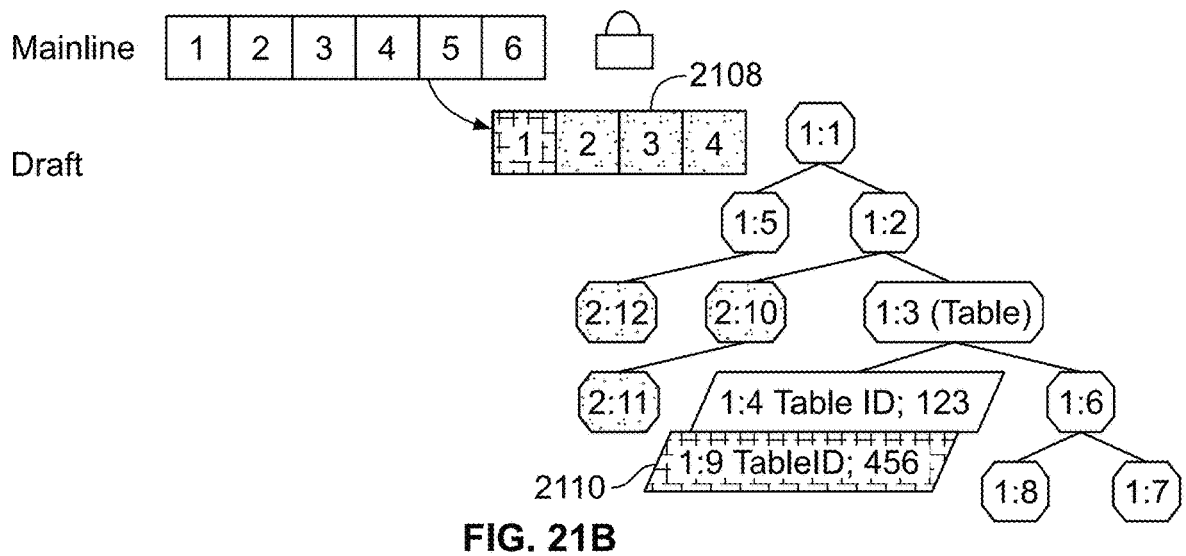
FIG. 21B is a diagram illustrating an example of creating a draft of a document with an embedded table, according to an embodiment.
Figure 21C:
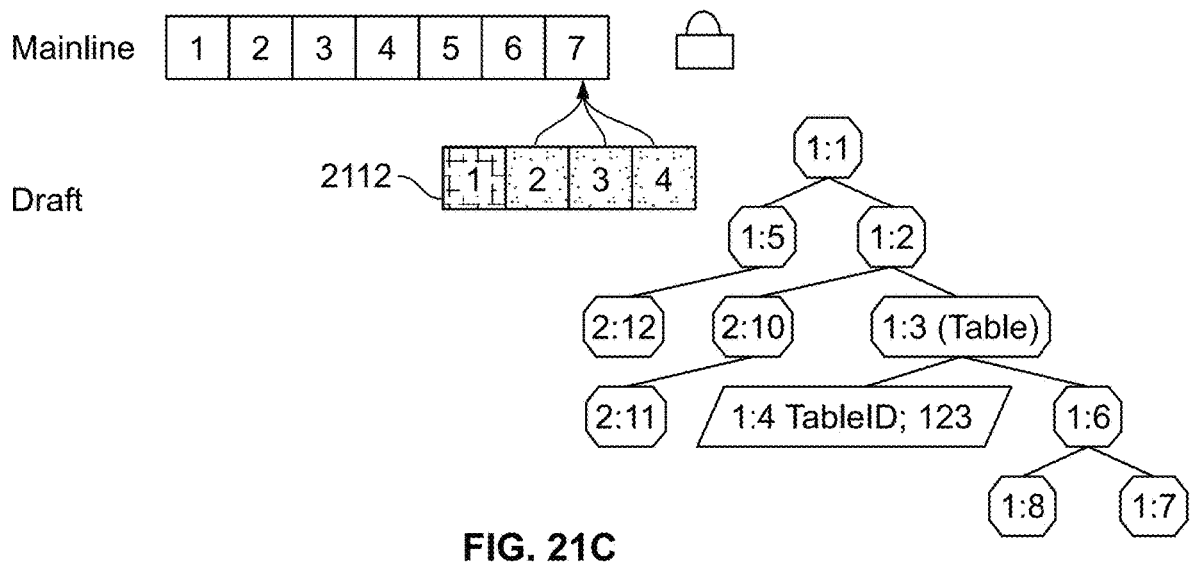
FIG. 21C is a diagram illustrating an example of merging a draft of a document with an embedded table back into the mainline, according to an embodiment.

According to an embodiment, drafting rich text fragments containing embedded tables according to an embodiment is depicted in FIGS. 21A-21O. In an embodiment, draft tables have different temporary IDs than non-draft tables. Since the table ID is 'painted on' to the embedding character as a format, the draft 2108 will have a different format from the mainline 2102. Upon creation of a draft, it may be necessary to paint on a new table ID 2110 to the mainline table ID 2106, such as is shown in FIG. 21B. Since table '456' has a newer ID than '123', it will override the older format. In an embodiment, the commit that overrode the table ID may be marked as 'No Merge', as represented by 2112 in FIG. 21C. This will cause the table ID to revert back to the mainline table ID 2106 upon merge, as illustrated in FIG. 21C.

Figure 22A:
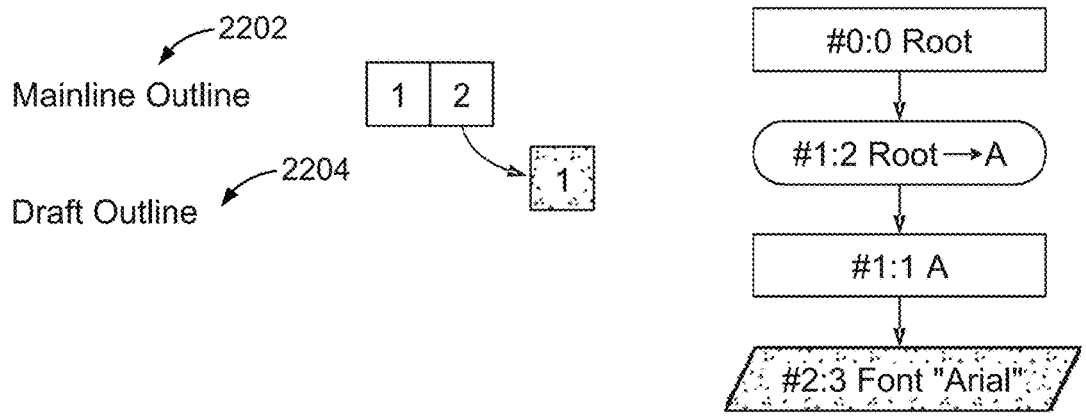
FIG. 22A is a diagram illustrating an example of creating a draft of an outline of a document, according to an embodiment.
Figure 22B:
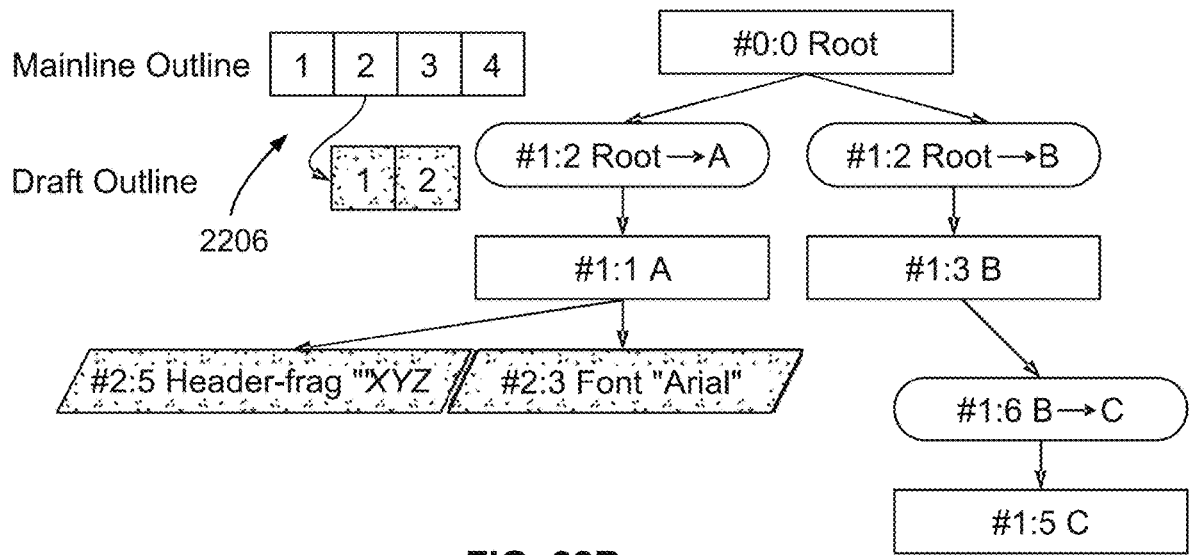
FIG. 22B is a diagram illustrating an example of editing an outline of a document in a draft mode, according to an embodiment.
Figure 22C:
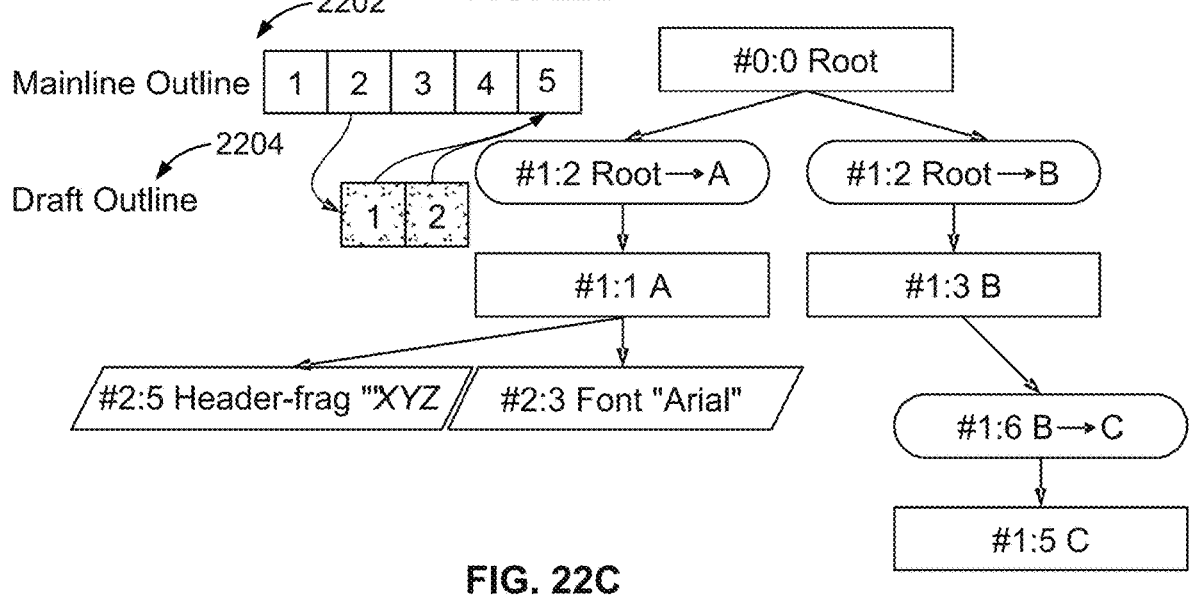
FIG. 22C is a diagram illustrating an example of merging edits from a draft of an outline of a document into the mainline of the outline, according to an embodiment.

With reference to FIGS. 22A-C, according to an embodiment, certain section properties such as default formats and headers/footers are stored in what is referred to herein as the "outline" of a document. In an embodiment, a draft outline 2204 may be created for the mainline outline 2202 of a document. In one embodiment, editing the outline of a document in draft mode proceed in a manner similar to drafting fragments of a document, as described in detail above. According to an embodiment, the outline of a document is not locked for editing to users who are not part of the draft session, and thus formatting and other such edits may flow freely between the mainline document and the draft, as represented by 2206 in FIG. 22A.

In an embodiment, since the outline may not be locked, new edits may flow into the mainline during the draft. The mainline and draft versions share the same ID space so new edits to the mainline can easily be applied to the draft (see, e.g., FIG. 22A). In the very rare case that a cycle occurs, it may be resolved as described above.

According to an embodiment, merging a draft outline of a document proceeds in a manner similar to fragments. Merging a draft outline is illustrated in FIG. 22C. Even though commits 1 and 2 for the draft outline 2004 may have been interleaved with commits 3 and 4 for the mainline outline, they will be merged as commit 5, in an embodiment. This is the desired behavior since a merge should appear in history as an instantaneous event. This reordering will have no effect on the outline. Although the outline may not be locked, it may still be desirable to restrict certain operations. For example, users outside of a draft may not be allowed to delete an outline node that is being drafted, in an embodiment.

Figure 29:
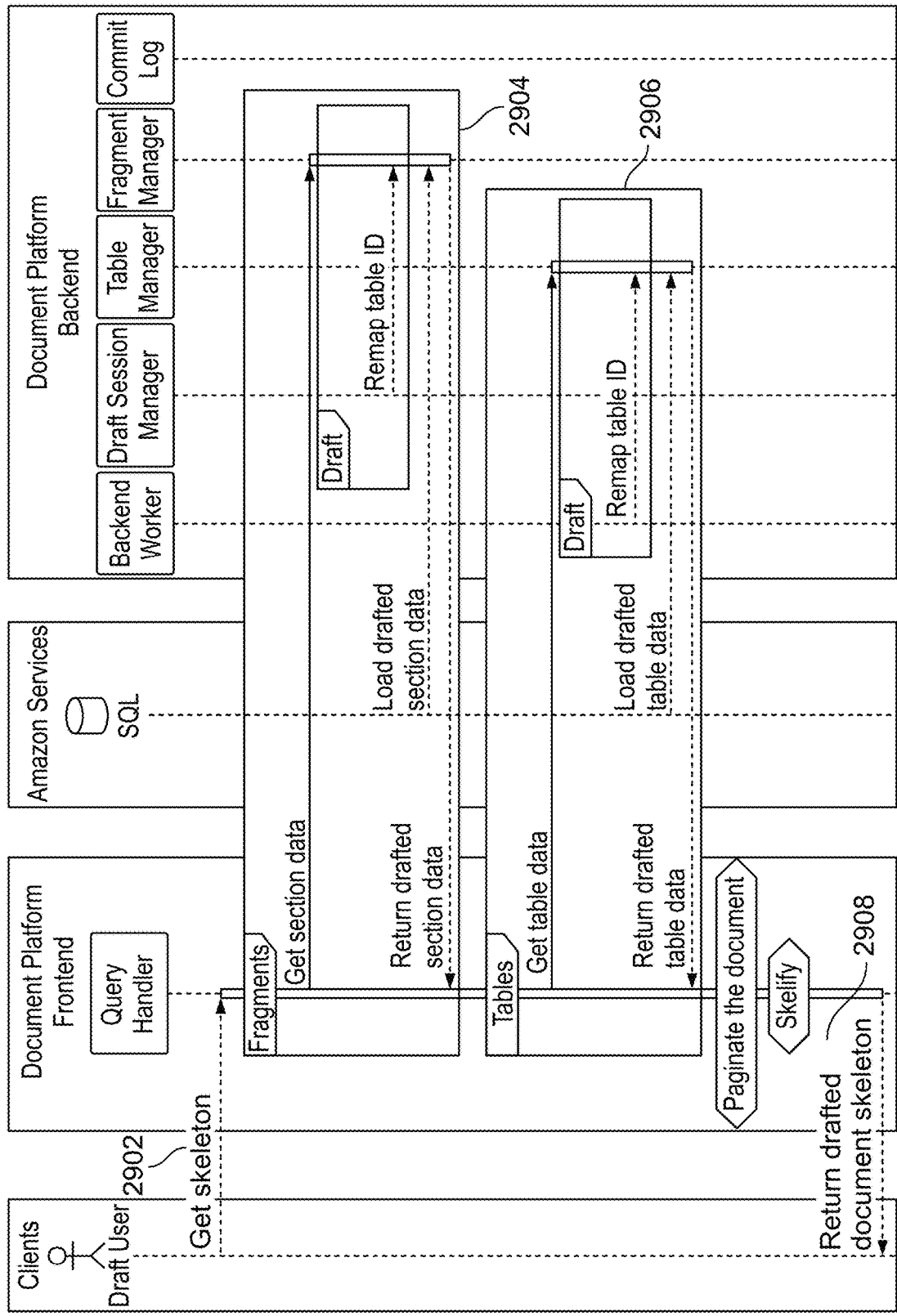
FIG. 29 is a sequence diagram illustrating another example of requesting a skeleton of a document that is in a draft mode, according to an embodiment.
Figure 30A:
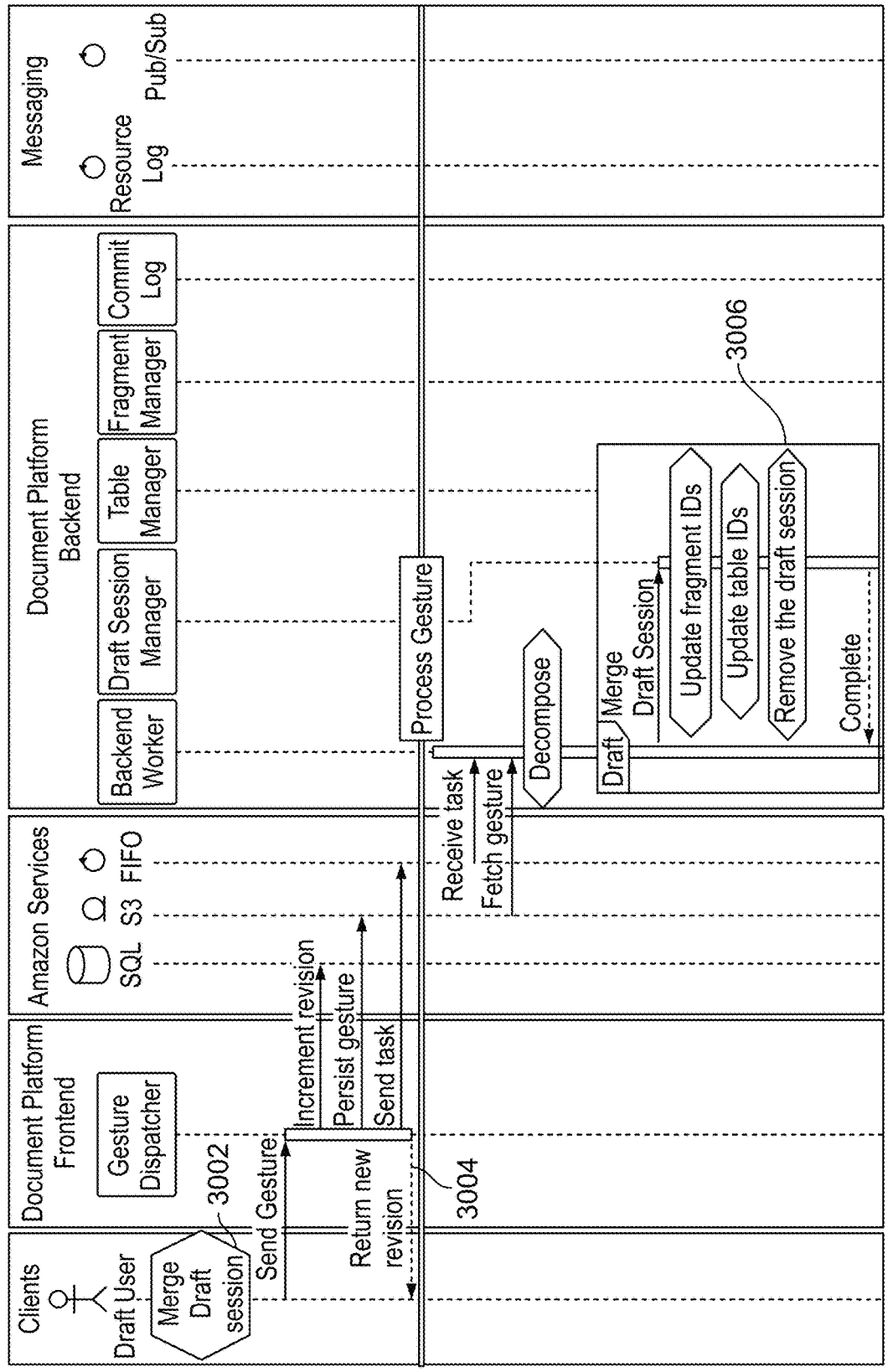
FIG. 30A and FIG. 30B are sequence diagrams illustrating an example of merging a draft session, according to an embodiment.
Figure 30B:
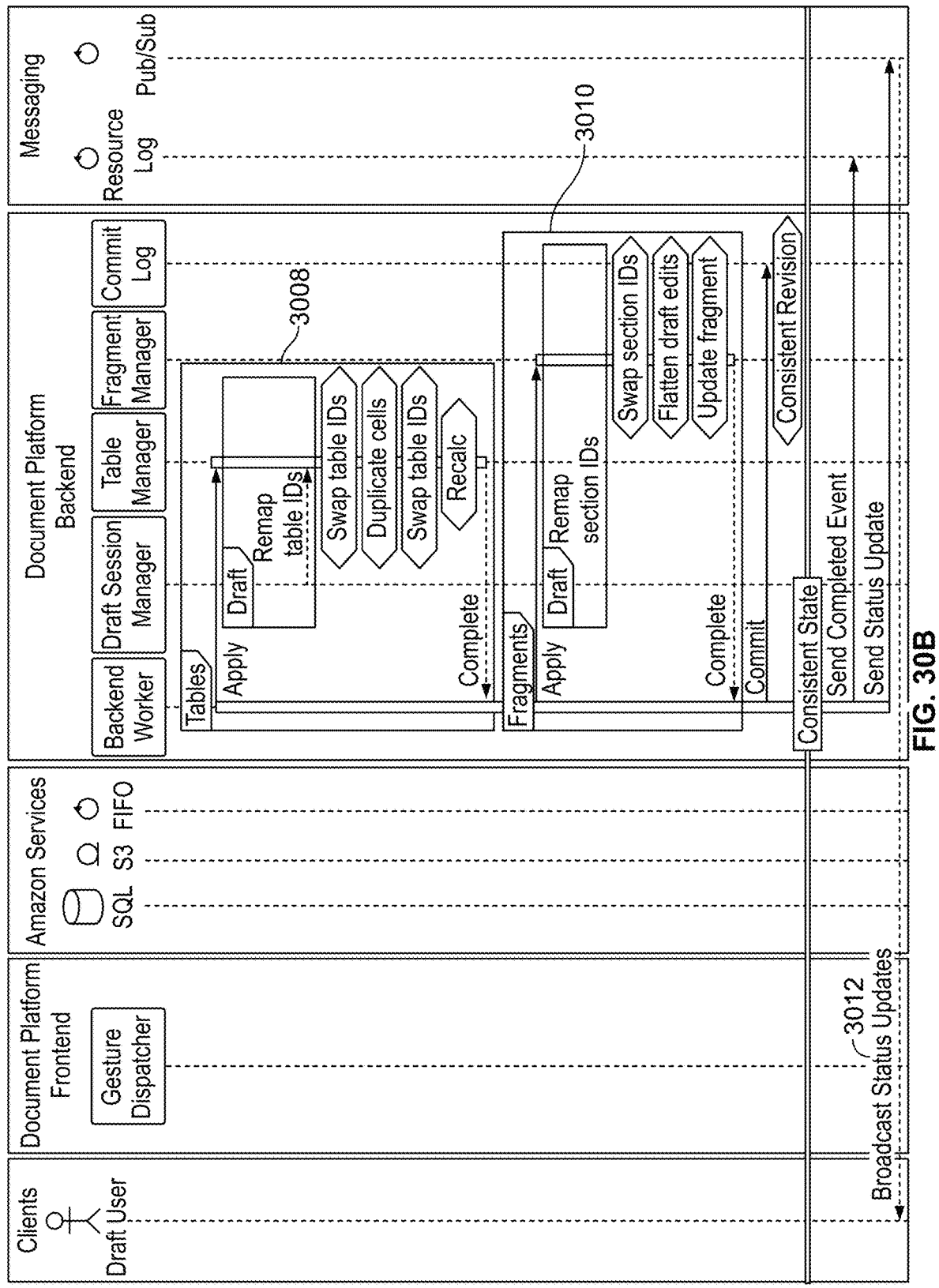
Figure 31A:
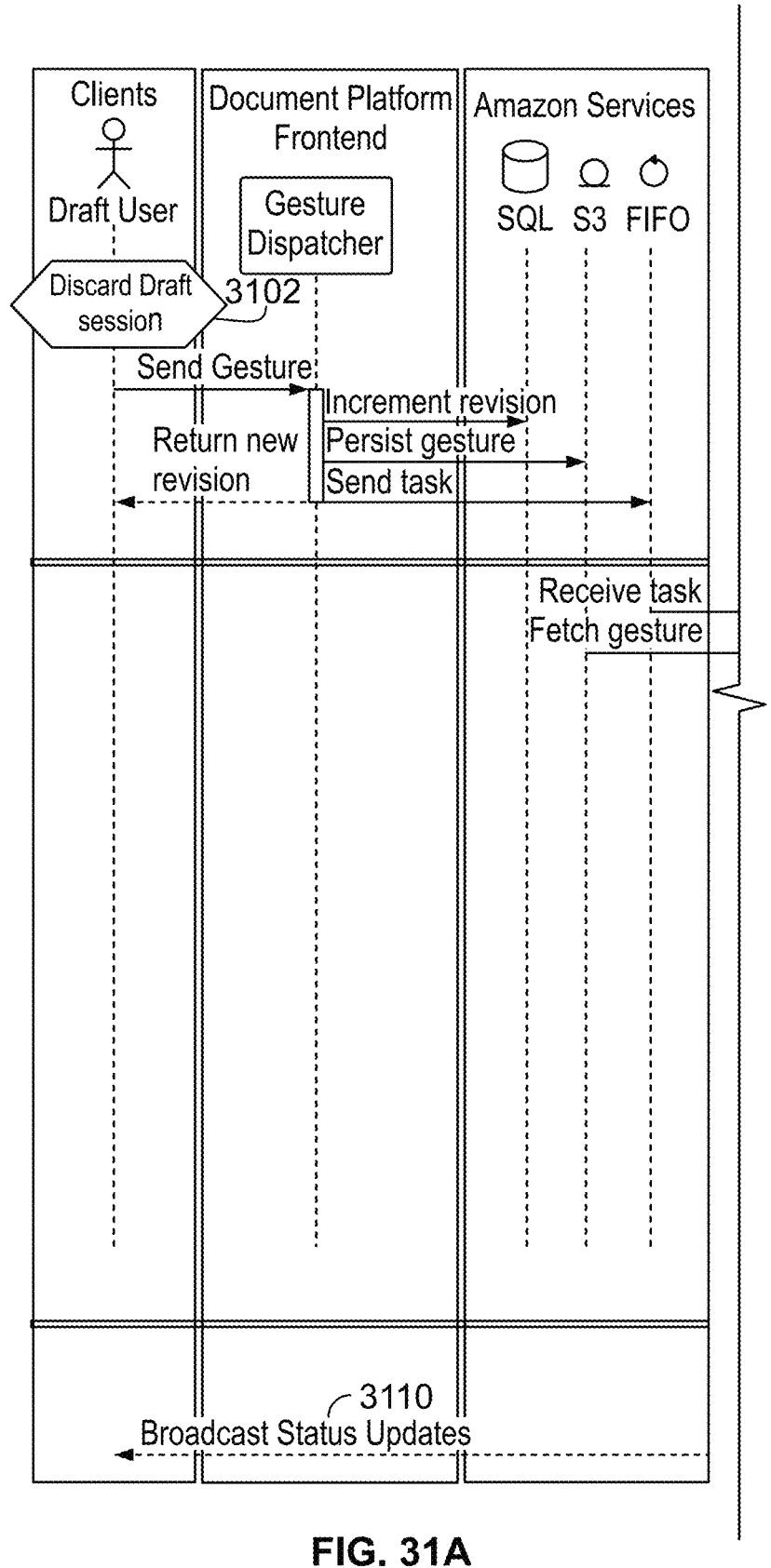
FIG. 31A and FIG. 31B are a sequence diagram illustrating an example of discarding a draft session, according to an embodiment.
Figure 31B:
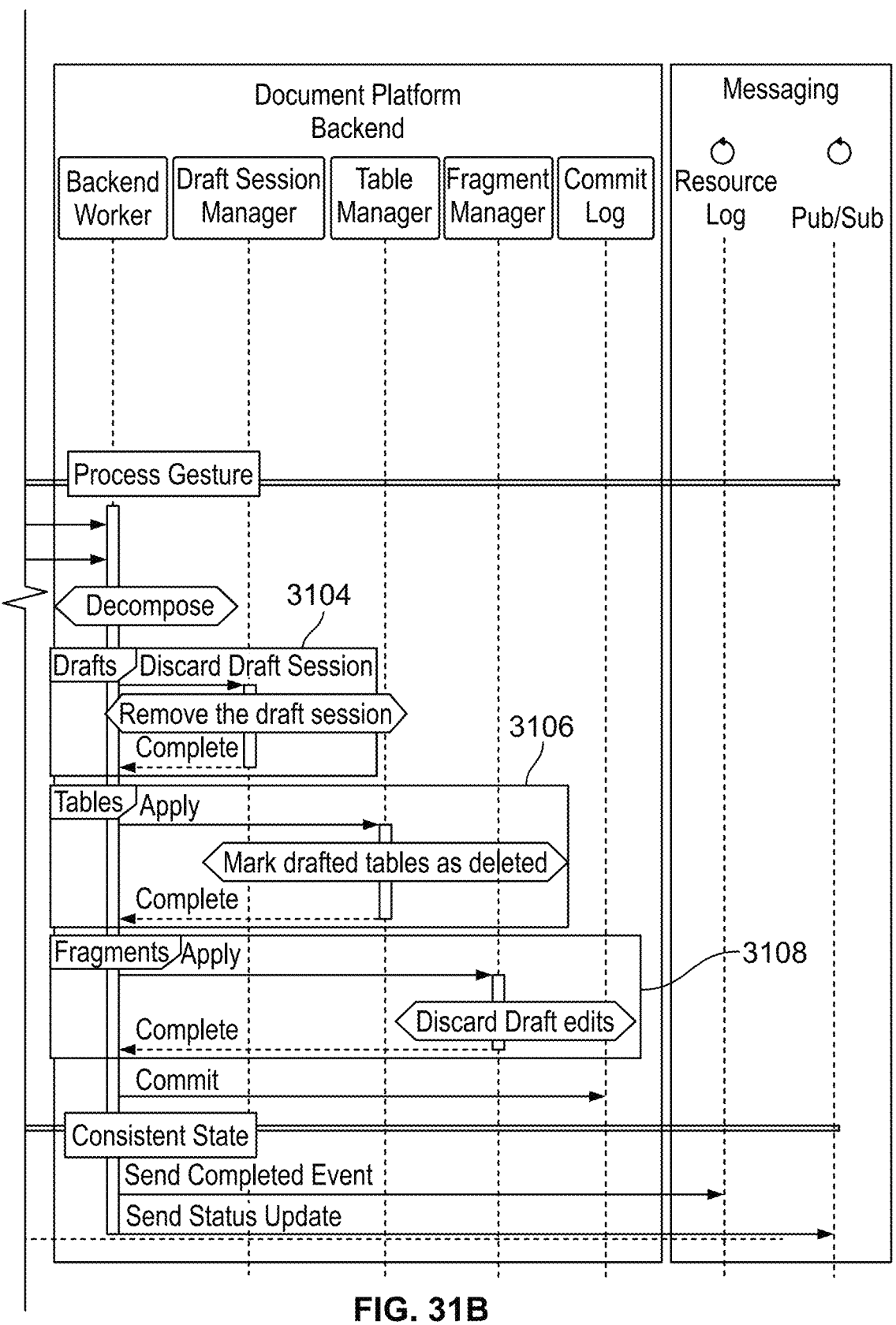

FIGS. 23-31B are sequence diagrams illustrating various processes in accordance with one or more embodiments described herein. In particular, the sequence diagrams illustrate exemplary process for creating a draft of a section of a document (FIGS. 23A and 23B), opening a draft section of a document as a user who is part of the draft session (FIG. 25) and as a user who is not part of the draft session (FIG. 24), editing a draft section of a document as a user who is part of the draft session (FIGS. 27A and 27B) and as a user who is not part of the draft session (FIG. 26), obtaining a skeleton of the document as a user who is part of the draft session (FIG. 29) and as a user who is not part of the draft session (FIG. 28), merging a draft session (FIGS. 30A and 30B), and discarding a draft session (FIGS. 31A and 31B).

Figure 23A:
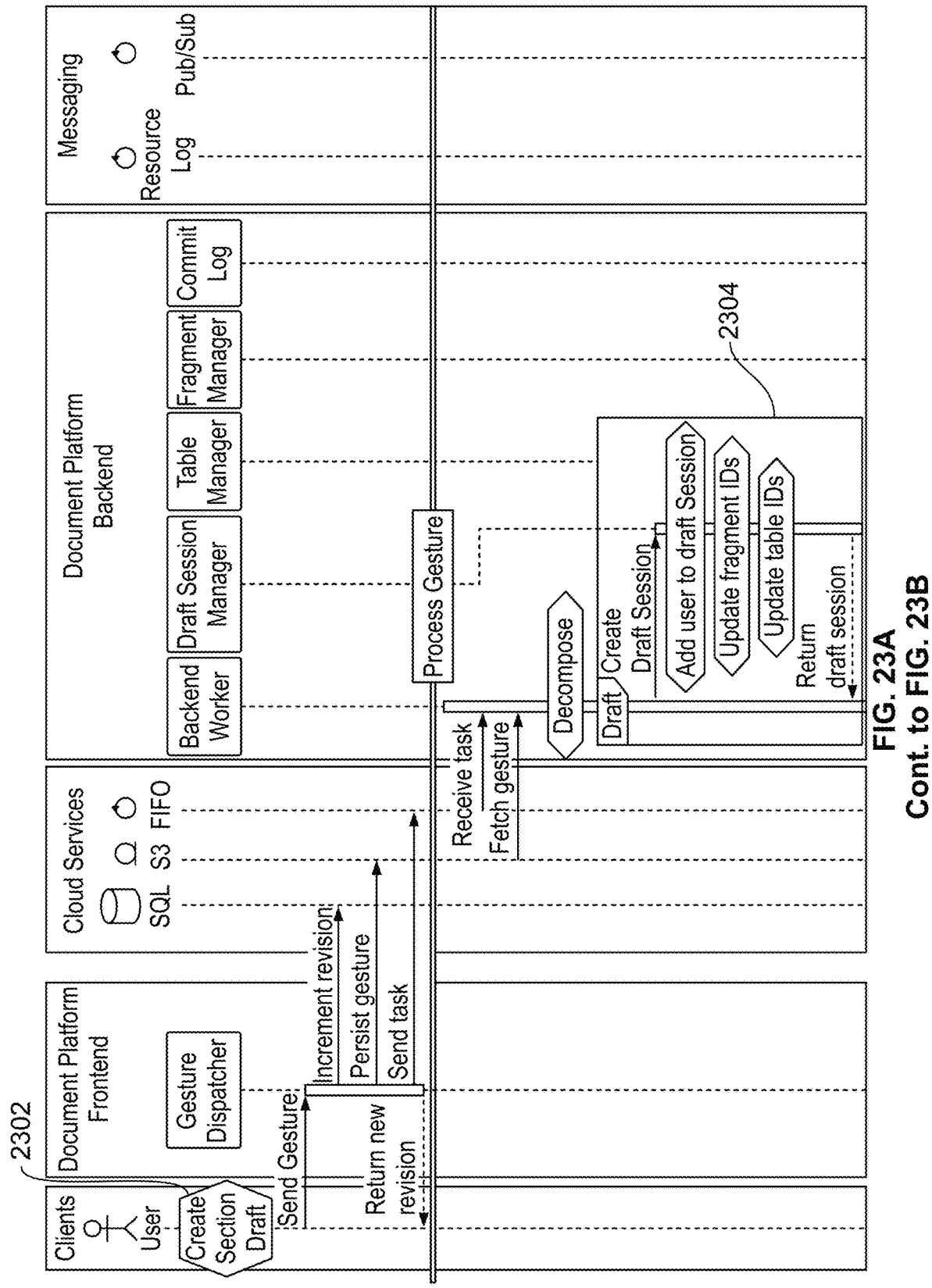
FIG. 23A and FIG. 23B are sequence diagrams illustrating an example of creating a draft of a section of a document, according to an embodiment.
Figure 23B:
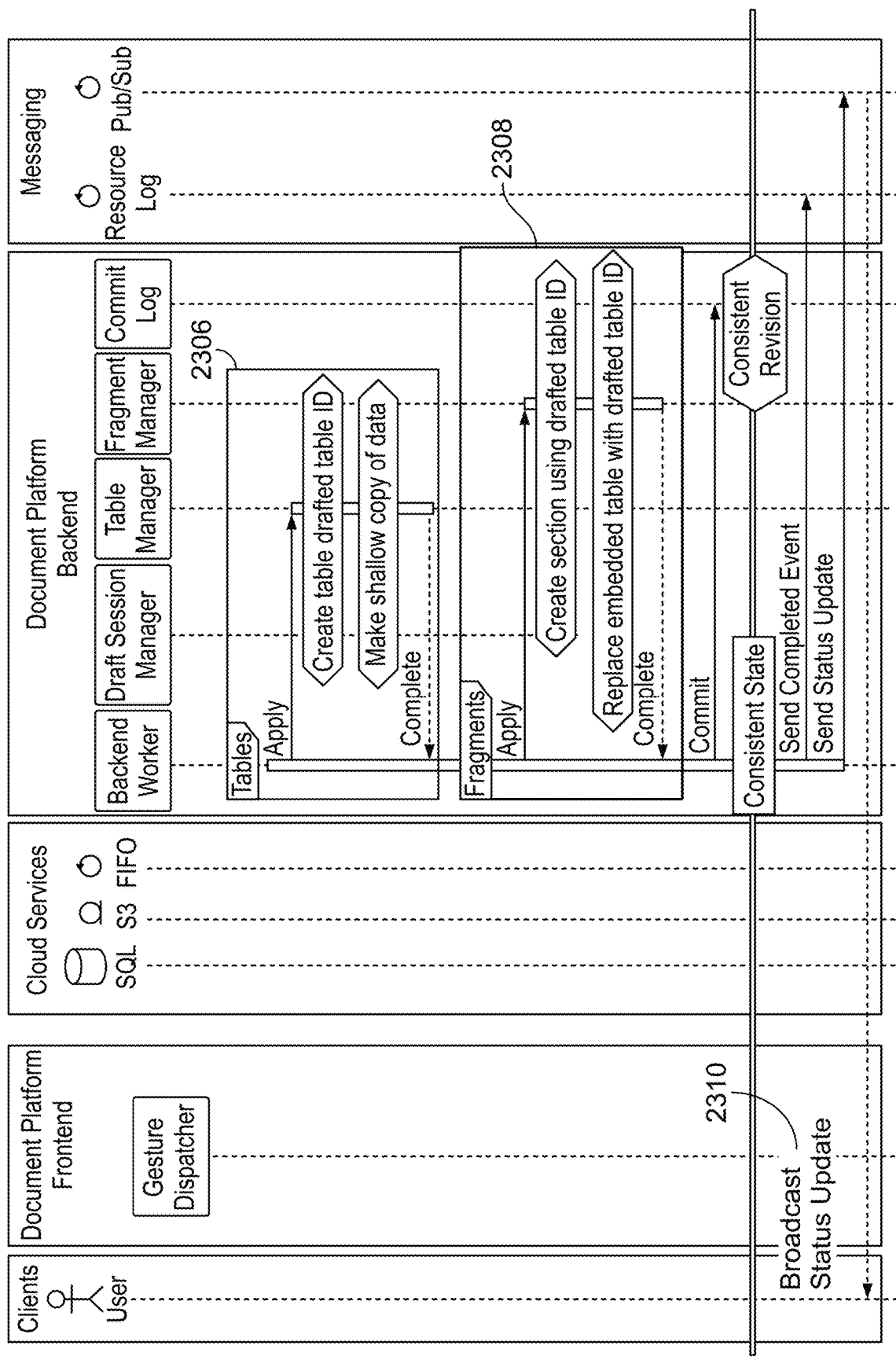

FIGS. 23A and 23B are a flow diagram showing a sequence for creating a draft of a section of a document, for example, first document 114, according to an embodiment. In the embodiment shown in FIGS. 23A and 23B, a document is provided for editing to various clients (including, for example, users 120, 122, 124) by a frontend user interface ("frontend"). In some embodiments, the frontend user interface is provided by the first computing device 100, the fifth computing device 106, or another suitable computing device. In some embodiments, the clients utilize respective ones of the computing devices 104*a*, 104*b*, 104*c*. Although only one client and one document are shown in FIGS. 23A and 23B, in other embodiments, the frontend may provide hundreds of documents to hundreds of clients concurrently.

In block 2302 of the illustrated embodiment, a first user who is collaborating on the document with other users creates a draft of a section of the document. For example, the first user may initiate a gesture (e.g., CreateDraftSession) that will store the necessary information to facilitate drafting a specific section of the document. In one embodiment, the first user may initiate the gesture by selecting a control (e.g., control 3210 in FIG. 32) displayed to the user in a web-based user interface (e.g., user interface 3200) of a workspace. In accordance with an embodiment, the gesture received by the frontend may be processed by a document platform backend and may include the data flows and operations comprising blocks 2304 (creating a draft session), 2306 (creating a draft table with a draft table ID), and 2308 (creating a draft of the section using the draft table ID). In some embodiments, the document platform backend ("backend") is hosted by the first computing device 100, the fifth computing device 106, or another suitable computing device. For example, at block 2304, the backend may create a draft session. In one embodiment, creating a draft session (block 2304) may include adding the first user to the draft session (e.g., giving the first user permission to edit the section of the document in draft mode), and updating any applicable fragment IDs and table IDs. Once the gesture has been fully processed and a draft of the section of the document has been created, the first user and the other users collaborating on the document may receive a status update 2310. For example, in an embodiment, the first user may be presented with an indication that the section of the document can be edited in the draft mode while the other users may be notified that the section of the document is currently locked for editing.

Figure 24:
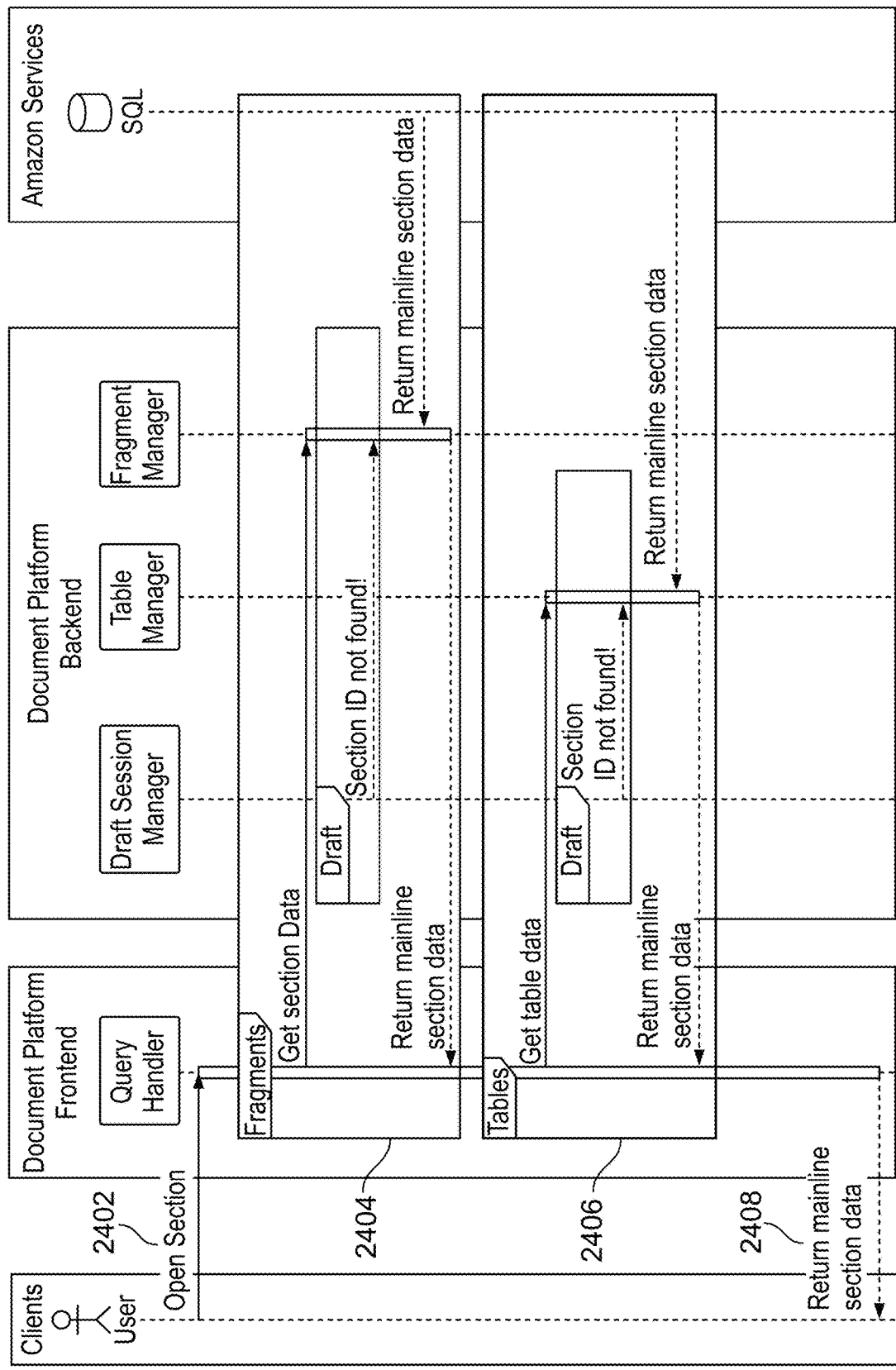
FIG. 24 is a sequence diagram illustrating an example of opening a section of a document that is in a draft mode, according to an embodiment.
Figure 25:
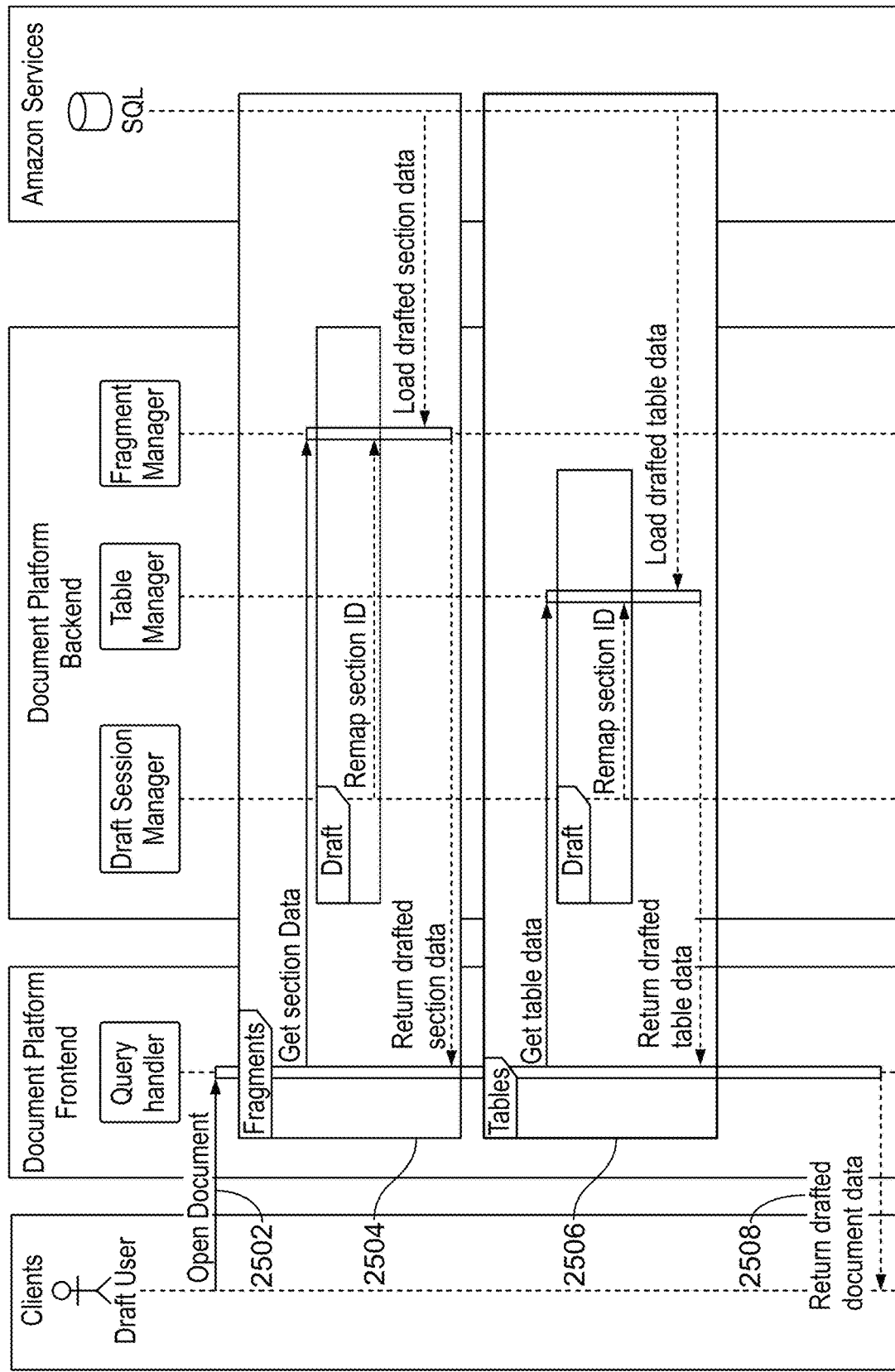
FIG. 25 is a sequence diagram illustrating another example of opening a section of a document that is in a draft mode, according to an embodiment.

FIGS. 24 and 25 are flow diagrams showing sequences for opening a draft section of a document as a user who is part of the draft session (FIG. 25) and as a user who is not part of the draft session (FIG. 24), according to one or more embodiments. In the embodiment shown in FIGS. 24 and 25, a first user (e.g., user 120) of a plurality of users (e.g., users 120, 122, 124) collaborating on a document (e.g., first document 114) has created a draft of a section of a document. For example, a draft section of the document has been created through the various data flows and processes shown in FIGS. 23A and 23B, which are described in detail above.

FIG. 24 illustrates an example in which a second user (e.g., user 122) who is not part of the draft session created for the section of the document that is currently being edited in draft mode by the first user attempts to open the draft section of the document, in an embodiment. As shown in FIG. 24, when the second user opens 2402 the section of the document that is being edited in draft mode, data for the section from the mainline causal tree is returned 2408. For example, at block 2404, mainline section data for any fragments of the document are returned, and at block 2406, mainline section data for any tables in the document are returned.

FIG. 25 shows an example in which the first user, who is a part of the draft session (e.g., created in the sequence shown in FIGS. 23A and 23B) for the section of the document being edited in draft mode, opens the drafted section of the document, in an embodiment. As shown in FIG. 25, when the first user opens 2502 the draft section of the document, data from the draft branch of the causal tree is returned 2508. For example, at block 2504, drafted section data for fragments of the document is returned, and at block 2506, drafted table data for tables included in the document is returned.

Figure 26:
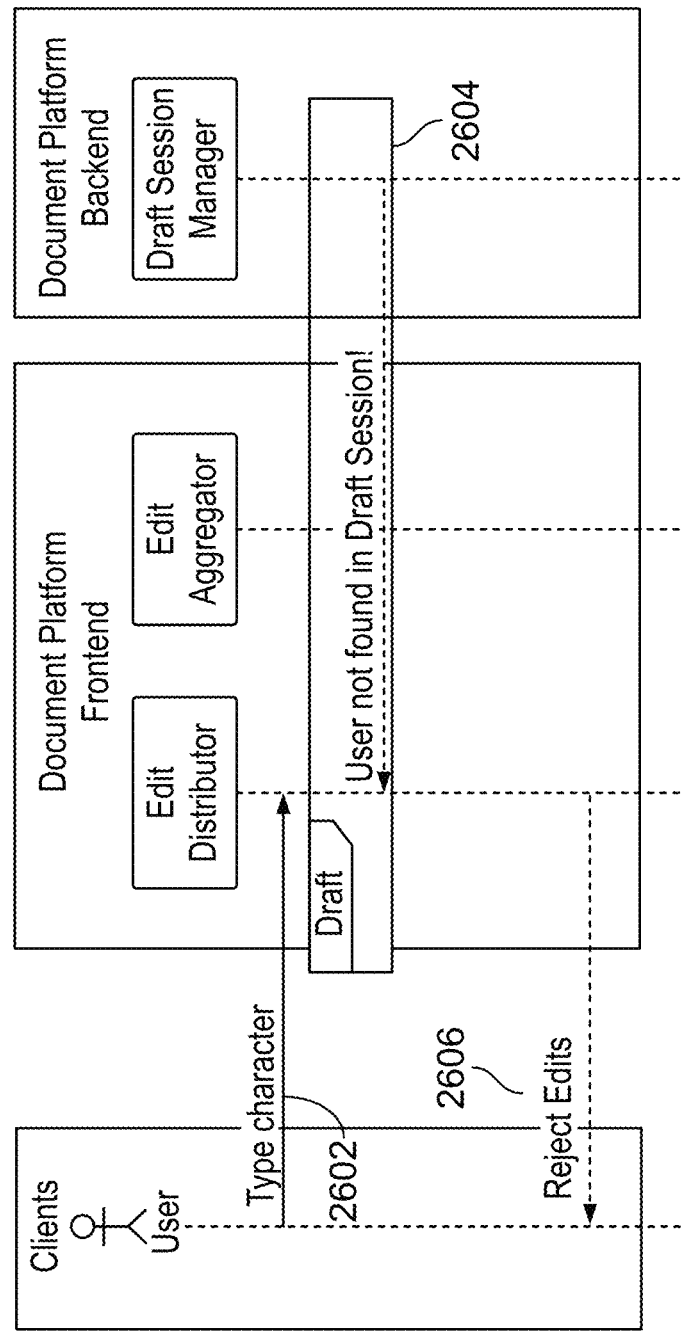
FIG. 26 is a sequence diagram illustrating an example of editing a section of a document that is in a draft mode, according to an embodiment.
Figure 27A:
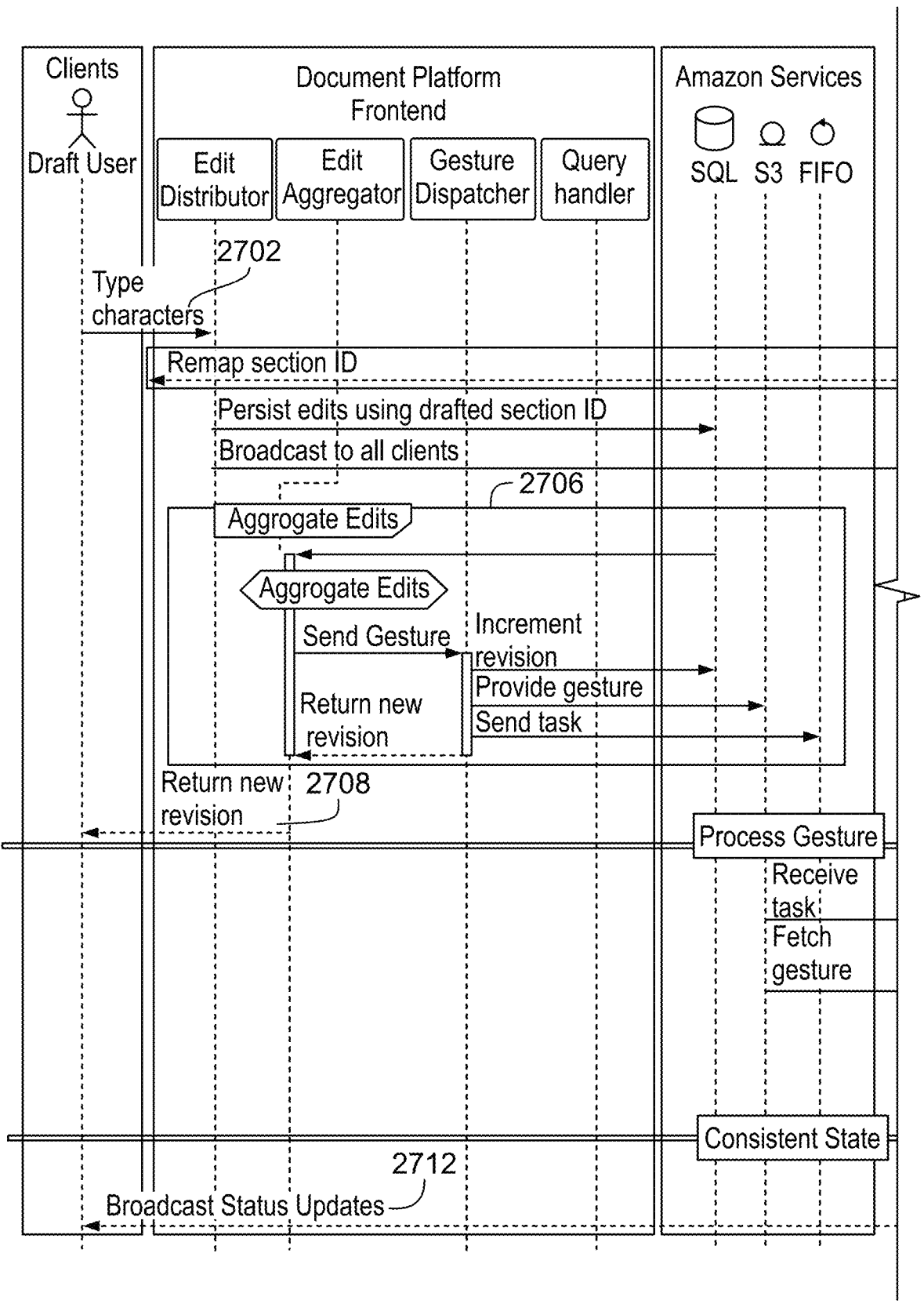
FIG. 27A and FIG. 27B are a sequence diagram illustrating another example of editing a section of a document that is in a draft mode, according to an embodiment.
Figure 27B:
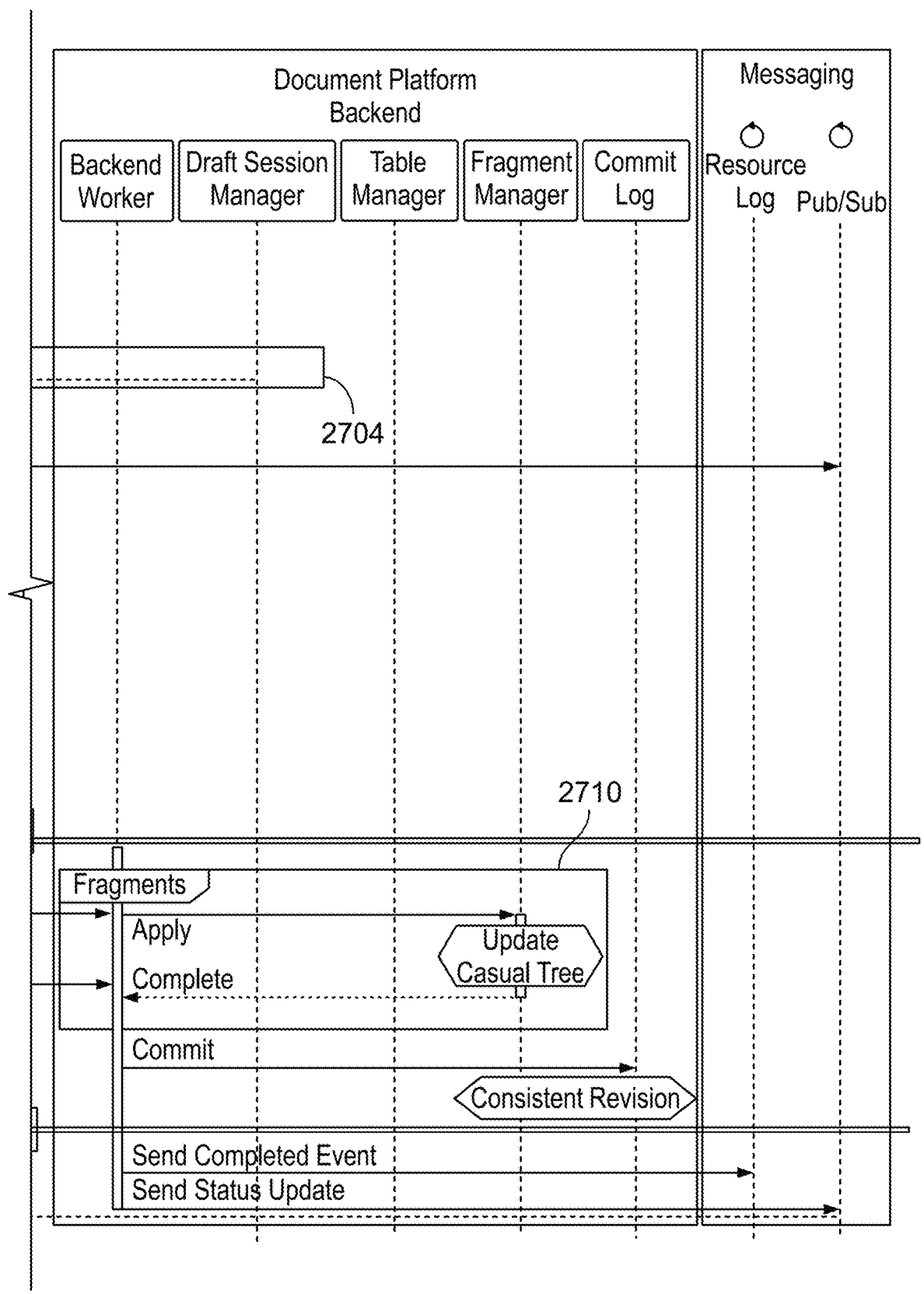

FIGS. 26, 27A, and 27B are flow diagrams showing sequences for editing a draft section of a document as a user who is part of the draft session (FIGS. 27A and 27B) and as a user who is not part of the draft session (FIG. 26), according to one or more embodiments. In the embodiment shown in FIGS. 26, 27A, and 27B, a first user (e.g., user 120) of a plurality of users (e.g., users 120, 122, 124) collaborating on a document (e.g., first document 114) has created a draft of a section of a document. For example, a draft section of the document has been created through the various data flows and processes shown in FIGS. 23A and 23B, which are described in detail above.

FIG. 26 shows an example sequence for when a second user (e.g., user 122) who is not part of the draft session created for the section of the document that is currently being edited in draft mode by the first user attempts to edit the section of the document, in an embodiment. For example, the second user may attempt to edit 2602 the section of the document in collaborative mode. When the second user attempts to make an edit 2602 to the section, the frontend checks with the backend to determine whether the second user is a part of the draft session at block 2604. When it is determined that the second user is not part of the draft session at block 2604, the edits attempted by the second user are rejected 2606, in an embodiment.

FIGS. 27A and 27B are example flow diagrams for when the first user, who is part of the draft session (e.g., created in the sequence shown in FIGS. 23A and 23B) for the section of the document being edited in draft mode, attempts to edit the section of the document, in an embodiment. For example, the first user may make edits 2702 to the section of the document in draft mode. When the first user edits the section of the document, the section ID for the section may be remapped to the drafted section ID at block 2704. The edits made by the first user may be aggregated at block 2706 and returned to the first user 2708. At block 2710, the draft branch of the causal tree may be updated to reflect the edits 2702 made by the first user to the draft section. In at least one embodiment, the first user may be provided with a status update 2712 reflecting that edits were made to the draft section of the document.

Figure 28:
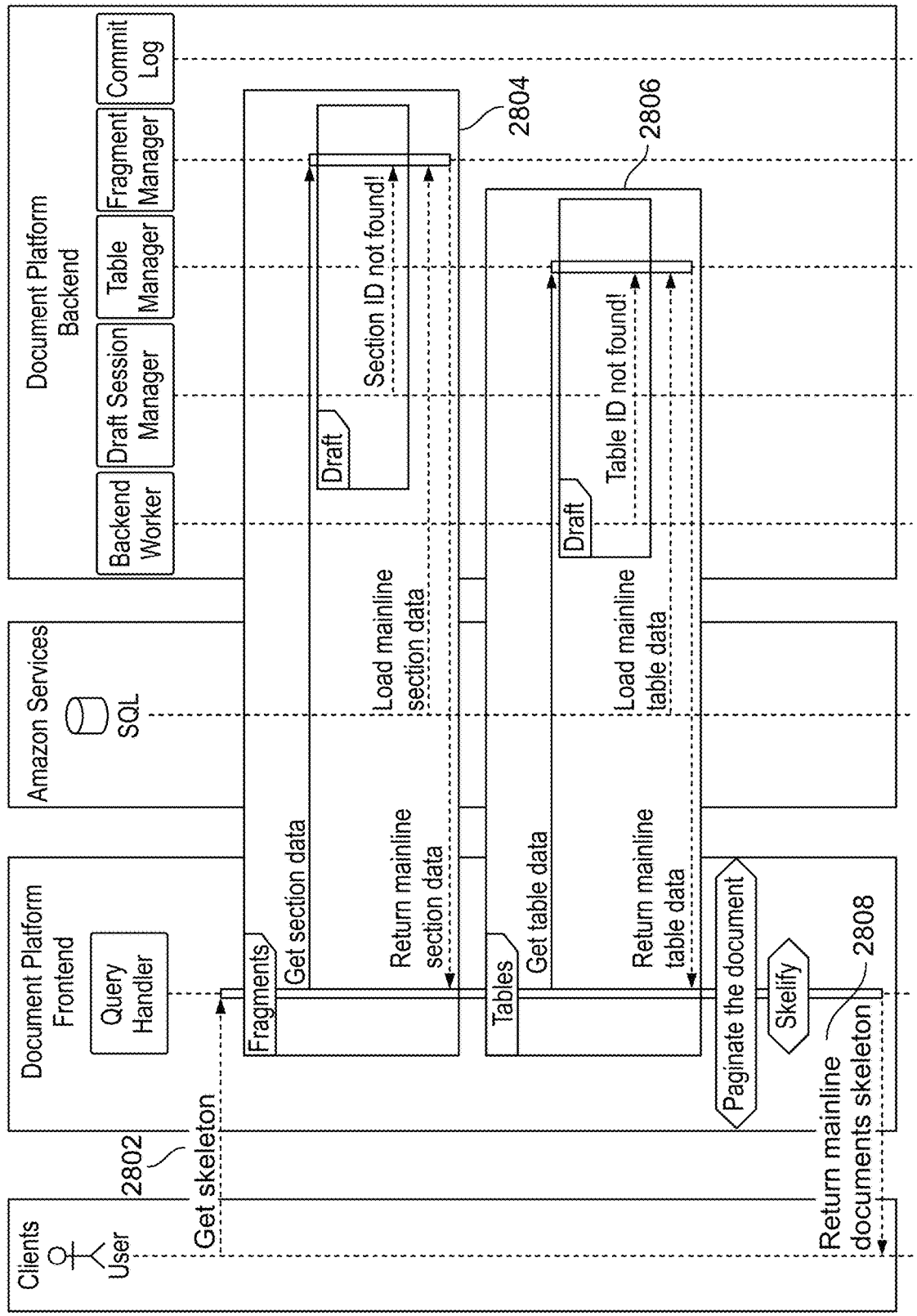
FIG. 28 is a sequence diagram illustrating an example of requesting a skeleton of a document that is in a draft mode, according to an embodiment.

FIGS. 28 and 29 are flow diagrams showing example sequences for obtaining a skeleton of a document, in which a portion of the document is being edited in draft mode, as a user who is part of the draft session (FIG. 29) and as a user who is not part of the draft session (FIG. 28), according to one or more embodiments.

With reference to FIG. 28, a second user (e.g., user 122) who is not part of the draft session created for the section of the document that is currently being edited in draft mode by the first user, makes a request 2802 for a skeleton of the document. In response to the request 2802, at block 2804, mainline section data for any fragments of the document are returned, and at block 2806, mainline table data for any tables in the document are returned. The second user therefore receives the mainline document skeleton 2808.

FIG. 29 shows an example in which the first user, who is a part of the draft session (e.g., created in the sequence shown in FIGS. 23A and 23B) for the section of the document being edited in draft mode, makes a request 2902 for a skeleton of the document, in an embodiment. As shown in FIG. 29, in response to the request 2902 from the first user for a skeleton of the document, drafted section data for fragments of the document is returned at block 2904, and drafted table data for tables included in the document is returned at block 2906, in an embodiment. The first user therefore receives the drafted document skeleton 2908.

FIGS. 30A and 30B are a flow diagram showing example processes for merging a draft session, according to an embodiment. In the embodiment shown in FIGS. 30A and 30B, a first user (e.g., user 120) of a plurality of users (e.g., users 120, 122, 124) collaborating on a document (e.g., first document 114) has created a draft session for a section of the document and made edits to the draft section of the document. For example, a draft session has been created through the various data flows and processes shown in FIGS. 23A and 23B, and edits have been made to the draft section through the example data flows and processes shown in FIGS. 27A and 27B, all of which are described in detail above.

At block 3002, the first user may initiate a merge draft session gesture that will aggregate all of the edits made during the draft session into a single revision to the mainline causal tree. In one embodiment, the first user may initiate the gesture by selecting a control (e.g., control 3210 in FIG. 33) displayed to the user in a web-based user interface (e.g., user interface 3300) of a workspace. In an embodiment, the gesture received by the frontend may be processed by the backend and may include the data flows and operations comprising blocks 3006 (merging the draft session), 3008 (remapping and updating table IDs in the mainline causal tree), and 3010 (remapping and updating section IDs in the mainline causal tree). In one embodiment, merging a draft session (block 3006) may include updating applicable fragment IDs and table IDs, and removing or closing the draft session. Once the gesture has been fully processed and the draft branch has been merged into the mainline causal tree, the first user and the other users collaborating on the document may receive a status update 3012. For example, in an embodiment, the document being edited in collaborative will be updated to reflect the edits that were made during the draft session. Additionally, the section of the document that had been edited in the draft mode will no longer appear to any of the users as being locked for editing, in an embodiment.

FIGS. 31A and 31B are a flow diagram showing example processes for discarding a draft session, according to an embodiment. In the embodiment shown in FIGS. 31A and 31B, a first user (e.g., user 120) of a plurality of users (e.g., users 120, 122, 124) collaborating on a document (e.g., first document 114) has created a draft session for a section of the document and made edits to the draft section of the document. For example, a draft session has been created through the various data flows and processes shown in FIGS. 23A and 23B, and edits have been made to the draft section through the example data flows and processes shown in FIGS. 27A and 27B, all of which are described in detail above.

At block 3102, the first user may initiate a discard draft session gesture that will cause the draft session to be removed and all edits to draft tables and sections of the document to be deleted. In one embodiment, the first user may initiate the gesture by selecting a control displayed to the user in a web-based user interface of a workspace. In an embodiment, the gesture received by the frontend may be processed by the backend and may include the data flows and operations comprising blocks 3104 (discarding the draft session), 3106 (marking draft tables as deleted), and 3108 (discarding draft edits). In one embodiment, once a draft session is discarded, the first user and the other users collaborating on the document may receive a status update 3110. For example, in an embodiment, the section of the document that had previously been locked for editing will no longer appear as such to any of the users.

Turning to FIGS. 32-36, examples of how a user collaborating on a document with one or more other users can take a section of the document into a draft mode according to an embodiment will now be described. In this scenario, the first user 3220 (depicted in FIGS. 32, 33, and 35) and the second user 3420 (depicted in FIGS. 34 and 36) are collaborating on the first document 114 which, in this example, is a document 3204 and is shown in the web-based user interface 3200 of FIG. 32. In the examples described herein with reference to FIGS. 32A-32E, the first user 3220 and the second user 3420 may be users 120 and 122, for example. In some embodiments, the user-interfaces 3200, 3300, 3400, 3500, and 3600 are provided by the first computing device 100, the fifth computing device 106, or another suitable computing device. In some embodiments, the users 3220 and 3420 utilize respective ones of the computing devices 104a, 104b, 104c.

Figure 32:
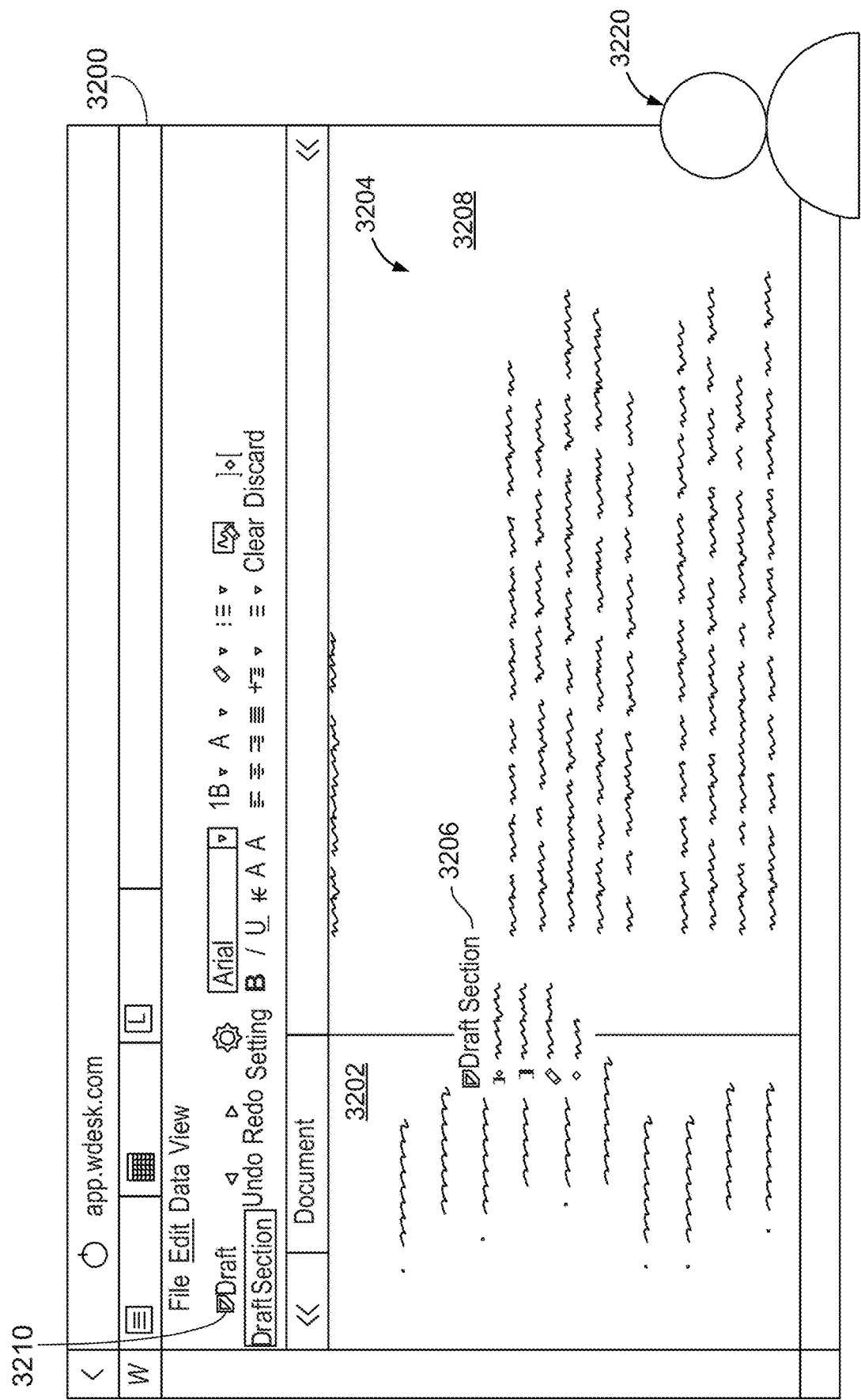
FIG. 32 illustrates an example of loading a section of a document into a draft mode, according to an embodiment.

With reference to FIG. 32, the user interface 3200 for the document 3204 includes a document outline 3202, an editing field 3208, a draft control 3210, and a draft control shortcut 3206. The document outline 3202 identifies the different sections that comprise the document 3204 and shows how the sections are arranged and ordered within the document 3204. The draft control 3210 gives the first user 3220 the option to edit a section of the document 3204 in a draft mode. In one embodiment, the draft control 3210 may be selected by the first user 3220 to initiate a draft of a designated section of the document 3204. In one example, the designated section of the document 3204 may be whichever section is currently displayed in the editing field 3208 of the user interface 3200. In another example, the designated section of the document 3204 may be whichever section is currently being edited by the first user 3220 in collaborative mode. In one embodiment, the draft control shortcut 3206 allows the first user 3220 to initiate a draft of a section from the document outline 3202. For example, the first user 3220 may select the draft control shortcut 3206 from a shortcut menu that appears when a given section of the document is selected from (or hovered over in) the document outline 3202.

Figure 33:
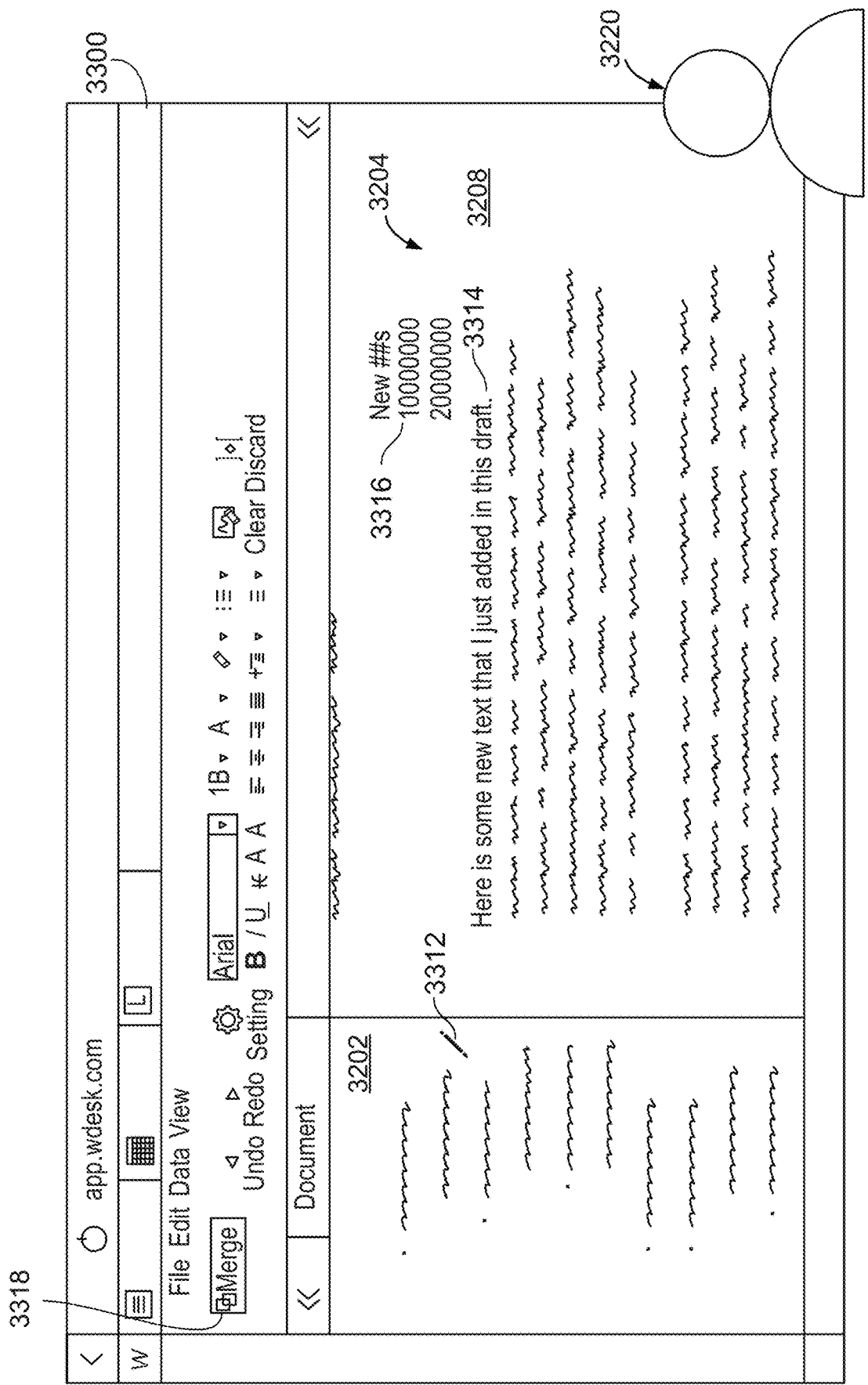
FIG. 33 illustrates an example of editing a section of a document in a draft mode, according to an embodiment.

In the user-interface 3300 of FIG. 33, the first user 3220 is making edits 3314 and 3316 to the document 3204 in draft mode. In an embodiment, an edit control 3312 is displayed in the outline 3202 by the section of the document currently being edited in draft mode. The edit control 3312 may be displayed to indicate to the first user 3220 that they are able to make edits to the section of the document, in an embodiment. Because the first user 3202 is currently editing the section of the document 3204 in draft mode, the draft control 3210 shown in FIG. 32 is replaced by a merge control 3318 in FIG. 33. In an embodiment, the first user 3220 may select the merge control 3318 to merge the edits made to the draft section of the document back into the mainline document.

FIG. 34 shows an example user-interface 3400 that may be displayed to the second user 3420, according to an embodiment. In this example, the second user 3420 is collaborating with the first user 3220 on the document 3204. As with user-interface 3200, the user-interface 3400 for the document 3204 provided to the second user 3420 includes the document outline 3402 and an editing field 3408. In the scenario depicted in FIG. 34, the first user 3220 is currently editing the section of the document 3204 in draft mode (as shown in FIGS. 32 and 33). Accordingly, an indicator 3420 is displayed in the document outline 3202 next to the section being edited in draft mode to indicate that the section is currently locked for editing (by another user). As shown in FIG. 34, the edits 3314 and 3316 made by first user 3220 are not visible to the second user 3420 since the first user 3220 has not yet published the edits by merging the draft session, in an embodiment. If the second user 3420 attempts to edit the section of the document 3204 that is currently being edited in draft mode by the first user 3220, the second user 3420 will be prevented from doing so, in an embodiment. In such an instance, the second user 3420 may be presented with a notification 3418 that is displayed on user-interface 3400, in an embodiment. In one example, the notification 3418 may indicate that another user (e.g., the first user 3220) is currently editing the section of the document.

Figure 35:
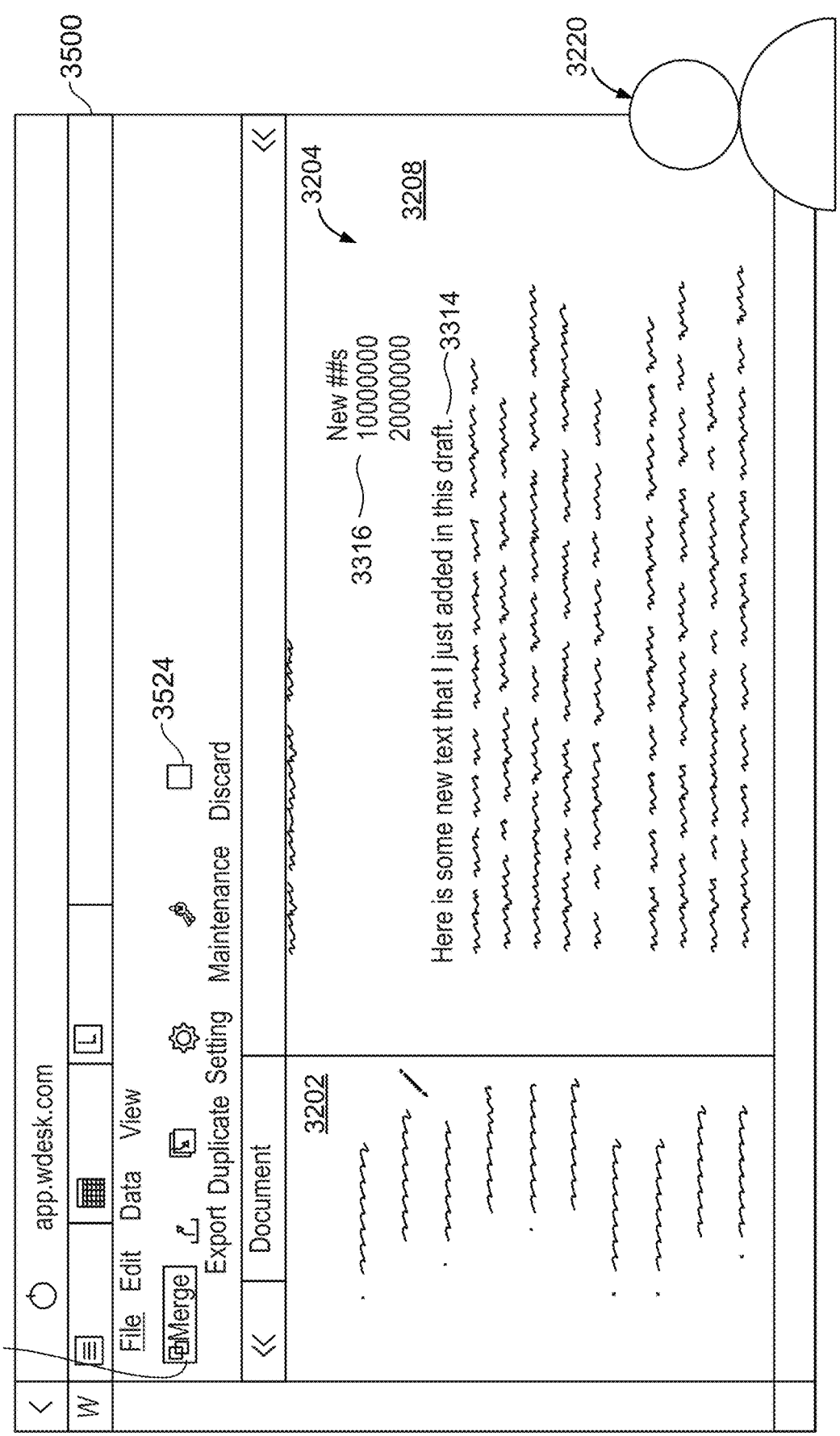
FIG. 35 illustrates an example of merging or discarding edits made to a draft section of a document, according to an embodiment.

In the example user-interface 3500 of FIG. 35, the first user 3220 is given the options to merge or discard the edits 3314, 3316 that the first user 3220 made to the section of the document 3204 in draft mode, in an embodiment. For example, the first user 3220 may select the merge control 3318 to cause the edits 3314, 3316 to be merged into the mainline document 3204. In another example, the first user 3220 may select a discard control 3524 to discard the edits 3314, 3316 so that they will not be merged into the mainline document 3204.

Figure 36:
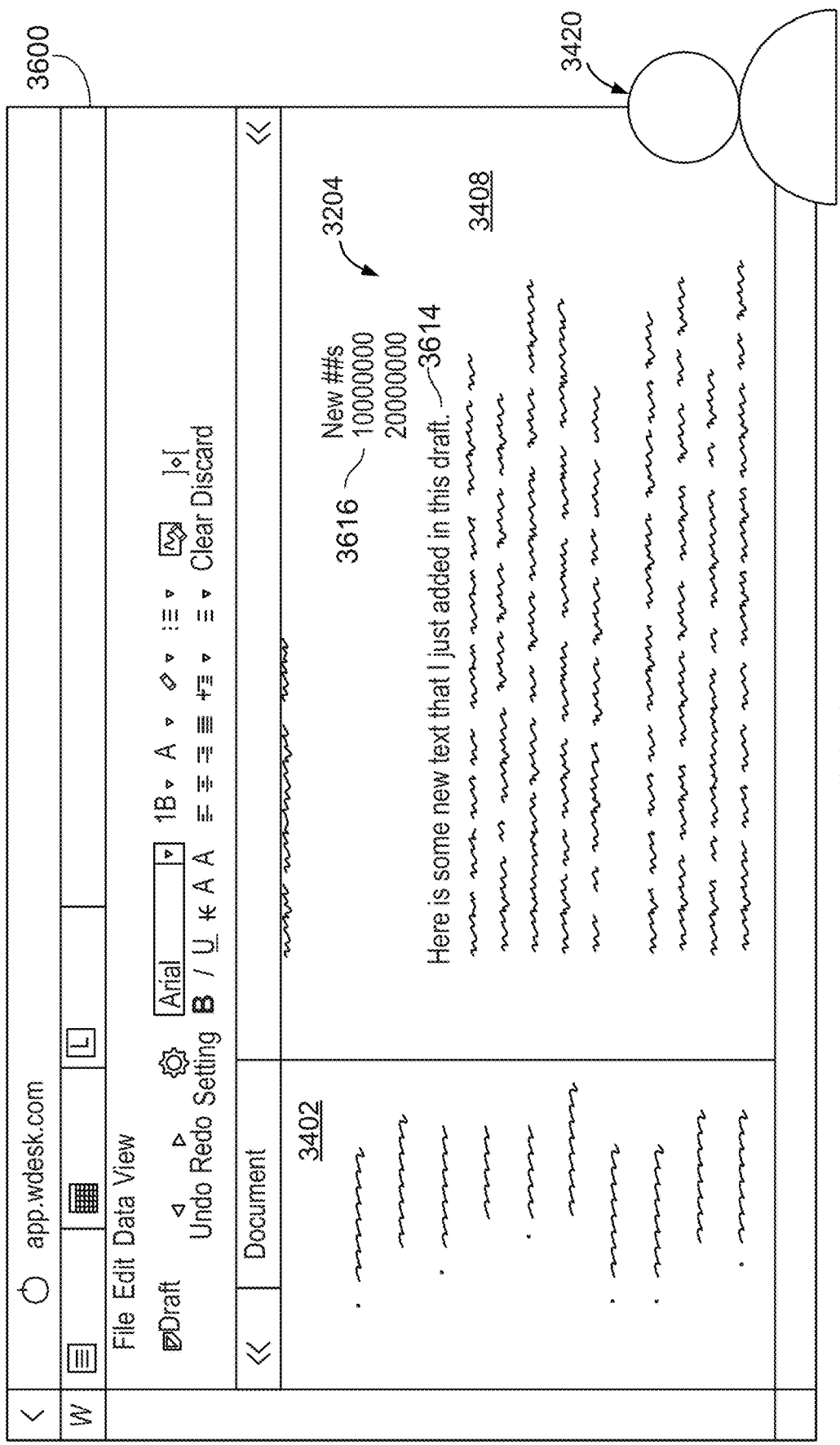
FIG. 36 illustrates an example of a document after edits from a draft section are merged, according to an embodiment.

Once the first user 3220 merges the draft session, the edits 3314 and 3316 made to the document 3204 will be visible to the second user 3420, as edits 3614 and 3616 shown in the user-interface 3600 of FIG. 36, in an embodiment.

FIGS. 37A-41C illustrate various examples involving private drafting and links. In various embodiments, at least some documents are stored using a suitable data structure configured to maintain links and references between cells, tables, paragraphs, sections, or other suitable portions of a document. In the examples shown in FIGS. 37A-41O, a first user (e.g., user 120) and a second user (e.g., user 122) are collaborating on two spreadsheet documents (referred to herein as "Sheet A" and "Sheet B"). In the examples shown, the first user is referred to as "User 1" and the second user is referred to as "User 2".

Figure 37A:
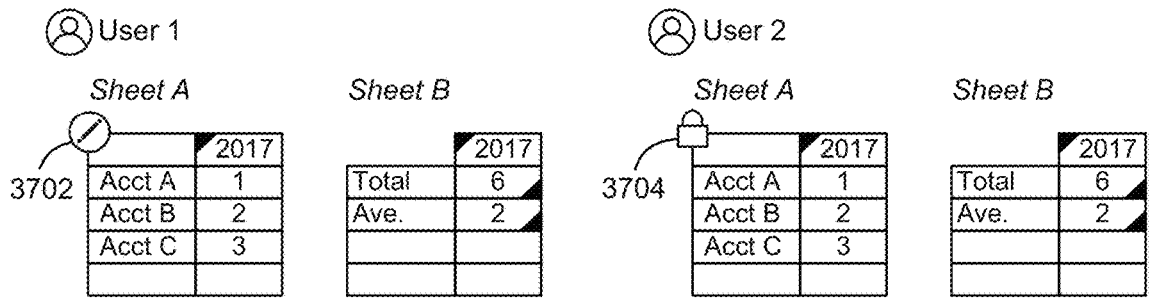
FIG. 37A is a screenshot diagram illustrating an example spreadsheet application in which one section of the spreadsheet is in a draft mode and another section of the spreadsheet is in a collaborative mode, according to an embodiment.
Figure 37B:
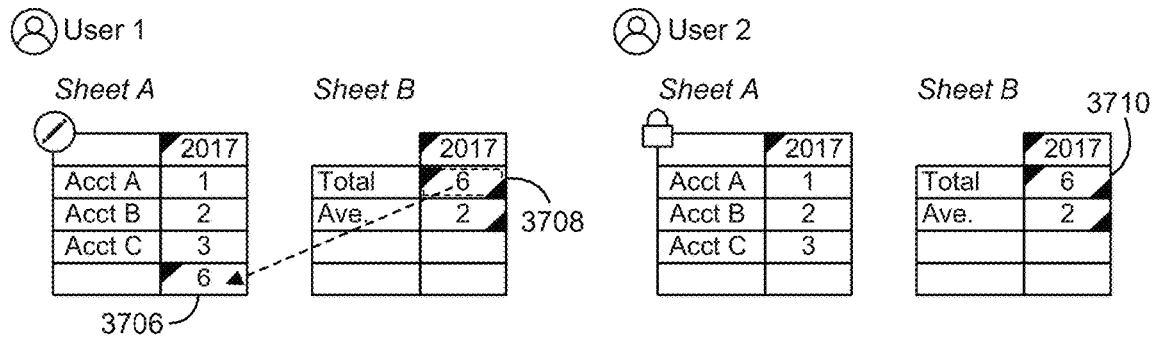
FIG. 37B is a screenshot diagram illustrating an edit being made to the draft section of the spreadsheet of FIG. 37A, according to an embodiment.
Figure 37C:
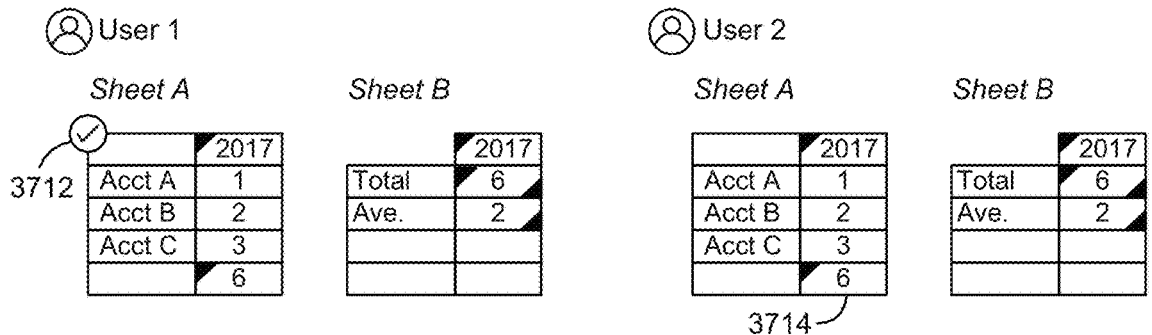
FIG. 37C is a screenshot diagram illustrating the result of merging the edit made to the draft section of FIG. 37B, according to an embodiment.
Figure 37D:
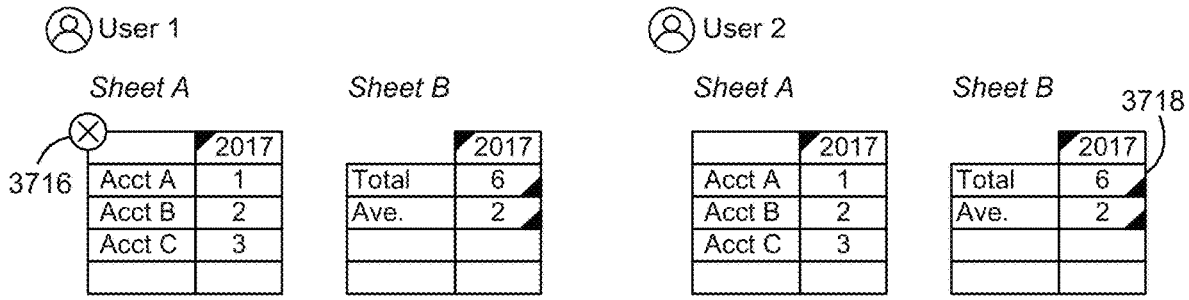
FIG. 37D is a screenshot diagram illustrating the result of discarding the edit made to the draft section of FIG. 37B, according to an embodiment.

In the scenario shown in FIG. 37A, User 1 has drafted Sheet A (i.e., User 1 is editing Sheet A in draft mode). In an embodiment, Sheet A will be displayed to User 1 with an indicator (e.g., an icon) 3702 indicating that Sheet A is editable. On the other hand, Sheet A will appear to User 2 with a different indicator 3704 indicating that Sheet A is currently locked for editing by another user. While User 1 is editing Sheet A in draft mode, User A creates a destination link in Sheet A that links content 3706 in Sheet A to content 3708 in Sheet B, as shown in FIG. 37B. For example, User A adds content 3706 to a cell of Sheet A that is linked to content 3708 from a cell of Sheet B. In an embodiment, User 2 can see that a source link has been created with cell 3710 in Sheet B, but not where the link is being used (e.g., the destination link or usage link) since Sheet A is still locked for editing in draft mode. In one example, a small solid triangle appears in the upper left corner of the cell 3710 in Sheet B to indicate that the cell 3710 is linked to content in another document, in an embodiment. In an embodiment, when User 1 publishes the edits made to Sheet A in draft mode (e.g, which may be indicated by an icon, such as a check mark, 3712 appearing next to Sheet A, in an embodiment), User 2 will be able to see the destination 3714 of the link that User 1 created with the source cell 3710 in Sheet B, as shown in FIG. 37C. FIG. 37D illustrates an example in which User 1 discards the link created in Sheet A while editing Sheet A in draft mode before the link is published. As shown in FIG. 37D, the link that was created in Sheet A linking content 3706 in Sheet A to content 3708 in Sheet B (see FIG. 37B) is discarded 3716 by User 1 while Sheet A is still being edited in draft mode. As a result, the source link indicator is removed from cell 3710 in Sheet B.

Figure 38A:
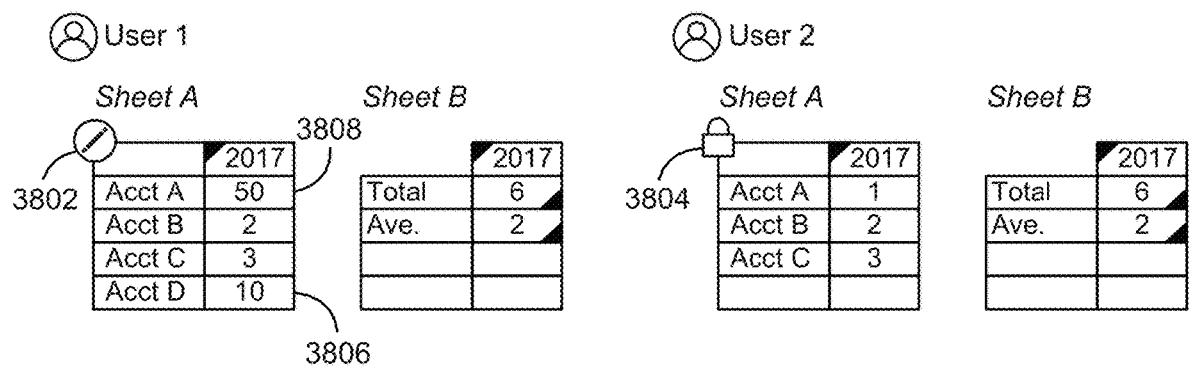
FIG. 38A is a screenshot diagram illustrating an example spreadsheet application in which one section of the spreadsheet is in a draft mode and another section of the spreadsheet is in a collaborative mode, according to an embodiment.
Figure 38B:
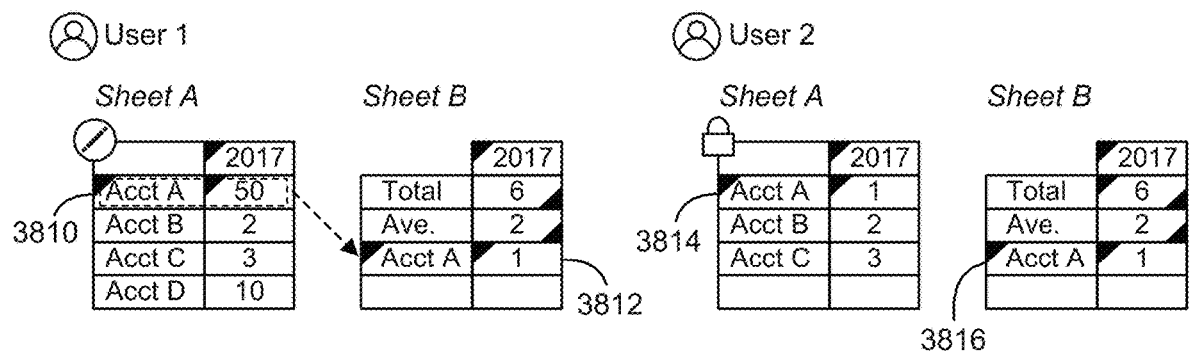
FIG. 38B is a screenshot diagram illustrating the result of an edit being made to the draft section of the spreadsheet of FIG. 38A, according to an embodiment.

FIGS. 38A and 38B illustrate an example in which a user is able to edit a collaborative section of a document while also editing a different section of the document in draft mode, in an embodiment. In the examples shown in FIGS. 38A and 38B, User 1 is editing Sheet A in draft mode while working collaboratively with User 2 on editing Sheet B. As was the case with the example shown in FIG. 37A, Sheet A is displayed to User 1 with an indicator 3802 indicating that Sheet A is editable, while Sheet A is displayed to User 2 with a different indicator 3804 indicating that Sheet A is currently locked for editing by another user. Because Sheet A is being edited by User 1 in draft mode, the edits 3806 and 3808 that User 1 has made to Sheet A are not visible to User 2. Turning to FIG. 38B, while User 1 is editing Sheet A in draft mode, User 1 creates a link to Sheet B from data in Sheet A. For example, User 1 creates a source link 3810 in draft Sheet A and a usage link 3812 in collaborative Sheet B. In an embodiment, both User 1 and User 2 will see the usage link 3812 (for User 1) and 3816 (for User 2) in Sheet B even while Sheet A is still in draft mode. User 2 will be able to see that a source link 3814 has been created in Sheet A, but not the other edits made to Sheet A in draft mode by User 1 (until User 1 publishes those edits), in accordance with an embodiment.

Figure 39A:
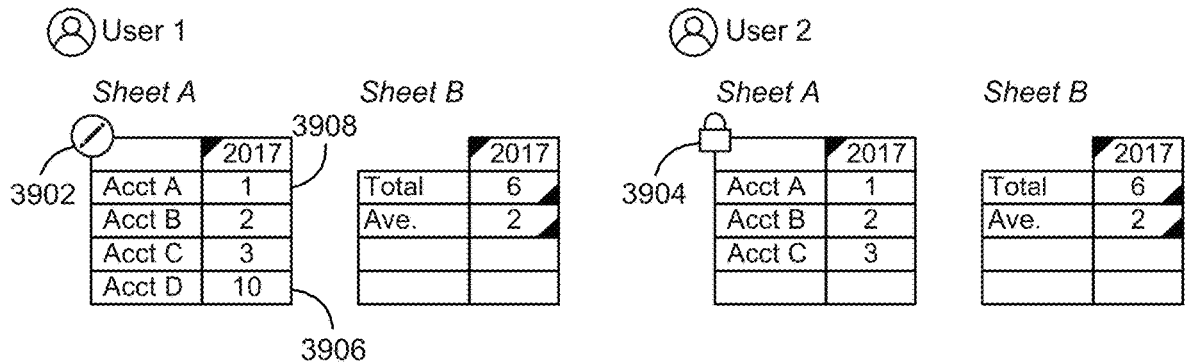
FIG. 39A is a screenshot diagram illustrating an example spreadsheet application in which one section of the spreadsheet is in a draft mode and another section of the spreadsheet is in a collaborative mode, according to an embodiment.
Figure 39B:
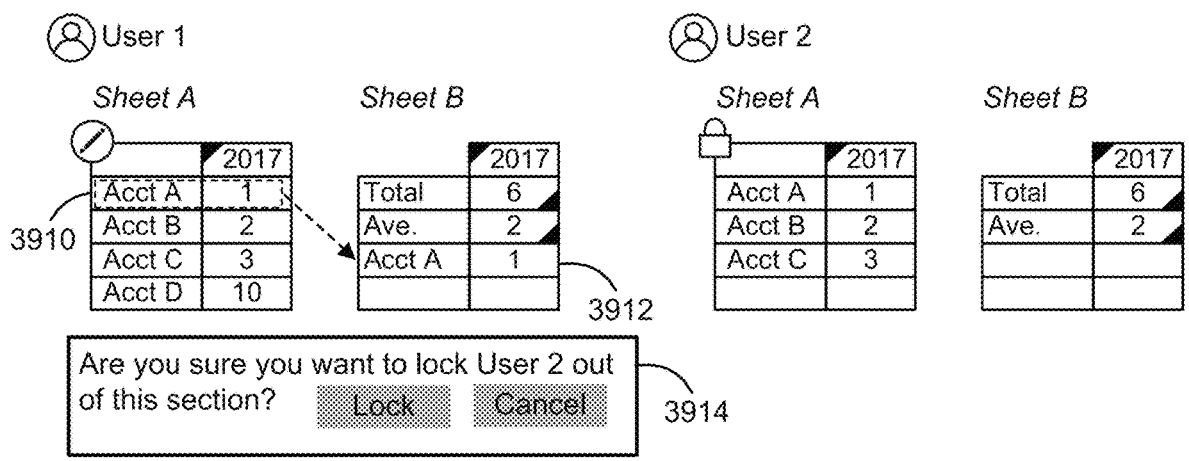
FIG. 39B is a screenshot diagram illustrating the result of an edit being made to the draft section of the spreadsheet of FIG. 39A, according to an embodiment.
Figure 39C:
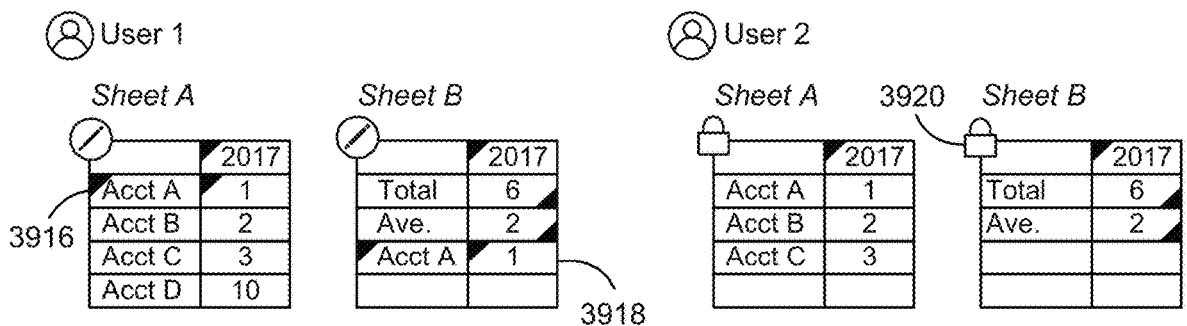
FIG. 39C is a screenshot diagram illustrating both sections of the spreadsheet of FIG. 39A in draft mode as a result of the edit of FIG. 39B, according to an embodiment.

FIGS. 39A-39C illustrate an example in which a user is not permitted to edit a collaborative section of a document while also editing a different section of the document in draft mode, in accordance with an embodiment. In the examples shown in FIGS. 39A-39C, User 1 is editing Sheet A in draft mode while working collaboratively with User 2 on editing Sheet B. As was the case with the example shown in FIG. 37A, Sheet A is displayed to User 1 with an indicator 3902 indicating that Sheet A is editable, while Sheet A is displayed to User 2 with a different indicator 3904 indicating that Sheet A is currently locked for editing by another user. Because Sheet A is being edited by User 1 in draft mode, the edits 3906 and 3908 that User 1 has made to Sheet A are not visible to User 2. In FIG. 39B, User 1 copies content 3910 from Sheet A and pastes the content 3912 in Sheet B. Because in the present example User 1 is not permitted to make edits to the collaborative Sheet B while User 1 is editing Sheet A in draft mode, User 1 is prompted 3914 to add Sheet B into the draft session and lock out User 2, in an embodiment. As shown in FIG. 39C, if User 1 chooses to add Sheet B to the draft session, then the link that User 1 created between the content 3916 in Sheet A and the content 3918 in Sheet B is fully within the draft session. As a result, Sheet B is now displayed to User 2 with another indicator 3920 indicating that Sheet B is also locked for editing by another user, in an embodiment.

Figure 40A:
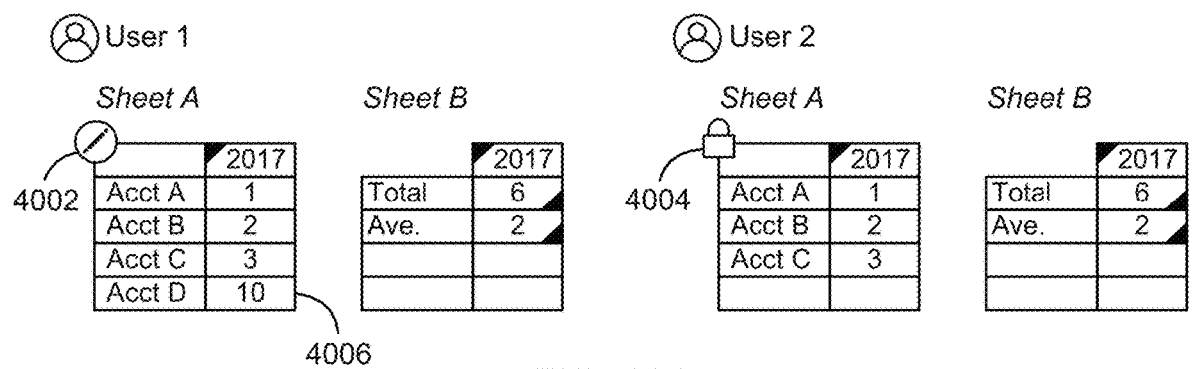
FIG. 40A is a screenshot diagram illustrating an example spreadsheet application in which one section of the spreadsheet is in a draft mode and another section of the spreadsheet is in a collaborative mode, according to an embodiment.
Figure 40B:
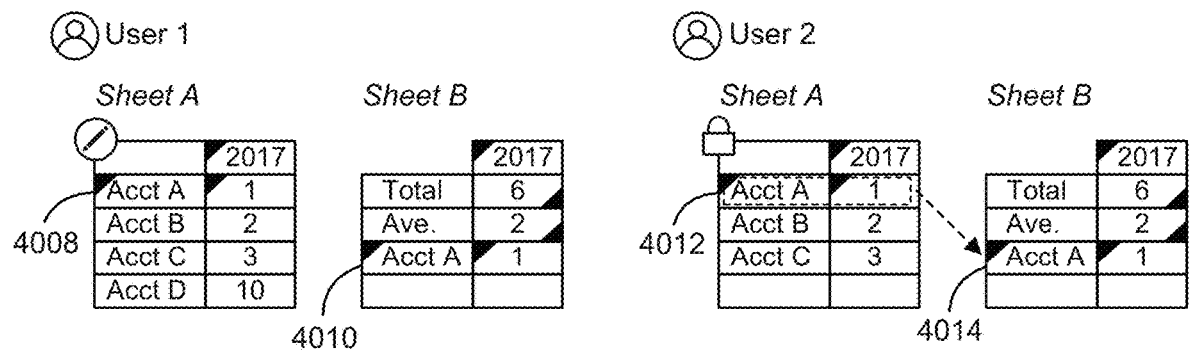
FIG. 40B is a screenshot diagram illustrating the result of an edit being made to the collaborative section of the spreadsheet of FIG. 40A, according to an embodiment.

FIGS. 40A and 40B illustrate an example in which a user creates a source link in another user's draft section of a document and a usage link in a collaborative section of the document, in an embodiment. In the examples shown in FIGS. 40A and 40B, User 1 is editing Sheet A in draft mode while working collaboratively with User 2 on editing Sheet B. As was the case with the example shown in FIG. 37A, Sheet A is displayed to User 1 with an indicator 4002 indicating that Sheet A is editable, while Sheet A is displayed to User 2 with a different indicator 4004 indicating that Sheet A is currently locked for editing by another user.

Because Sheet A is being edited by User 1 in draft mode, the edits 4006 that User 1 has made to Sheet A are not visible to User 2. Turning to FIG. 40B, while User 1 is editing Sheet A in draft mode, User B creates a link to Sheet B from data in Sheet A. For example, User 2 creates a source link 4012 in Sheet A (e.g., in the mainline version of Sheet A) and a usage link 4014 in collaborative Sheet B. In an embodiment, both User 1 and User 2 will see the usage link 4010 (for User 1) and 4014 (for User 2) in Sheet B and the source link 4008 (for User 1) and 4012 (for User 2) even while Sheet A is still in draft mode. User 2 will not be able to see the other edits (e.g., 4006) made to Sheet A in draft mode by User 1 (until User 1 publishes those edits), in accordance with an embodiment.

Figure 41A:
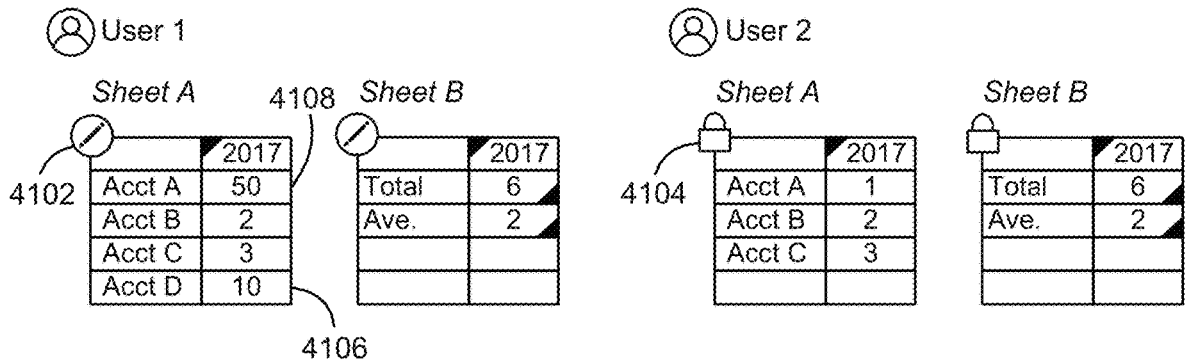
FIG. 41A is a screenshot diagram illustrating an example spreadsheet application in which multiple sections of the spreadsheet are in a draft mode, according to an embodiment.
Figure 41B:
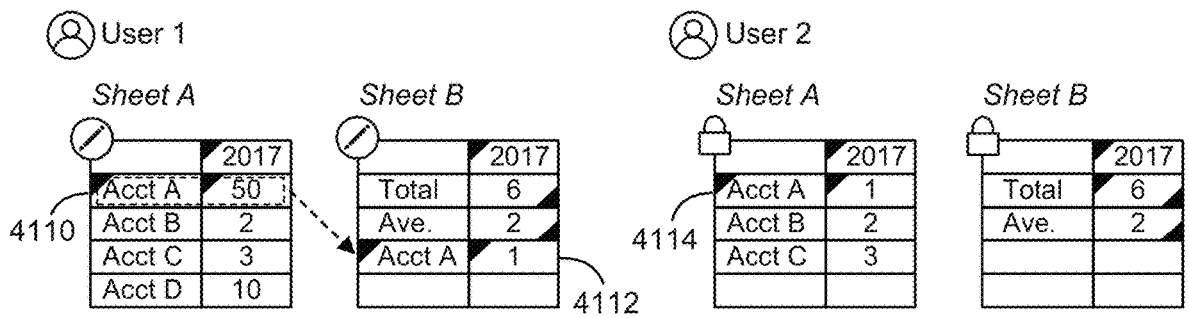
FIG. 41B is a screenshot diagram illustrating the result of an edit being made to one of the draft sections of the spreadsheet of FIG. 41A, according to an embodiment.
Figure 41C:
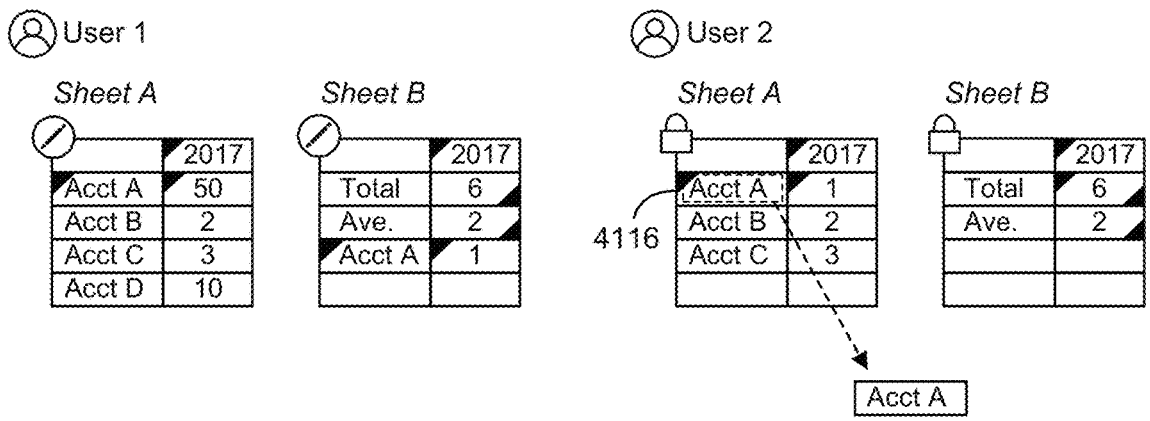
FIG. 41C is a screenshot diagram illustrating an edit being made to one of the draft sections of the spreadsheet of FIG. 41A, according to an embodiment.

FIGS. 41A-41C illustrate an example in which a user creates a source link in a draft section and a usage link in the same draft session, in accordance with an embodiment. In the examples shown in FIGS. 41A-41C, User 1 is editing both Sheet A and Sheet B in draft mode. As such, both Sheet A and Sheet B are displayed to User 1 with an indicator 4102 indicating that Sheet A and Sheet B are editable, while Sheet A and Sheet B are displayed to User 2 with a different indicator 4104 indicating that Sheet A and Sheet B are currently locked for editing by another user. Because Sheet A is being edited by User 1 in draft mode, the edits 4106 and 4108 that User 1 has made to Sheet A are not visible to User 2. Turning to FIG. 41B, while User 1 is editing Sheet A and Sheet B in draft mode, User 1 creates a link to Sheet B from data in Sheet A. For example, User 1 creates a source link 4110 in draft Sheet A and a usage link 4112 in draft Sheet B. In an embodiment, both User 1 and User 2 will see the source link 4112 (for User 1) and 4114 (for User 2) in Sheet A even while Sheet A is still in draft mode. However, User 2 will not be able to see that a usage link has been created in Sheet B, in accordance with an embodiment. User 2 is able to create links 4116 to other documents, which will simply add to that same link network, in an embodiment.

Figure 42:
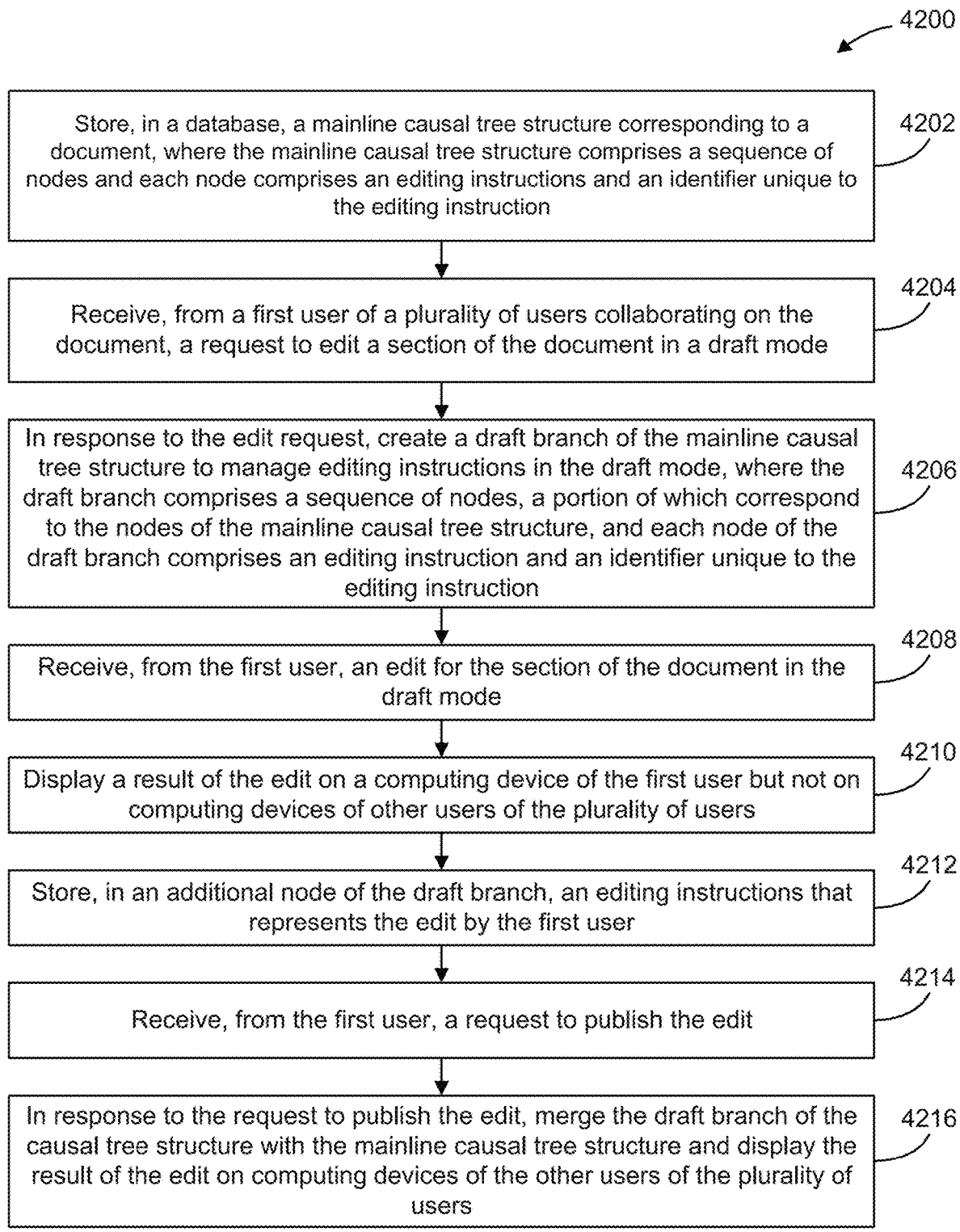
FIG. 42 is a flowchart illustrating an example method, implemented on a server, for facilitating private drafting, according to an embodiment.

FIG. 42 is a flowchart illustrating an example method, implemented on a server, for facilitating private drafting of a document, according to an embodiment. In some embodiments, the method 4200 is implemented by the productivity server 100 of FIG. 1A, which interacts with the database server 106 and the computing devices 104a, 104b, and 104c. FIG. 42 is described with reference to FIGS. 1A and 1B for explanatory purposes. In other embodiments, however, the method 4200 is implemented by another suitable computing device.

At block 4202, the productivity server 100 stores, on a database of the productivity server 100 or on database server 106, a mainline causal tree structure (e.g., a data structure) corresponding to a document. The document may be stored on the database of the productivity server 100 or the database server 106. The mainline causal tree structure includes a sequence of nodes, and each node comprises an editing instruction and an identifier unique to such editing instruction. In an embodiment, the identifiers of the editing instructions in the mainline causal tree structure are assigned by client devices when these edit instructions are received by the client devices (e.g., when the editing instructions are entered by a user). In other embodiments, for example when an editing instruction is too large for a client device to process, upon receiving the editing instruction, the productivity server 100 assigns the editing instruction an identifier and processes and applies the editing instruction to the causal tree structure maintained by the server. In still other embodiments, the mainline causal tree structure contains server-generated instructions (e.g., creation of a document, re-balance of the causal tree structure, or externally updated link content), and these server-generated instructions are assigned identifiers by the server.

At block 4204, the productivity server 100 receives, via its network interface 162, from a first user collaborating on the document with other users, a request to edit a section of the document in a draft mode. At block 4206, in response to the edit request received at block 4204, the productivity server 100 creates, via its processor 152, a draft branch of the mainline causal tree structure to manage editing instructions in the draft mode. In an embodiment, the draft branch of the causal tree structure comprises a sequence of nodes, a portion of which correspond to the nodes of the mainline causal tree structure. Each node of the draft branch of the causal tree structure comprises an editing instruction and an identifier unique to the editing instruction, in an embodiment. At block 4208, the productivity server 100 receives, via its network interface 162, from the first user, an edit for the section of the document in the draft mode. At block 4210, the productivity server 100, via its processor 152, causes a result of the edit to be displayed on a computing device of the first user (e.g., one of client devices 104a, 104b, and 104c), but not on computing devices of other users collaborating on the document. At block 4212, the productivity server 100 stores, on a database of the productivity server 100 or on database server 106, in an additional node of the draft branch of the causal tree structure, an editing instruction that represents the edit by the first user. At block 4214, the productivity server 100 receives, via its network interface 162, a request to publish the edit. At block 4216, in response to the request to publish the edit receives at block 4214, the productivity server 100, via its processor 152, merges the draft branch of the causal tree structure with the mainline causal tree structure, and causes the result of the edit to be displayed on computing devices of the other users collaborating on the document.

In an embodiment, in response to the productivity server 100 receiving the edit request from the first user, the productivity server 100, via its processor 152, causes to be displayed on the computing device of the first user and the computing devices of the other users, an indicator to indicate that the section of the document is being edited in the draft mode.

In an embodiment, the productivity server 100, via its processor, causes the indicator to be removed after the productivity server 100 receives the request to publish the edit from the first user.

In another embodiment, while the section of the document is in the draft mode, the productivity server 100 prevents the other users, of the plurality of users collaborating on the document, from editing the section of the document.

In still another embodiment, while the section of the document is in the draft mode, the productivity server 100 receives, via its network interface 162, from the first user, an edit to a different section of the document that is not in the draft mode and, while the section of the document is in the draft mode, causes the result of the edit to the different section of the document to be displayed on the computing devices of the other users of the plurality of users.

In yet another embodiment, each of the nodes of the mainline causal tree structure is associated with a first document identifier and each of the nodes of the draft branch is associated with a second document identifier different from the first document identifier.

In still other embodiments, where the edit by the first user is one of a plurality of edits made by the first user to the section of the document in the draft mode, the productivity server 100, via its processor 152, merges the draft branch of the causal tree structure with the mainline causal tree structure by grouping the plurality of edits by the first user into a single editing instruction and storing the single editing instruction in an additional node of the mainline causal tree structure.

In another embodiment, while the section of the document is in the draft mode, the productivity server 100 receives, via its network interface 162, from the first user, a request to add a second user of the plurality of users to the draft mode. In response to the request to add the second user to the draft mode, the productivity server 100, via its processor 152, allows the second user to make edits to the section of the document in the draft mode.

In still another embodiment, where the section of the document in the draft mode includes first content that is linked to second content not in the section of the document in the draft mode, and while the section of the document is in the draft mode, the productivity server 100 receives, via its network interface 162, an edit to the second content. In response to receiving the edit to the second content, the productivity server, via its processor 152, updates the first content linked to the second content. In an embodiment, the second content is included in a different section of the document not in the draft mode. In still another embodiment, the document being collaborated on by the plurality of users is a first document, and the second content is included in a second document different from the first document.

Figure 43:
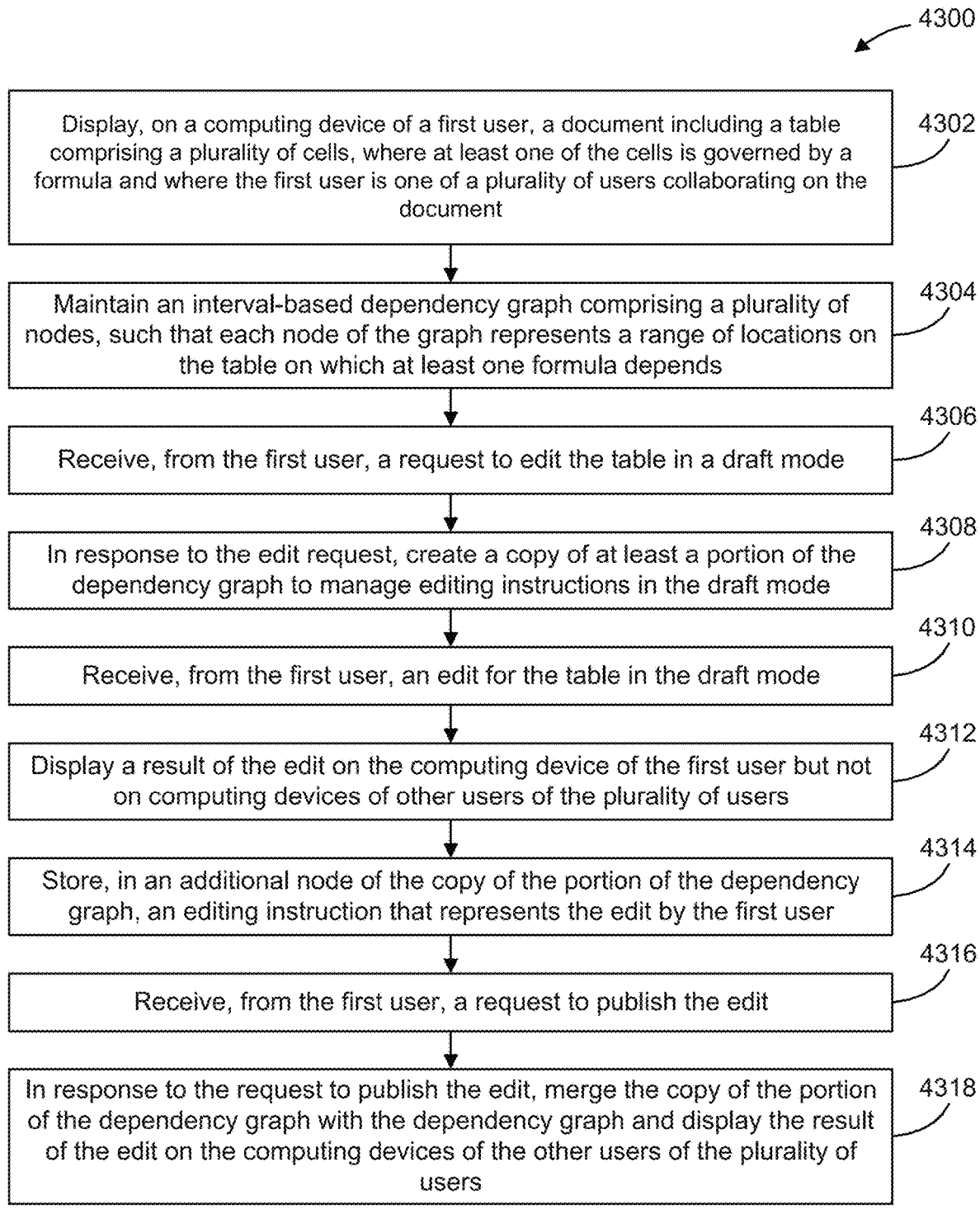
FIG. 43 is a flowchart illustrating an example method, implemented on a server, for facilitating private drafting, according to an embodiment.

FIG. 43 is a flowchart illustrating an example method, implemented on a server, for facilitating private drafting of a document, according to an embodiment. In some embodiments, the method 4300 is implemented by the productivity server 100 of FIG. 1A, which interacts with the database server 106 and the computing devices 104*a*, 104*b*, and 104*c*. FIG. 43 is described with reference to FIGS. 1A and 1B for explanatory purposes. In other embodiments, however, the method 4300 is implemented by another suitable computing device.

At block 4302, the productivity server 100, via its processor 152, causes to be displayed on a computing device (e.g., one of client devices 104*a*, 104*b*, and 104*c*) of a first user, a document including a table comprising a plurality of cells, where at least one of the cells is governed by a formula and where the first user is collaborating on the document with other users.

At block 4304, the productivity server 100, via its processor 152, maintains an interval-based dependency graph comprising a plurality of nodes, such that each node of the graph represents a range of locations on the table on which at least one formula depends. In an embodiment, the interval-based dependency graph is maintained on a database of the productivity server 100. In another embodiment, the interval-based dependency graph is maintained on database server 106. At block 4306, the productivity server 100 receives, via its network interface 162, from the first user, a request to edit the table in a draft mode. At block 4308, in response to the edit request received at block 4306, the productivity server 100, via its processor 152, creates a copy of at least a portion of the dependency graph to manage editing instructions in the draft mode. At block 4310, the productivity server 100 receives, via its network interface 162, from the first user, an edit for the table in the draft mode.

At block 4312, the productivity server 100, via its processor 152, causes a result of the edit to be displayed on the computing device of the first user but not on computing devices of other users collaborating on the document. At block 4314, the productivity server 100 stores, on a database of the productivity server 100 or on database server 106, in an additional node of the copy of the portion of the dependency graph, an editing instruction that represents the edit by the first user. At block 4316, the productivity server 100 receives, via its network interface 162, from the first user, a request to publish the edit. At block 4318, in response to the request to publish the edit received at block 4316, the productivity server 100, via its processor 152, merges the copy of the portion of the dependency graph with the dependency graph, and causes the result of the edit to be displayed on the computing devices of the other users collaborating on the document.

In an embodiment, in response receiving the edit request, the productivity server 100, via its processor 152, causes to be displayed on the computing device of the first user and the computing devices of the other users, an indicator to indicate that the table is being edited in the draft mode. In another embodiment, the productivity server 100, via its processor, causes the indicator to be removed after the productivity server 100 receives the request to publish the edit from the first user.

In yet another embodiment, while the table is in the draft mode, the productivity server 100 prevents the other users, of the plurality of users collaborating on the document, from editing the table.

In still another embodiment, while the table is in the draft mode, the productivity server 100 receives, via its network interface 162, from the first user, an edit to a portion of the document that is not in the draft mode and, while the table is in the draft mode, causes the result of the edit to the portion of the document to be displayed on the computing devices of the other users collaborating on the document.

In other embodiments, where the table in the draft mode is a first table in the document, and while the first table is in the draft mode, the productivity server 100 receives, via its network interface 162, from the first user, an edit to a second table included in the document, where the second table is not in the draft mode and the edit to the second table includes a reference to the first table. In response to receiving the edit to the second table, the productivity server 100, via its processor 152, prompts the first user to add the second table to the draft mode.

In still another embodiment, where the table in the draft mode is a first table in the document, the productivity server 100 receives, via its network interface 162, from a second user collaborating on the document, an edit to a second table included in the document, where the second table is not in the draft mode and the edit to the second table includes a reference to the first table. In response to receiving the edit to the second table, the productivity server 100, via its processor 152, causes to be displayed on the first table an indication that the first table is referenced by another table.

In yet another embodiment, where the table in the draft mode is a first table in the document and the edit for the table in the draft mode includes a reference to a second table in the document, and where the second table is not in the draft mode, the productivity server 100, via its processor 152, causes to be displayed on the computing devices of the other users of the plurality of users, an indication that the second table is referenced by another table. The productivity server 100 causes the indication to be displayed prior to receiving the request to publish the edit from the first user.

In still another embodiment, while the first table is in the draft mode, the productivity server 100 receives, via its network interface 162, from the first user, a request to add a second user of the plurality of users to the draft mode. In response to receiving the request to add the second user to the draft mode, the productivity server 100, via its processor 152, allows the second user to make edits to the first table in the draft mode.

The examples described above involve the use of R-Trees, which are described in more detail later in this disclosure. However, the techniques described herein may also be used with causal trees or causal graphs. A description and use scenarios for causal trees and causal graphs according to various embodiments will now be provided.

Causal tree structures are useful representations of how content and metadata associated with the content are organized. For example, a document may be represented by a single causal tree structure or a bounded set of causal tree structures. The causal tree structure is useful in efficiently tracking and storing changes made in the document. A typical causal tree structure includes nodes of the editing instructions in the document, and each editing instruction has a unique identifier or ID. The editing instructions include, for example, text characters, insertion of text characters, deletion of text characters, formatting instructions, copy and paste, cut and paste, etc. In other words, a causal tree structure is a representation of all the instructions (regardless of type) that compose a document. The causal tree structure starts with a root node, from which all other instruction nodes branch. Except for the root node, each editing instruction in the document is caused by whichever editing instruction that came before it. Every editing instruction is aware of the ID of its parent instruction, i.e., the instruction that "caused" it. In an embodiment, each instruction (other than the root node) in the document may be represented as a 3-tuple: ID or nodeID (ID of the instruction), CauseID (ID of the parent instruction), and Value (value of the instruction). Example causal tree structures are shown in FIG. 2A and FIG. 2B.

Figure 2A:
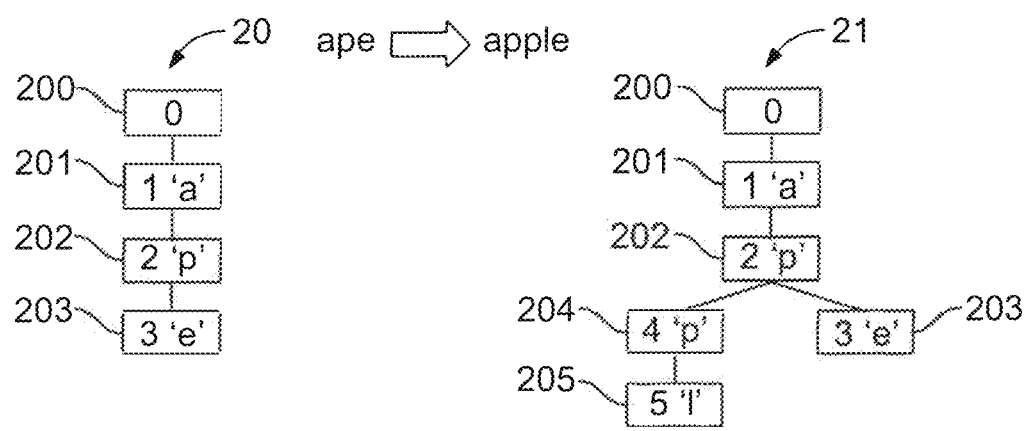
FIG. 2A is a diagram illustrating insertion of text in a causal tree structure.
Figure 2B:
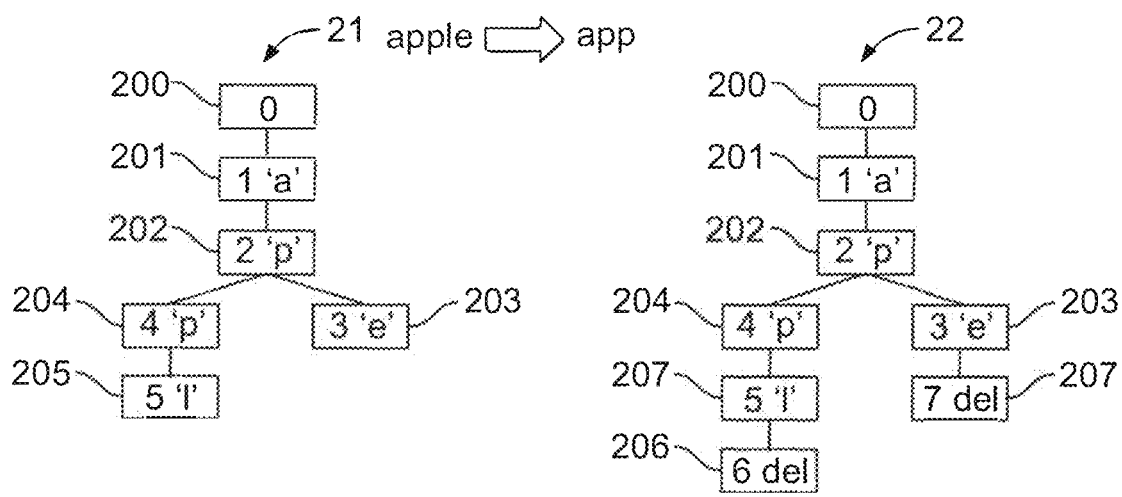
FIG. 2B is a diagram illustrating deletion of text in a causal tree structure.

FIG. 2A is a diagram illustrating insertion of text in a causal tree structure. A causal tree 20 for the text "ape" is shown. The first node in the causal tree 20 is the root node 200, assigned an ID of "0". Following the root node 200 is the character "a", which resides in a first node 201 having an ID of "1", a CauseID of "0", and a Value of "a". Following the character "a", character "p" is located in a second node 202 having an ID of "2", a CauseID of "1", and a Value of "p". Finally, character "e" follows the character "p" and resides in a third node 203, which has an ID of "3", a CauseID of "2", and a Value of "e". Together, root node 200 to the third node 203 forms one branch of the causal tree 20.

When a user changes the text "ape" to "apple" by inserting new characters "p" and "l" between the existing characters "p" and "e" in the causal tree 20, these insertions result in causal tree 21. The causal tree 21 is a modified version of the causal tree 20 and tracks the character insertion instructions as additional nodes of the tree. In the causal tree 21, the instruction to insert a new character "p" is added as the fourth node 204 and is assigned the next available ID, i.e., "4". The instruction to insert new character "p" also has a CauseID of "3" since its parent instruction is the existing "p" in the text "ape". The instruction to insert a new character "l" follows the instruction to insert the new character "p", and the instruction to insert the new character "l" is shown in a fifth node 205. The instruction to insert the new character "l" has an ID of "5", a CauseID of "4", and a value of "l".

As shown in FIG. 2A, two branches are formed or caused by the second node 202 (the first "p"). The first branch includes the third node 203, which is the character "e" from the text "ape". The second branch includes the fourth node 204 (the second "p") and the fifth node 205 (the character "l"). In an embodiment, the ordering of branches in a causal tree is significant because incorrectly sequenced branches result in unwanted results. For example, an incorrectly sequenced branch from the second node 202 in causal tree 21 would result in "apepl" rather than "apple".

In an embodiment, sequence of the instructions in a causal tree is determined by the ID of the instructions; the higher the value of the ID the later the node came into existence, since the ID for a node is based on the next available sequential ID in the document. For example, in causal tree 21 the fourth node 204 has the ID of "4" and thus was created after the third node 203 which has the ID of "3". Nodes or branches sharing the same CauseID are ordered from highest value ID to lowest value ID. For example, in causal tree 21, the fourth node 204 and the third node 203 share the same parent node (the second node 202) and the same CauseID of "2". Because the ID ("4") of the fourth node 204 is higher than the ID ("3") of the third node 203, the fourth node 204 begins the first branch following the second node 202, and the third node 203 begins the second branch following the second node 202. In yet another embodiment, sequence of the branches is determined by a time stamp, where the nodes sharing the same CauseID are ordered from newest node (i.e., created later in time) to oldest node (i.e., created earlier in time).

FIG. 2B illustrates deletion of text from a causal tree structure. When a user deletes a character from existing text, the character is not removed from the causal tree structure, but only marked as deleted. In other words, the causal tree tracks the instructions to delete using additional nodes. For example, the user changes the text "apple" to "app" by deleting the characters "l" and "e", corresponding to the fifth node 205 and the third node 203, from the causal tree 21. The deletion of the character results in the modified causal tree 22. In the causal tree 22, a "del" instruction (i.e., delete instruction) is created after the characters "l" (fifth node 205) and "e" (third node 203). The "del" instruction in the sixth node 206 is caused by the character "l" and is assigned the next available ID, which is "6". Because the "del" instruction in the sixth node 206 is caused by the character "l", it has a CauseID of "5" corresponding to the ID of the character "l". The "del" instruction in the seventh node 207 is caused by the character "e" and has an ID of "7". The "del" instruction in the seventh node 207 has a CauseID of "3", which corresponds to the ID of the character "e". The Value of the "del" instruction is "del", which represents deletion.

Using a causal tree structure, every editing instruction in a document is immutable (including deletions), which ensures convergence of the changes at all user sites. As long as sufficient time is allowed for all editing instructions to arrive at all user sites, every user device will be able to construct the same causal tree and the users will be able to view and edit the same revision of document. In an embodiment, the value of the editing instruction may be mutable, however, the ID (e.g., ID of the node containing the editing instruction) is not mutable.

Storing the 3-tuple of every editing instruction in a document, however, requires a lot of memory and network transmission time. To reduce the amount of storage space and network transmission time needed, causal trees are compressed, where tree nodes form long chains with incrementing IDs. Not every ID is stored; only the first ID in each chain is stored. The CauseID may be similarly compressed.

Figure 3:
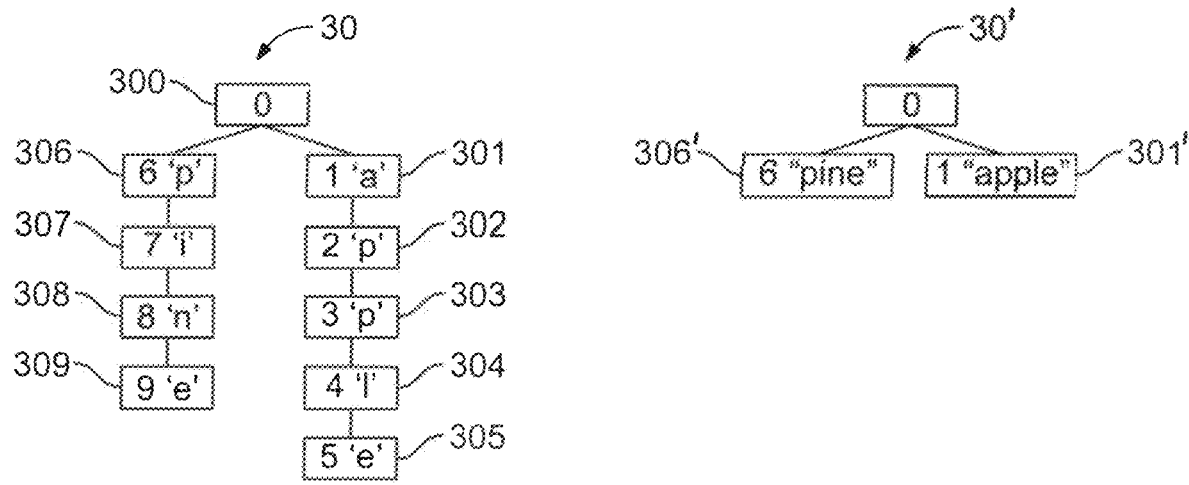
FIG. 3 is a diagram illustrating a compression algorithm for insertion of text in a causal tree structure, according to an embodiment.

FIG. 3 is a diagram illustrating a compression algorithm for insertion of text in a causal tree, according to an embodiment. In an example, a user inserts "pine" before "apple" to create the text "pineapple". The insertion of text generates an uncompressed causal tree 30, in which four additional characters with IDs of "6", "7", "8", and "9" are generated. In more detail, the causal tree 300 includes a root node 300, which causes two branches. The first branch includes nodes 301, 302, 303, 304, and 305, which respectively correspond to the IDs of "1" to "5" forming the text "apple". The second branch includes nodes 306, 307, 308, and 309, which respectively correspond to the IDs of "6" to "9" forming the text "pine".

A compression algorithm is applied to uncompressed causal tree 30 resulting in compressed causal tree 30'. In compressed tree 30', node 301 to 305 with IDs of "1" to "5" are grouped or chained together to form a chain node 301' for the text "apple". Nodes 306 to 309 with IDs of "6" to "9" are grouped or chained together to form another chain node 306' for the text "pine". In an embodiment, in the compressed causal tree 30', only the ID of the first node in a chain node is stored. In FIG. 3, for chain node 301', only the ID of the first character "a" is stored; for chain node 306', only the ID of the first character "p" is stored. Consequently, in the compressed causal tree 30', instead of storing IDs "1" to "9" as in uncompressed causal tree 30, the only IDs stored are "1" and "6".

Figure 4:
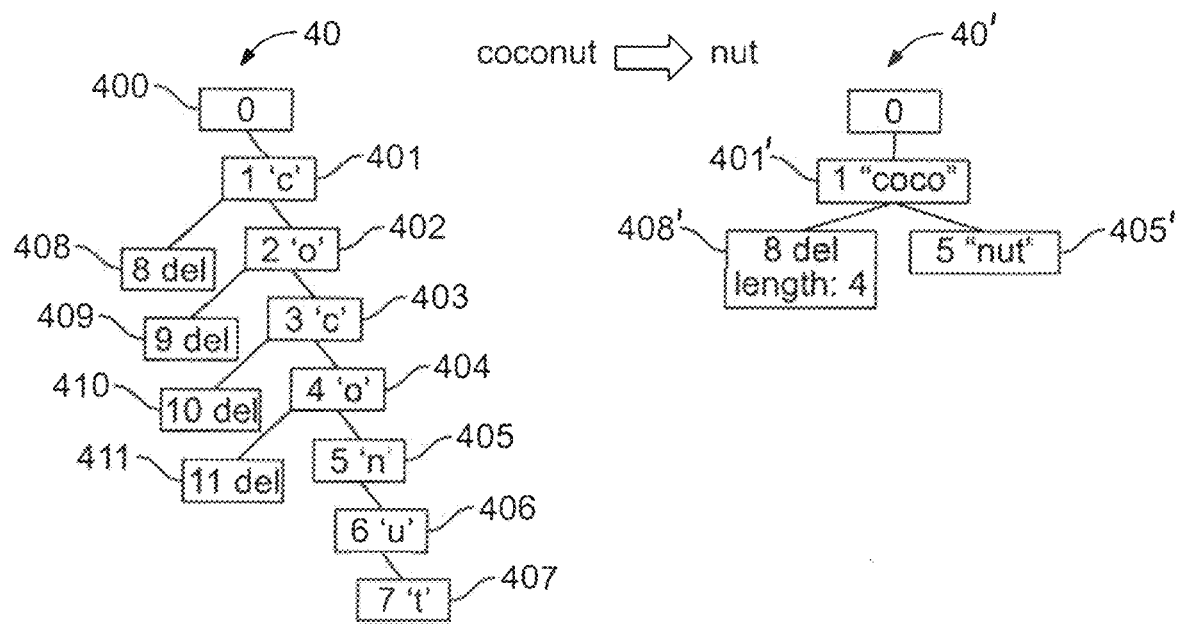
FIG. 4 is a diagram illustrating a compression algorithm for deletion of text in a causal tree structure, according to an embodiment.

FIG. 4 is a diagram illustrating a compression algorithm for deletion of text in a causal tree structure, according to an embodiment. In an example, a user deletes "coco" from "coconut" to create the text "nut". Uncompressed causal tree 40 includes a root node 400 and nodes 401 to 411. Nodes 401 to 407 respectively correspond to the characters in the text "coconut", which has IDs of "1" to "7". Since "coco" is deleted from "coconut", a "del" instruction is added after each character of "coco", resulting in four deletion instructions "del" having IDs of "8", "9", "10", and "11". The four deletion instructions "del" reside in nodes 408 to 411.

A compression algorithm is applied to uncompressed causal tree 40 resulting in compressed causal tree 40'. The compressed causal tree 40' includes the root node 400. Following the root node 400 is a chain node 401' for the text "coco". The chain node 401' has an ID of "1" (the ID of the first character "c") and a CauseID of "0" (the ID of the root node 400). The chain node 401' in turn causes two chain nodes 405' and 408'. The chain node 405' has an ID of "5", a CauseID of "1", and a Value of "nut". The chain node 408' has an ID of "8", a Cause ID of "1", and a Value of "del" representing the deletion instruction. In an embodiment, the chain node 408' includes a length field ("4"), because the chain node 408' contains four deletion instructions "del". Instead of removing the text "coco" from the tree, the chain node 408' modifies the character chain node 401' so that the system tracks the edit that deleted "coco" from "coconut".

In compressed causal tree 40', only three IDs are stored following the root node 400. ID "1" is stored and corresponds to "coco" in chain node 401'. ID "5" is stored and corresponds to "nut" in chain node 405'. ID "8" is stored and correspond to the four deletion instructions "del" in chain node 408'. The chain nodes 405' and 408' share the same CauseID of "1", because "coco" of chain node 401' is the parent of both chain nodes 405' and 408'.

Figure 5A:
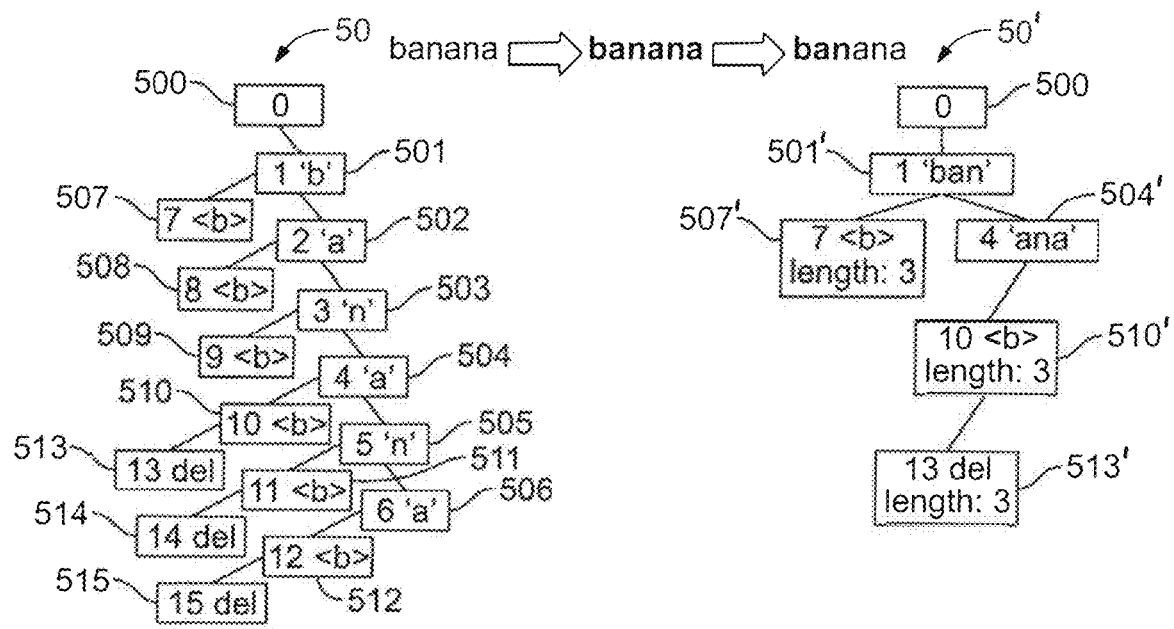
FIG. 5A is a diagram illustrating a compression algorithm for formatting changes in a causal tree structure, according to an embodiment.

Not only can the causal tree structure be used to track and store insertion and deletion of text, it can also be utilized to track and store formatting changes and other metadata changes. FIG. 5A is a diagram illustrating a compression algorithm for tracking and storing formatting changes in a causal tree structure, according to an embodiment. A user first bolds the text "banana" and then enters an instruction to delete the bolding of the characters "ana". As a result, the "ban" portion of the text "banana" is displayed in bold while the "ana" portion of the text "banana" is displayed not in bold.

Uncompressed causal tree 50 includes a root node 500 and nodes 501 to 515. Nodes 501 to 506 respectively correspond to the characters in the text "banana", which has IDs of "1" to "6". When the text "banana" is bolded, a bold instruction "<b>" is generated for each character node in the text "banana". In uncompressed causal tree 50, the bold instructions "<b>" span nodes 507 to 512 and have IDs "7" to "12". Each of the bold instructions "<b>" at character nodes 507 to 512 is caused by a character in the text "banana". For example, the bold instruction "<b>" at node 507 is caused by the character "b" at node 501. The bold instruction "<b>" at node 507 thus has a CauseID of "1". Likewise, the bold instruction "<b>" at node 512 is caused by the last "a" at node 506. The bold instruction "<b>" at node 512 thus has a CauseID of "6".

When the user enters an instruction to delete the bolding of the "ana" portion of the text "banana", three deletion instructions "del" are generated and added to the uncompressed causal tree 50. The deletion instructions "del" have IDs of "13", "14", and "15" and are caused by nodes 510, 511, and 512, respectively, and thus have respective CauseIDs of "10", "11", and "12". A deletion instruction does not remove the characters or instructions from the causal tree; instead, the deletion instruction simply instructs for the deletion or undoing of its respective parent node. In this example, the bold instructions "<b>" at nodes 510, 511, and 512 remain pointing to their respective parent nodes, i.e., nodes 504, 505, and 506, even though the bold instructions "<b>" at nodes 510, 511, and 512 are marked as deleted by the delete instructions "del" at nodes 513, 514, and 515.

When uncompressed causal tree 50 is compressed, the result is the compressed causal tree 50'. The compressed causal tree 50' includes the root node 500. Following the root node 500 is a chain node 501' for the text "ban". The chain node 501' has an ID of "1" (the ID of the first character "b") and a CauseID of "0" (the ID of the root node 500). The chain node 501' in turn causes two chain nodes 504' and 507'. The chain node 507' is a formatting chain node and has an ID of "7", a CauseID of "1", and a Value of "<b>" representing a bold instruction. In an embodiment, a length field is included in formatting chain node 507' to indicate that the chain is "3" characters long, i.e., there are three bold instructions "<b>" in the formatting chain node 507'. In other embodiments, however, the length field is omitted from the formatting chain node 507'. The three bold instructions "<b>" in formatting chain node 507' are caused by the text "ban" in chain node 501', and the bold instructions "<b>" modify the text "ban" to create the bolded word "ban".

The chain node 501' also causes the chain node 504', which has an ID of "4", a CauseID of "1", and a Value of "ana". The chain node 504' in turn causes another formatting chain node 510', which has an ID of "10", a CauseID of "4", and a Value of "<b>" representing a bold instruction. A length field in formatting chain node 510' indicates that the chain is "3" characters long, i.e., there are three bold instructions "<b>" in the formatting chain node 510'. The bold instructions "<b>" in the formatting chain node 510' modify the text "ana" in the chain node 504'.

When the user enters the instruction to delete the bolding of the characters "ana", the formatting chain node 510' causes a chain node 513'. The chain node 513' includes deletion instructions "del" and has an ID of "13", a CauseID of "10", and a Value of "del" representing a delete instruction. A length field in the chain node 513' indicates that the chain is "3" characters long, i.e., there are three deletion instructions "del" in the chain node. The deletion instructions in the chain node 513' modify the formatting chain node 510', i.e., which deletes the bold instructions contained in chain node 510'.

The user experience to unbold the text "ana" may be represented in another syntax, in another embodiment. In one example, it could be a syntax representing bold-ness as a Boolean property e.g., "bold=false". In another example, it could be a syntax where the unbold is a complementary instruction to "<b>" i.e., "<unb>".

Figure 5B:
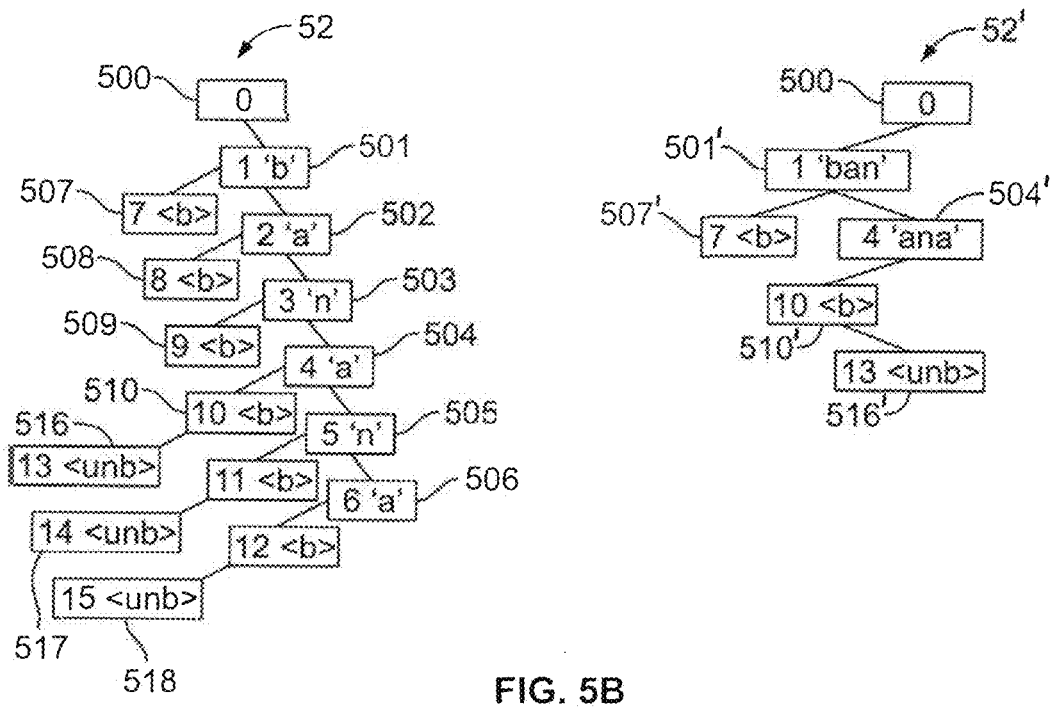
FIG. 5B is a diagram illustrating a compression algorithm for tracking and storing formatting changes in a causal tree structure, according to an embodiment.

FIG. 5B is a diagram illustrating one possible alternate approach to handling formatting change instructions, and then the application of the compression algorithm for tracking and storing formatting changes in a causal tree structure, according to an embodiment. A user first bolds the text "banana" and then enters an "unbold" instruction to unbold "ana". As a result, the "ban" portion of the text "banana" is displayed in bold while the "ana" portion of the text "banana" is displayed not in bold, which is the same result as shown in FIG. 5A. FIG. 5B illustrate some of the same elements as FIG. 5A and the description of such like-numbered elements are omitted for brevity.

As shown in FIG. 5B, in uncompressed causal tree 52, when the user enters an "unbold" instruction to unbold the text "ana", three nodes 516, 517, and 518 are created. Node 516 has an ID of "13", a CauseID of "10", and a Value of "<unb>" representing an unbold instruction. Node 517 has an ID of "14", a CauseID of "11", and a Value of "<unb>". Node 518 has an ID of "15", a CauseID of "12", and a Value of "<unb>." Thus, the nodes 516, 517 and 518 corresponding to the unbold instruction are caused by the nodes 510, 511, and 512 corresponding to the bold instructions "<b>" of the text "ana." On the other hand, in the uncompressed tree 50 of FIG. 5A, the delete "<del>" instruction adds deletion instruction nodes 513, 514, and 515 to the bold instruction nodes 510, 511, and 512. The result of both causal trees 50 and 52 are the same, which is that "ana" is bolded and then unbolded.

Compressing uncompressed causal tree 52 results in compressed causal tree 52'. When the user enters the "unbold" instruction to unbold the text "ana", the chain node 510' causes a chain node 516'. The chain node 516' includes unbold instructions "<unb>" and has an ID of "13", a CauseID of "10", and a Value of "<unb>" representing an unbold instruction. The instructions in the chain node 516' modify the chain node 510', i.e., which unbolds the text "ana" (chain node 504') that was previously bolded by chain node 510'.

Furthermore, although delete instruction (from the perspective of the system) or an undo instruction (from the perspective of the user) is applied to a bold instruction in FIG. 5A, the process is similar when the undo instruction is applied to other types of instructions (e.g., insertion of text, deletion of text, copy and paste instruction, etc.). As an example, if the bolded word "ana" (which encompasses chain nodes 504' and 510') are deleted, and the delete instruction is undone, both chain nodes 504' and 510' would be re-displayed at the user device. In general terms, any instruction can be undone by attaching a deletion instruction to it (e.g., a deletion instruction may be attached to another deletion instruction to undo the previous deletion).

Figure 6:
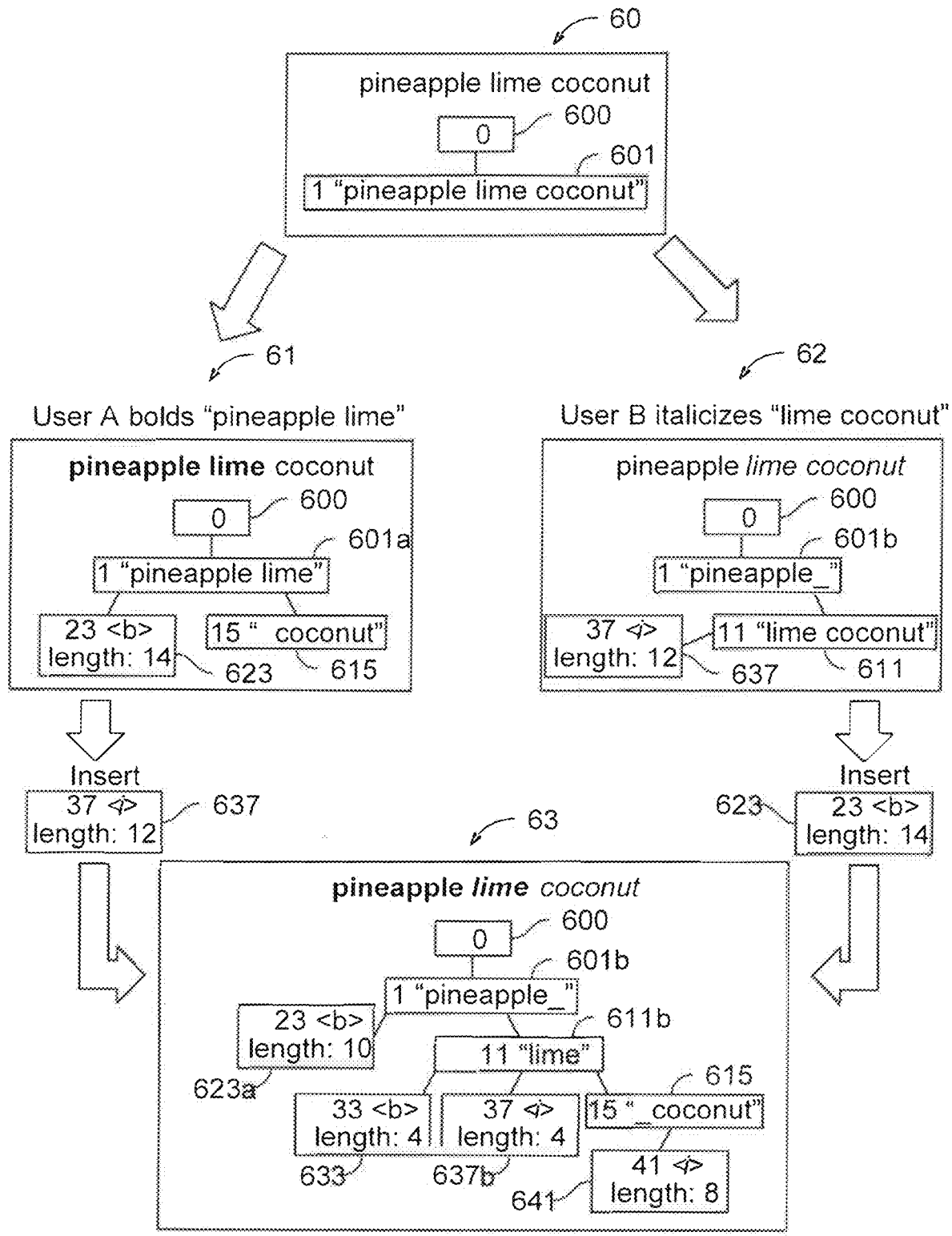
FIG. 6 is a diagram illustrating a compression algorithm for resolving formatting conflicts in a causal tree structure, according to an embodiment.

FIG. 6 is a diagram illustrating a compression algorithm for resolving formatting conflicts in a causal tree structure, according to an embodiment. When multiple users edit the same document, formatting conflicts may occur. Such conflicts may be resolved using a causal tree structure according to an embodiment.

In FIG. 6, a document includes the text "pineapple lime coconut". The document is represented by a causal tree 60, which includes a root node 600 and a chain node 601. The chain node 601 has an ID of "1", a CauseID of "0", and a Value of "pineapple lime coconut". Two users, User A and User B, make changes to the document. User A accesses and edits the document from a first user site and/or client device. User B accesses and edits the document from a second user site and/or client device.

User A bolds "pineapple lime", resulting in causal tree 61 based on User A's edits. The causal tree 61 includes the root node 600 and chain nodes 601*a*, 615, and 623. Chain node 601*a* is a character chain node and has an ID of "1", a CauseID of "0", and a Value of "pineapple lime". Character chain node 601*a* in turn causes chain nodes 615 and 623. Chain node 615 is also a character chain node and has an ID of "15", a CauseID of "1", and a Value of "_coconut" (a space plus the characters in the text "coconut"). As used in FIG. 6, "_" indicates a space. Chain node 623 is a formatting chain node and has an ID of "23", a CauseID of "1", and a Value of "<b>" representing a bold instruction. In the current embodiment, a length field in the chain node 623 indicates that the chain is 14 characters long, i.e., the bold instructions "<b>" in the formatting chain node 623 apply to fourteen characters. The fourteen bold instructions "<b>" in the formatting chain node 623 modify the text "pineapple lime" in character chain node 601*a*. In other embodiments, however, the length field is omitted from the chain node 623. In still other embodiments, the space character " " may be preserved in either of the two character chains.

User B italicizes "lime coconut", resulting in causal tree 62 based on user B's edits. The causal tree 62 includes the root node 600 and chain nodes 601*b*, 611, and 637. Chain node 601*b* is a character chain node has an ID of "1", a CauseID of "0", and a Value of "pineapple_" (the characters in the text "pineapple" plus a space). Character chain node 601*b* in turn causes another character chain node 611. Character chain node 611 has an ID of "11", a CauseID of "1", and a Value of "lime coconut". Character chain node 611 causes formatting chain node 637, which has a ID of "37", a CauseID of "11", and a Value of "<i>" representing an italicize instruction. In the present embodiment, a length field in the formatting chain node 637 indicates that the chain is 12 characters long, i.e., the twelve italicize instructions "<i>" in the formatting chain node 637 apply to twelve characters. The italicize instructions "<i>" in formatting chain node 637 modify the text "lime coconut" in the character chain node 611. In other embodiments, however, the length field is omitted from the chain node 637.

In an embodiment, User A and User B are editing the document simultaneously, or almost simultaneously. When the edits made by User A and User B are transmitted to the server, the edits are incorporated into a single causal tree 63 as shown in FIG. 6. Once the edits are incorporated, User A and User B will be accessing and viewing the same revision of the document, i.e., the revision of the document that includes the text "pineapple lime coconut", in which "pineapple" is bolded, "lime" is bolded and italicized, and "_coconut" (space plus the characters in the text "coconut") is italicized.

In more detail, causal tree 63 includes the root node 600 and several subsequent chain nodes. Immediately following the root node 600 is the character chain node 601*b*, which has an ID of "1", a CauseID of "0", and a Value of "pineapple_" (the characters in the text "pineapple" plus a space). Character chain node 601b in turn causes two chain nodes 611 and 623a. Chain node 623a is a formatting chain node and has an ID of "23", a CauseID of "1", a Value of "<b>", and a length of 10 corresponding to the number of characters in the text "pineapple" in character chain node 601b. Formatting chain node 623a is a bold instruction to modify the text "pineapple_" (the characters in the text "pineapple" plus a space) in chain node 601b. Formatting chain node 623a is a portion of formatting chain node 623 in causal tree 61, which corresponds to the edits made by User A.

Character chain node 611 is also caused by chain node 601b. Character chain node 611b has an ID of "11", a CauseID of "1", and a Value of "lime". In turn, character chain node 611b causes two formatting chain nodes 633 and 637b and another character chain node 615. Formatting chain node 633 has an ID of "33", a CauseID of "11", a value of "<b>", and a length of 4 corresponding to the number of characters in the text "lime". Formatting chain node 633 is a bold instruction to modify the text "lime" in the character chain node 611. Formatting chain node 633 is also a portion of the formatting chain node 623 in causal tree 61. Together, formatting chain nodes 623a and 633 correspond to the edits made by User A.

Character chain node 611b also causes formatting chain node 637b. Formatting chain node 637b has an ID of "37", a CauseID of "11", a Value of "<i>" representing an italicize instruction and a length of 4 corresponding to the number of characters in the text "lime". Formatting chain node 637b is an italicize instruction to modify the text "lime" in the character chain node 611b. Formatting chain node 637b is a portion of the formatting chain node 637, which corresponds to the edits made by User B in the causal tree 62.

Character chain node 615 is caused by character chain node 611b. Character chain node 615 has a ID of "15", a CauseID of "11", and a Value of "_coconut" (a space plus the characters in the text "coconut"). Character chain node 615 causes formatting chain node 641, which has an ID of "41", a CauseID of "15", a Value of "<i>", and a length of 8 corresponding to the number of characters in "coconut". Formatting chain node 641 is an italicize instruction to modify the text "_coconut" (a space plus the characters in the text "coconut") in the character chain 615. Together, formatting chain node 637b and 641 corresponds to the edits made by User B in formatting chain node 637 in the causal tree 62.

Figure 7A:
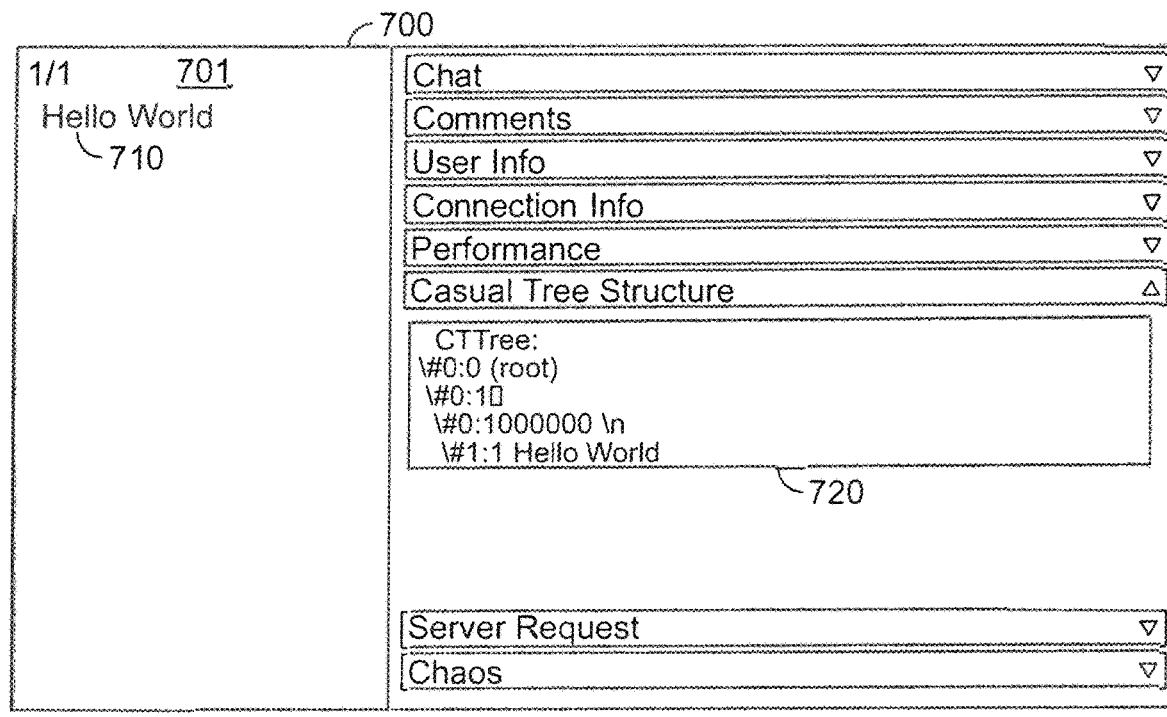
FIG. 7A is a screen shot diagram illustrating a collaborative editing application, according to an embodiment.

FIG. 7A is a screen shot diagram illustrating a collaborative editing application 700, according to an embodiment. The collaborative editing application 700 includes an editor window 701 and a causal tree structure 720. Although the causal tree structure 720 is shown in FIG. 7A, in other embodiments, the causal tree structure 720 may not be shown. Text "Hello World" 710 is shown in the editor window 701. In the corresponding causal tree structure 720, the causal tree structure 720 has a root node and a character chain node. The root node has an ID of "0". The character chain node has an ID of "1" and a Value of "Hello World".

The syntax of the causal tree structure 720 will be explained in more detail. In the causal tree structure 720, a chain node or a branch of the causal tree structure is represented as "#<site ID>:<stamp>[Value]". In FIG. 7A, the root node is represented as "#0:0 (root)." The line "#0:1 0" represents a subtree. The line "#0:1000000 \n" denotes a new line, which is used to begin paragraphs in the document. The line "#1:1 Hello World" represents the character chain node for the text "Hello World". The syntax shown for causal tree structure 720 is arbitrarily chosen and may be different in other embodiments.

In an embodiment, an instruction ID of the chain node includes a combination of the site ID and the stamp. For example, in FIG. 7A, the instruction ID is represented by "#<site ID>:<stamp>". The site ID is assigned to each client device by the server upon connecting to a document stored on the server. This way, every client session has a unique site ID. The stamp is a numeric value counter (e.g., an integer counter) of instructions entered or typed by a user (or instructions generated by the server) that is roughly synchronized across client devices. The next available numeric value of the stamp at each client device is determined based on the changes to the causal tree structure stored at the server, and the server broadcasts such changes to the client devices so that stamp values across client devices are sequential. In an embodiment, each user's edit instruction has a unique stamp value, and only one user's edit instruction can be assigned the next available stamp value in the instruction ID (e.g., next highest ID number for the causal tree). In other embodiments however, instructions from multiple users that are generated simultaneously may be assigned the same stamp value, and such instructions are distinguished from each other by their site IDs. In turn, the instruction ID is generated by client devices by combining the site ID and stamp. The instruction IDs thus generated are unique because even if the stamp portion of one client device collides with another client, the site ID portion of the instruction ID is unique across the client devices.

Although the instruction IDs in the present embodiment is generated at the client devices, in other embodiments, the instruction ID is generated by the server. In still other embodiments, the instruction ID may include a time stamp, which indicates the time at which the instruction is entered by the user.

In an embodiment, the site ID is used to identify the user, such that each user has a unique site ID. In various embodiments, each user is assigned the next available site ID when the user begins an editing session. For example, User A is assigned #1 as a site ID for a first editing session. When User A leaves the first editing session and begins a second editing session during which time User B is already editing the document, User A is assigned #2 as site ID for the second editing session while User B is assigned #1 as the site ID. In other embodiments, however, the site ID is not user session-specific and may be persistent for each user.

In various embodiments, the site ID is useful to resolve conflicts that may arise when edits from different users arrive simultaneously at the server (i.e., serves a tie-breaking function). In an embodiment, User A makes an edit to the document and User B also makes an edit to the document. User A's editing instruction is assigned a first instruction ID, a combination of User A's site ID and the next available stamp value. User B's editing instruction is assigned a second instruction ID, a combination of User B's site ID and the next available stamp value. In one scenario, User A's edit instruction and User B's edit instruction are assigned the same stamp value (due to network latency) and the instructions are received by the server at the same time. To resolve such conflict, the server processes the editing instruction with a lower site ID first. For instance, if User A is assigned site ID #1 and User B is assigned site ID #2, then the server will process User A's editing instructions prior to processing User B's editing instructions. In other embodiments, however, the user editing instruction associated with a higher site ID may take priority.

In other embodiments in which the instruction IDs include time stamps, the time stamp may be used (in place of or in addition to the site ID) to resolve conflicts that may arise when edits from different users arrive simultaneously at the server. As the time stamps are generated at the client devices when the users enters the edit, a user instruction associated with an earlier time stamp may take priority over a user instruction associated with a later time stamp, such that the user instruction associated with the earlier time stamp is processed first.

Figure 7B:
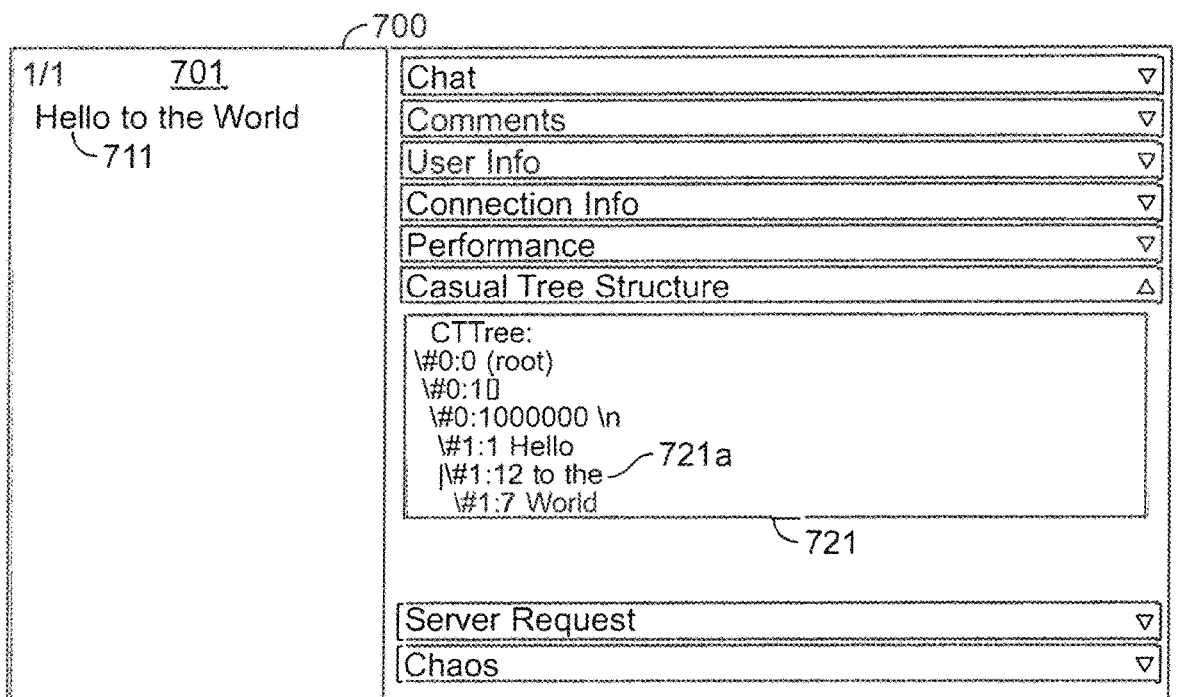
FIG. 7B is a screen shot diagram illustrating the collaborative editing application of FIG. 7A with insertion of text, according to an embodiment.

FIG. 7B is a screen shot diagram illustrating the collaborative editing application 700 of FIG. 7A with insertion of text, according to an embodiment. A user adds "to the" (the characters in the text "to the" plus a space) between "Hello" (the characters in the text "Hello" plus a space) and "World", forming a new phrase "Hello to the World" 711 shown in the editor window 701. The corresponding causal tree 721 is shown in the causal tree structure window. The causal tree 721 has a root node and three character chain nodes. The "Hello" character chain node has an instruction ID of "#1:1" (site ID=1 and stamp=1) and is caused by the root node. The "World" character chain node has an instruction ID of "#1:7" (site ID=1 and stamp=7) and is caused by the "Hello" character chain node. Character chain node 721a corresponds to the added text "to the". Character chain node 721a has an instruction ID of "#1:12" (site ID=1 and stamp=12) and is also caused by the "Hello" chain node. In other words, the "Hello" character chain node is the parent chain node of both the "World" character chain node and the new character chain node 721a.

Figure 7C:
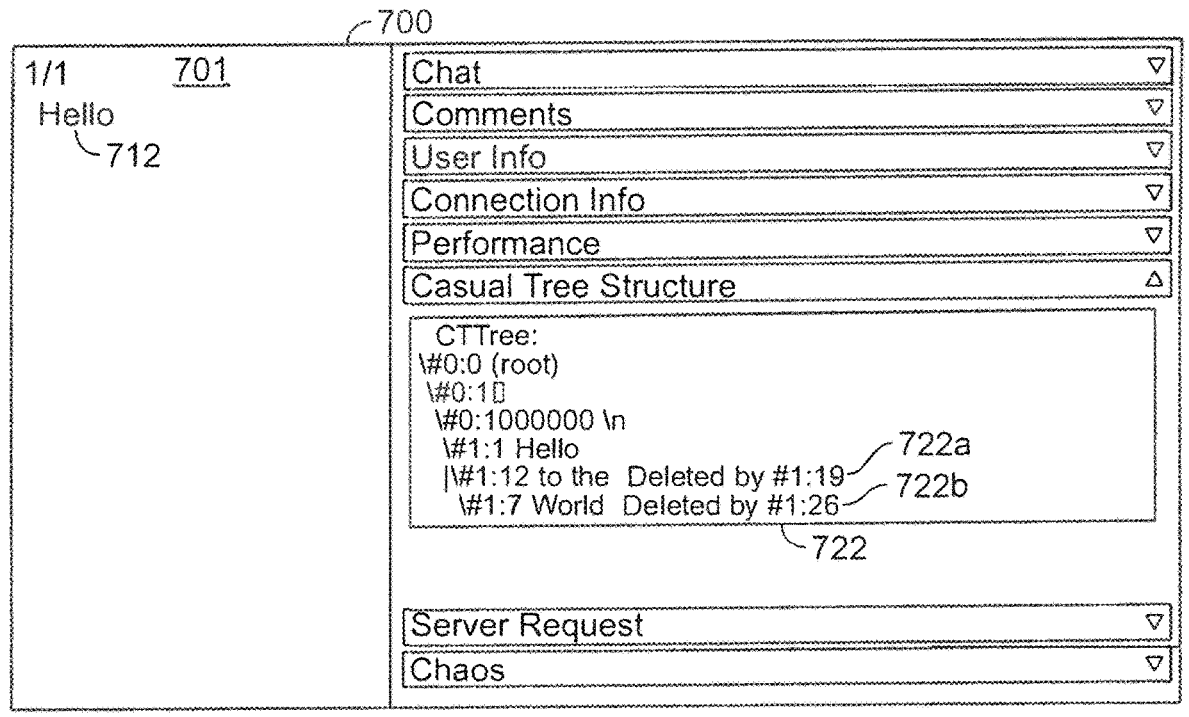
FIG. 7C is a screen shot diagram illustrating the collaborative editing application of FIG. 7B with deletion of text, according to an embodiment.

FIG. 7C is a screen shot diagram illustrating the collaborative editing application 700 of FIG. 7B with deletion of text, according to an embodiment. The user now deletes "to the World" (a space plus the characters in the text "to the World") from the phrase "Hello to the World". The resultant text "Hello" 712 is shown in the editor window 701. In the corresponding causal tree structure 722, two deletion chain nodes 722a and 722b are added. The deletion chain node 722a follows and is caused by character chain node 721a and has an instruction ID of "#1:19" (site ID=1 and stamp=19). The deletion chain node 722b follow and is caused by the "World" character chain node. The deletion chain node 722b has an instruction ID of "#1:26" (site ID=1 and stamp=26). In an embodiment, a length field for the deletion chain nodes 722a and 722b is not shown because it is assumed that the deletion chain node has the same length of its parent node. In other embodiment, a length field may be added to the syntax for the causal tree structure 722 to denote the length of the deletion chain nodes 722a and 722b.

Figure 8A:
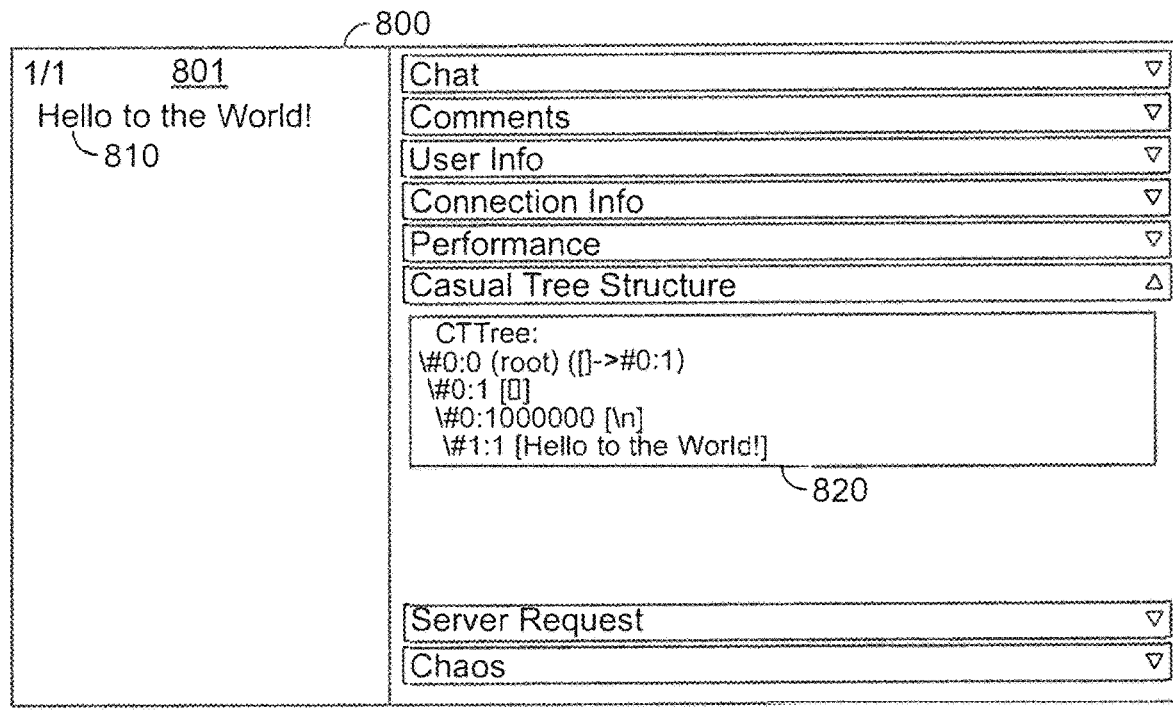
FIG. 8A is a screen shot diagram illustrating a collaborative editing application, according to an embodiment.

FIG. 8A is a screen shot diagram illustrating a collaborative editing application 800, according to an embodiment. The collaborative editing application 800 includes an editor window 801 and a causal tree structure 820. Although the causal tree structure 820 is shown in FIG. 8A, in other embodiments, the causal tree structure 820 may not be shown. Text "Hello to the World!" 810 is shown in the editor window 801. In the corresponding causal tree structure 820, the causal tree has a root node and a character chain node. The character chain node has an instruction ID of "#1:1" (site ID=1 and stamp=1) and a Value of "Hello to the World!" as shown in brackets ([ ]).

Figure 8B:
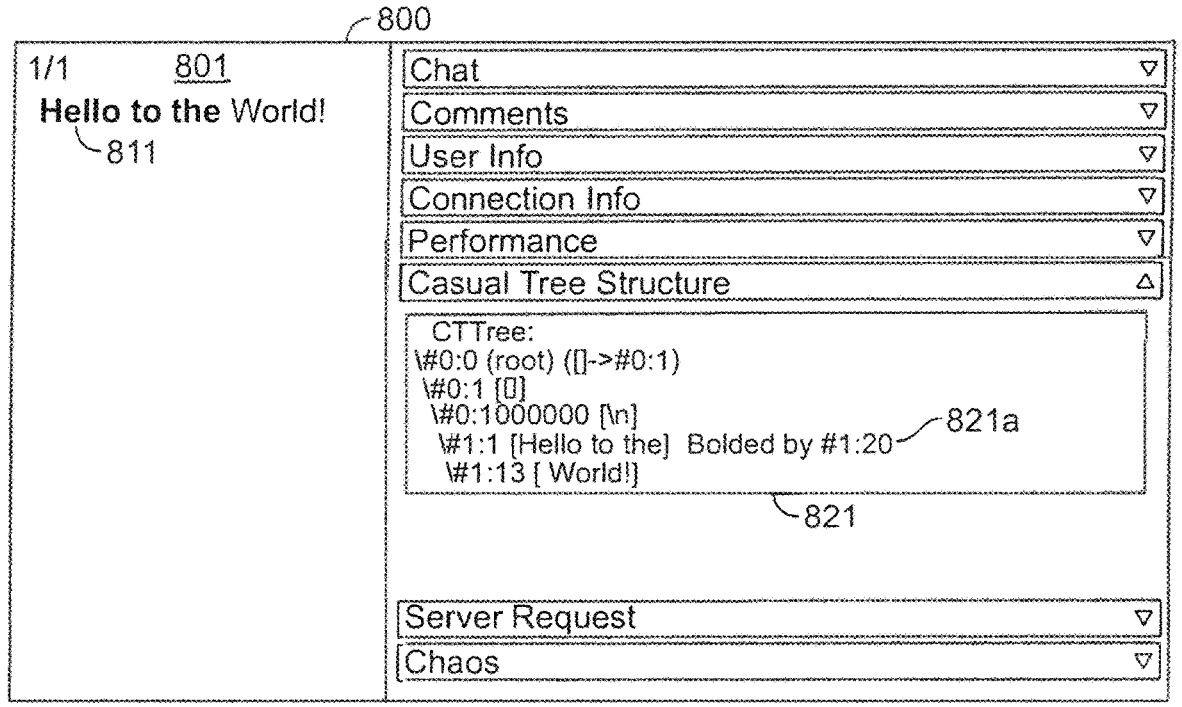
FIG. 8B is a screen shot diagram illustrating the collaborative editing application of FIG. 8A with formatting change, according to an embodiment.

FIG. 8B is a screen shot diagram illustrating the collaborative editing application 800 of FIG. 8A with formatting change, according to an embodiment. A user bolds "Hello to the" in "Hello to the World!" via a bold instruction, as shown in the editor window 801. The corresponding causal tree structure 821 is shown in the causal tree structure window.

The causal tree structure 821 has a root node and three character chain nodes. The "Hello to the" character chain node has an instruction ID of "#1:1" (site ID=1 and stamp=1) and is caused by the root node. The "World!" (a space plus the characters in the text "World!") character chain node has an instruction ID of "#1:13" (site ID=1 and stamp=13) and is caused by the "Hello to the" character chain node. Formatting chain node 821a is caused by the "Hello to the" character chain node. Formatting chain node 821a has an instruction ID of "#1:20" (site ID=1 and stamp=20). The formatting chain node 821a is a bold instruction to modify the "Hello to the" character chain node. In an embodiment, a length field for the formatting chain node 821a is not shown because it is assumed that the formatting chain node has the same length of its parent node. In other embodiment, a length field may be added to the syntax for the causal tree structure 821 to denote the length of the formatting chain node 821a.

Figure 8C:
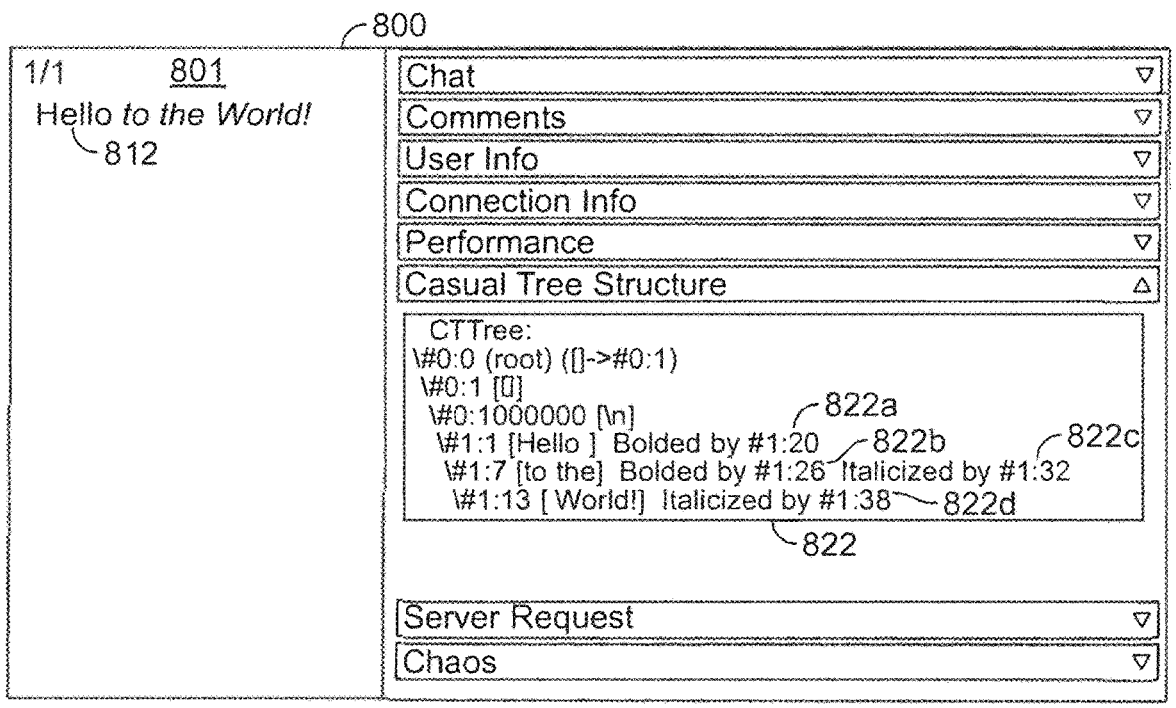
FIG. 8C is a screen shot diagram illustrating the collaborative editing application of FIG. 8B with another formatting change, according to an embodiment.

FIG. 8C is a screen shot diagram illustrating the collaborative editing application 800 of FIG. 8B with another formatting change, according to an embodiment. The user now italicizes "to the World!" in the phrase "Hello to the World!" via an italicize instruction, as shown in the editor window 801. The corresponding causal tree structure 822 illustrates the formatting change. The causal tree structure 822 includes a root node. Following the root node is the "Hello" (the text "Hello" plus a space) character chain node, which has an instruction ID of "#1:1" (site ID=1 and stamp=1). As shown in the editor window 801, "Hello" is bolded, and the bold instruction corresponds to formatting node chain 822a. Formatting node chain 822a is caused by the "Hello" character chain node and has an instruction ID of "#1:20" (site ID=1 and stamp=20).

Character chain node "to the" is also caused by the "Hello" character chain node. The character chain node "to the" has an instruction ID of "#1:7" (site ID=1 and stamp=7). Two formatting chain nodes follow "to the" character chain node. Formatting chain node 822b has an instruction ID of "#1:26" (site ID=1 and stamp=26) and is a bold instruction, which indicates that "to the" has been bolded. Formatting chain node 822c has an instruction ID of "#1:32" (site ID=1 and stamp=32) and is an italicize instruction, which indicates that "to the" has been italicized. Both formatting chain nodes 822b and 822c are caused by the character chain node "to the".

Character chain node "World!" (a space plus the text "World!") is caused by character chain node "to the". The character chain node "World!" has an instruction ID of "#1:13" (site ID=1 and stamp=13). A formatting chain node 822d follows the character chain node "World!". Formatting chain node 822d has an instruction ID of "#1:38" (site ID=1 and stamp=13) and is an italicize instruction, which indicates that "World!" has been italicized. Formatting chain node 822d is caused by the character chain node "World!".

Although the instruction IDs in the embodiments of FIGS. 7A-7C and 8A-8C are a combination of site IDs and stamps, in other embodiments, the instruction IDs may be represented by only a sequence of integers without the site IDs, i.e., the stamps are the instruction IDs.

In various embodiments, a causal tree is restructured into smaller, even-sized branches. If a tree is unbalanced, then the restructured or rebalanced tree contains more branches than the original tree in an embodiment. Depending on the editing instructions, the restructured or rebalanced tree may contain less branches than the original tree. The branches make it easier for the system to support the client-server architecture where the server has the whole document, and the client device only needs the part actively used by the client device. This way, rather than transmitting the entire tree to a client device, only the branches that are needed by a user are sent to that user's client device. Furthermore, transmitting just the necessary branches, which are smaller than the entire tree structure, reduces transmission time when sent from the server to the client device, reduces processing time on the client device, and decreases the horsepower requirements of the client device. This is particularly useful when the client device is a mobile phone, tablet, or other handheld device that may have lower computational power.

Figures 9, 10A:
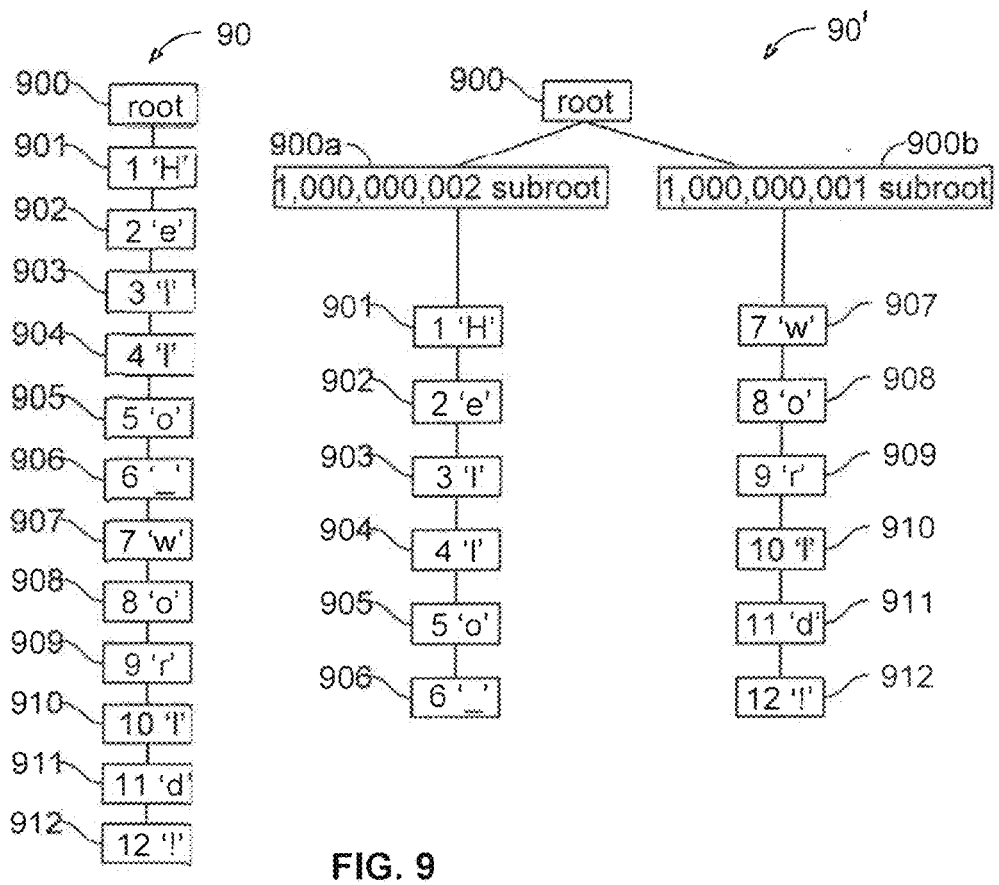
FIG. 9 is a diagram illustrating a rebalancing algorithm for generating a causal tree having even-sized branches, according to an embodiment.
FIG. 10A is a screen shot diagram illustrating a spreadsheet application, according to an embodiment.

FIG. 9 is a diagram illustrating a rebalancing algorithm for generating a causal tree having even-sized branches, according to an embodiment. A causal tree has even-sized branches when there are approximately equal number of nodes in each branch. Compression of a causal tree may be performed in real time, i.e., while the users are editing a document. Rebalancing of a causal tree may be performed offline, i.e., after all users have finished editing a document and all editing instructions are received by the server. Rebalancing may also be performed in real time if the causal tree becomes too off-balanced (i.e., the difference in the number of nodes between two branches become too large). In that case, the server temporarily suspends the users' editing sessions to rebalance the causal tree.

Referring to FIG. 9, a document contains the text "Hello World!". A causal tree 90 corresponding to the text is generated and includes a root node 900 and character nodes 901 to 912. Each character in the character nodes 901 to 912 is assigned an ID. For example, character node 901 is assigned an ID of "1" and has a Value of "H". Character node 906 is assigned an ID of "6" and has a Value of "_" corresponding to a space. Character node 907 is assigned a ID of "7" and has a Value of "w". Character node 912 is assigned a ID of "12" and has a Value of "!".

When a rebalancing algorithm is applied to the causal tree 90, a rebalanced tree 90' is generated. The rebalanced tree 90' includes the root node 900. Two subroot nodes 900a and 900b are generated. Subroot node 900a has an ID of "1,000,000,002" and subroot node 900b has an ID of "1,000,000,001". Subroot nodes 900a and 900b are invisible nodes, i.e., they are not visible to the user when the document is composed. Character nodes 901 to 906 follow subroot node 900a, and character node 901 is caused by subroot node 900a. Instead of following character node 906, character nodes 907 to 912 now form a second branch in the rebalanced tree 90'. Character node 907 is now caused by subroot node 900b and its CauseID is changed from 6 to 1,000,000,001. Although the CauseID of character node 907 is modified, the ID of character node 907 remains the unchanged. As shown in FIG. 9, rebalanced tree 90' thus has two chains formed by character nodes 901 to 906 and character nodes 907 to 912, with each chain having six characters.

The rebalancing algorithm generates the invisible subroot nodes to allow redistribution of nodes in the causal tree. The invisible subroot nodes also preserve the proper traversal order of the nodes in the causal tree. For example, in rebalanced tree 90', because the ID of subroot node 900a is greater than the ID of subroot node 900b, the branch beginning with subroot node 900a (character nodes 901 to 906) is traversed before the branch beginning with subroot node 900b (character nodes 907 to 912). In other embodiments, however, the ID of subroot node 900a may be less than the ID of subroot node 900b, and the branch beginning with subroot node 900a is traversed before the branch beginning with subroot 900b.

In still other embodiments, subroot nodes are not generated. Instead, an additional identifier is added to the first node in each branch of the rebalanced tree to indicate the order in which the branches of the rebalanced causal tree should be traversed.

This example, though trivial in size, illustrates what happens with a much larger document. Many business documents number in the hundreds of pages; some, in the thousands of pages. Due to limited display space on computer devices a user may only need to display no more than 4 pages at a time. Rather than transmitting the entire causal tree representing the thousands of pages and having a client device, especially a mobile device with limited computational power, work through pagination, the server can perform pagination, rebalancing the causal tree into branches appropriately limited in size to what can be displayed on the client device. The server then sends only the branch that represents the content to be displayed on the client device.

In various embodiments, only the ID (shown as the instruction ID in the causal tree structures in FIGS. 7A-7C and 8A-8C) of a chain node is persistent. The persistent nature of the ID allows the server to track all changes made in the document. A comparison of the document (e.g., redline or blackline) at any point in time may be generated by traversing the nodes of the causal tree structure.

Other example instructions that are suitable for a causal tree structure include the copy and paste instruction and the cut and paste instruction. Regarding the copy and paste instruction, the branches and/or nodes that are associated with the copied content are duplicated into new branches and/or nodes. The new branches and/or nodes have a different CauseID than the original branches and/or nodes, depending on where the copied content is pasted. Regarding the cut and paste instruction, prior to creating the duplicate branches and/or nodes, delete instruction nodes are added to follow the original branches and/or nodes.

A causal tree may be used to represent content other than a conventional computer document. In an embodiment a causal tree may be created for every cell in a spreadsheet to provide the benefits of tracking changes to a cell's value over time, provide for visual formatting on individual characters in that cell, control over access to the value, or other cell and character-specific capabilities as represented in the causal tree of that cell. In one embodiment it could be used to track changes to a formula that generates a cell's value.

In another embodiment, a causal tree is created fora spreadsheet with each cell being a branch of that spreadsheet. For example, FIG. 10A is a screen shot diagram illustrating a spreadsheet application, according to an embodiment. FIG. 10A shows a spreadsheet 1050 with cells A9, A10, A11, A12, and A13 having values. A causal tree structure is generated for the spreadsheet 1050, and each cell A9, A10, A11, A12, and A13 is a branch caused by a root node of the spreadsheet causal tree structure.

Figures 10B, 10C:
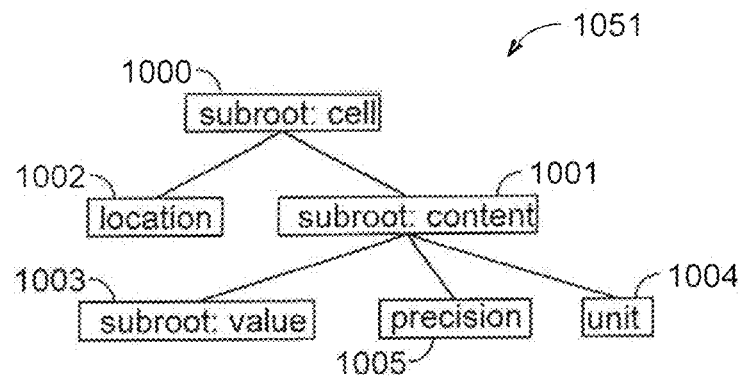
FIG. 10B is a diagram illustrating a general causal tree structure of a cell in the spreadsheet application of FIG. 10A, according to an embodiment.
FIG. 10C is a screen shot diagram illustrating a formula in the spreadsheet application of FIG. 10A, according to an embodiment.

FIG. 10B is a diagram illustrating a general causal tree structure 1051 of a cell in the spreadsheet application of FIG. 10A, according to an embodiment. The causal tree structure 1051 includes a subroot node 1000 ("subroot: cell"), which serves as the root node of the cell. The cell subroot node 1000 in turn causes two branches. The first branch includes a location node 1002, which indicates the location of a cell in the spreadsheet (e.g., cell "A9"). The second branch includes a content subroot 1001 ("subroot: content"). In this embodiment, the content subroot 1001 causes three branches, value subroot node 1003 ("subroot: value"), precision node 1005, and unit node 1004. The value subroot node 1003 indicates the value of the cell (e.g., "$10.00" for cell "A9"). In this embodiment, the precision node 1005 and unit node 1004 are metadata associated with the data in the cell. For example, for cell "A9," the unit node 1004 would have a value of 10^−2, indicating that the precision of the value is to the hundredth, and the precision node 1005 would have a value of "USD", indicating that the unit for the cell is US dollars. In other embodiments, the content subroot 1001 may cause nodes with metadata other than or in addition to precision node 1005 and unit node 1004. Such metadata may include, for example, date of measurement, and other metadata that may be associated with the data or cell.

FIG. 10C is a screen shot diagram illustrating a formula in the spreadsheet application of FIG. 10A, according to an embodiment. As shown in FIG. 100, the selected cell A13 contains a formula "=SUM(A8:A12)". The formula contained in cell A13 corresponds to a causal tree branch, such as that shown in FIG. 10D, according to an embodiment.

Figures 10D, 11A:
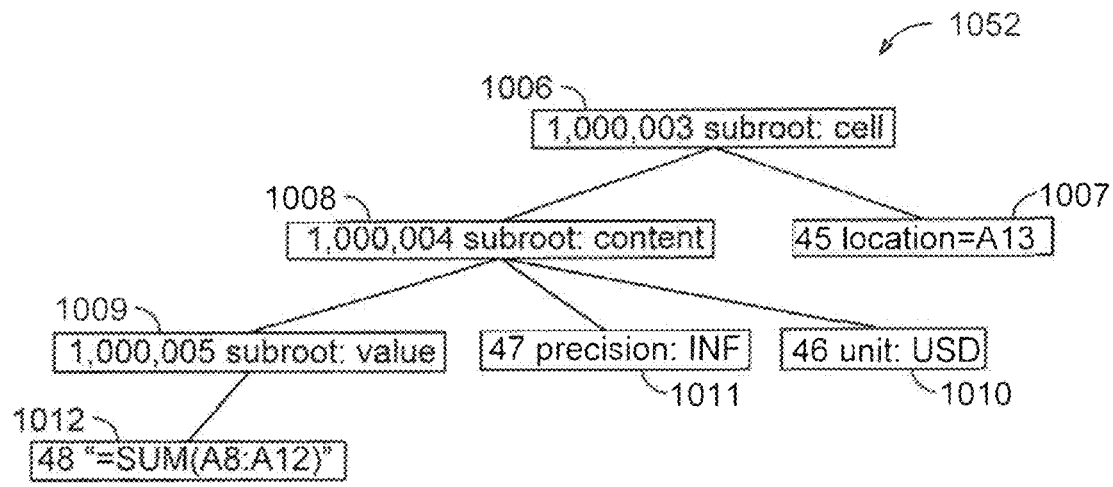
FIG. 10D is a diagram illustrating a causal tree structure of the formula of FIG. 100, according to an embodiment.
FIG. 11A is a screen shot diagram illustrating a spreadsheet application, according to another embodiment.

Referring to FIG. 10D, the causal tree branch 1052 for cell A13 includes a cell subroot node 1006 ("subroot: cell"), which may be an invisible node in some embodiments. The cell subroot node 1006 has an ID of "1,000,003". Following the subroot node 1006 are content subroot node 1008 ("subroot: content") and location node 1007. The content subroot node 1008 has an ID of "1,000,004", and may be an invisible node in some embodiments. Location node 1007 has an ID of "45" and indicates that the location of the cell is "A13". The content subroot node 1008 causes three branches: value subroot node 1009 ("subroot: value"), precision node 1011, and unit node 1010. The unit node 1010 has an ID of "46" and indicates that the unit of the cell is "USD" or US dollars. The precision node 1011 has an ID of "47" and indicates that the precision of the data in the cell is infinite ("INF"). The value subroot node 1009 has an ID of "1,000,005", and may be an invisible node in some embodiments. The value subroot node 1009 in turn causes node 1012, which indicates the instruction in the cell. The node 1012 has an ID of "48" and indicates that the formula "=SUM(A8:A12)" is the instruction in the cell. In an embodiment, the formula in a spreadsheet cell is an instruction that is understood by the spreadsheet application, which interprets and processes the instruction. For instance, when node 1012 is reached, the spreadsheet application understands that the formula "=SUM(A8:A12)" calls for the summation of the values in cells A8 through A12, and processes the formula to obtain the sum.

FIG. 11A is a screen shot diagram 1150 illustrating a spreadsheet application, according to an embodiment. The screen shot diagram 1150 has a different cell A12 than the screen shot diagram 1050 shown in FIG. 10A. In FIG. 11A, the unit associated with cell A12 is "€", not "$" as shown in FIG. 10A.

Figure 11B:
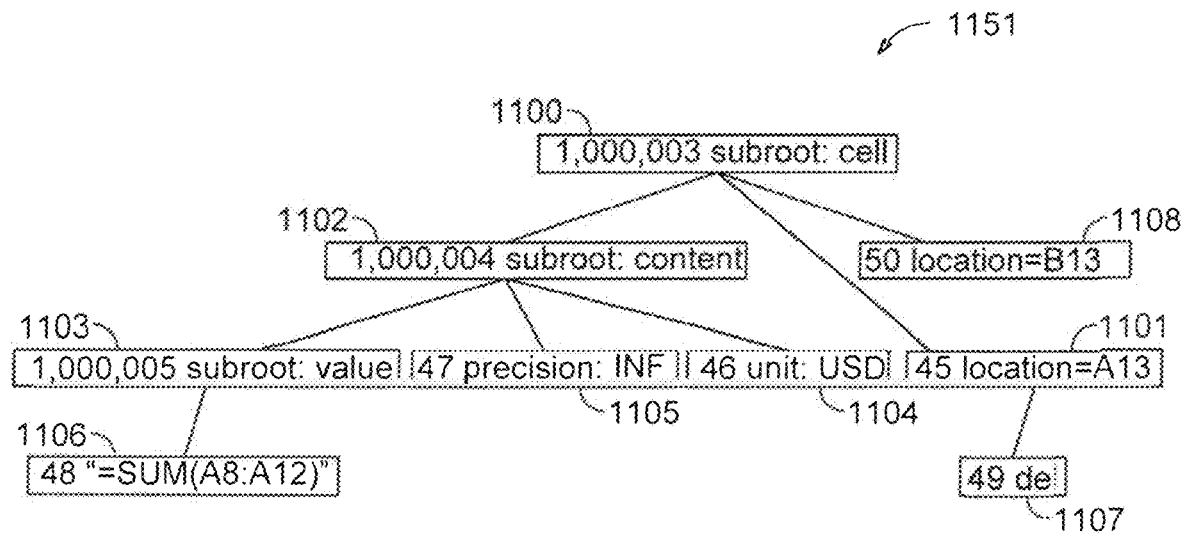
FIG. 11B is a diagram illustrating a causal tree structure when the formula of FIG. 11A is moved to another cell, according to an embodiment.

FIG. 11B is a diagram illustrating a causal tree structure 1151 when the formula of FIG. 11A is moved to another cell, according to an embodiment. The causal tree structure 1151 begins with a cell subroot 1100 having an ID of "1,000,003." The cell subroot 1100 may be an invisible node in some embodiments. Following the subroot node 1100 are content subroot node 1102 ("subroot: content") and location node 1108. The content subroot node 1102 has an ID of "1,000, 004", and may be an invisible node in some embodiments. Location node 1101 has an ID of "45" and indicates that the location of the cell is "A13". The content subroot node 1102 in turn causes three branches: value subroot node 1103 ("subroot: value"), precision node 1105, and unit node 1104. The unit node 1104 has an ID of "46" and indicates that the unit of the cell is "USD" or US dollars. The precision node 1105 has an ID of "47" and indicates that the precision of the data in the cell is infinite ("INF"). The value subroot node 1103 has an ID of "1,000,005", and may be an invisible node in some embodiments. The value subroot node 1103 in turn causes node 1106, which indicates the instruction in the cell. The node 1106 has an ID of "48" and indicates that the formula "=SUM(A8:A12)" is the instruction in the cell.

In the present embodiment, the formula "=SUM(A8: A12)" is moved from cell A13 to B13. With this edit, a delete instruction "del" is added after the location node 1101 as node 1107. Node 1107 has an ID of "49", which is the next available ID in the causal tree structure. Another location node 1108 is added. The location node 1108 is caused by the cell subroot node 1100 and has an ID of "50." The location node 1108 indicates that the location of the formula is now in cell "B13".

Figure 11C:
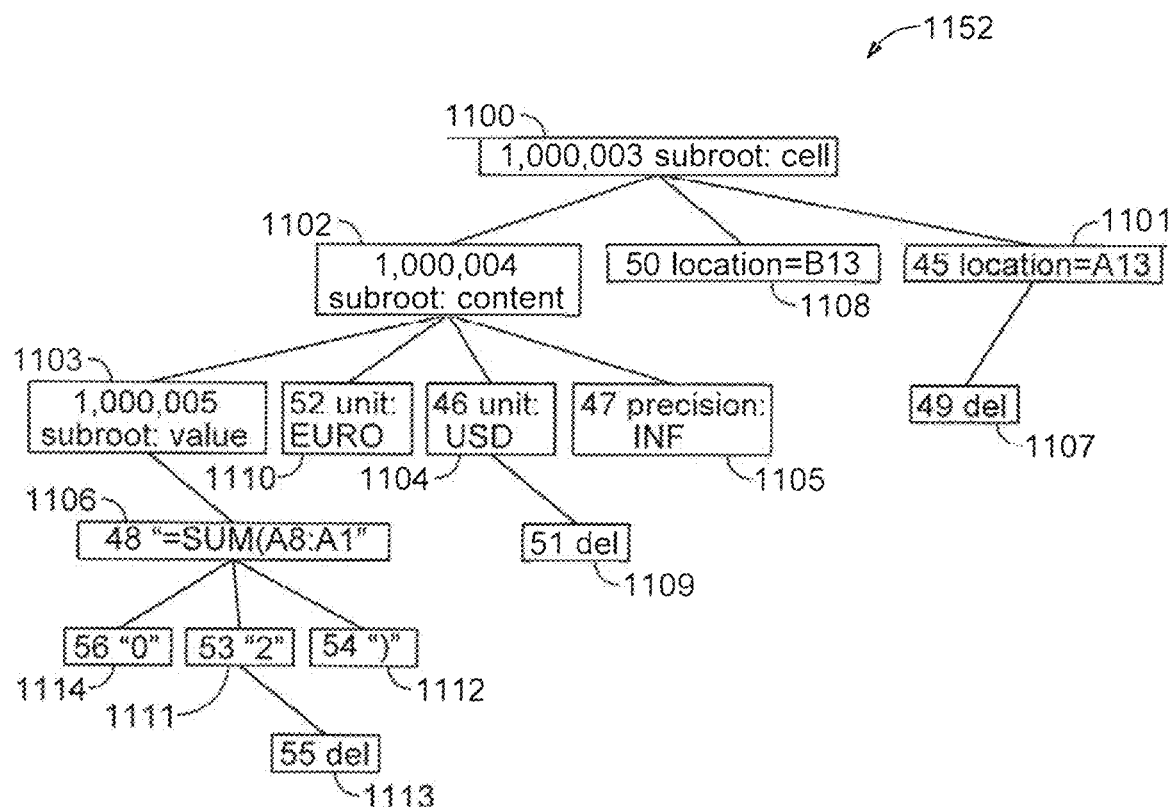
FIG. 11C is a diagram illustrating a causal tree structure when the formula of FIG. 11A is moved to another cell and edited, according to an embodiment.

FIG. 11C is a diagram illustrating a causal tree structure 1152 when the formula of FIG. 11A is moved to another cell and then edited, according to an embodiment. The causal tree structure 1152 is based on the causal tree structure 1151 of FIG. 11A, and the descriptions of like-numbered elements are omitted for brevity.

In FIG. 11C, the formula "=SUM(A8:A12)" is edited to "=SUM(A8:A10)" having a unit of "Euro" instead of "USD", after the formula is moved from cell A13 to cell B13. First, the unit of the formula is revised. Following the unit node 1104, a delete instruction node 1109 is added. The delete instruction node 1109 has an ID of "51" and a value of "del" indicating the delete instruction. Together, unit node 1104 and deletion node 1109 indicate that the unit "USD" is no longer the unit of the formula. When the unit of the formula is changed to "Euro," new unit node 1110 is created. New unit node 1110 has an ID of "52" and a value of "EURO" indicating that the new unit associated with the formula is "Euro."

The edits with respect to the text of the formula is reflected in the casual tree branch beginning with the node 1106. The node 1106 has an ID of "48" and indicates that the unedited portion of the formula is "=SUM(A8:A1". The node 1106 causes nodes 1111, 1112, and 1114. Node 1111 has an ID of "53", indicates that it follows node 1106, and a value of "2". A delete instruction node 1113 is generated following node 1111 because "2" is deleted from the formula. The delete instruction node 1113 has an ID of "55," indicates that it follows node 1111 and a value of "del" indicating the delete instruction. Node 1112 follows the node 1106 and has an ID of 54 and a value of ")". The "0" added to the formula is indicated in node 1114, which follows the node 1106. Node 1114 has an ID of "56" and a value of "0".

As noted earlier, the value or instruction of a node is not restricted by the causal tree, but rather only by the syntax understood by an application that processes and interprets the value or instruction. For example, the i18n character set can be represented without an impact on the causal tree; the application that interprets it does need to know how to interpret the values.

Figure 12:
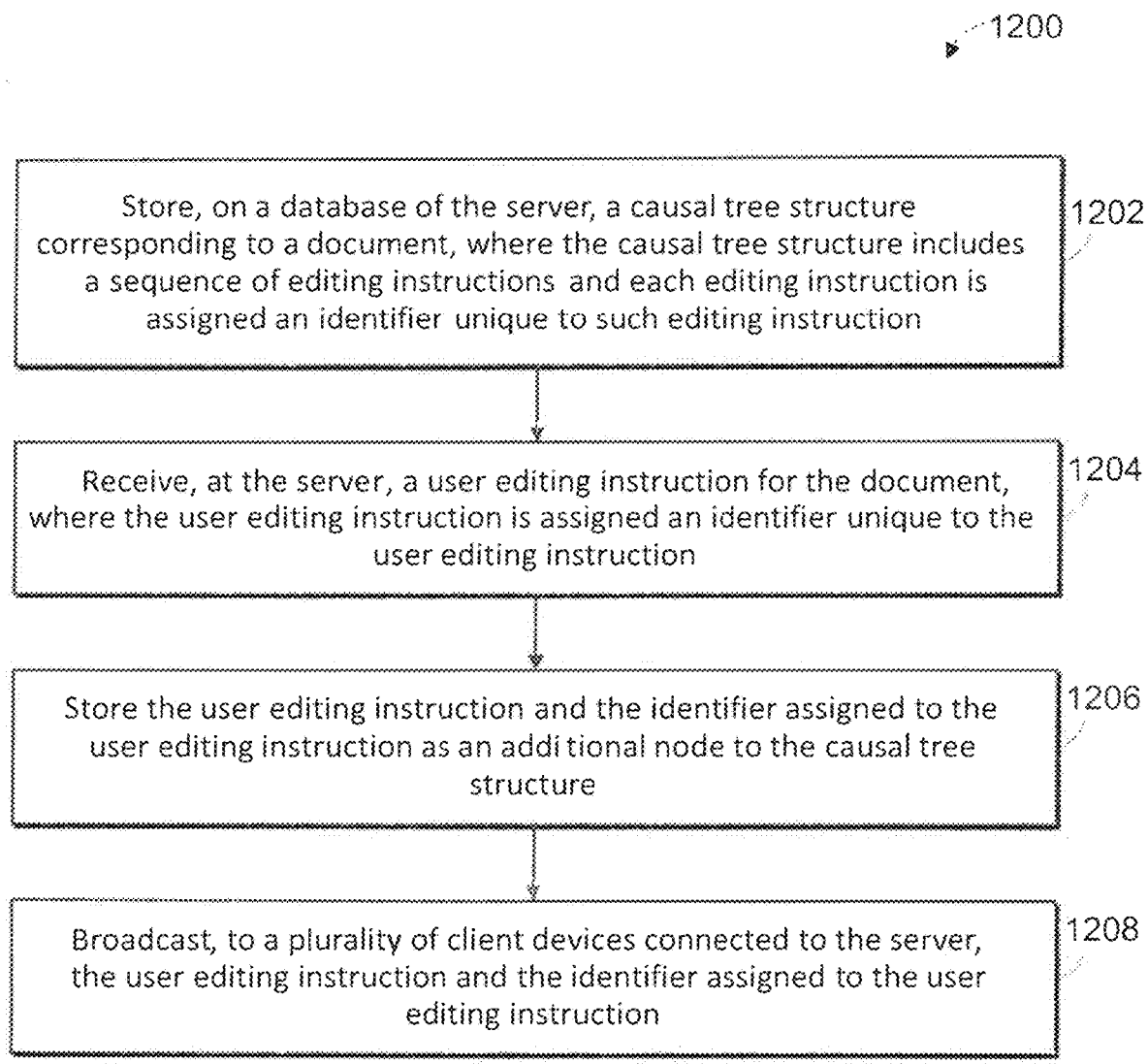
FIG. 12 is a flowchart illustrating an example method, implemented on a server, for editing a document, according to an embodiment.

FIG. 12 is a flowchart illustrating an example method 1200, implemented on a server, for editing a document, according to an embodiment. In some embodiments, the method 1200 is implemented by the productivity server 100 of FIG. 1A, which interacts with the database server 106 and the computing devices 104a, 104b, and 104c. FIG. 12 is described with reference to FIGS. 1A and 1B for explanatory purposes. In other embodiments, however, the method 1200 is implemented by another suitable computing device.

At 1202, the productivity server 100 stores, on a database of the productivity server 100 or on the database server 106, a causal tree structure (e.g., a data structure) corresponding to a document. The document may be stored on the database of the productivity server 100 or the database server 106. The causal tree structure includes a sequence of editing instructions, and each editing instruction is assigned an identifier unique to such editing instruction. In an embodiment, the identifiers of the editing instructions in the causal tree structure are assigned by client devices when these edit instructions are received by the client devices (e.g., when the editing instructions are entered by a user). In other embodiments, for example when an editing instruction is too large for a client device to process, upon receiving the editing instruction, the server assigns the editing instruction an identifier and processes and applies the editing instruction to the causal tree structure maintained by the server. In still other embodiments, the causal tree structure contains server-generated instructions (e.g., creation of a document, re-balance of the causal tree structure, or externally updated link content), and these server-generated instructions are assigned identifiers by the server.

At 1204, the productivity server 100 receives, via its network interface 162, a user editing instruction for the document, where the user editing instruction is assigned an identifier unique to the user editing instruction. In an embodiment, the identifier unique to the user editing instruction is assigned by the client device after receiving the user editing instruction. Then at 1206, the productivity server 100 stores, via its processor 152, the user editing instruction and the identifier assigned to the user editing instruction as an additional node to the causal tree structure. At 1208, the productivity server 100 broadcasts, to a plurality of client devices (e.g., client devices 104a, 104b, and 104c) connected to the productivity server 100, the user editing instruction and the identifier assigned to the user editing instruction.

In an embodiment, the identifier assigned to the user editing instruction may include a site identifier and a stamp. The site identifier is unique to an editing session of the user at a client device. The stamp is a numeric value (e.g., an integer value) based on identifiers assigned to editing instructions in the causal tree structure. In an embodiment, the stamp represents temporal relativeness to all other identifiers in the same causal tree structure, which allows the determination of the history of edits to the document. In some embodiments, the number of editing instructions in the causal tree may be reduced but the identifiers will continue to increment.

In still another embodiment, the identifier assigned to the user editing instruction may further include a cause identifier, where the cause identifier is an identifier of a prior editing instruction in a node in the causal tree structure that precedes the additional node.

In yet another embodiment, the document may be composed by traversing identifiers of the editing instructions in a sequential order (e.g., in an ascending or descending order).

In still other embodiments, the user editing instruction may include an instruction to modify a series of consecutive data in the document. The series of consecutive data, for example, may be a string of characters that is inserted or deleted by the user.

In an embodiment, each editing instruction in the causal tree structure may include at least one instruction selected from the group consisting of a modification of a value, a modification of metadata, a link to another node of the causal tree structure, a link to a node in another causal tree structure corresponding to another document, a link to the other causal tree, and a link to data residing outside the causal tree structure.

In another embodiment, the causal tree structure may include an editing instruction that is assigned a cause identifier. The causal tree structure may further include a second editing instruction that is assigned the same cause identifier as the editing instruction. The editing instruction and the second editing instruction may form separate branches of the causal tree structure.

Figure 13:
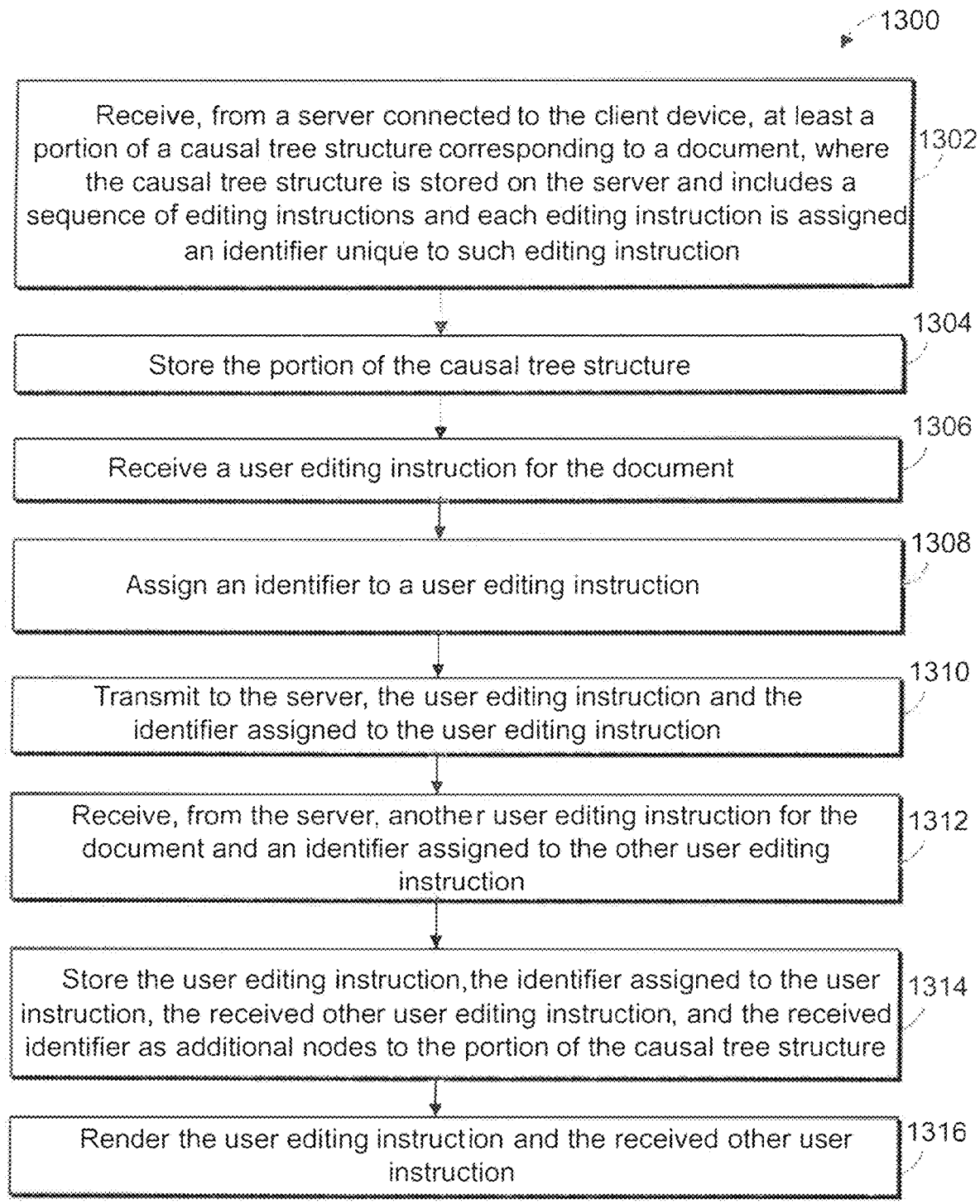
FIG. 13 is a flowchart illustrating an example method, implemented on a client device, for editing a document, according to an embodiment.

FIG. 13 is a flowchart illustrating an example method 1300, implemented on a client device, for editing a document, according to an embodiment. In some embodiments, the method 1300 is implemented by any of the client devices 104a, 104b, and 104c connected to the productivity server 100 and the database server 106. FIG. 13 is described with reference to FIGS. 1A and 1B for explanatory purposes. In other embodiments, however, the method 1300 is implemented by another suitable computing device.

At 1302, the client device 104a receives, from the productivity server 100 or the database server 106, at least a portion of a causal tree structure corresponding to a document. The client device 104a may receive the portion of a causal tree structure in response to a user request to access, view, and/or edit the corresponding portion of the document. The causal tree structure is stored on the database server 106 (or a database of the productivity server 100) and includes a sequence of editing instructions. Each editing instruction is assigned an identifier unique to such editing instruction.

At 1304, the client device 104a stores the received portion of the causal tree structure in its memory. At 1306, the client device 104a receives a user editing instruction for the document input by a user. At 1308, the client device 104a assigns, using its processor 152, an identifier to the user editing instruction.

At 1310, the client device 104a transmits, to the productivity server 100, the user editing instruction and the identifier assigned to the user editing instruction. At 1312, the client device 104a receives, from the productivity server 100, another user editing instruction for the document and an identifier assigned to the other user editing instruction. In an embodiment, the other user editing instruction is an instruction transmitted to the productivity server 100 by another client device (e.g., client device 104b) from another user who is collaboratively editing the same document.

At 1314, the client device 104a stores the user editing instruction and the identifier assigned to the user instruction, and the received other user editing instruction and the received identifier as additional nodes to the portion of the causal tree structure stored on the client device 104a. At 1316, the client device 104a processes and renders the user editing instruction and the received other user instruction, e.g., display edits to the document made by the user of client device 104a and the user of client device 104b.

In an embodiment, the client device 104a assigns the identifier to the user editing instruction by assigning a site identifier and a stamp. The site identifier is unique to the user's editing session on the client device 104a. The stamp is a numeric value (e.g., an integer value) based on identifiers assigned to editing instructions in the causal tree structure stored on the server.

In various embodiments, the client device 104a maintains a "maxStamp" numeric counter. When the client device 104a needs to generate or assign an identifier to a user editing instruction, the client device 104a increments maxStamp and sets the stamp of the identifier to the new maxStamp value. When the client device 104a receives editing instructions from the network or the productivity server 100, the client device 104*a* sets the maxStamp to the largest-seen stamp for the incoming editing instruction. This process ensures that when the client device 104*a* generates an identifier, that identifier's stamp will be larger than any stamp the client device 104*a* has yet seen.

In still other embodiments, the client device 104*a* further assigns a cause identifier as a part of the identifier of the user editing instruction. The cause identifier is an identifier of a prior editing instruction in the causal tree structure that precedes the additional node in which the user editing instruction resides.

In an embodiment, the client device 104*a* composes (e.g., processes and renders) the document by traversing identifiers of the editing instructions in the portion of the causal tree structure in a sequential order.

In various embodiments, the user editing instruction may include an instruction to modify a series of consecutive data in the document.

In an embodiment, the user editing instruction of the client device 104*a* and the other user editing instruction of the client device 104*b* may share a cause identifier, where the cause identifier is an identifier of a prior editing instruction in the causal tree structure that precedes both the user editing instruction and the other user editing instruction.

In still another embodiment, the client device 104*a* receives a next user editing instruction, and assigns an identifier to the next user editing instruction based on the identifier assigned to the user instruction and the identifier assigned to the other user instruction.

Figure 14:
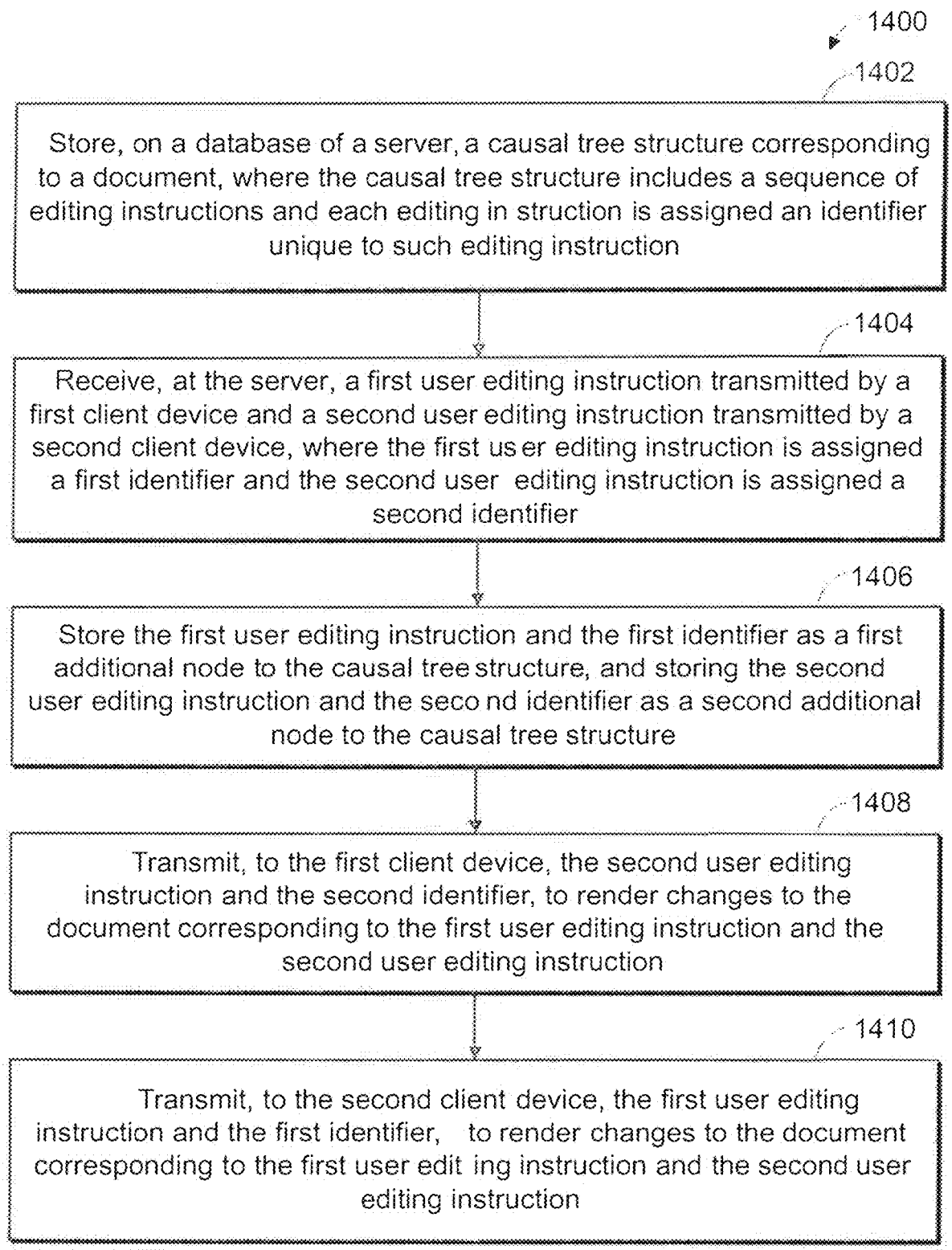
FIG. 14 is a flowchart illustrating another example method, implemented on a server, for editing a document, according to an embodiment.

FIG. 14 is a flowchart illustrating another example method, implemented on a server, for editing a document, according to an embodiment. In some embodiments, the method 1400 is implemented by the productivity server 100 of FIG. 1A, which interacts with the database server 106 and the client devices 104*a*, 104*b*, and 104*c*. FIG. 14 is described with reference to FIGS. 1A and 1B for explanatory purposes. In other embodiments, however, the method 1400 is implemented by another suitable computing device.

At 1402, the productivity server 100 stores, on a database of the productivity server 100 or the database server 106, a causal tree structure corresponding to a document. The causal tree structure includes a sequence of editing instructions and each editing instruction is assigned an identifier unique to such editing instruction. At 1404, the productivity server 100 receives a first user editing instruction transmitted by a first client device (e.g., client device 104*a*) and a second user editing instruction transmitted by a second client device (e.g., client device 104*b*). The first user editing instruction is assigned a first identifier (e.g., by the first client device 104*a*) and the second user editing instruction is assigned a second identifier (e.g., by the second client device 104*b*). At 1406, the productivity server 100 stores, via its processor 152, the first user editing instruction and the first identifier as a first additional node to the causal tree structure, and stores the second user editing instruction and the second identifier as a second additional node to the causal tree structure.

At 1408, the productivity server 100 transmits, to the first client device 104*a*, the second user editing instruction and the second identifier, to render changes to the document corresponding to the first user editing instruction and the second user editing instruction. At 1410, the productivity server 100 transmits, to the second client device 104*b*, the first user editing instruction and the first identifier, to render changes to the document corresponding to the first user editing instruction and the second user editing instruction.

According to the method 1400, if both the first user and the second user are editing the same portion of the document, both users' editing instructions are used to update the causal tree structure stored on the server and the copies of the causal tree structure (or copies of a branch of the causal tree structure) at the users' client devices. This ensures that the user edits converges and that both users are editing the same revision of the document.

In an embodiment, the first identifier may include a first site identifier unique to a first user's editing session on the first client device 104*a*, and a first stamp, which is a numeric value (e.g., an integer value) based on identifiers assigned to editing instructions in the causal tree structure. The second identifier may include a second site identifier unique to a second user's editing session on the second client device 104*b*, and a second stamp, which is a numeric value (e.g., an integer value) based on identifiers assigned to editing instructions in the causal tree structure.

In another embodiment, the first identifier may further include a first cause identifier, which is an identifier of a prior editing instruction in the causal tree structure that precedes the first user editing instruction. The second identifier may further include a second cause identifier, which is an identifier of a prior editing instruction in the causal tree structure that precedes the second user editing instruction.

In an embodiment where the first cause identifier and the second cause identifier are the same, the productivity server 100 compares the first stamp and the second stamp. If the first stamp is greater than the second stamp, the productivity server 100 processes the first user editing instruction before processing the second user editing instruction. If the first stamp is less than the second stamp, the productivity server 100 processes the second user editing instruction before processing the first user editing instruction.

In still another embodiment, when the first user editing instruction and the second user editing instruction are received by the productivity server 100 simultaneously, the productivity server 100 compares the first site identifier and the second site identifier. If the first site identifier is less than the second site identifier, the productivity server 100 processes the first user editing instruction before processing the second user editing instruction. If the first site identifier is greater than the second site identifier, the productivity server 100 processes the second user editing instruction before processing the second user editing instruction.

In still another embodiment, the first identifier may include a first time stamp and the second identifier may include a second time stamp. The productivity server 100 compares the first time stamp and the second time stamp. If the first time stamp has an earlier time than the second time stamp, the productivity server 100 processes the first user editing instruction before processing the second user editing instruction. If the first time stamp has a later time than the second time stamp, the productivity server 100 processes the second user editing instruction before processing the first user editing instruction.

Figure 15:
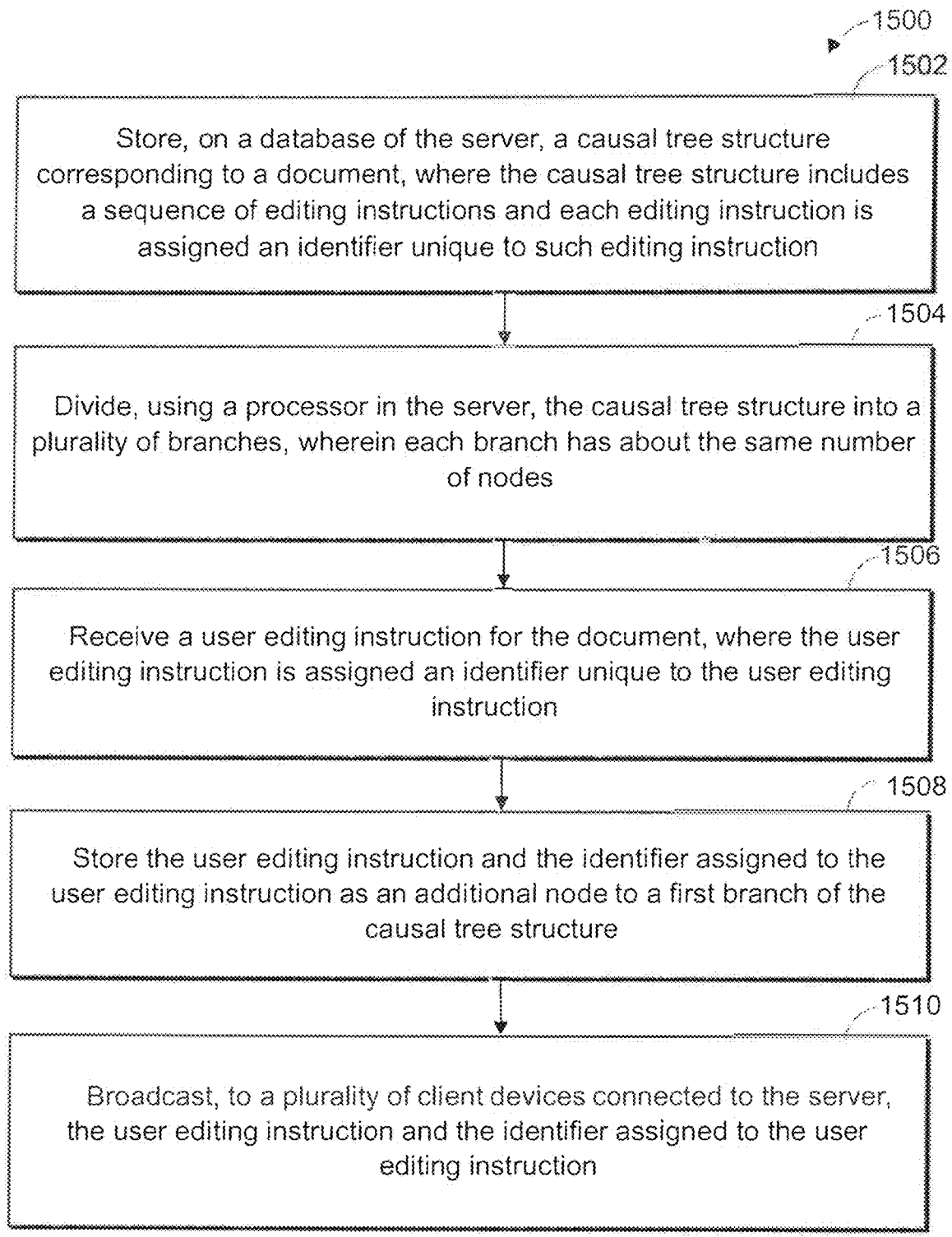
FIG. 15 is a flowchart illustrating yet another example method, implemented on a server, for editing a document, according to an embodiment.

FIG. 15 is a flowchart illustrating yet another example method 1500, implemented on a server, for editing a document, according to an embodiment. In some embodiments, the method 1500 is implemented by the productivity server 100 of FIG. 1A, which interacts with the database server 106 and the client devices 104*a*, 104*b*, and 104*c*. FIG. 15 is described with reference to FIGS. 1A and 1B for explanatory purposes. In other embodiments, however, the method 1500 is implemented by another suitable computing device.

At 1502, the productivity server 100 stores, on a database of the productivity server 100 or the database server 106, a causal tree structure corresponding to a document. The causal tree structure includes a sequence of editing instructions and each editing instruction is assigned an identifier unique to such editing instruction. At 1504, the productivity server 100 divides, using its processor 152, the causal tree structure into a plurality of branches, where each branch has about the same number of editing instructions.

At 1506, the productivity server 100 receives a user editing instruction for the document, where the user editing instruction is assigned an identifier unique to the user editing instruction. At 1508, the productivity server 100 stores the user editing instruction and the identifier assigned to the user editing instruction as an additional node to a first branch of the causal tree structure. At 1510, the productivity server 100 broadcasts, to a plurality of client devices (e.g., 104a, 104b, and 104c) connected to the server, the user editing instruction and the identifier assigned to the user editing instruction.

In an embodiment, the productivity server 100 compares a number of editing instructions in the first branch of the causal tree structure to a predetermined number. If the number of editing instructions in the first branch exceeds the predetermined number, the productivity server 100 re-divides (e.g., re-balances) the causal tree structure into a second plurality of branches having about the same number of editing instructions.

In another embodiment, the productivity server 100 re-divides the causal tree structure when all user sessions to edit the document are terminated.

In yet another embodiment, the productivity server 100 temporarily suspends all user sessions to edit the document when re-dividing or re-balancing the causal tree structure.

In an embodiment, the re-divided causal tree structure may have a different number of branches than the causal tree structure.

In still another embodiment, the identifier assigned to each editing instruction may include an instruction identifier and a cause identifier. The productivity server 100 re-divides the causal tree structure by modifying cause identifiers of first editing instructions in the second plurality of branches without modifying the instruction identifiers of the first editing instructions.

In various embodiments, the causal tree structure also may be used to represent other metadata such as for use in formatting rendering of the data, or for capturing semantic information. It may contain metadata useful for other purposes such as for generating footnotes or even other documents in other data formats such as HTML, XML, XBRL, and iXBRL. In another embodiment, characters may represent data used to control access to the CauseID supporting such features as redacting content. The causal tree structure can be extended and adapted to all kinds of documents.

In still other embodiments, the causal tree structure may be used to represent various types of documents and objects such as a presentation or structured drawing. For instance, a presentation may include object of various types, e.g., text object, spreadsheet/table object, images. In an embodiment, each object may have its own causal tree structure. In another embodiment, each object may be a branch in causal tree structure for the presentation. The layout of these objects and the relationship between them may also be captured by the causal tree. In yet other embodiments, the causal tree may be used to link objects in different documents together. In still other embodiments, a node of a causal tree in one document may be a link to another separate and unrelated causal tree in another document. In other words, a causal tree may include an instruction that refers to nodes and branches of another causal tree or an entire other causal tree.

Some of the examples provided above refer to RTrees and their use in tracking edits of various users. A more detailed explanation of the mechanics of using R-Trees for keeping track of edits to a table (e.g., a standalone spreadsheet or a table that is integrated into a text document) will now be described with reference to FIGS. 44-56D.

The term "graph" as used herein refers to a representation of a set of objects, in which at least some pairs of objects in the set are connected to one another by one or more edges. Each of the objects occupies a vertex of the graph. An "interval-based dependency graph" or "dependency graph" as used herein is a data structure that represents the inter-dependencies of a set of formulas or other mechanisms of reference between objects by way of a graph, with the instantiation of each vertex being referred to as a "node." Possible implementations of a dependency graph include an interval tree and a skip list. The term "reference element" as used herein is an electronically-stored object (such as a formula, function) that establishes a unidirectional or bidirectional link between at least two objects (such as between at least two cells of a spreadsheet or at least two cells of different spreadsheets). An example of a reference element is a formula contained in a cell of a spreadsheet, wherein the formula refers to (relies upon) the value contained in some other cell of the spreadsheet (or a cell of a different spreadsheet or which, itself, may be the result of a formula calculation) in order to calculate a result. The term "table" as used herein is a collection of data organized into rows and columns. Examples of tables include a spreadsheet and a worksheet. A table may be embedded within any sort of document. Finally, "document" as used herein includes any type of electronically stored document, including text documents, spreadsheets, presentations, drawings, diagrams, and composite documents that include elements of different types of documents.

Figure 44:
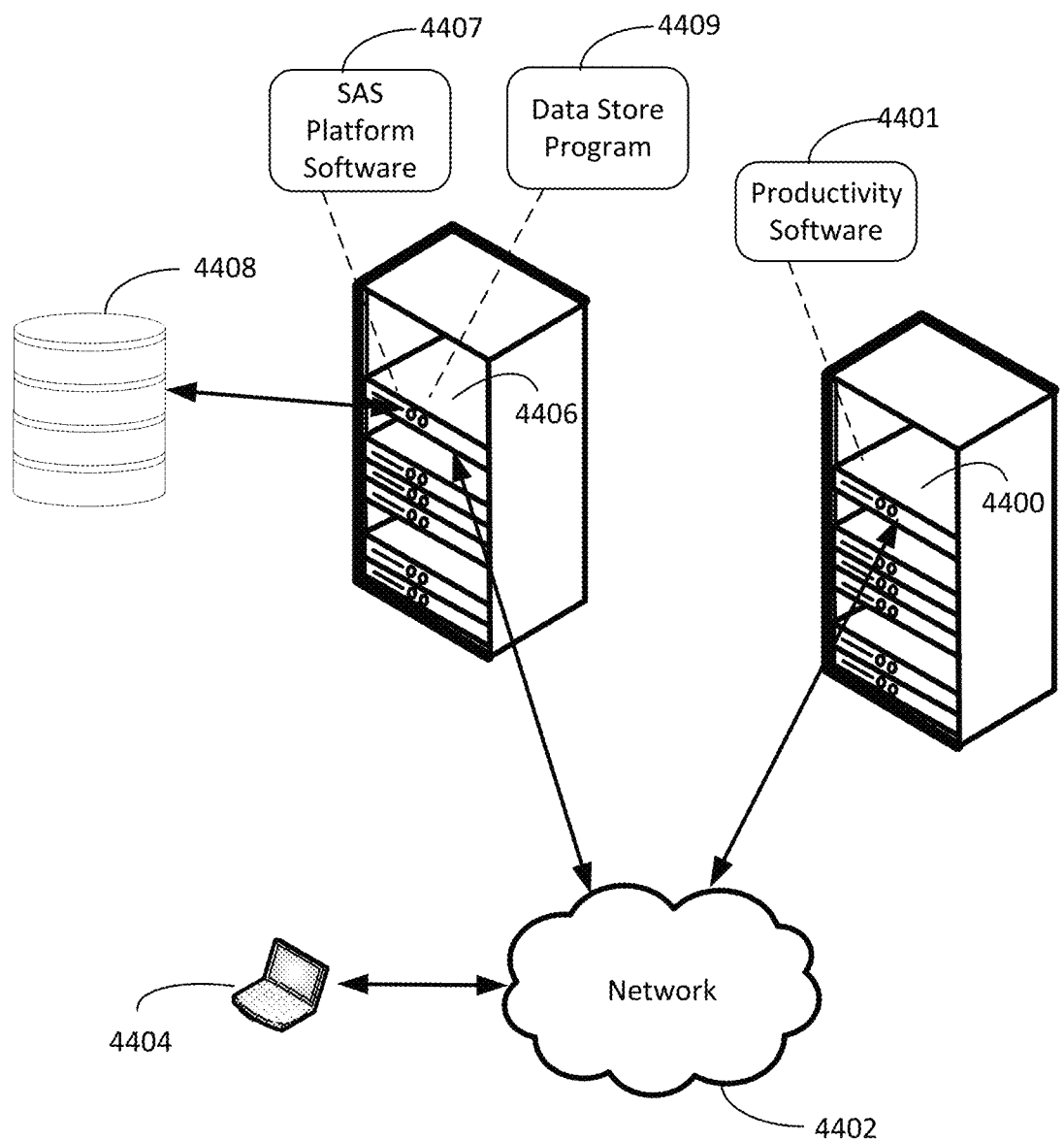
FIG. 44 is an example of a networking environment in which various embodiments of the disclosure may be employed.

Various embodiments of the disclosure are implemented in a computer networking environment. Turning to FIG. 44, an example of such an environment is shown. A first computing device 4400 is communicatively linked to a network 4402. Possible implementations of the network 4402 include a local-area network, a wide-area network, a private network, a public network (e.g., the Internet), or any combination of these. The network 4402 may include both wired and wireless components. Also communicatively linked to the network 4402 are a second computing device 4404 and a third computing device 4406. It is to be understood that the various embodiments may be carried out on the first computing device 4400, the second computing device 4404, or other computing devices not depicted. In an embodiment, the second computing device 4404 accesses the first computing device 4400 via a thin, web-based client.

In an embodiment, the first computing device 4400 executes productivity software 4401 and the third computing device 4406 executes software as a service ("SAS") platform software 4407. In order to access various reference elements in an embodiment, the productivity software 4401 transmits commands to the SAS platform 4407 along one or more element identifiers ("IDs"). The SAS platform software 4407 executes a data store program 4409, which uses the one or more element IDs as indices to retrieve the one or more elements (including reference elements) from a graph database maintained in a media storage device 4408. The data store program 4409 also stores elements in the graph database using element IDs.

Figure 45A:
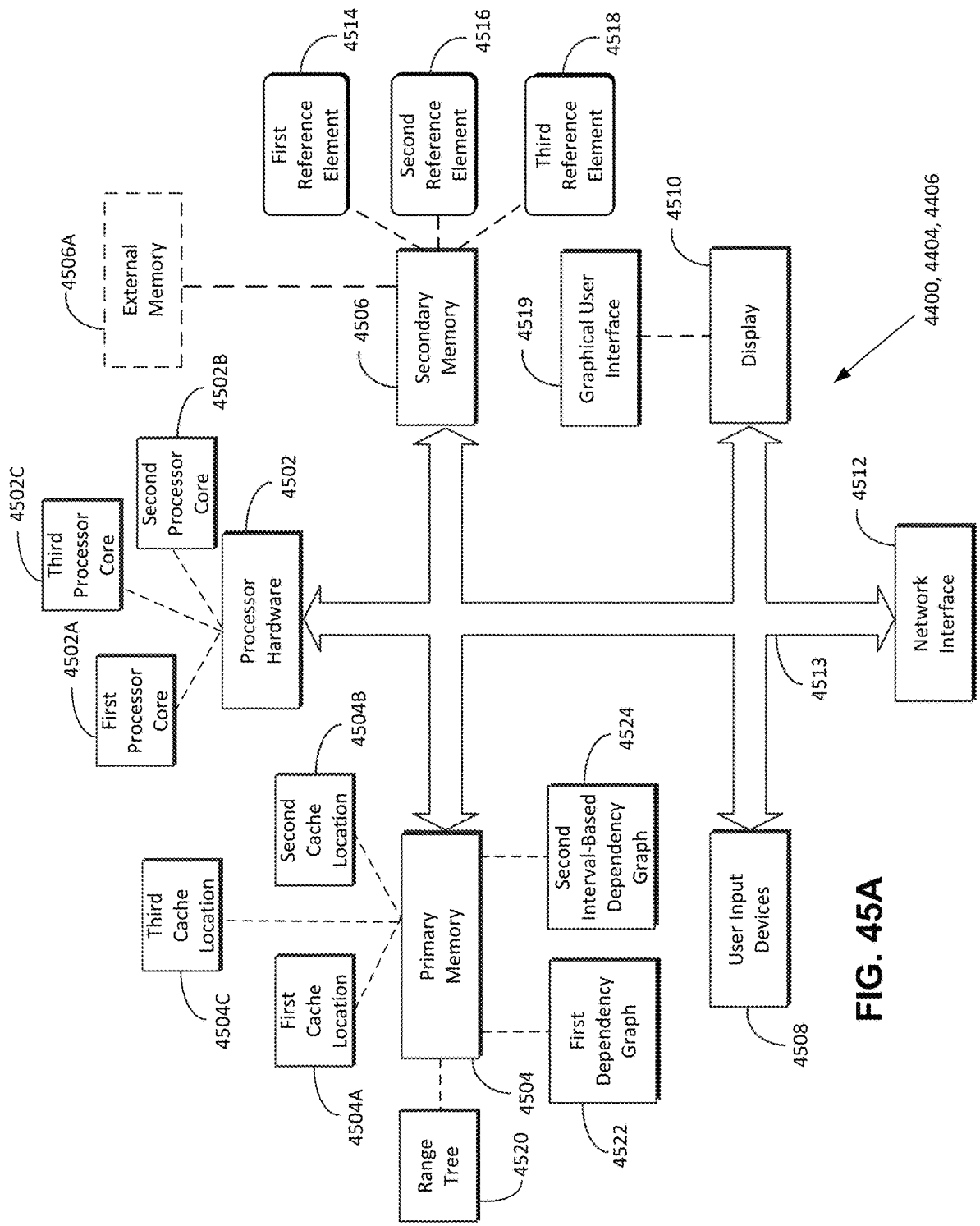
FIG. 45A is a block diagram of a computing device according to an embodiment.

In one implementation, one or more of the computing devices of FIG. 44 have the general architecture shown in FIG. 45A. The computing device according to this architecture includes processor hardware 4502 (e.g., a microprocessor, controller, or application-specific integrated circuit) (hereinafter "processor 4502"), a primary memory 4504 (e.g., volatile memory, random-access memory), a secondary memory 4506 (e.g., non-volatile memory), user input devices 4508 (e.g., a keyboard, mouse, or touchscreen), a display device 4510 (e.g., an organic, light-emitting diode display), and a network interface 4512 (which may be wired or wireless (e.g., a network interface card). Each of the elements of FIG. 45A is communicatively linked to one or more other elements via one or more data pathways 4513. Possible implementations of the data pathways 4513 include wires, conductive pathways on a microchip, and wireless connections. In an embodiment, the processor 4502 is one of multiple processors in the computing device, each of which is capable of executing a separate thread. In an embodiment, the processor 4502 communicates with other processors external to the computing device in order to initiate the execution of different threads on those other processors. For example, the first computing device 4400 could communicate with the third computing device 4406 to initiate different threads of execution on one or more processors on the third computing device 4406.

In some embodiments, the primary memory 4504 includes multiple cache locations, represented in FIG. 45A by a first cache location 4504A, a second cache location 4504B, and a third cache location 4504C. In an embodiment, the processor 4502 includes multiple processor cores, represented in FIG. 45A by a first processor core 4502A, a second processor core 4502B, and a third processor core 4502C. Each processor core is capable of operating independently of the other processor cores, and is capable of carrying out a separate thread of execution (e.g., by retrieving instructions and data from the primary memory 4504). Thus, two or more of the processor cores can execute threads in parallel and independently.

The memories 4504 and 4506 store instructions and data. In some embodiments, the secondary memory 4506 is implemented as, or supplemented by an external memory 4506A. The media storage device 4408 is a possible implementation of the external memory 4506A. The processor 4502 executes the instructions and uses the data to carry out various procedures including, in some embodiments, the methods described herein, including displaying a graphical user interface 4519. The graphical user interface 4519 is, according to one embodiment, software that the processor 4502 executes to display a spreadsheet on the display device 4510, and which permits a user (e.g., operating the second computing device 4404) to make inputs into the various cells of the spreadsheet via the user input devices 4508.

Stored within the secondary memory 4506 (or the external memory 4506A) are one or more reference elements, represented in FIG. 45A by a first reference element 4514, a second reference element 4516, and a third reference element 4518. Each reference element includes one or more data structures including: (1) an abstract syntax tree ("AST") having information regarding how the reference element (e.g., the spreadsheet cell formula) is to be interpreted and (2) a data structure (such as a bit array) representing the location or locations (e.g., the spreadsheet cell locations) of data on which the reference element depends. Each reference element can be referenced by its own, unique element ID. One possible implementation of an element ID is a Globally Unique Identifier ("GUID"). According to an embodiment, each reference element is a data structure that corresponds to a cell in a spreadsheet. If the cell contains a formula, then the reference element includes a pointer to an AST for the formula.

In an embodiment, the processor 4502 maintains a range tree 4520 in the primary memory 4504. Each node of the range tree 4520 is associated with one or more reference elements. In one implementation, each node of the range tree 4520 represents a cell of a spreadsheet that contains a formula. As will be discussed below in further detail, the processor 4502 may, for a given formula of the spreadsheet, search the range tree 4520 to identify which cells contain formulas. The range tree 4520 may be one of multiple range trees. According to various embodiments, the processor 4502 also maintains a first dependency graph 4522 and a second dependency graph 4524, each of which is interval-based, and each of whose functionality will be described below in further detail. In some embodiments, the processor 4502 only maintains a single dependency graph. In others, the processor 4502 maintains more than two dependency graphs.

In an embodiment, the processor 4502 retrieves multiple pieces of data from its own memory (one or both of its primary memory and its secondary memory) or from an external data storage device (e.g., from the media storage device 4408 via request sent to the third computing device 4406) to assemble a spreadsheet.

Figure 45B:
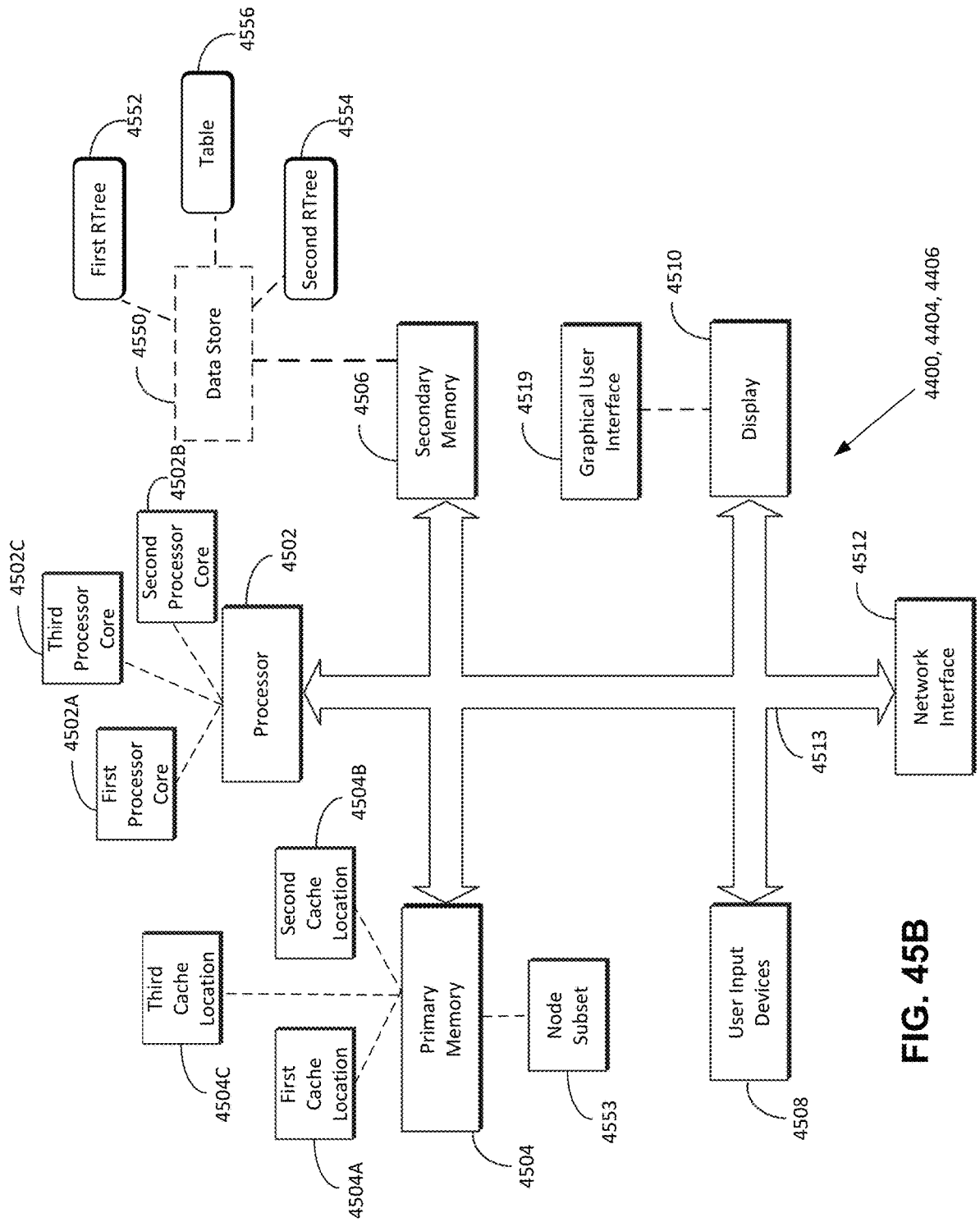
FIG. 45B is a block diagram of a computing device according to another embodiment.

Turning to FIG. 45B, according to an embodiment, instead of using a range tree and two dependency graphs, a computing device uses two RTrees (e.g., Hilbert RTrees)—one RTree in place of the range tree and one RTree in place of the two dependency graphs—which are primarily persisted in an electronic data store ("data store") 4550, which is maintained in memory that is external to the computing device (e.g., maintained in the media storage device 4408 by the data store program 4409). In an embodiment, the data store 4550 is a graph database. The processor 4502 in this embodiment uses a first RTree 4552 to search for cells (e.g., search for cells containing formulas) and uses a second RTree 4554 to search for dependencies (e.g., search for cells on which formulas depend). In this embodiment, the processor 4502 does not necessarily need to load an entire RTree into the primary memory 4504 in order to search it, but instead loads only those nodes (shown as node subset 4553 in FIG. 45B) that it needs to search in order to find cells. Also persisted in the data store 4550 is the table itself, represented by block 4556 in FIG. 45B. The table 4556 is, in one implementation, composed of multiple nodes within the data store 4550 (e.g., one node per cell with the nodes being implemented as vertices of a graph database). As previously noted, one example of a table is a spreadsheet.

In each of the RTrees, each non-leaf node contains an MBR (i.e., contains data representing an MBR). An MBR in this context is the smallest possible rectangle that encompasses all of the cells that the portion of the RTree under that node references. An MBR can be as small as a single cell (which has a start row equal to the end row, and a start column equal to the end column). Each leaf node of the RTree contains a reference (e.g., element ID number or uniform resource identifier ("URI")) to a cell of a table (e.g., a cell of a spreadsheet) and an indicator of the cell's position within the table. In one implementation, the data representing the MBR is in the form of numbers describing the start row, end row, start column, and end column of the MBR with respect to the table. The notation [start row, end row, start column, end column] will often be used herein to express the MBR, with Row 1 being represented by '0' and Column A being represented by '0.'

In an embodiment, for each of the RTrees 4552 and 4554, each node of the RTree is serialized into binary, given a key, and persisted in the data store 4550. To search a given RTree, the processor 4502 retrieves its root node (e.g., copies it from the data store 4550 into the primary memory 4504) and queries the root node to determine whether the cell or cells it is looking for are within the MBR of the any of the children of the root node. If yes, then the processor 4502 obtains the relevant child node or nodes from the data store 4550 (e.g., copying it or them into the primary memory 4504) and, for each child obtained, makes the same query. The processor 4502 repeats this process recursively until it reaches one or more leaf nodes. When the processor 4502 reaches the point at which it is loading leaf nodes into the primary memory 4504, it starts reviewing the cell position data contained in the leaf node or nodes in order to locate a match. If it finds one or more matches, the processor 4502 copies the cells (e.g., requests them from the data store 4550) and stores them into the primary memory 4504.

According to an embodiment, the processor 4502 adds nodes to the RTrees 4552 as data is entered into one or more cells of the table 4556. For example, if a user has an active spreadsheet open and imports multiple columns from another spreadsheet, the processor may add a node representing those additional columns.

Figure 46:
FIG. 46 shows a spreadsheet that helps illustrate an embodiment.

In order to illustrate principles of the various embodiments, an example of a spreadsheet is shown in FIG. 46. The spreadsheet, generally labeled 4600, has a number of cells that are organized into rows and columns. The spreadsheet 4600 would ordinarily not display the formulas within the cells, but instead would display the evaluated result of the formulas with the cells and the formulas above within a formula bar. However, for ease of reference, the formulas are shown in FIG. 46 inside the respective cells they govern. Each cell has an element ID that the processor 4502 may use to retrieve the contents of the cell, including the formula of the cell (if it has a formula) and the value contained in the cell (either a constant or the calculated result of a formula). Although the only type of formula shown in FIG. 46 is a "sum" formula, it is to be understood that other types of formulas are possible. Additionally, a cell might contain a link to another cell, and such a link could be treated the same way as a formula for the techniques described herein.

According to an embodiment, for each cell in FIG. 46, the processor 4502 uses a numerical value to represent the row (starting with zero, so that row one is represented by the value zero, row two is represented by the value one, row three is represented by the value two, etc.) and a numerical value to represent the column (starting with zero, where column A is represented by the value zero, column B is represented by the value one, column C is represented by the value two, etc.). The processor 4502 represents each interval as a starting point (inclusive) followed by an ending point (exclusive). For example, processor 4502 represents a column interval from column A to column A by the interval [0,1). In an embodiment, the processor 4502 uses these numerical values to calculate the size of the interval as the difference between the ending point to the starting point. For example, the size of the column interval from column A to column A is 1−0=1. For the sake of clarity, however, the intervals of rows and columns will hereafter be described in terms of rows and column notations of FIG. 46 with inclusive endpoints. Thus, for example, the range of cells from A6 to C6 will be said to include the row interval [6,6] and the column interval [A,C].

In an embodiment, when the computing device (e.g., the first computing device 4400) receives the input of a formula into a spreadsheet (e.g., from the second computing device 4404 via the network 4402), the processor 4502 analyzes the AST of the formula to determine which cells the formula references, populates the data structure (e.g., a bit array) with data representing those cells, and associates the cell into which the formula has been input with the appropriate nodes of the dependency graphs 4522 and 4524 (or the second RTree 4554). Furthermore, the processor 4502 inserts a node into the range tree 4520 (or the first RTree 4552) corresponding to the cell location (e.g., A6) into which the formula is input. Additionally, the processor 4502 analyzes the range tree 4520 and the dependency graphs 4522 and 4524 (or first and second RTrees 4552 and 4554, if they are being used) in order to determine which formulas of the spreadsheet may be carried out in parallel, assign the newly-input formula to a group based on this analysis, and update any previously-assigned groups of other, previously-input formulas based on the analysis. According to various embodiments, the processor 4502 carries out these operations in such a way and with such timing that they are complete by the time an event requiring recalculation of the spreadsheet is required (e.g., immediately upon input of the formula).

Figure 47:
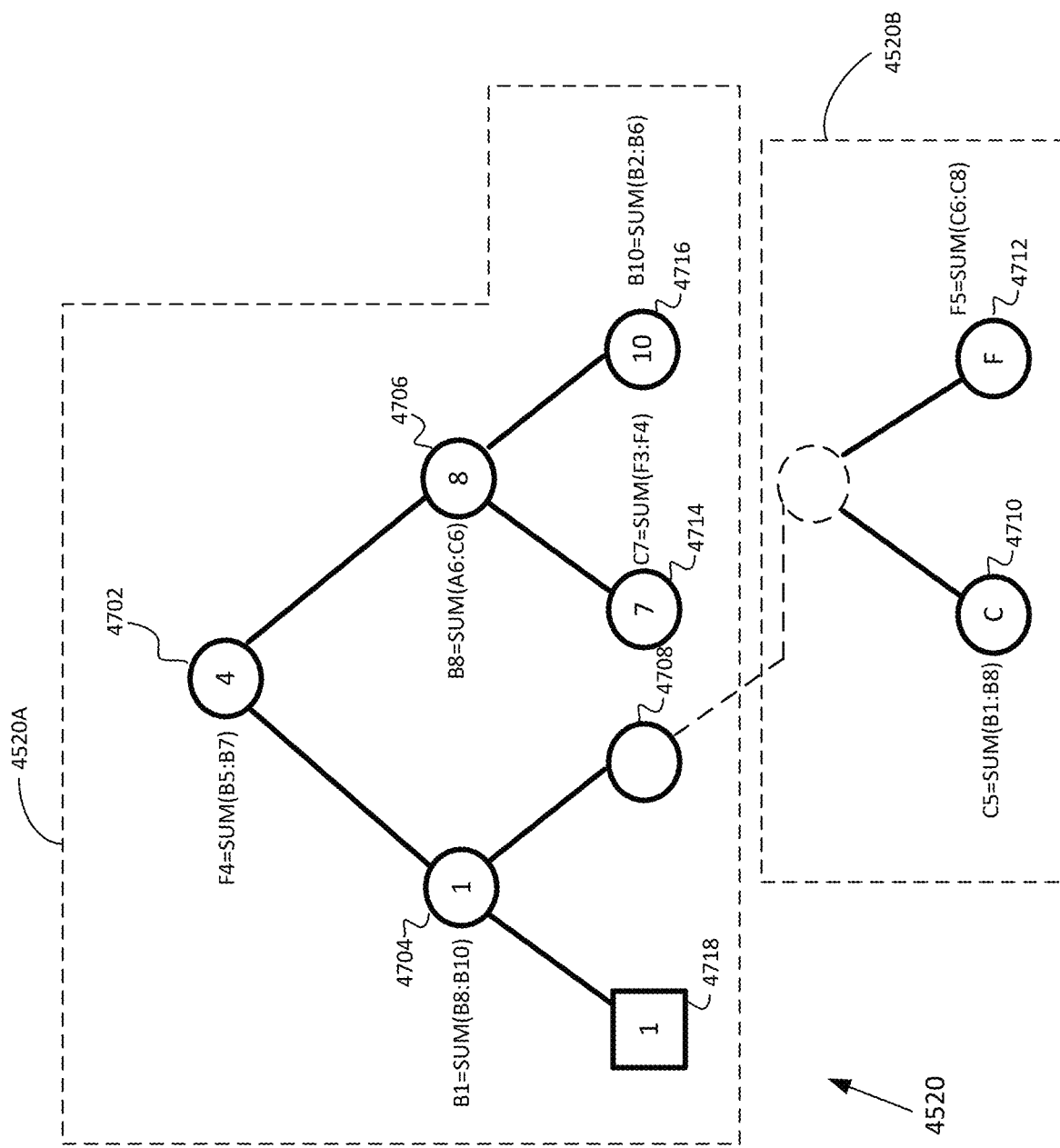
FIG. 47 shows a range tree according to an embodiment.

Turning to FIG. 47, a possible implementation of the range tree 4520 for the spreadsheet of FIG. 46 is shown. The range tree 4520 in this example is a two-dimensional range tree, with a first dimension (region 4520A) representing the rows of the spreadsheet 4600, and a second dimension (region 4520B) representing the columns. The rows and columns are denoted in FIG. 47 by their actual row and column values in FIG. 46 for ease of reference. In other implementations, however, the rows and columns would both be numerically represented and start from zero. Associated with each node of the range tree 4520 is a cell of the spreadsheet 4600 (whose location and formula are textually shown within the node in FIG. 47 for convenient reference). In some embodiments, an object containing serialized data for the cell (e.g., the value in the cell, and a pointer to the root node of an AST, if the cell contains a formula, or a null pointer, if the cell does not contain a formula) is part of the node. The range tree in this implementation only includes nodes corresponding to those cells in the spreadsheet 4600 containing formulas. In some embodiments, however, the range tree 4520 would include a node for each cell having a value in it, and the processor 4502 would distinguish between nodes representing formula-containing cells and nodes representing non-formula-containing cells by reading the AST pointer of the cell object. Additionally, the processor 4502 could treat linking references the same way it treats formulas. For example, if a cell merely contained a link to some other cell (e.g., cell B9 might contain a link to cell B10, such that cell B9's value was always the same as that of cell B10), the processor 4502 could include such a cell in any search of the range tree 4520.

The nodes of the range tree 4520 are connected with one another by edges as shown in FIG. 47. For example, in the first region 4520A of the range tree 4520: a first node 4702 represents cell F4; a second node 4704 represents cell B1, a third node 4706 represents cell B8; a fourth node 4708 refers to a second region 4520B (in a second dimension) having a fifth node 4710 representing cell C5 and a sixth node 4712 representing cell F5; a seventh node 4714 represents cell C7, and an eighth node 4716 represents cell B10. The first region 4520A also includes a duplicate node 4718 for the purpose of balancing the tree. Naturally, the processor 4502 may create and maintain more complex two-dimensional structures for other spreadsheets. For the sake of clarity, only the fourth node 4708 is depicted as having a second dimension.

Figure 48A:
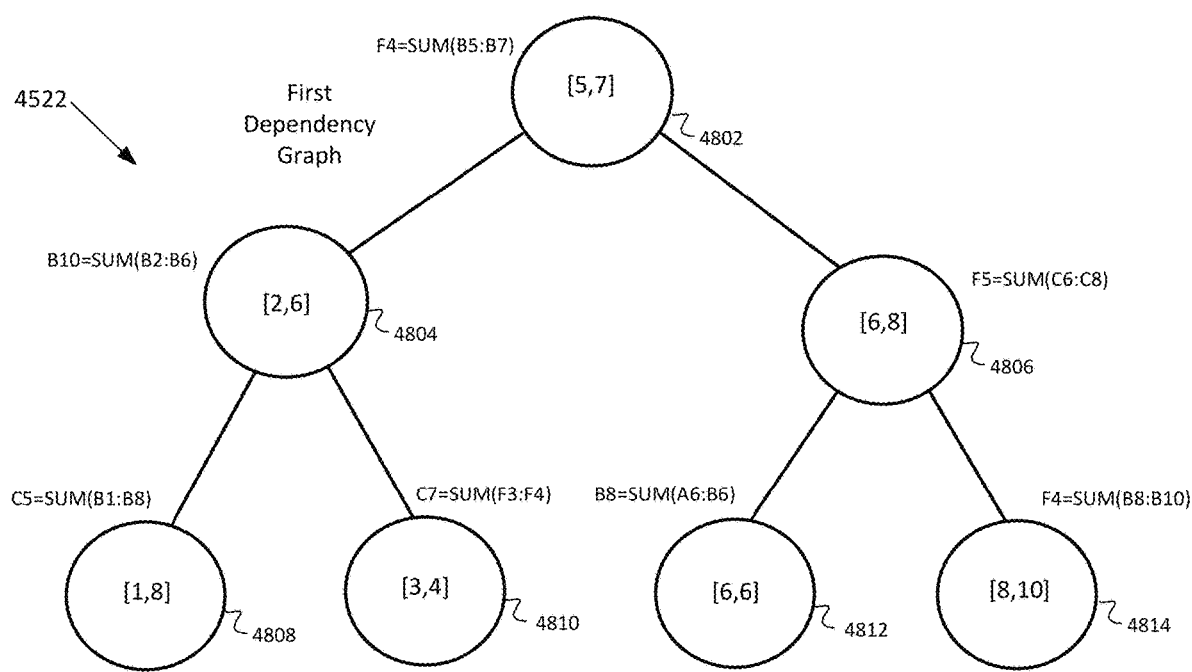
FIG. 48A shows a first dependency graph according to an embodiment.
Figure 48B:
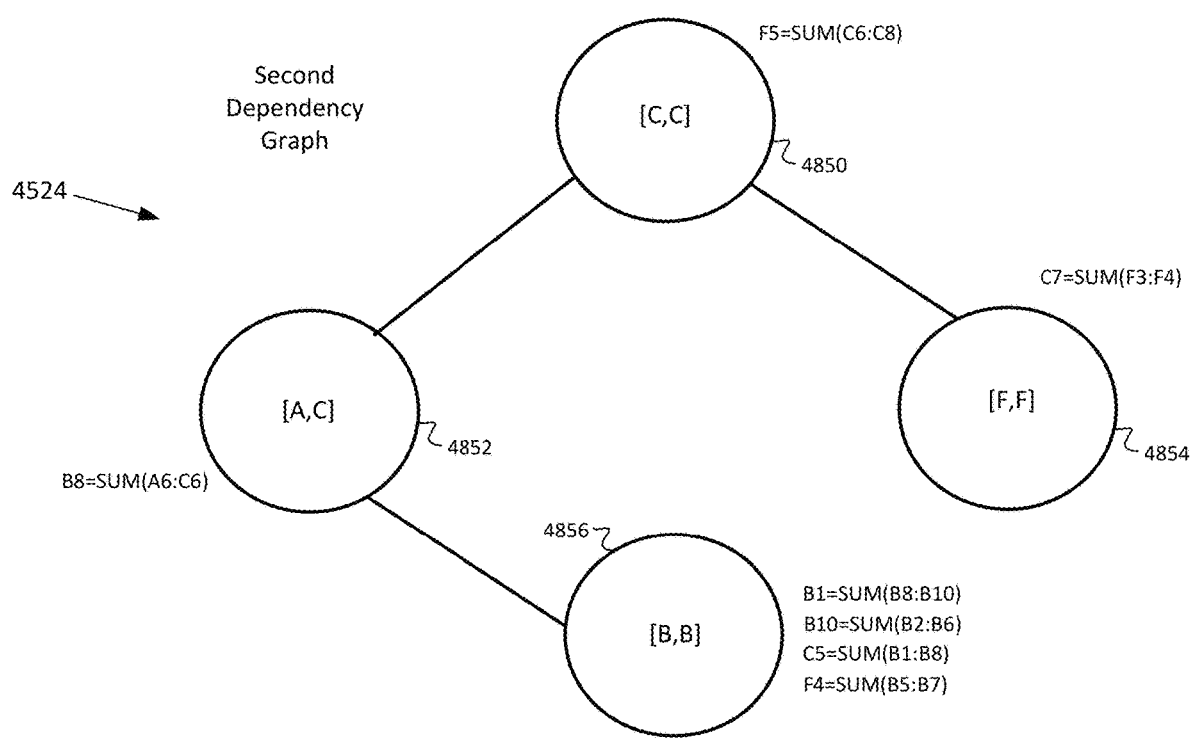
FIG. 48B shows a second dependency graph according to an embodiment.

Turning to FIG. 48A and FIG. 48B, possible implementations of the first dependency graph 4522 and the second dependency graph 4524 for the spreadsheet of FIG. 46 are shown. The first dependency graph 4522 (FIG. 48A) in this example is a row interval tree, and the second dependency graph 4524 (FIG. 48B) is a column interval tree. As with FIG. 47, the rows and columns of FIG. 48A and FIG. 48B are denoted by their actual row and column values (from FIG. 46) for ease of reference. In other implementations, however, the rows and columns would both be numerically represented and start from zero. Associated with each node of the first dependency graph 4522 and the second dependency graph 4524 is at least one cell of the spreadsheet 4600 (whose location and formula are textually shown within the node for convenient reference) that depends on at least one cell that falls within the range of rows or columns represented by the node. This may include, for example, a dependency based on a formula or a dependency based on a link.

Continuing with FIG. 48A, the processor 4502 creates and maintains the first dependency graph 4522 to track the rows on which each of the formulas of the spreadsheet 4600 depends. The first dependency graph 4522 in this example includes: a first node 4802 representing the interval of row five to row seven and associated with cell F4; a second node 4804 representing the interval of row two to row six and associated with cell B10, a third node 4806 representing the interval of row six to row eight and associated with cell F5; a fourth node 4808 representing the interval of row one to row eight and associated with cell C5, a fifth node 4810 representing the interval of row three to row four and associated with cell C7, a sixth node 4812 representing row six only and associated with cell B8; and a seventh node 4814 representing the interval of row eight to row ten and associated with cell F4.

Turning to FIG. 48B, the processor 4502 creates and maintains the second dependency graph 4524 to track the columns on which each of the formulas of the spreadsheet 4600 depends. The second dependency graph 4524 in this example includes: a first node 4850 representing column C only and associated with cell F5; a second node 4852 representing the interval of column A to column C and associated with cell B8; a third node 4854 representing column F only and associated with cell C7, and a fourth node 4856 representing column B only and associated with cells B1, B10, C5, and F4.

For ease of reference, Table 1 maps the cells of FIG. 46 (via their respective formulas) to their row intervals in the first dependency graph 4522 ("Depends on Row Interval"), their column intervals in the second dependency graph 4524 ("Depends on Column Interval"), the identity of cells that would be returned in a search of the range tree 4520 ("Depended on By"), and the respective calculation groups of the formulas, which will be described below in more detail ("Group"). The notation "=SUM(X:Y)" means "sum the values from cell X to cell Y, inclusive."

TABLE 1

| Cell | Formula | Depends on Row Interval | Depends on Column | Depended on By | Group |
|------|---------|-------------------------|-------------------|----------------|-------|
| B10  | #CIRCULAR! | [2, 6] | [B, B] | B1, C5 | 0 |
| F4   | #CIRCULAR! | [5, 7] | [B, B] | C7, F5 | 0 |
| B8   | 0 | [6, 6] | [A, C] | B1, C5 | 0 |
| C7   | 0 | [3, 4] | [F, F] | F5 | 1 |
| B1   | 0 | [8, 10] | [B, B] | C5 | 1 |
| C5   | #CIRCULAR! | [1, 8] | [B, B] | — | 2 |
| F5   | 0 | [6, 8] | [C, C] | — | 2 |

In an embodiment, when the processor 4502 detects that a cell of a spreadsheet has been edited, the processor 4502 searches the dependency graphs 4522 and 4524 (or the second RTree 4554) to identify all formulas in the spreadsheet that are interested in (i.e., depend on) that cell, and executes these formulas group by group, with formulas in each group being executed in parallel with one another.

Figure 49A:
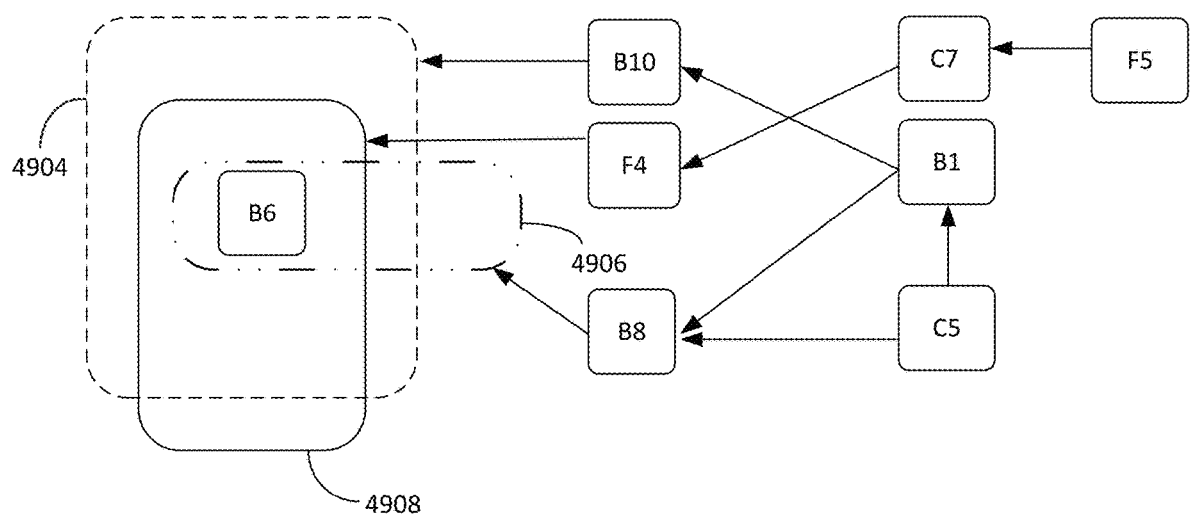
FIG. 49A and FIG. 49C depict the dependencies among formulas of a spreadsheet according to different embodiments.
Figure 49B:
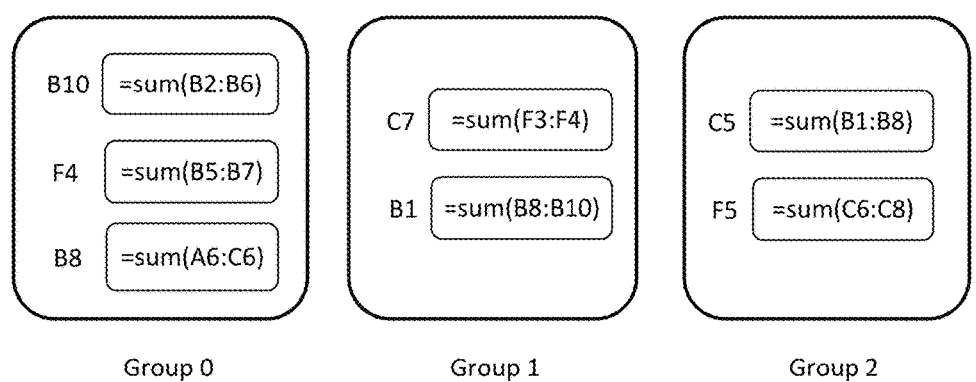
FIG. 49B and FIG. 49D depict the grouping of the formulas of a spreadsheet into groups for parallel processing according to different embodiments.
Figure 49C:
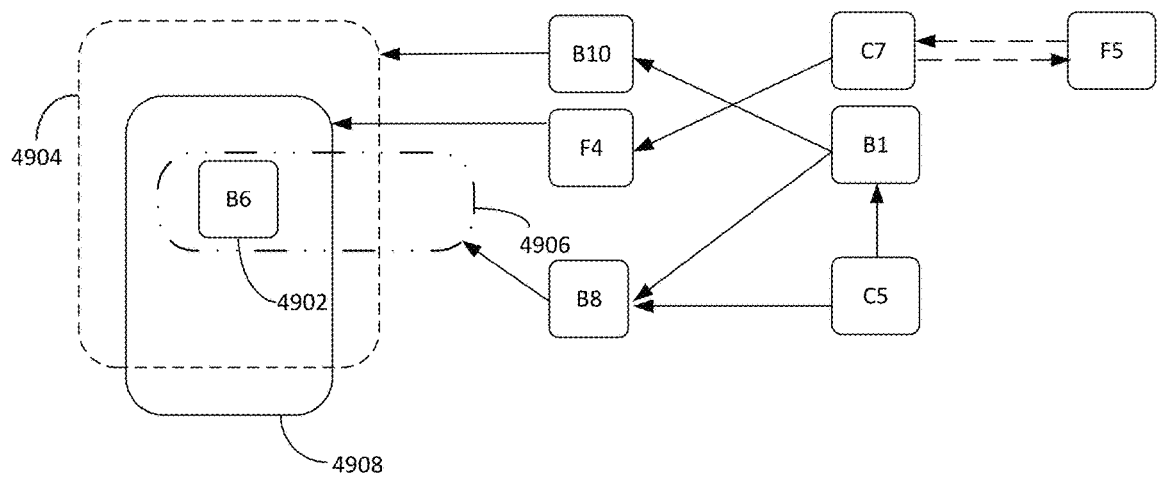
Figure 49D:
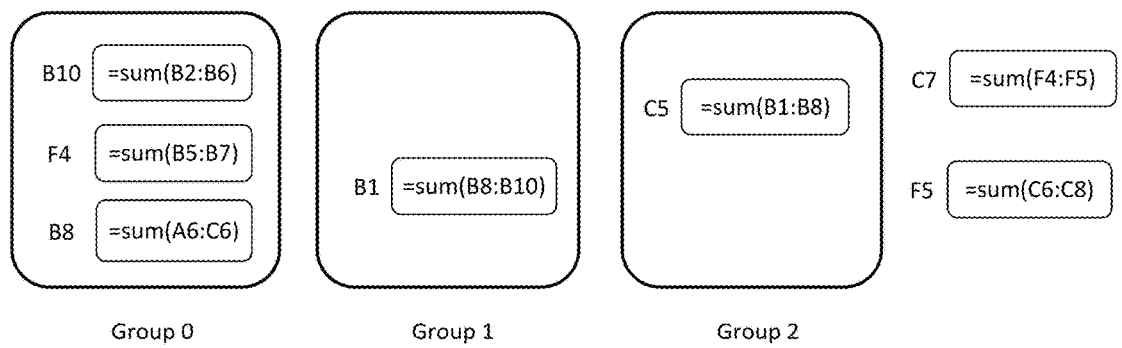

Turning to FIG. 49A, a representation of the interdependencies among the formulas of the spreadsheet 4600 is depicted. For the sake of example, this representation assumes that the value in cell B6 is changed (e.g., from '4' to '5'). The range of cells on which the formula of cell B10 depends is represented by a box 4904, the range of cells on which the formula of cell B8 depends is represented by a box 4906, and the range of cells on which the formula of F4 depends is represented by a box 4908. In an embodiment, the processor 4502 groups the formulas according to their dependencies as shown in FIG. 49B, and recalculates the formulas (based on the new value) in each group in parallel using multiple processors and multiple processor cores in order to optimize the speed of the recalculation.

Figure 50:
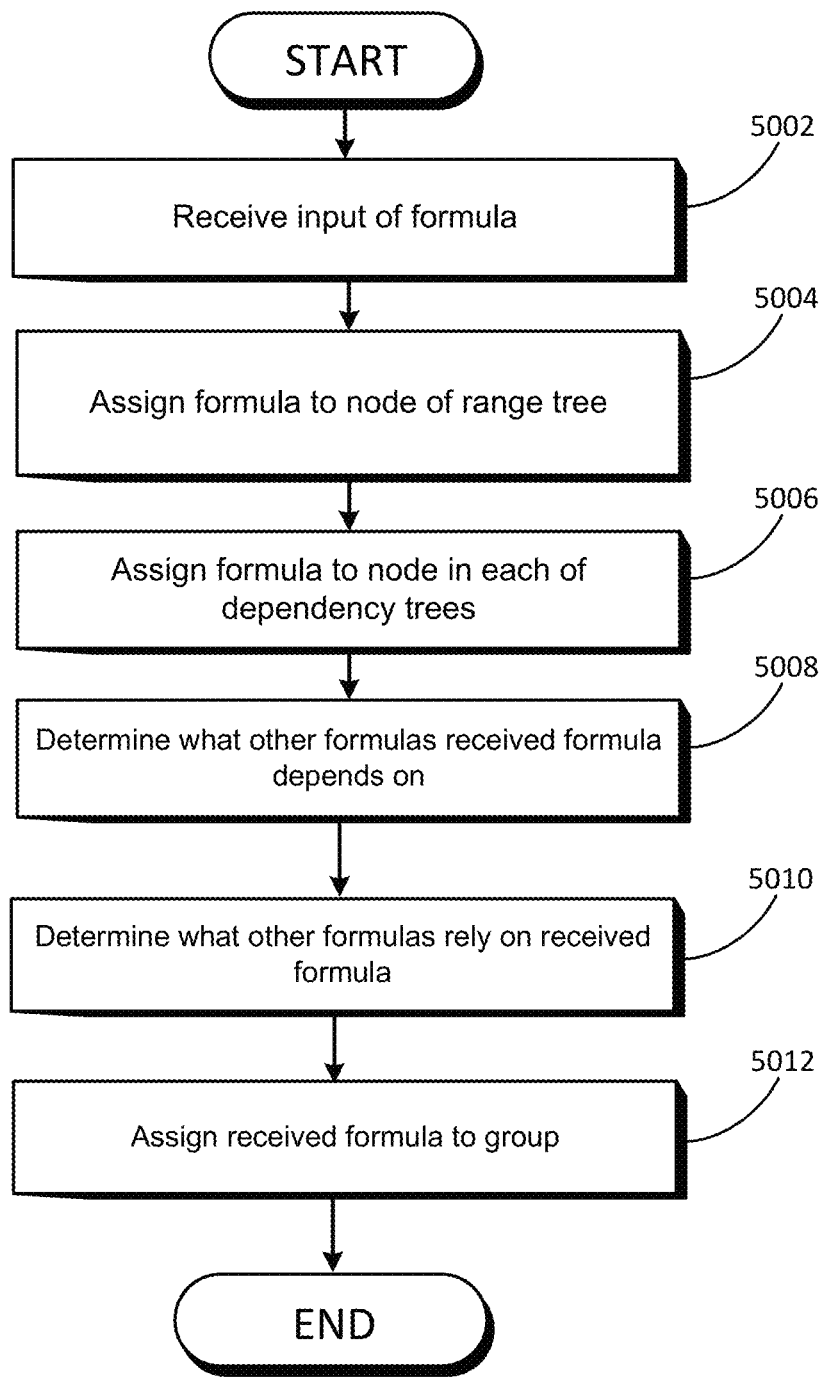
FIG. 50 shows an example of how a computing device maintains dependencies among reference elements in an embodiment.

Turning to FIG. 50, an example of how a computing device maintains dependencies among reference elements in an embodiment is described. In this example, it will be assumed that the processor 4502 is carrying out the actions on the first computing device 4400 and that the reference elements are formulas of a spreadsheet. It is to be understood that, although the actions are depicted as occurring in sequence, many of them may be performed in parallel. At block 5002, the processor 4502 receives an input of a formula into the spreadsheet. For example, assume that the first computing device 4400 hosts the spreadsheet 4600 by executing the productivity software 4401 on the processor 4502, and that the second computing device 4404 executes a web browser that interacts with the productivity software 4401 to display the spreadsheet 4600. Further assume that a user interacts with the second computing device 4404 to input the formula "=SUM(B2:136)" into cell B10 of the spreadsheet 4600. The second computing device 4404 transmits the input formula to the first computing device 4400 via the network 4402. The processor 4502 (assumed to be part of the first computing device 4400 in this example) receives the input formula and creates an AST for the formula.

At block 5004, the processor 4502 assigns the received formula to a node (creating the node if necessary) in the range tree 4520 (or the first RTree 4552). For example, the processor 4502 may assign the formula to a node based on the location (row and column) of the cell within the spreadsheet 4600.

At block 5006, the processor 4502 assigns the received formula to a node (again, creating the node, if necessary) in each of the dependency graphs 4522 and 4524 (or to a node in the second RTree 4554).

At block 5008, the processor 4502 determines what other cells with formulas the received formula depends upon. For example, the processor 4502 analyzes the AST of the received formula to determine which cell intervals the received formula depends upon and then queries the range tree 4520 (or first RTree 4552) to determine which, if any, of those depended-upon cells contain formulas.

At block 5010, the processor 4502 determines (e.g., by querying the dependency graph 4522 and 4524 or by querying the second RTree 4554) what other formulas rely upon the received formula.

At block 5012, the processor 4502 assigns the formula to a group based on the determinations it made at block 5008 and, if necessary, block 5010. In assigning the formula to a group, the processor 4502 selects the first group in which the received formula can be safely calculated after dependencies on other formulas have been resolved. For example, assume that the spreadsheet 4600 is in an initial, blank state (i.e., there are no other formulas in the spreadsheet), so the processor 4502 receives a result of "zero hits" back from the query to the range tree 4520 (or to the first RTree 4552). The processor 4502 determines, based on the result, that the received formula is not dependent on any other formulas. The processor 4502 therefore assigns the formula to the first group ("Group 0"), as shown in FIG. 49B.

To illustrate how a formula might be moved from one group to another, assume that, after inputting the formula in B10, the user inputs the formula of C5, which is "=SUM (B1:B8)." The processor 4502 queries the range tree 4520 (or first RTree 4552) at block 5008 and receives one hit back from the range tree 4520—that of the cell B10. The processor 4502 determines the group to which the formula of cell B10 was assigned—Group 0 in this case—and assigns the formula of C5 to the next available group—the second group ("Group 1"). The processor 4502 also queries the first and second dependency graphs 4522 and 4524 (or the second RTree 4554) and determines that there are no formulas in the spreadsheet 4600 that depend on it (i.e., depend on C5). Further assume that the user subsequently inputs still another formula into the spreadsheet 4600—the formula of B1, which is "=SUM(B8:B10)." The processor 4502 carries out block 5008 and, as a result of the query of the range tree 4520 (or first RTree 4552), receives a result of B10. The processor 4502 also carries out block 5010 for the formula of B1 and determines, based on the query of the dependency graphs 4522 and 4524 (or second RTree 4554), that the formula of C5 is dependent on B1. Consequently, the processor 4502 assigns the formula of B1 to the next available group after B10's group—Group 1—and reassigns the formula of C5 to the next available group after B1's group, which is Group 2. In other words, the processor 4502 identifies the dependency of C5 on B1 and, because B1 needs to be calculated before C5, bumps C5 from Group 1 and into the next group.

In an embodiment, a computing device uses a range tree and a dependency graph (e.g., such as the range trees and dependency graphs discussed herein) or uses RTrees to identify dependencies among multiple reference elements (e.g., to identify what depends on each reference element and to identify what each reference element depends on) by carrying out a flattening process on the dependency graph. Additionally, the computing device can use this process to identify those reference elements that are circular. A reference element is "circular" if it refers to at least one other reference element that refers back to it. An example of a circular reference element would be if cell A1 had the formula "=A2+3" and cell A2 had the formula "A1−3." The formula in A1 and the formula in A2 would each be considered a circular reference element. A circular reference may be many levels deep.

For example, the processor 4502 would, for a given formula of the spreadsheet 4600, carry out the operation of assigning the formulas to groups as described above, and iterate through the dependency graphs 4522 and 4524 (or through the second RTree 4554) until it reached an iteration where it could not flatten any more formulas, i.e., it has traversed the entire dependency graph originating with the input initiating this process. At that point, the processor 4502 designates as circular those formulas that have not been assigned to a group. Some formulas designated as circular might not be directly circular, but may just depend on circular formulas. To illustrate an embodiment having circular reference, the diagrams of FIG. 49C and FIG. 49D use the formulas of the spreadsheet 4600 but with one change: the formula for C7 is "=SUM(F4:F5)" instead of "=SUM (F3:F4)." Consequently, if the processor 4502 carries out the grouping operation described above, then the formulas for cells C7 and F5 would be separated out into a separate circularity group of their own for processing. In some cases, processing these formulas would involve displaying an error message on the user interface 4519.

Figure 51:
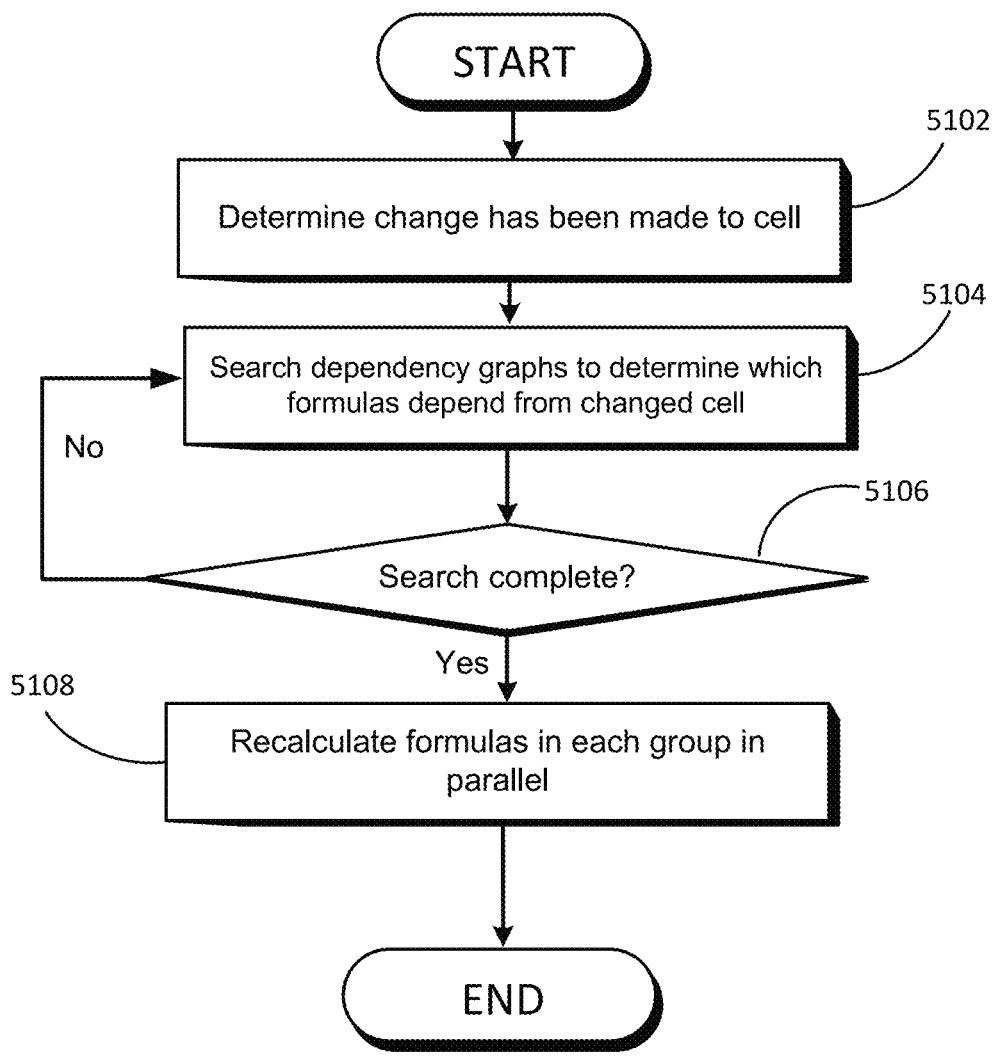
FIG. 51 shows an example of how a computing device reevaluates reference elements in an embodiment.

Turning to FIG. 51, an example of how a computing device reevaluates reference elements in an embodiment is described. As with the previous example, it will be assumed that the processor 4502 is carrying out the actions on the first computing device 4400 and that the reference elements are formulas of a spreadsheet. Furthermore, the actions represented in FIG. 51 do not necessarily have to be carried out in the sequence shown and may, as appropriate, be carried out in parallel. At block 5102, the processor 4502 determines that a change has been made to a cell of the spreadsheet. For example, assume that the first computing device 4400 hosts the spreadsheet 4600 by executing the productivity software 4401 on the processor 4502, and that the second computing device 4404 executes a web browser that interacts with the productivity software 4401 to display the spreadsheet 4600. Further assume that a user interacts with the second computing device 4404 (via the graphical user interface 4519) to change the value of cell B6 from '4' to '5,' which the processor 4502 detects. The second computing device 4404 transmits the changed value to the first computing device 4400 via the network 4402.

At block 5104, the processor 4502 searches the dependency graphs 4522 and 4524 (or searches the second RTree 4554) to determine which formulas depend on the changed cell. In this example, the processor 4502 determines, based on the search, that the formulas of cells B10, F4, and B8 reference cell B6. The processor 4502 continues to search the dependency graphs 4522 and 4524 (or the second RTree 4554) to identify the formulas that reference B10, F4, and B8, the formulas that reference those formulas, and so on, until the processor 4502 completes its search (block 5106). As a result, the processor 4502 identifies the formula of the cells shown in FIG. 49B. However, the processor 4502 does not need to determine the order in which to recalculate these formulas because the processor 4502 already made this determination during the process set forth in conjunction with FIG. 50. That is, each of the formulas located by the processor 4502 in carrying out blocks 5104 and 5106 have already been assigned to groups, and this group assignment is reflected in the data associated with the nodes of the dependency graphs 4522 and 4524 (or the second RTree 4554) with which the respective formulas are associated.

At block 5108, once the processor 4502 has completed identifying a group of formulas (and, for example, moves on to identifying the next group), the processor 4502 (in parallel with searching the dependency graphs 4522 and 4524 or the second RTree 4554) calculates the formulas of the group based on the new value in the changed cell. Because the formulas in a particular group do not depend on one another, the computing device 4400 can calculate each of these formulas in parallel with one another. In one embodiment, for each formula calculation completed, the processor 4502 stores the result in memory (e.g., cache memory) so that the formula or formulas of the next group that depend from the first formula can access the result. For example, the first processor core 4502A recalculates the result of the formula of B10 and stores the result in the first cache location 4504A, while, in parallel, a second processor core 4502B recalculates the result of the formula of F4 and stores the result in the third cache 4504B, and the third processor core 4502C recalculates the result of the formula of B8 and stores the result in the third cache 204C. Once recalculation of the formulas of Group 0 have been completed, any available processor core can access the appropriate result from the appropriate cache and begin recalculating the formulas of Group 1, and so on.

In an embodiment, the processor 4502 caches the results of frequently-used operations in order to optimize the speed at which it recalculates the formulas of a spreadsheet. For example, assume that the processor 4502 is executing a spreadsheet that has cells B1=SUM(A1:A100) and C1=SUM(A1:A100)+SUM(B1:B100). The processor 4502 needs to calculate B1 before C1, but B1 and C1 do share a common operation: SUM(A1:A100). When the processor 4502 calculates B1, it may cache the result in one of the cache locations of FIG. 45A or FIG. 45B. When the processor 4502 calculates C1, the processor 4502 reuses the result of the B1 calculation (i.e., retrieves the result from the cache location) so that, in order to calculate (or recalculate) 01, the processor 4502 only needs to calculate SUM(B1:B100).

According to various embodiments, a computing device can use one or more of the processes described above to calculate the degree of criticality or fragility of a reference element. For example, given a cell of a spreadsheet ("cell X"), criticality is a relative measure of the count of other cells whose values are in some way dependent on cell X. For example, a first cell is considered more critical than a second cell if the count of cells directly or indirectly dependent on the first cell is greater than the same count on the second cell. Conversely, given a cell ("cell Y"), fragility is a relative measure of the count of other cells upon which cell Y directly or indirectly depends. For example, a first cell is considered more fragile than a second cell if the count of cells upon which the first cell directly or indirectly depends is greater than the same count on the second cell. Dependents and dependencies may be due to a formula reference or some other mechanism that establishes a directional or bi-directional link between at least two cells.

For example, in the context of the computing device of FIG. 45A or FIG. 45B, the processor 4502 can, in an embodiment, determine which other cells depend on each cell by searching the first and second dependency graphs 4522 and 4524 (or the second RTree 4554), count the number of dependents located for each search, and designate those cells whose number of dependents exceeds a predetermined threshold as critical. Put another way, the processor 4502 takes a given cell and searches the dependency graphs 4522 and 4524 (or the second RTree 4554) to find out which cell ranges are "interested" in that cell. The processor 4502 obtains the list of ranges (e.g., a list of range objects, each range object including the spreadsheet location of each cell "interested" in that range). The processor 4502 then searches the dependency graphs 4522 and 4524 (or the second RTree 4554) again to determine which cells are interested in this first set of retrieved cells. The processor 4502 carries out this search procedure recursively until either it fails to find any more dependents or begins finding cells that it had previously located (which may occur if there are cells in a circularly-dependent relationship).

The processor 4502 may then highlight the cells designated to be critical on the graphical user interface 4519 (e.g., in particular color, such as green). Alternatively, the processor 4502 may rank the cells in order of criticality, and display a corresponding ranked list of the cells on the user interface 4519.

In another example, the processor 4502 can, in an embodiment, determine which other cells each cell depends on by analyzing the AST of the formula for each cell and searching the range tree 4520 (or the first RTree 4552). For example, the processor 4502 takes each cell having a formula, finds out which cell ranges the formula depends on from the AST of the formula, and searches the range tree 4520 (or the first RTree 4552) to find the cells in those ranges that have formulas. The processor 4502 then iterates over each of those cells, calculating the count of each cell's dependents by iteratively searching the range tree 4520 (or the first RTree 4552) for each successive set of formulas located. The processor 4502 designates those cells whose number of dependencies on other cells exceeds a predetermined threshold as fragile. The processor 4502 may then highlight the cells designated to be fragile on the graphical user interface 4519 (e.g., in particular color, such as red). Alternatively, the processor 4502 may rank the cells in order of fragility, and display a corresponding ranked list of the cells on the user interface 4519.

To illustrate one possible way in which the graphical user interface 4519 may be implemented according to an embodiment, FIG. 52A shows an example of a spreadsheet. The spreadsheet 5200 includes a number of cells that are interdependent either through a link (cells C10 and C18) or through formulas. FIG. 52B shows the various formulas and links in their respective cells. If, for example, the spreadsheet 5200 is being displayed by the processor 4502, the processor 4502 could carry out any of the procedures described above to maintain and identify dependencies and, in response to a user request (e.g., a pull-down menu selection of "Show Dependencies"), render, on the graphical user interface 4519, the representation of FIG. 52C, in which the different cells having formulas or links are shown in their relative locations on the spreadsheet 5200, but with the rest of the spreadsheet being hidden or shaded. Additionally, the processor 4502 could show the various edges of a graph (along with directional arrows to indicate which element depends on which). In this example, assuming that criticality is measured by the number of formulas that depend, either directly or indirectly, from a cell, then cell D10 would be the most critical of the spreadsheet 5200 (as it is depended upon by D12, C18, C19, C10, and C12). The processor 4502 could highlight cell D10 in green to indicate this characteristic. On the other hand, assuming that fragility is measured by the number of cells that a cell depends on, either directly or indirectly, then cell C12 would be the most fragile of the spreadsheet 5200 (as it depends on C11, D11, C10, C5, C19, C17, C18, C16, and D10). The processor 4502 could highlight cell C12 in red to indicate this characteristic.

According to an embodiment in which the architecture of FIG. 45B is used, the processor 4502 sets the MBRs of the first RTree 4552 so that each MBR is only one column wide. In other words, for each block of cells that has multiple columns, the processor 4502 breaks up the MBR by column. This technique conveys a significant technical advantage in terms of reducing search time and retrieval time needed by the processor 4502 (i.e., needed by the computing device) and reducing the processing resources consumed by the computing device. One reason for this is that for the most common table-based application—a spreadsheet—calculations tend to be columnar (e.g., SUM operations). An example that illustrates this advantage will now be described with reference to FIG. 53A, FIG. 53B, FIG. 54A, and FIG. 54B.

For this example, assume that a user of the second computing device 4404 has logged into the productivity software 4401 and, using the productivity software 4401, opens up a spreadsheet 5300 (FIG. 53A). The user imports two sets of data (e.g., from locally-stored comma-separated value ("csv") files) into the spreadsheet 5300 at two different times. The first set of data populates the cells marked with 'x' in FIG. 53A and the second set of data populates the cells marked with 'y.' Many other cells of the spreadsheet might have values or formulas as well.

Turning to FIG. 54A, in response to the import of the first set of data, the first computing device 4400 inserts a first node 5402 into the RTree 4552. The first node 5402 includes data representing a first MBR 5302 (FIG. 53A) that encompasses the cells of the first data set—cells D1-D5, E5-E20, and Z50-Z100. In response to the import of the second set of data, the first computing device 4400 inserts a second node 5404 into the RTree 4552. The second node 5402 includes data representing a second MBR 5304 (FIG. 53A) that encompasses the cells of the second data set—cells B1, C1, and F6-F8. Note that the representation of the RTree 4552 in FIG. 54A is simplified for the sake of illustration. In addition to what is depicted, there may be many nodes between the first and second nodes 5402 and 5404 and the root node (depicted in phantom with reference numeral 5406). Additionally, the first node 5402 has child nodes 5408, 5410, and 5412, while the second node 5404 has child nodes 5414 and 5416 that contain actual references to cells.

Further assume that the user attempts to carry out an operation that requires the first computing device 4400 to query the RTree 4552 for cell F9. Because F9 is within the first MBR 5302, the first computing device will need to retrieve all of the leaf nodes under the first node 5402 and, possibly, many if not all of the cells represented by those leaf nodes. Since the area encompassed by the first MBR 5302 is large in proportion to the actual cells occupied within the area, the first computing device 4400 will need to import potentially many, many nodes in order to determine that F9 is not under the first node 5402. This represents wasted searching and retrieval time by the first computing device 4400 as well as a waste of processing resources (e.g., active threads used by first computing device 4400).

To improve performance according to an embodiment, instead of defining the first MBR 5302 according to the outermost limits of area encompassing all of the cells in the first data set, the first computing device 4400 breaks the area up by column. Referring to FIG. 53B, for the first data set the first computing device 4400 establishes a first MBR 5320 for the cells in Column D, a second MBR 5322 for the cells in column E, and a third MBR 5324 for the cells in Column Z. Referring to FIG. 54B, the first computing device 4400 inserts data representing the first MBR 5320, the second MBR 5322, and the third MBR 5324 into the first node 5402. For the second data set, the computing device 4400 establishes a first MBR 5326 for the cells in Column B, a second MBR 5328 for the cells in Column C, and a third MBR 5330 for the cells in Column F. Referring again to FIG. 54B, the first computing device 4400 inserts data representing the first MBR 5326, the second MBR 5328, and the third MBR 5330 into the second node 5404. Thus, if the user attempts to carry out an operation that requires the first computing device 4400 to query the RTree 4552 for cell F9 (e.g., the user wants to sum all values in Column F from F1 to F9 and put the result in F10), the first computing device 4400 will, in its traversal down the RTree 4552, find out that the MBRs of the first node 5402 (in FIG. 54B) do not include that cell and will not bother retrieving further nodes down any path leading from the first node 5402.

According to an embodiment, the first computing device 4400 maintains the RTree 4552 in an immutable manner. In other words, the first computing device 4400 persists each version of the RTree 4552 within the data store 4550 by refraining from deleting old versions of nodes. Instead of deleting old versions of nodes, the first computing device 4400 creates new versions (where appropriate) and changes the references between nodes (e.g., changes the pointers from parent nodes to child nodes). For example, assume that node 5416 changes (e.g., due to some sort of change in the spreadsheet 5300 of FIG. 53B). The first computing device 4400 would respond by creating a new version of the node 5416—shown in FIG. 54C as node 5416a, which included the appropriate post-change data. The first computing device 4400 would also create a new root—shown as node 5406a (since the MBRs need to be updated)—and creates new versions of the rest of the nodes in the branches leading to node 5416a. The first computing device 4400 would also link the new root node 5406a to the new versions of the various intermediate branch nodes and to the original versions of the nodes along the branch that did not change. Using immutably-managed data structures helps to ensure that the entire change history of the RTree 4552 is preserved.

In an embodiment, one or more of the computing devices of FIG. 44 maintains a map that includes mappings between coordinates (e.g., row and column) of cells of a table that is displayed (e.g., on a display device) and coordinates of nodes in an RTree that contain MBRs whose range encompasses the cells. In effect, such mapping allows for the use of virtual coordinates. For many types of changes to the RTree 4552, the use of virtual coordinates reduces the number of nodes of the RTree 4552 that need to be updated.

Figure 55A:
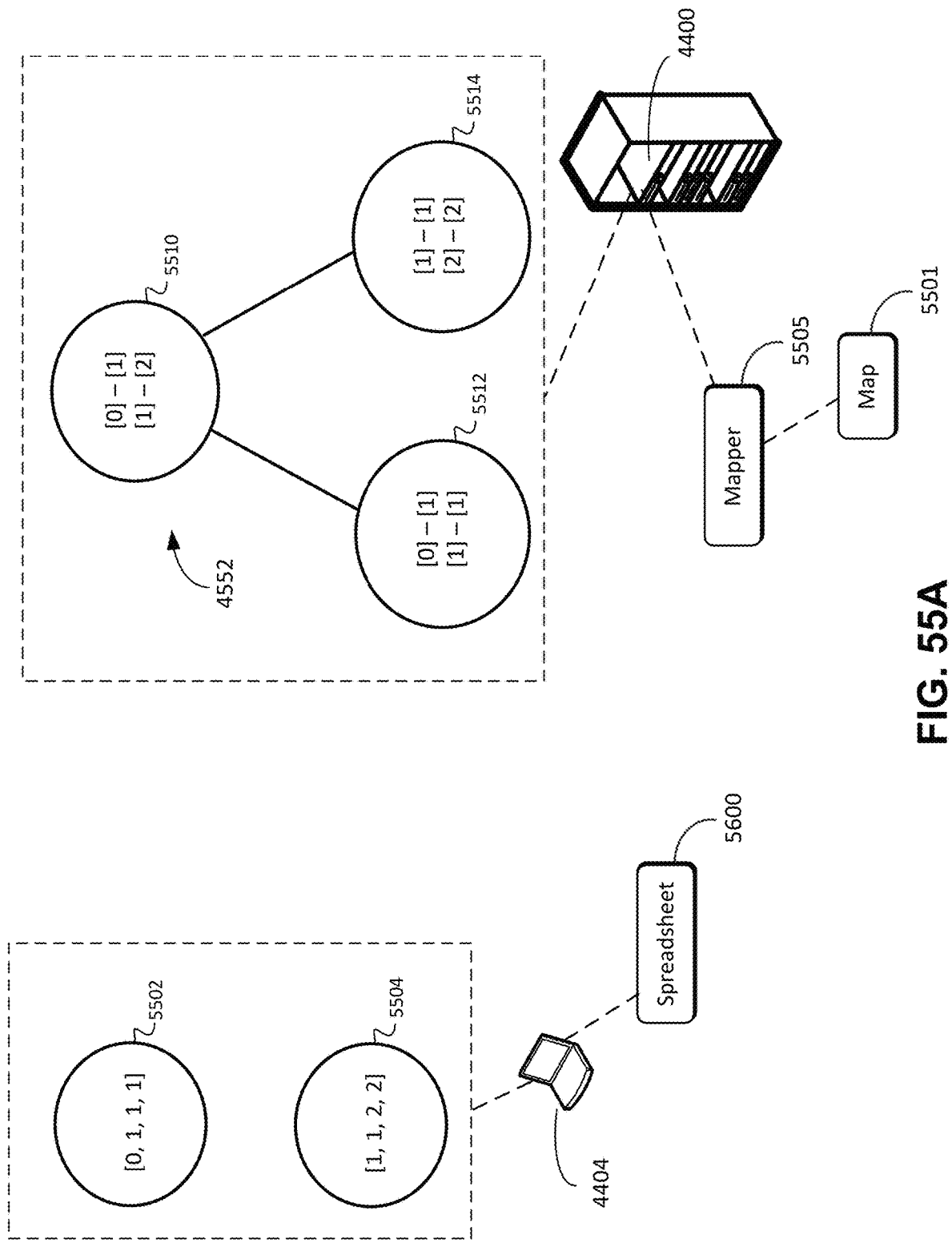

Turning to FIGS. 55A-55D and FIGS. 56A-56D, an example of how virtual coordinates may be implemented according to an embodiment will now be described. In this example, it will be assumed that the second computing device 4404 maintains the coordinates of a spreadsheet that is visually displayed on the second computing device 4404 and the first computing device 4400 maintains the coordinates of the corresponding nodes of the first RTree 4552 that contain the MBRs of the occupied cells. In this example, the initial state of the spreadsheet 5600 is shown in FIG. 55A and the initial state of the coordinates of the displayed spreadsheet, the initial state of the map (which is depicted with block 5501), and the initial state of the first RTree 4552 are shown in FIG. 55A. Initially, cells B1, B2, and C2 are occupied, and the second computing device 4404 maintains references to the values or formulas contained in these cells based on their display coordinates in nodes 5502 and 5504 (with values [0, 1, 1, 1] and [1, 1, 2, 2]). The first computing device 4400 maintains the MBR ranges in nodes 5510, 5512, and 5514. The first computing device 4400 also executes a virtual coordinate mapper 5505 that maps the display coordinates (from the client side) to the internal (i.e., node) coordinates on the RTree 4552 and vice versa. The mapping in the initial state is as follows:

Rows
0↔[0, 0]
1↔[1, 0]
Columns
1↔[1, 0]
2↔[2, 0]

In this example, the left value is the display coordinate and the right value is the node coordinate. The node coordinates are shown in the format [Whole, Fractional]. In other words, the node coordinates have a whole number component and a fractional number component. The nodes of the RTree in this example are ordered based on range, with the range attributes being stored as internal coordinates (coordinates of the RTree 4552). The ranges of the RTree 4552 are expressed as:

[Start Row]–[Stop Row]
[Start Column]–[Stop Column]

As shown in FIG. 81A, the first computing device 4400 stores the range attributes in nodes 1212 and 1214.

Continuing with the example (FIG. 55B), in a first operation, a user on the second computing device 4404 adds a cell (e.g., inserts a value into the cell) at display location E4 (represented in the memory of the second computing device 4404 as a node 5506 containing the values [3, 3, 4, 4]). The virtual coordinate mapper maps the display coordinates of the new cell to the node coordinates as follows:

Row
3↔[3, 0]
Column
4↔[4, 0]

Figure 55B:
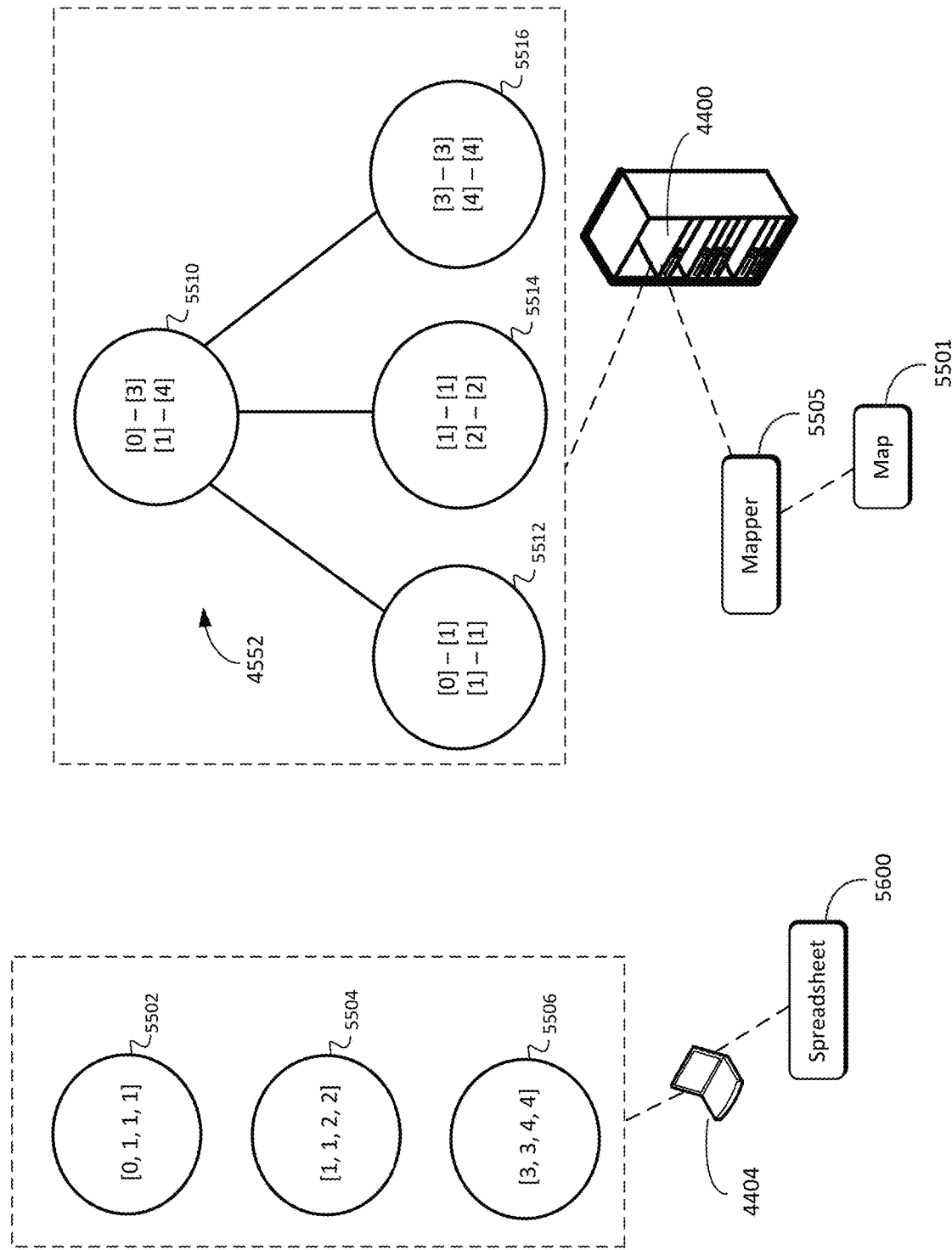

The first computing device 4400 responds by adding a fourth node 5516 to the RTree 4552, with a node coordinate of [3, 3, 4, 4], as shown in FIG. 55B.

Figures 56A, 56B, 56C, 56D:
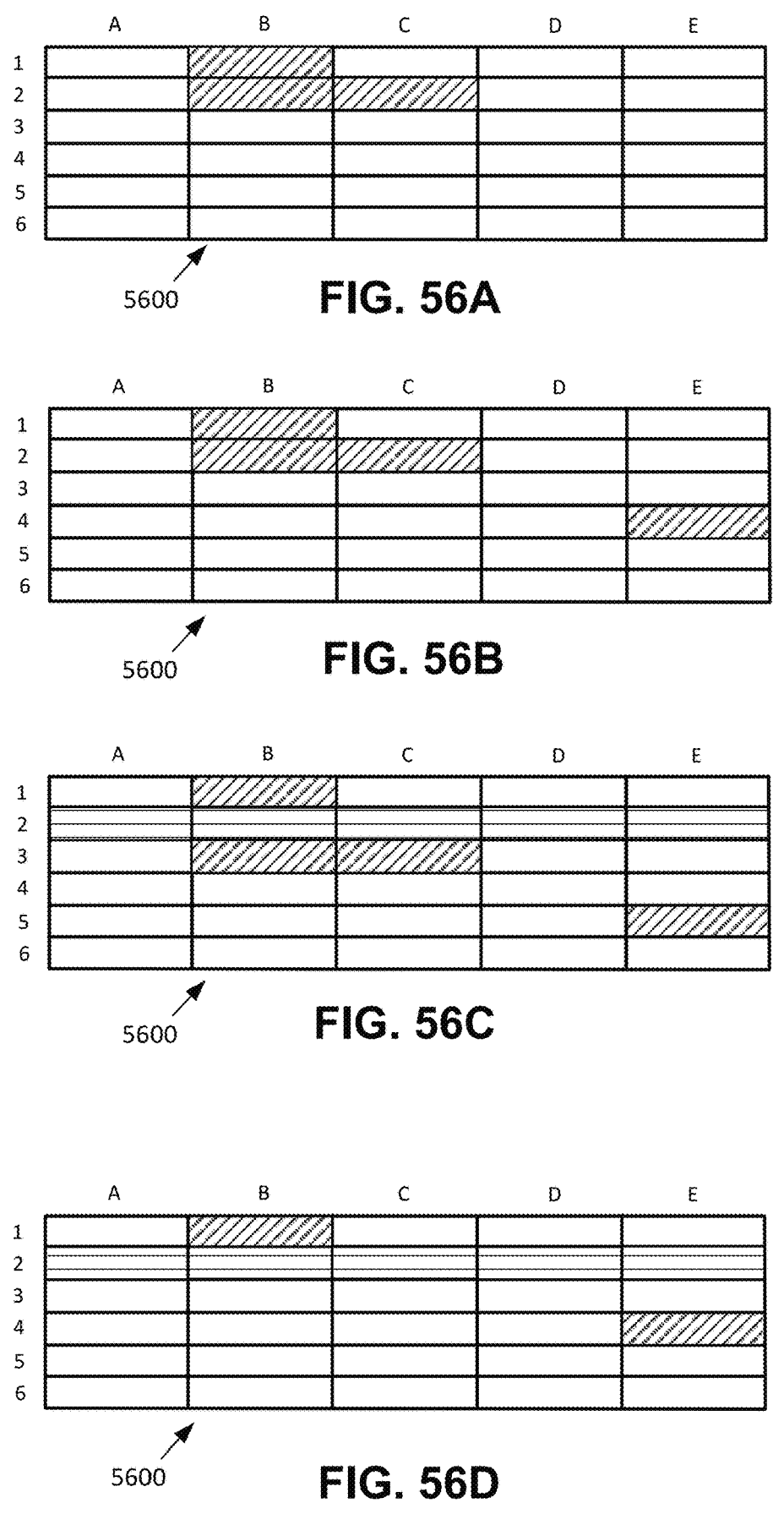

In a second operation, a user on the second computing device 4404 inserts a row (e.g., shifts cells, shifts partial row(s), or shifts complete row(s)) at Row 2 of the spreadsheet 5600 (FIG. 56C). The virtual coordinate mapper 5505 updates the mapping of the display coordinates to the node coordinates for the rows to include a fractional value (of 0.5) for Row 2 (which has been pushed down to Row 3) and to map new Rows 3 and 5 to the same node coordinates as old Rows 2 and 4. The column mappings remain unchanged:

Rows
0↔[0, 0]
1↔[0, 0.5]
2↔[1, 0]
4↔[3, 0]
Columns
1↔[1, 0]
2↔[2, 0]
4↔[4, 0]

Figure 55C:
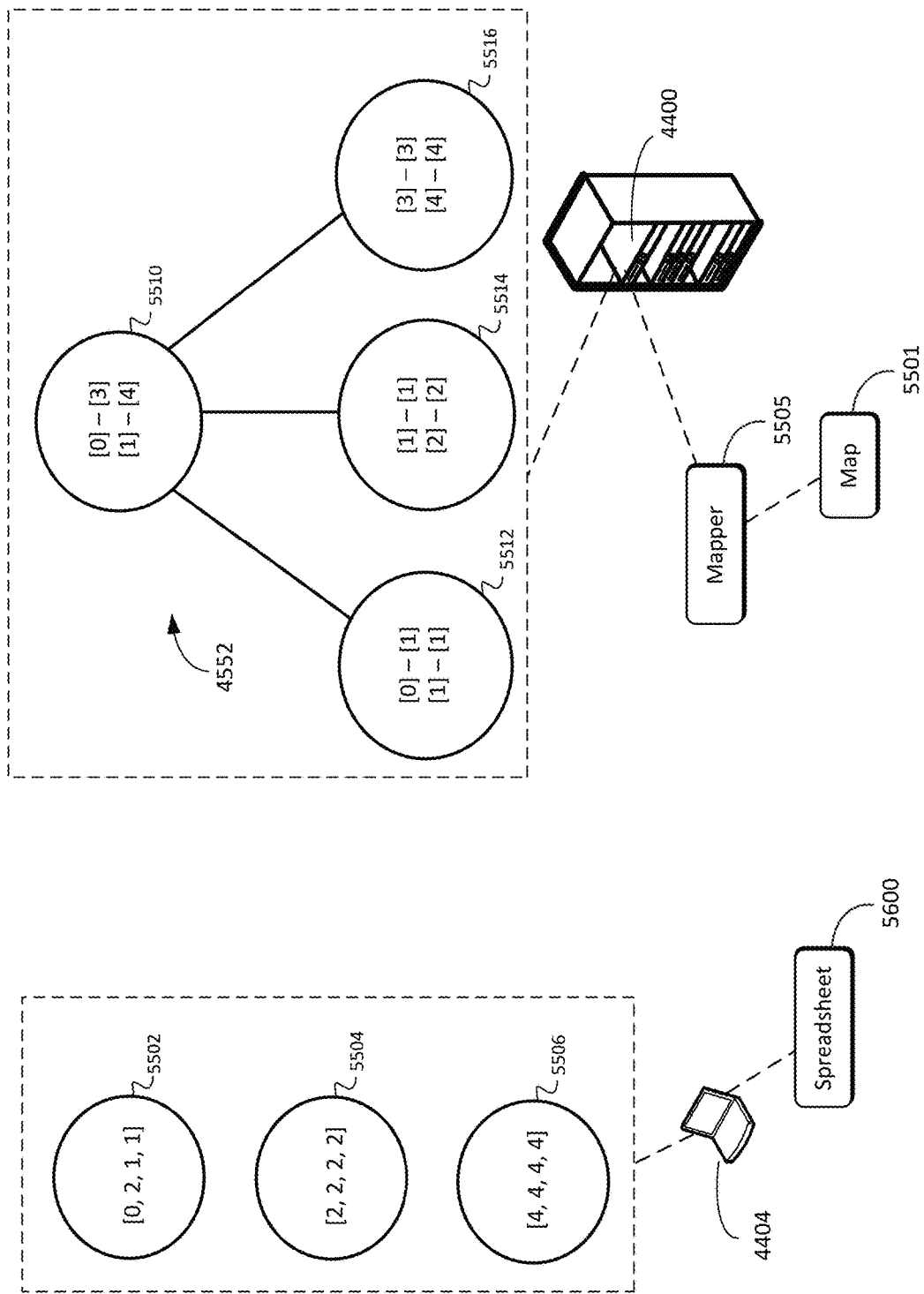

The first computing device 4400 does not need to update the RTree 4552, i.e., the RTree 4552 in FIG. 55C is the same as the RTree 4552 in FIG. 55B. This reduces the amount of work that the first computing device 4400 needs to perform and reduces the number of accesses the first computing device 4400 needs to make to the data store 4550. From the user's point of view, the improvement may be very significant (e.g., a 0.1 second delay versus a 10 second delay—depending on how many nodes in the RTree would have had to be updated if not for the use of virtual coordinates).

In an embodiment, the first computing device 4400 calculates the fractional component of the coordinate of the newly added node as follows: Find the lexical midpoint between existing mappings adjacent to the inserted row and map the inserted row to this value. The first computing device shifts all subsequent mappings accordingly.

Figure 55D:
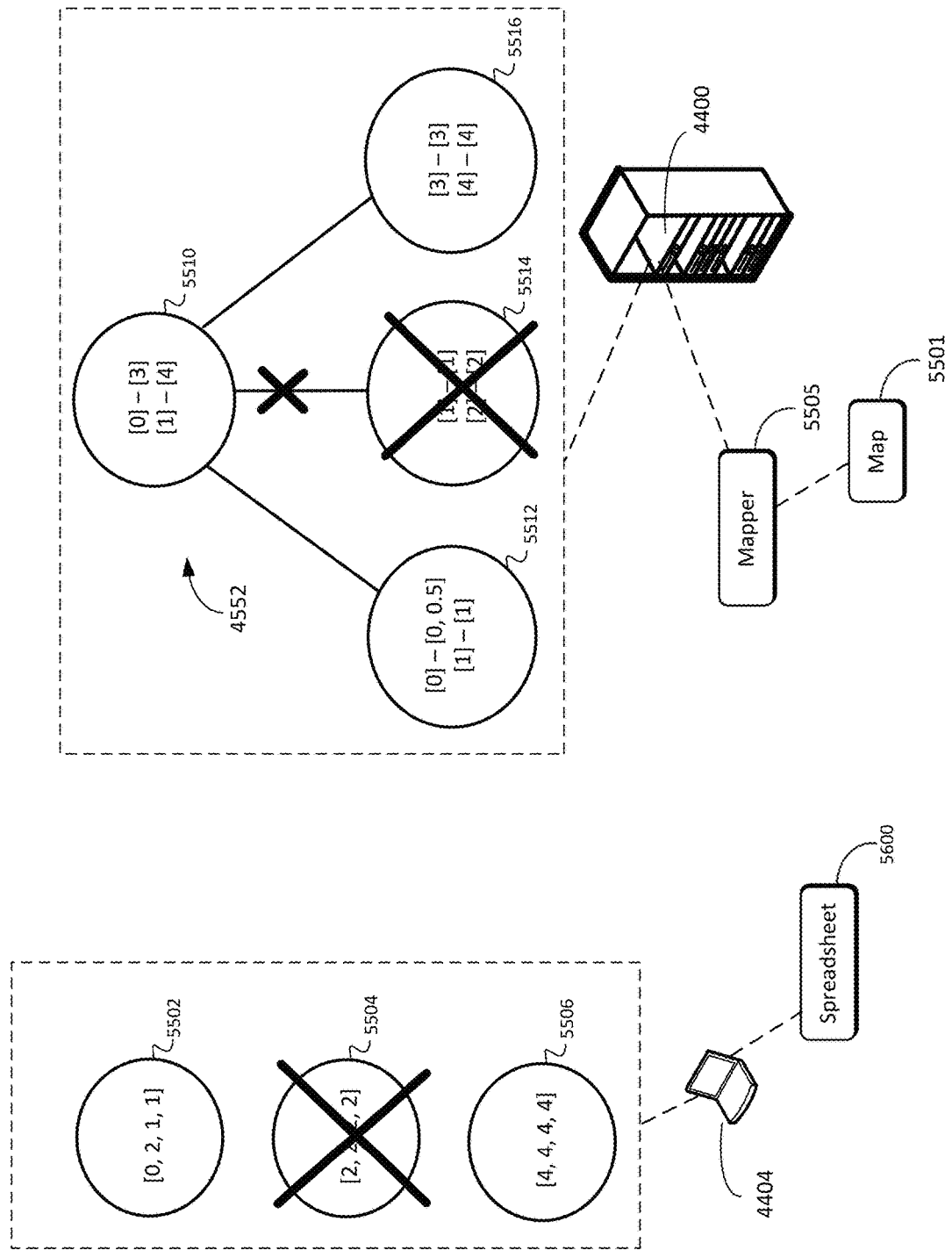

In a third operation, a user on the second computing device 4404 deletes Row 3 of the spreadsheet. The second computing device 4404 updates the display coordinates as shown in FIG. 55D (deleting the node 5504 representing the deleted row). The virtual coordinate mapper updates the mapping of the display coordinates by deleting the entry for Row 3 and mapping new Row 4 to the same node coordinates as old Row 5 (which has now shifted up). The remainder of the mappings remain unchanged:

Rows
0↔[0, 0]
1↔[0, 0.5]
3↔[3, 0]
Columns
1↔[1, 0]
2↔[2, 0]
4↔[4, 0]

For nodes with ranges containing start or stop rows corresponding to the deleted the node, the first computing device 4400 updates and re-inserts those nodes, or deletes them if both the start and stop row correspond to the deleted row. In this example, the first computing device 4400 deletes the node 5514 representing Row 3 from the RTree 4552, as shown in FIG. 55D.

It should be understood that the exemplary embodiments described herein should be considered in a descriptive sense only and not for purposes of limitation. Descriptions of features or aspects within each embodiment should typically be considered as available for other similar features or aspects in other embodiments. It will be understood by those of ordinary skill in the art that various changes in form and details may be made therein without departing from their spirit and scope as set forth in the following claims. For example, the actions described herein can be reordered in ways that will be apparent to those of skill in the art.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the embodiments illustrated in the drawings, and specific language has been used to describe these embodiments. However, no limitation of the scope of the invention is intended by this specific language, and the invention should be construed to encompass all embodiments that would normally occur to one of ordinary skill in the art. The terminology used herein is for the purpose of describing the particular embodiments and is not intended to be limiting of exemplary embodiments of the invention. In the description of the embodiments, certain detailed explanations of related art are omitted when it is deemed that they may unnecessarily obscure the essence of the invention.

The apparatus described herein may comprise a processor, a memory for storing program data to be executed by the processor, a permanent storage such as a disk drive, a communications port for handling communications with external devices, and user interface devices, including a display, touch panel, keys, buttons, etc. When software modules are involved, these software modules may be stored as program instructions or computer readable code executable by the processor on a non-transitory computer-readable media such as magnetic storage media (e.g., magnetic tapes, hard disks, floppy disks), optical recording media (e.g., CD-ROMs, Digital Versatile Discs (DVDs), etc.), and solid state memory (e.g., random-access memory (RAM), read-only memory (ROM), static random-access memory (SRAM), electrically erasable programmable read-only memory (EEPROM), flash memory, thumb drives, etc.). The computer readable recording media may also be distributed over network coupled computer systems so that the computer readable code is stored and executed in a distributed fashion. This computer readable recording media may be read by the computer, stored in the memory, and executed by the processor.

Also, using the disclosure herein, programmers of ordinary skill in the art to which the invention pertains may easily implement functional programs, codes, and code segments for making and using the invention.

The invention may be described in terms of functional block components and various processing steps. Such functional blocks may be realized by any number of hardware and/or software components configured to perform the specified functions. For example, the invention may employ various integrated circuit components, e.g., memory elements, processing elements, logic elements, look-up tables, and the like, which may carry out a variety of functions under the control of one or more microprocessors or other control devices. Similarly, where the elements of the invention are implemented using software programming or software elements, the invention may be implemented with any programming or scripting language such as C, C++, JAVA®, assembler, or the like, with the various algorithms being implemented with any combination of data structures, objects, processes, routines or other programming elements. Functional aspects may be implemented in algorithms that execute on one or more processors. Furthermore, the invention may employ any number of conventional techniques for electronics configuration, signal processing and/or control, data processing and the like. Finally, the steps of all methods described herein may be performed in any suitable order unless otherwise indicated herein or otherwise clearly contradicted by context.

For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device.

The words "mechanism", "element", "unit", "structure", "means", and "construction" are used broadly and are not limited to mechanical or physical embodiments, but may include software routines in conjunction with processors, etc.

The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those of ordinary skill in this art without departing from the spirit and scope of the invention as defined by the following claims. Therefore, the scope of the invention is defined not by the detailed description of the invention but by the following claims, and all differences within the scope will be construed as being included in the invention.

No item or component is essential to the practice of the invention unless the element is specifically described as "essential" or "critical". It will also be recognized that the terms "comprises," "comprising," "includes," "including," "has," and "having," as used herein, are specifically intended to be read as open-ended terms of art. The use of the terms "a" and "an" and "the" and similar referents in the context of describing the invention (especially in the context of the following claims) are to be construed to cover both the singular and the plural, unless the context clearly indicates otherwise. In addition, it should be understood that although the terms "first," "second," etc. may be used herein to describe various elements, these elements should not be limited by these terms, which are only used to distinguish one element from another. Furthermore, recitation of ranges of values herein are merely intended to serve as a shorthand method of referring individually to each separate value falling within the range, unless otherwise indicated herein, and each separate value is incorporated into the specification as if it were individually recited herein.

The invention claimed is:

1. A method for facilitating private drafting, the method comprising:
   storing, in a database, a mainline causal tree structure corresponding to a document, wherein the mainline causal tree structure comprises a sequence of nodes arranged in two or more branches and each node comprises an editing instruction and an identifier unique to the editing instruction, wherein the sequence of nodes tracks and stores changes made to the document over a history of the document;
   receiving, from a first user of a plurality of users collaborating on the document, a request to edit a section of the document in a draft mode;
   in response to the edit request, creating a draft branch of the mainline causal tree structure to manage editing instructions for the section of the document in the draft mode, wherein the draft branch comprises a sequence of nodes, a portion of which correspond to the nodes of the mainline causal tree structure, and each node of the draft branch comprises an editing instruction and an identifier unique to the editing instruction;
   receiving, from the first user, an edit for the section of the document in the draft mode;
   displaying a result of the edit on a computing device of the first user but not on computing devices of other users of the plurality of users;
   storing, in an additional node of the draft branch, an editing instruction that represents the edit by the first user;
   receiving, from the first user, a request to publish the edit; and
   in response to the request to publish the edit,
      merging the draft branch of the causal tree structure with the mainline causal tree structure, and
      displaying the result of the edit on computing devices of the other users of the plurality of users.

2. The method of claim 1, further comprising:
   in response to receiving the edit request, displaying, on the computing device of the first user and the computing devices of the other users, an indicator to indicate that the section of the document is being edited in the draft mode.

3. The method of claim 2, further comprising:
removing the indicator after receiving the request to publish the edit.

4. The method of claim 1, further comprising:
while the section of the document is in the draft mode, preventing the other users of the plurality of users from editing the section of the document.

5. The method of claim 1, further comprising:
while the section of the document is in the draft mode, receiving, from the first user, an edit to a different section of the document that is not in the draft mode; and
while the section of the document is in the draft mode, displaying the result of the edit to the different section of the document on the computing devices of the other users of the plurality of users.

6. The method of claim 1, wherein each of the nodes of the mainline causal tree structure is associated with a first document identifier and each of the nodes of the draft branch is associated with a second document identifier different from the first document identifier.

7. The method of claim 1, wherein the edit by the first user is one of a plurality of edits made by the first user to the section of the document in the draft mode, and wherein merging the draft branch of the causal tree structure with the mainline causal tree structure includes
grouping the plurality of edits by the first user into a single editing instruction; and
storing the single editing instruction in an additional node of the mainline causal tree structure.

8. The method of claim 1, further comprising:
while the section of the document is in the draft mode, receiving, from the first user, a request to add a second user of the plurality of users to the draft mode; and
in response to the request to add the second user to the draft mode, allowing the second user to make edits to the section of the document in the draft mode.

9. The method of claim 1, wherein the section of the document in the draft mode includes first content that is linked to second content not in the section of the document in the draft mode, further comprising:
while the section of the document is in the draft mode, receiving an edit to the second content; and
in response to receiving the edit to the second content, updating the first content linked to the second content.

10. The method of claim 9, wherein the second content is included in a different section of the document not in the draft mode.

11. The method of claim 9, wherein the document being collaborated on by the plurality of users is a first document, and the second content is included in a second document different from the first document.

* * * * *